Figure 13:
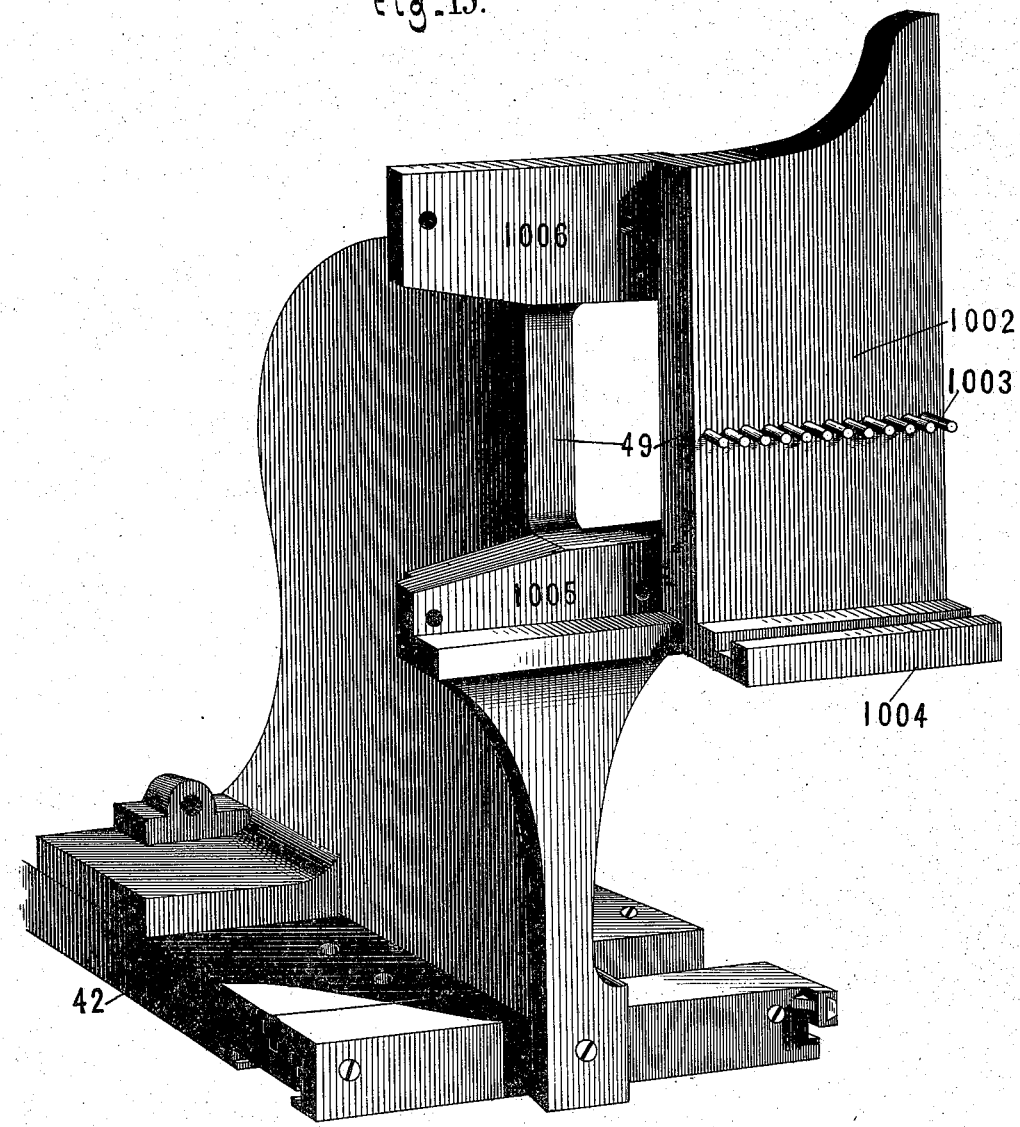

(No Model.)　　　　　　　　　　　　　　　　163 Sheets—Sheet 1.
J. W. PAIGE.
MACHINE FOR DISTRIBUTING, SETTING, AND JUSTIFYING TYPE.
No. 547,860.　　　　　　　　　　　Patented Oct. 15, 1895.
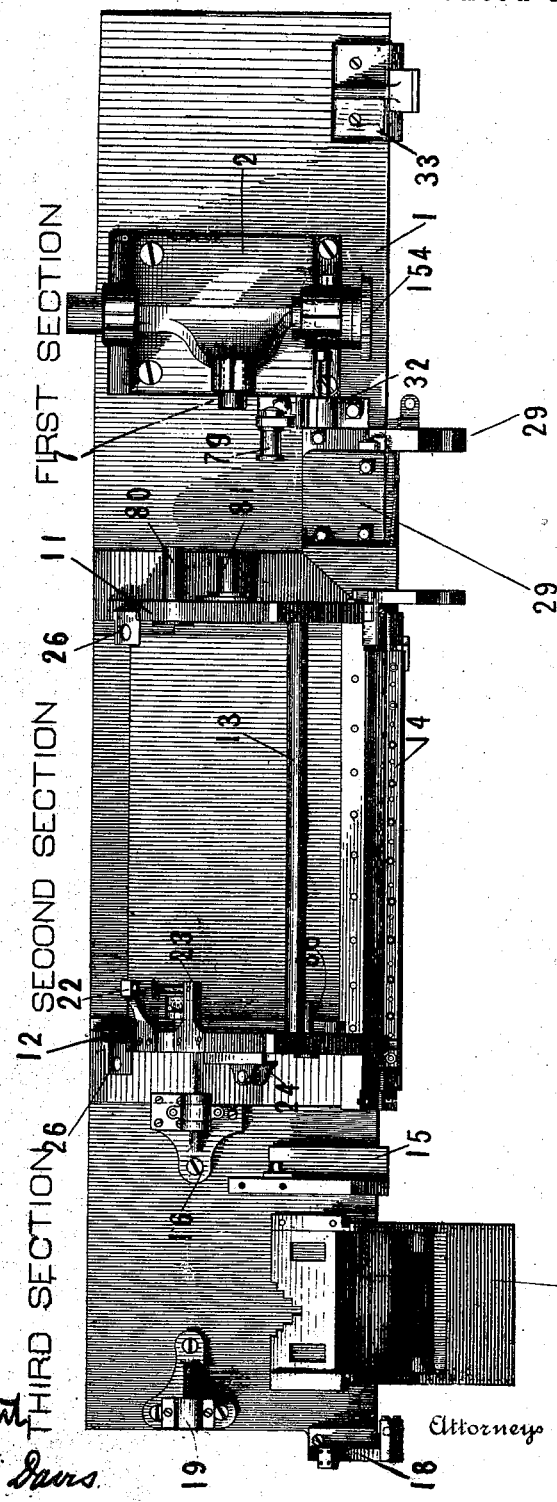
Witnesses　　　　　　　　　　　　　　　Inventor (No Model.) 163 Sheets—Sheet 2.
J. W. PAIGE.
MACHINE FOR DISTRIBUTING, SETTING, AND JUSTIFYING TYPE.
No. 547,860. Patented Oct. 15, 1895.
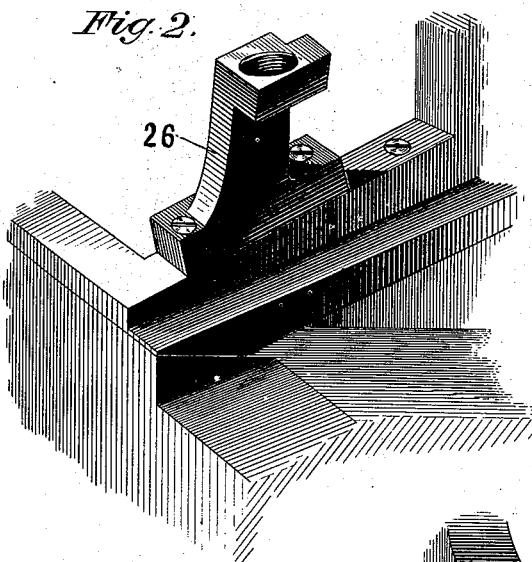
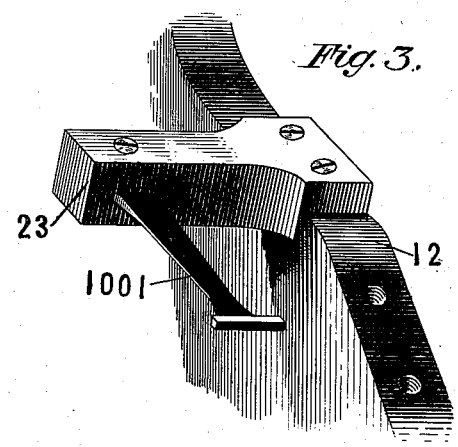
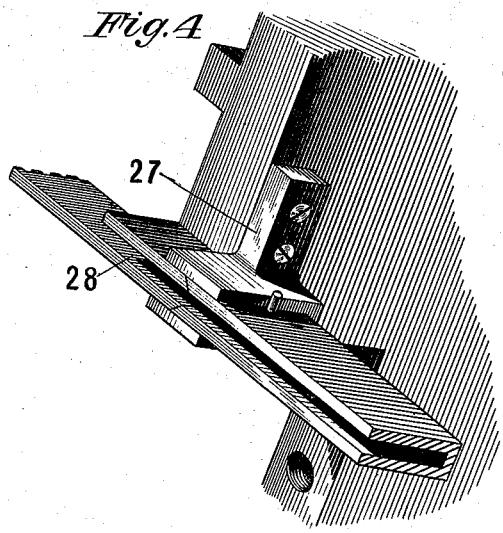

(No Model.)
J. W. PAIGE.
MACHINE FOR DISTRIBUTING, SETTING, AND JUSTIFYING TYPE.
No. 547,860. Patented Oct. 15, 1895.
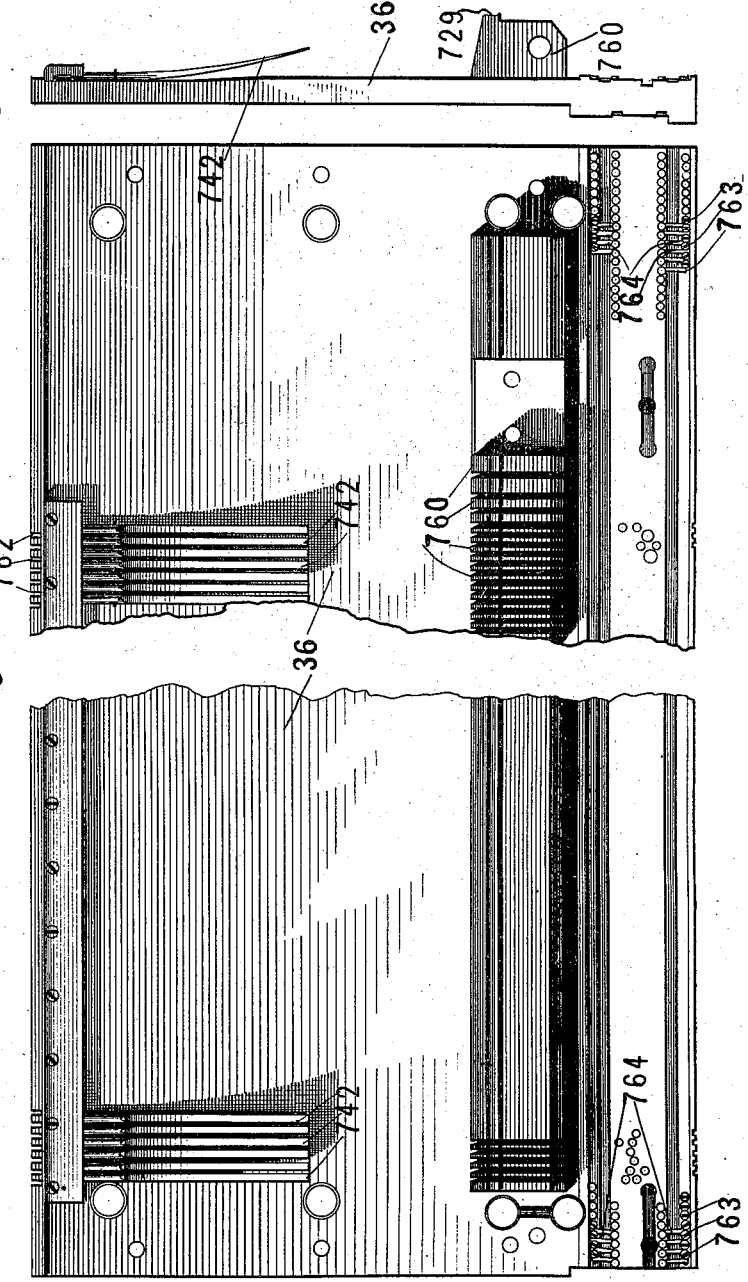

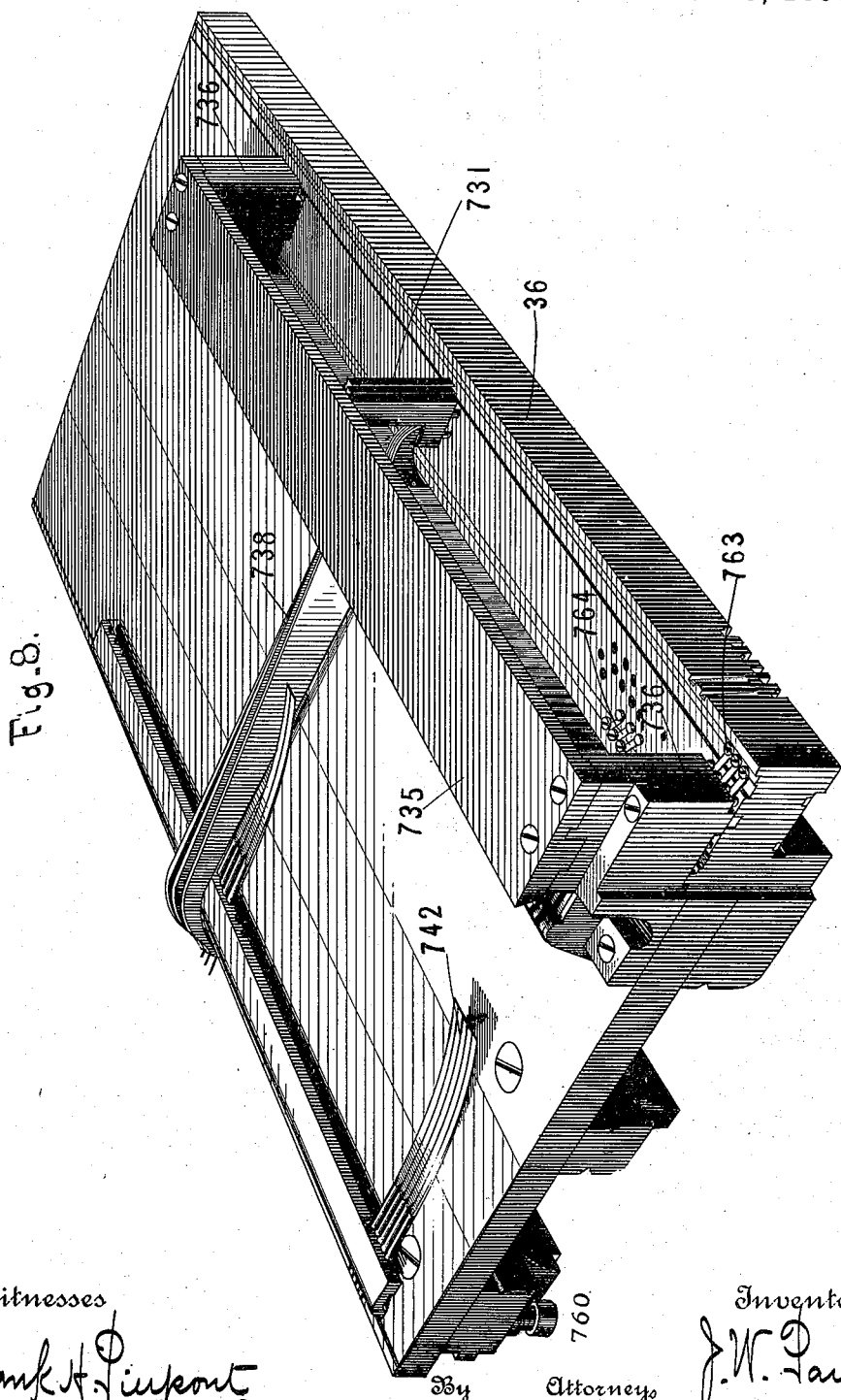

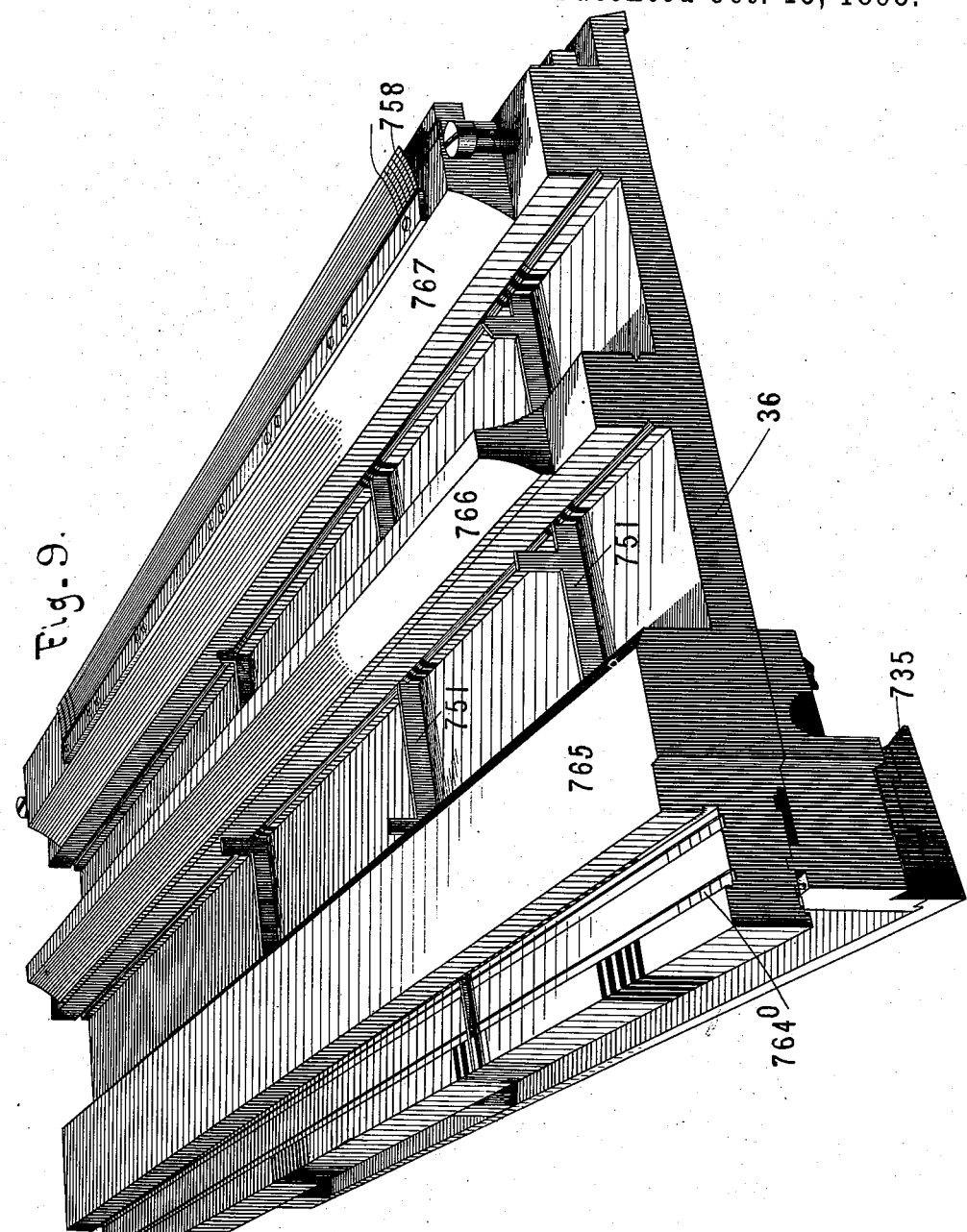

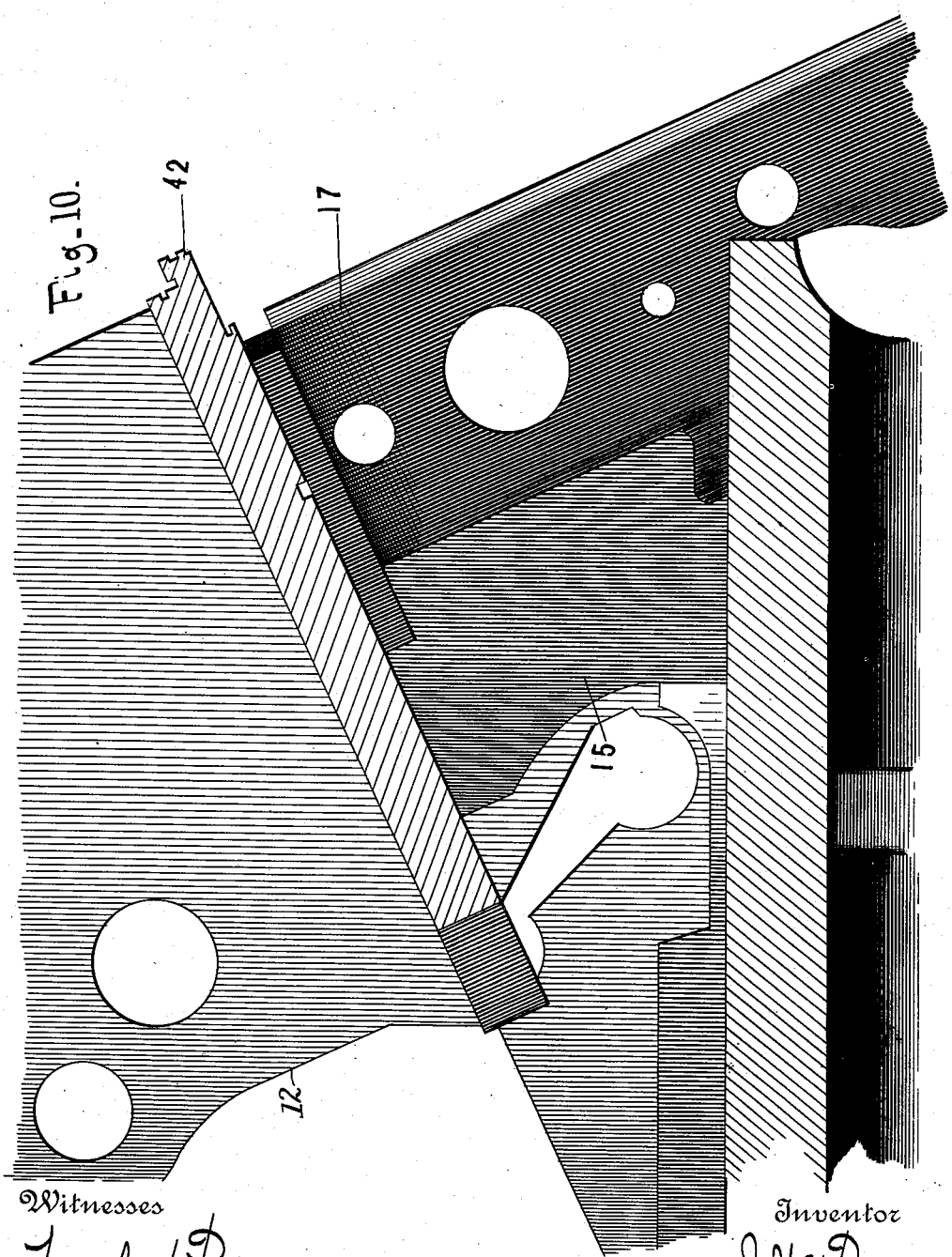

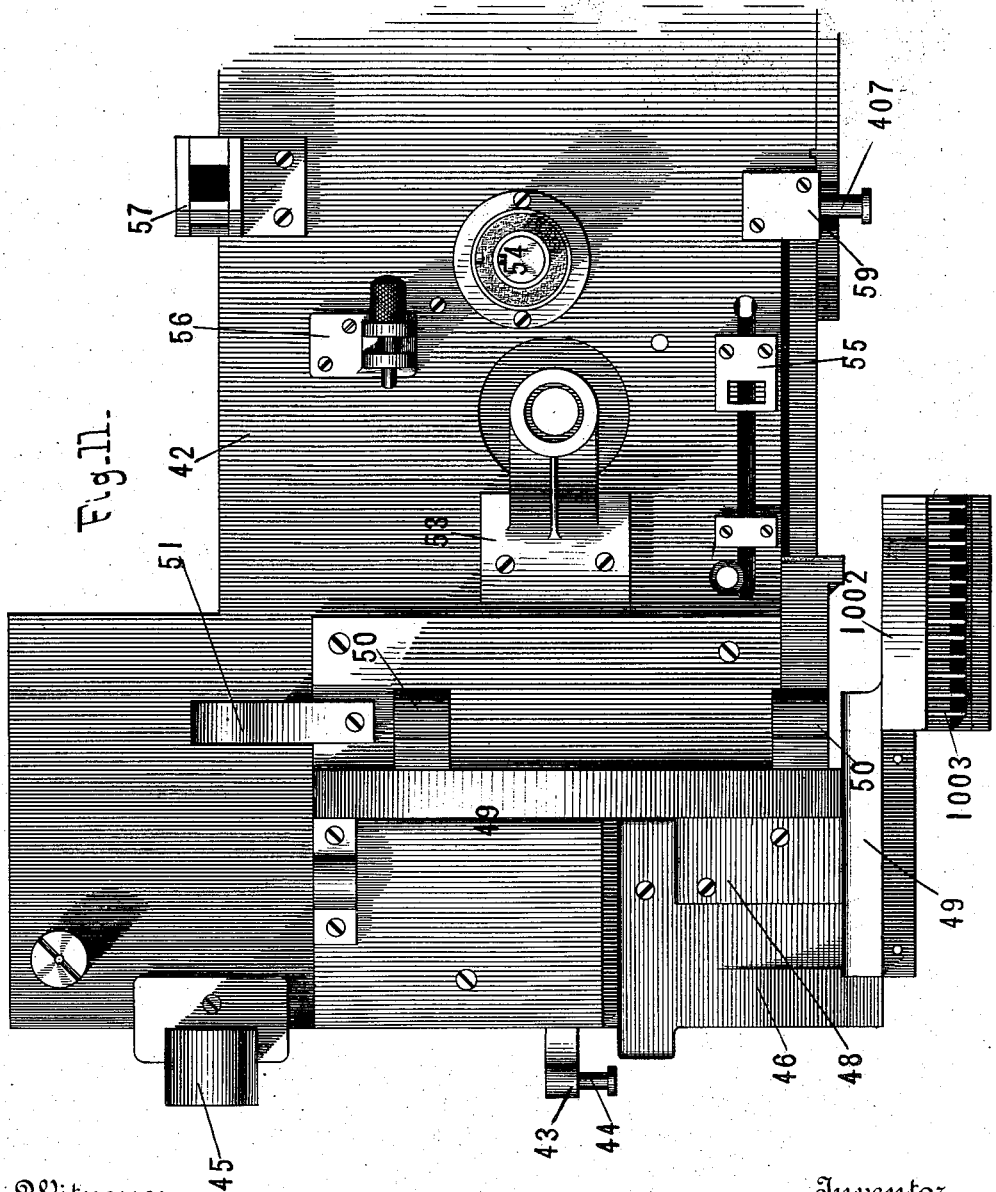

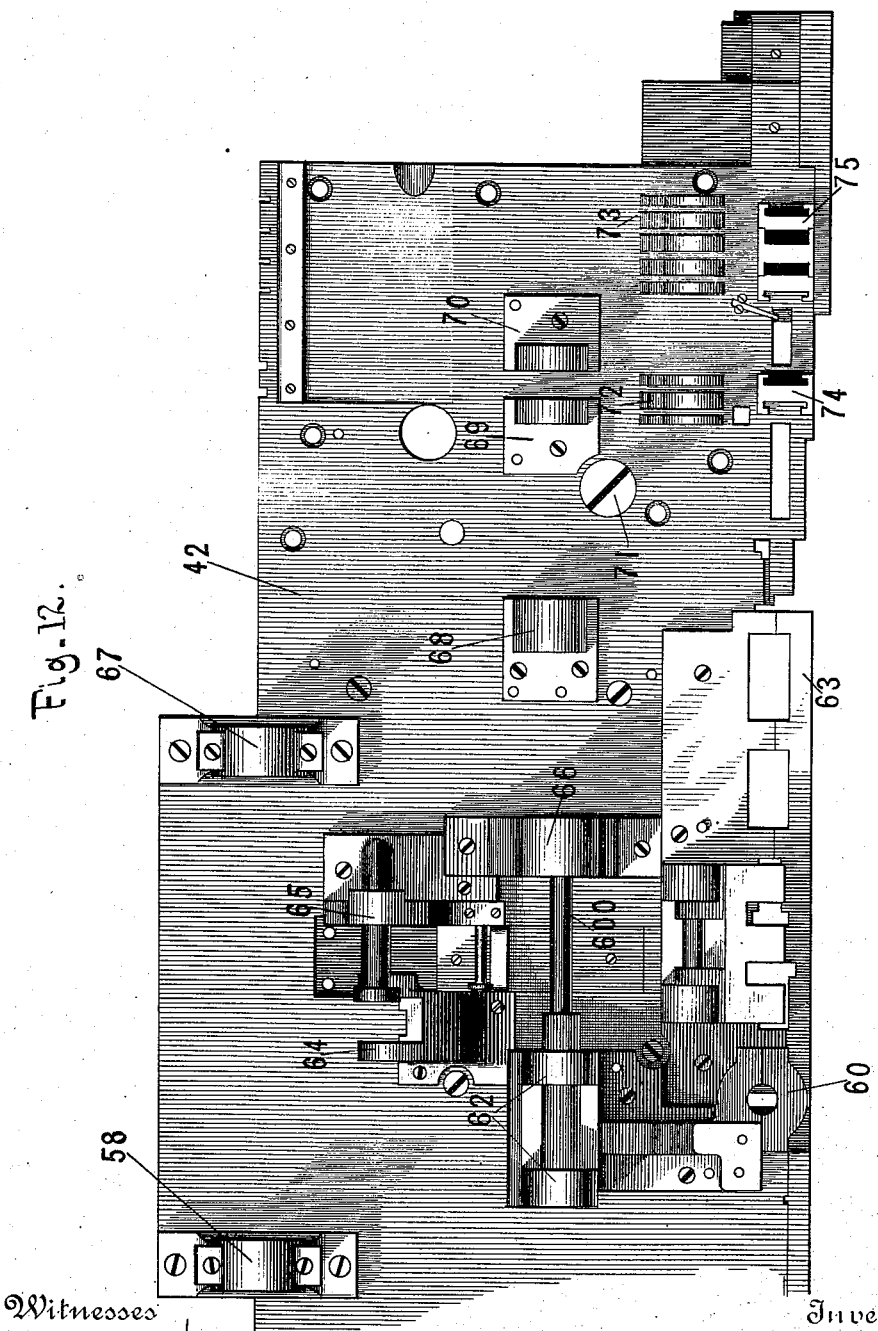

(No Model.) 163 Sheets—Sheet 10.

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis

Inventor
J. W. Paige
By Attorneys
H. W. Beadle & Co.

(No Model.) 163 Sheets—Sheet 11.
J. W. PAIGE.
MACHINE FOR DISTRIBUTING, SETTING, AND JUSTIFYING TYPE.
No. 547,860. Patented Oct. 15, 1895.

Witnesses
Frank H. Pierpont
Charles E. Davis

Inventor
J. W. Paige
By Attorney
H. W. Beadle + Co.

(No Model.) 163 Sheets—Sheet 12.
J. W. PAIGE.
MACHINE FOR DISTRIBUTING, SETTING, AND JUSTIFYING TYPE.
No. 547,860. Patented Oct. 15, 1895.

Witnesses
Frank H. Pierpont
Charles E. Davis

Inventor
J. W. Paige
By Attorney
H. W. Beadle & Co.

(No Model.) 163 Sheets—Sheet 13.
J. W. PAIGE.
MACHINE FOR DISTRIBUTING, SETTING, AND JUSTIFYING TYPE.
No. 547,860. Patented Oct. 15, 1895.

Witnesses
Frank H. Dupont
Charles E. Davis.

Inventor
J. W. Paige
By Attorneys
H. W. Beadle & Co.

(No Model.)  163 Sheets—Sheet 15.

J. W. PAIGE.
MACHINE FOR DISTRIBUTING, SETTING, AND JUSTIFYING TYPE.

No. 547,860. Patented Oct. 15, 1895.

WITNESSES:
Frank H. Pierpont
Charles E. Davis.

INVENTOR
J. W. Paige
BY H. W. Beadle & Co.

ATTORNEYS

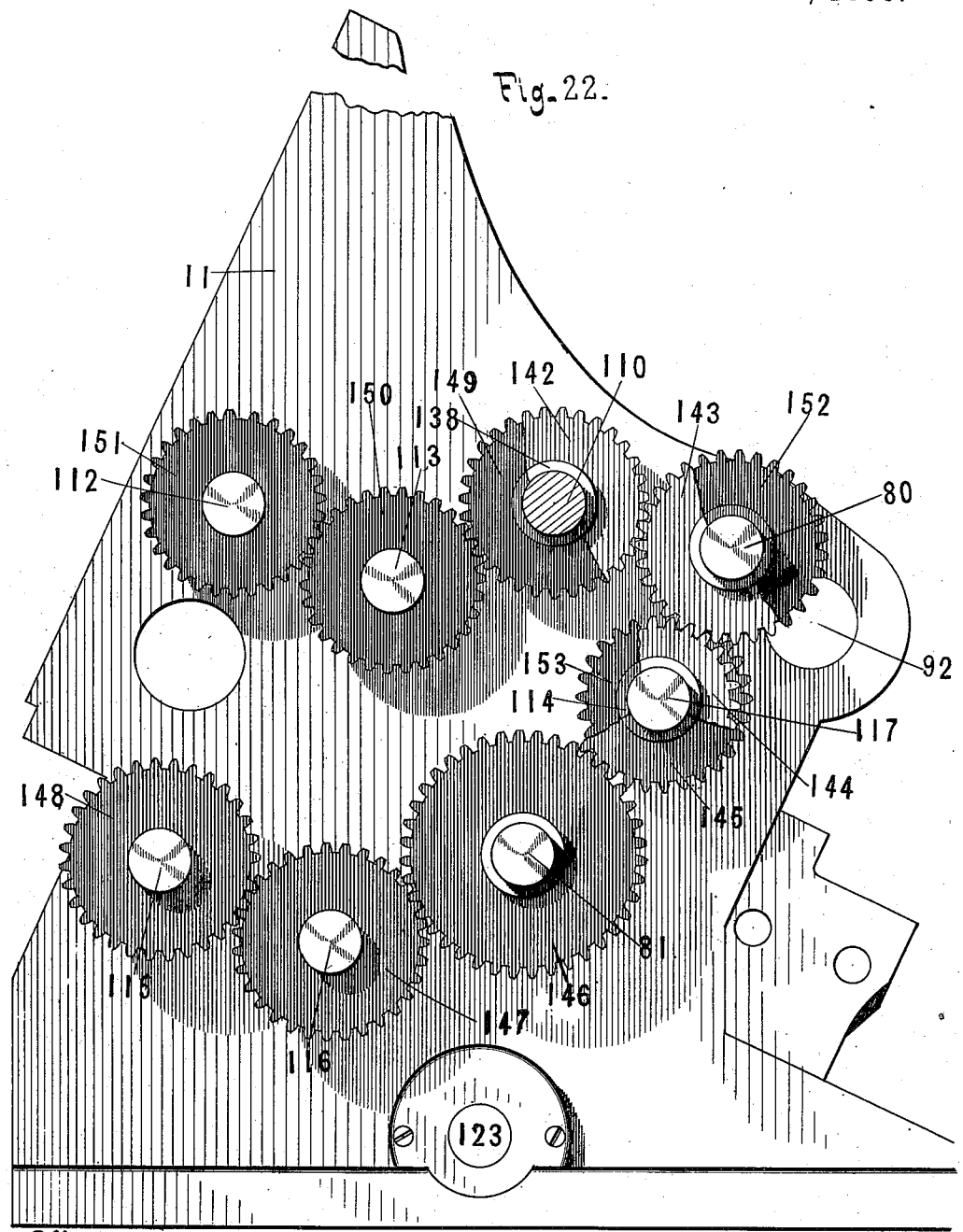

(No Model.) 163 Sheets—Sheet 17.
J. W. PAIGE.
MACHINE FOR DISTRIBUTING, SETTING, AND JUSTIFYING TYPE.
No. 547,860. Patented Oct. 15, 1895.
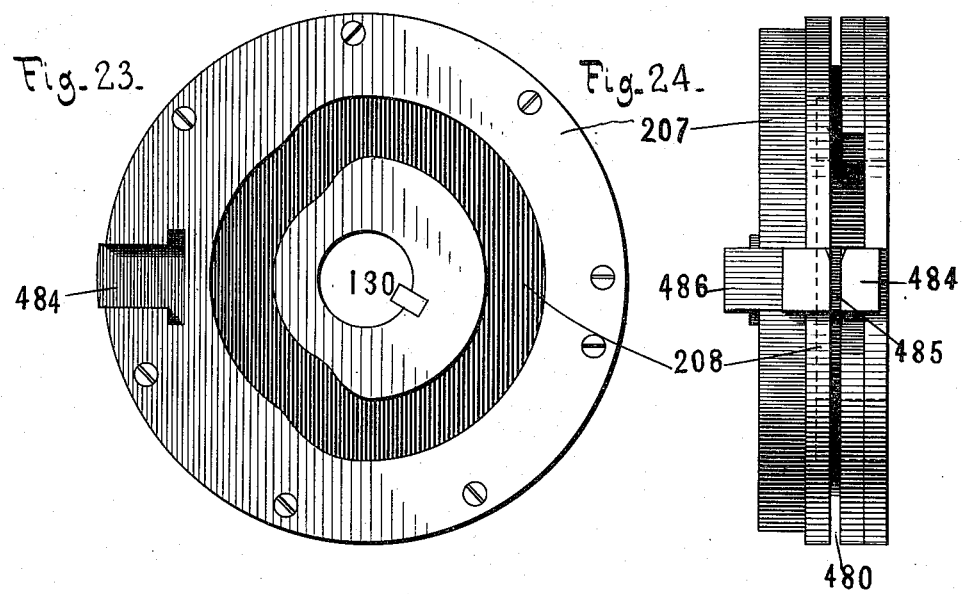
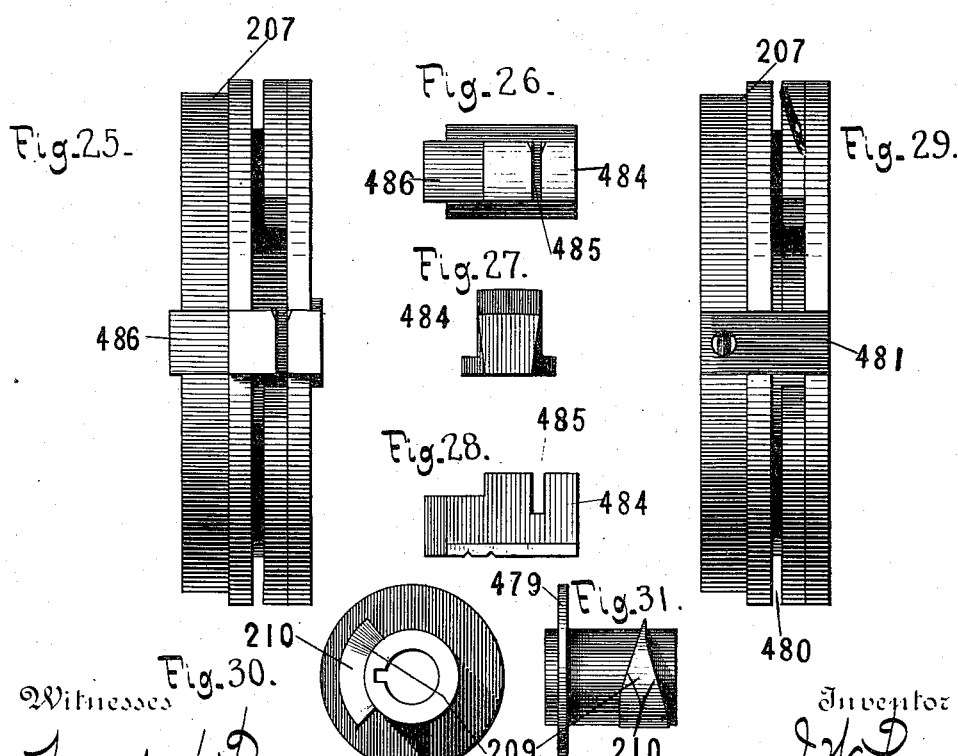

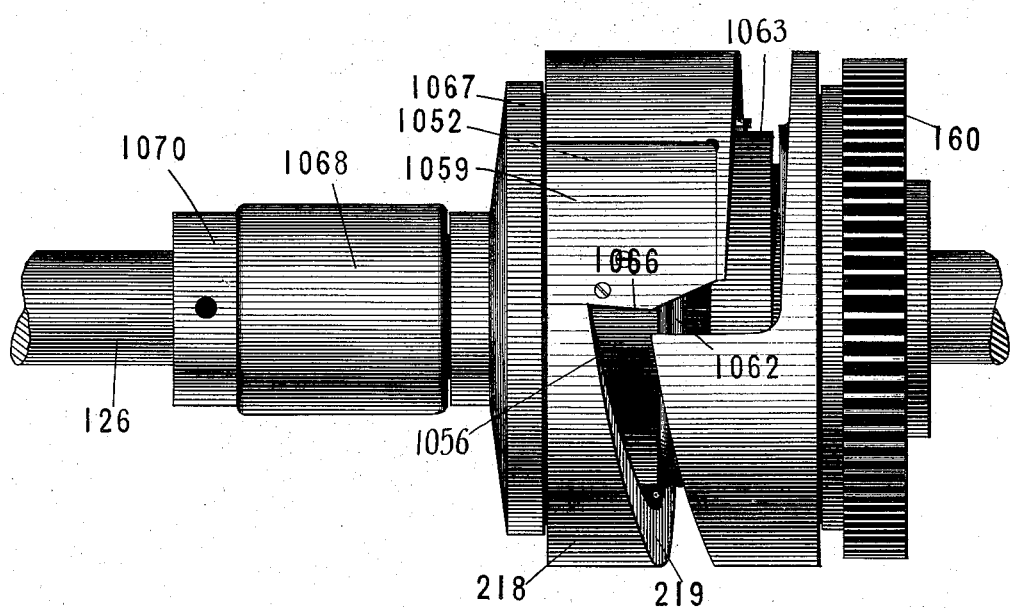

(No Model.)

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadle & Co.

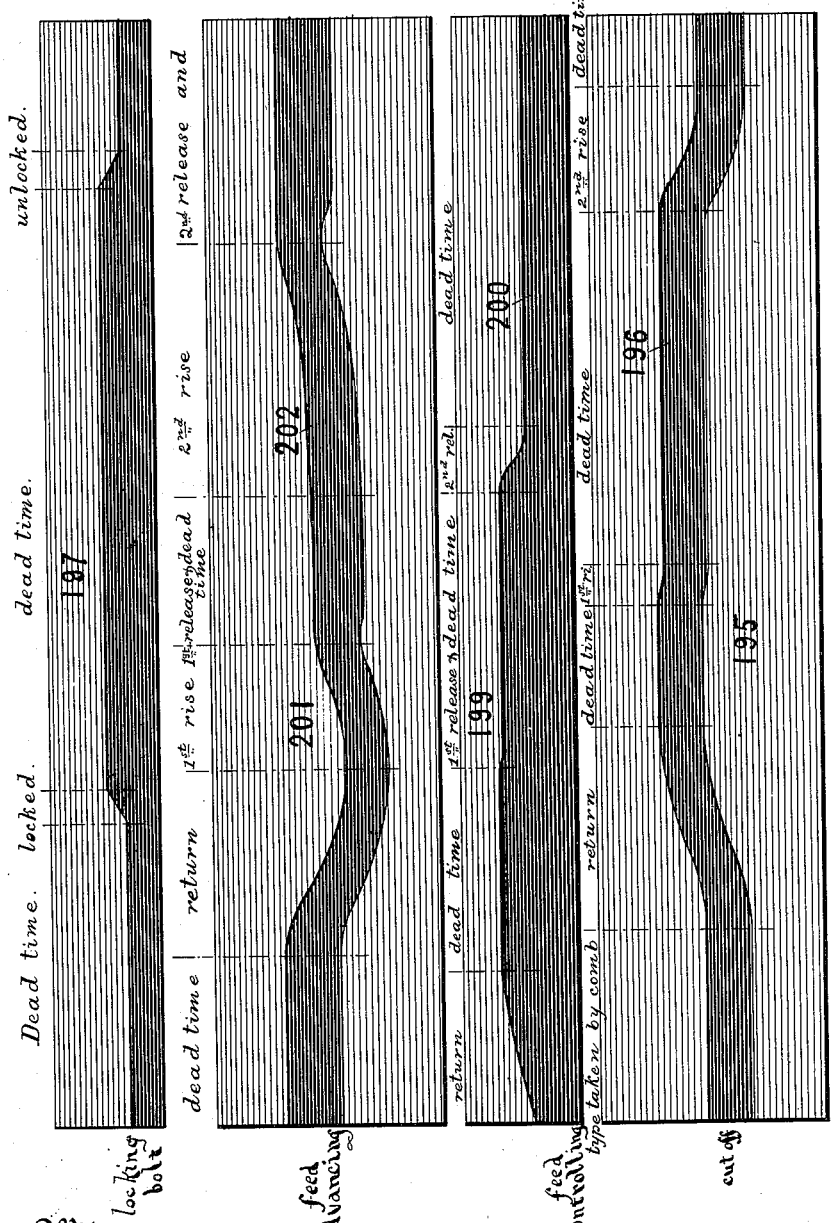

(No Model.) 163 Sheets—Sheet 21.
J. W. PAIGE.
MACHINE FOR DISTRIBUTING, SETTING, AND JUSTIFYING TYPE.
No. 547,860. Patented Oct. 15, 1895.
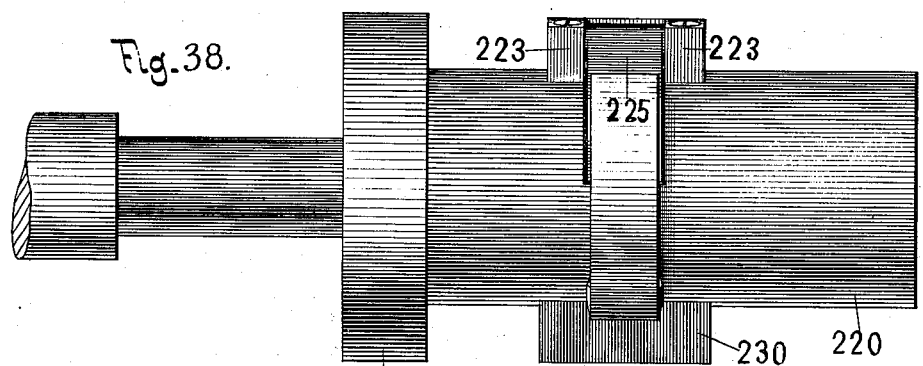
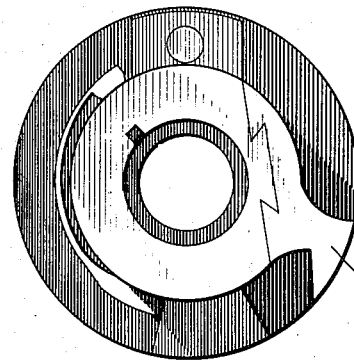
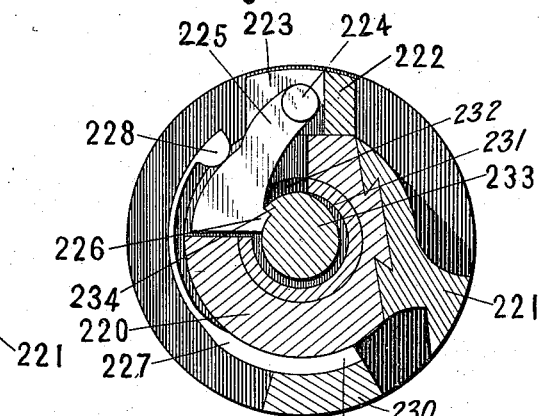
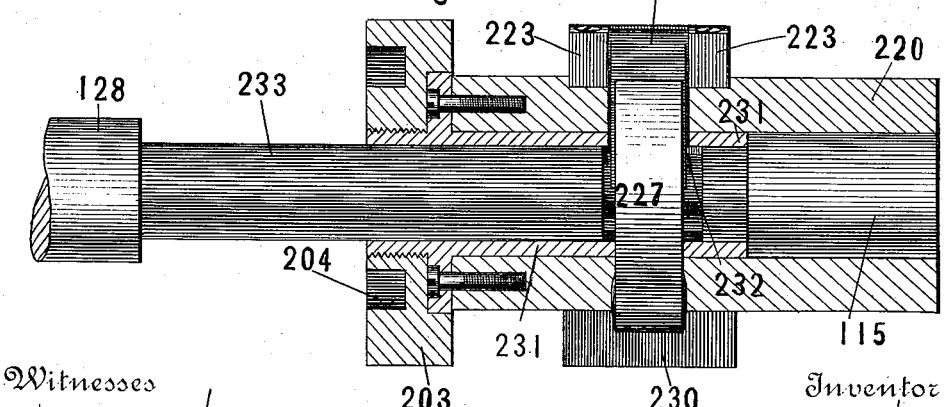
Witnesses
Frank H. Pierpont
Charles E. Davis.
Inventor
J. W. Paige
By Attorneys
H. W. Beadle & Co.

(No Model.)

J. W. PAIGE.

MACHINE FOR DISTRIBUTING, SETTING, AND JUSTIFYING TYPE.

No. 547,860.

163 Sheets—Sheet 22.

Patented Oct. 15, 1895.

(No Model.)

163 Sheets—Sheet 23.

J. W. PAIGE.
MACHINE FOR DISTRIBUTING, SETTING, AND JUSTIFYING TYPE.

No. 547,860.  Patented Oct. 15, 1895.

Witnesses:
Frank H. Pierpont
Charles E. Davis

By Attys.
H. W. Beadle + Co.

Inventor:
J. W. Paige (No Model.) 163 Sheets—Sheet 25.

J. W. PAIGE.

MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadle & Co.

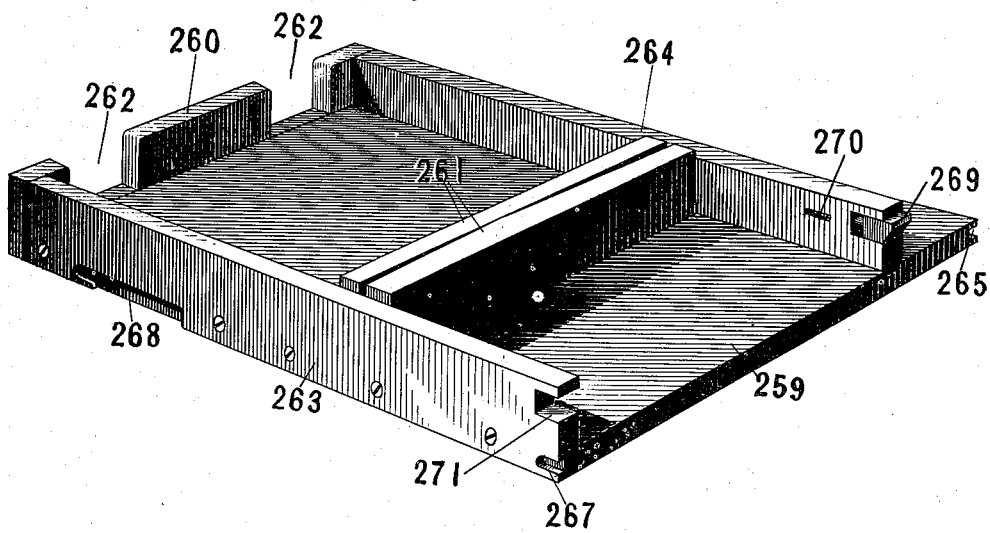
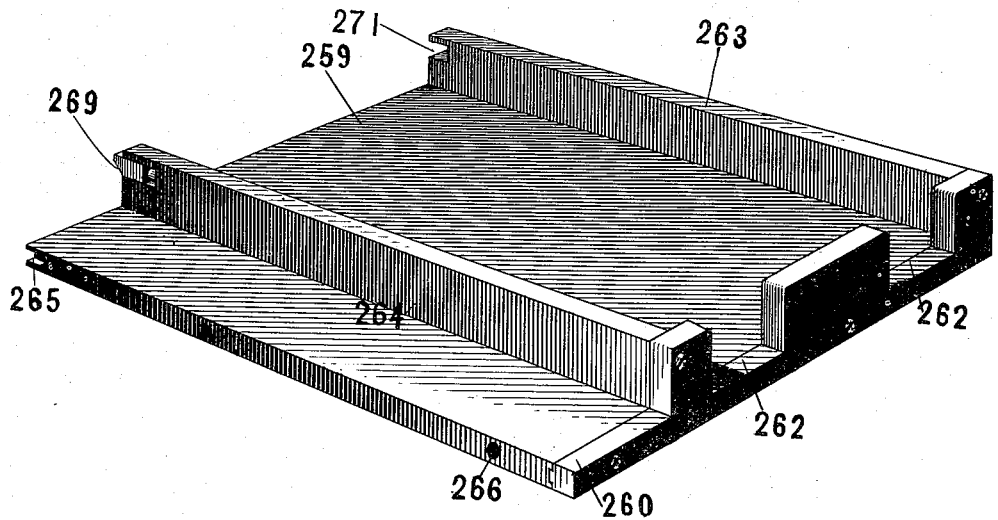

(No Model.) 163 Sheets—Sheet 27.
J. W. PAIGE.
MACHINE FOR DISTRIBUTING, SETTING, AND JUSTIFYING TYPE.
No. 547,860. Patented Oct. 15, 1895.
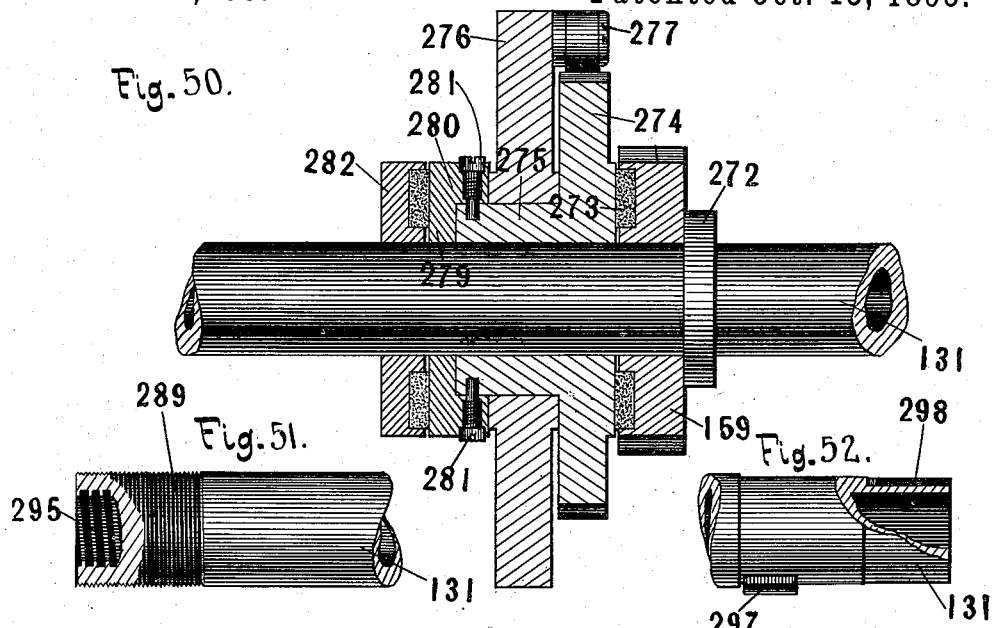
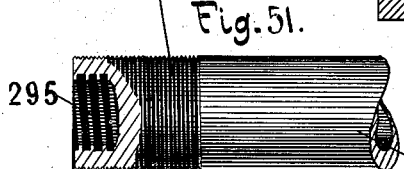
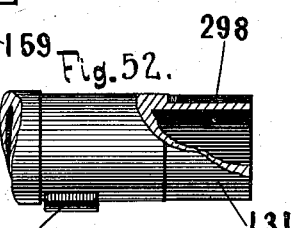
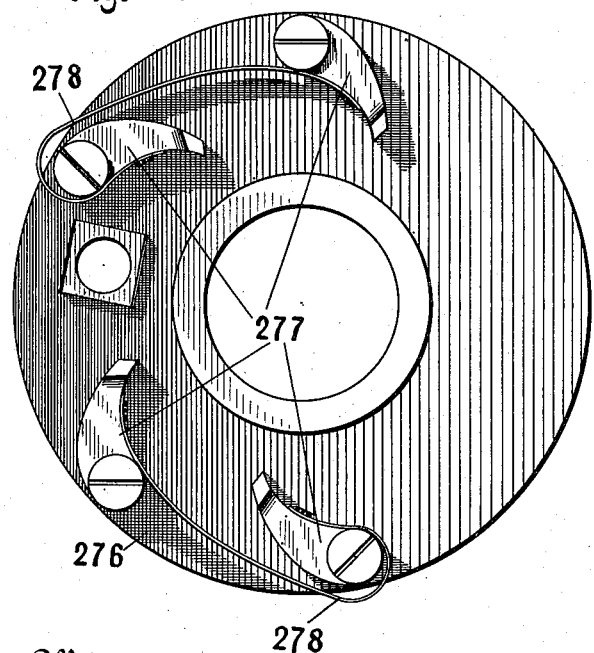
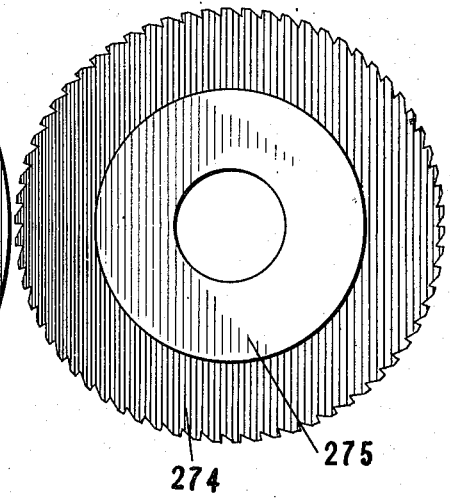
Witnesses
Frank H. Pierpont
Charles E. Davis.
Inventor
J. W. Paige
By Attorneys
H. W. Beadle + Co.

(No Model.)  163 Sheets—Sheet 28.
J. W. PAIGE.
MACHINE FOR DISTRIBUTING, SETTING, AND JUSTIFYING TYPE.
No. 547,860.  Patented Oct. 15, 1895.
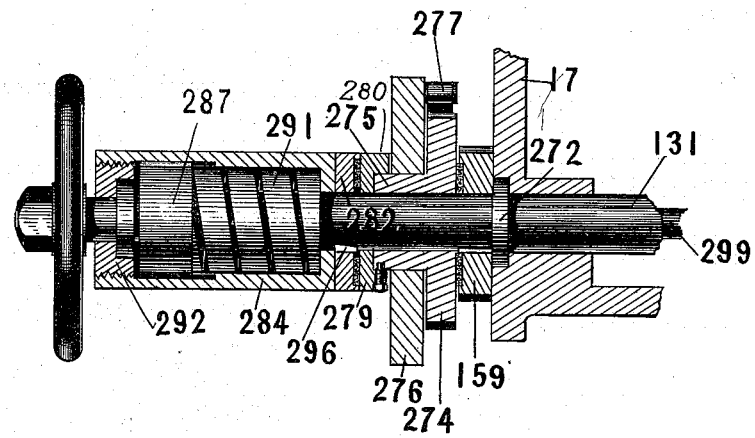
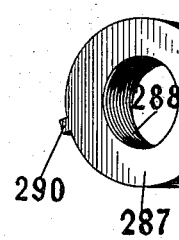
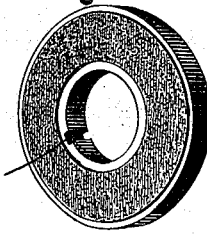
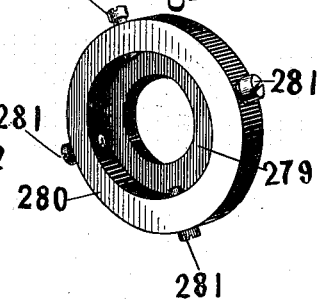
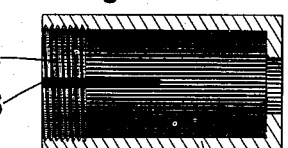
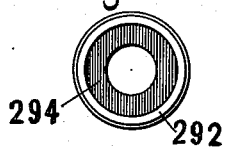
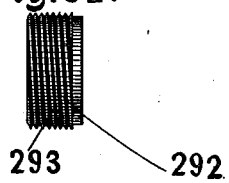
Witnesses
Frank H. Pierpont
Charles E. Davis.
Inventor
J. W. Paige
By Attorney
H. W. Reader + Co.

(No Model.) 163 Sheets—Sheet 29.
J. W. PAIGE.
MACHINE FOR DISTRIBUTING, SETTING, AND JUSTIFYING TYPE.
No. 547,860. Patented Oct. 15, 1895.

Witnesses
Frank H. Pierpont
Charles E. Davis

Inventor
J. W. Paige
By Attorneys
H. W. Beadle + Co.

(No Model.) 163 Sheets—Sheet 32.

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis

Inventor
J. W. Paige
By Attorneys
H. W. Beadle & Co.

(No Model.) 163 Sheets—Sheet 33.

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadle & Co.

(No Model.) 163 Sheets—Sheet 35.
J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadle & Co.

(No Model.)
163 Sheets—Sheet 36.
J. W. PAIGE.
MACHINE FOR DISTRIBUTING, SETTING, AND JUSTIFYING TYPE.
No. 547,860.  Patented Oct. 15, 1895.
Fig. 79.
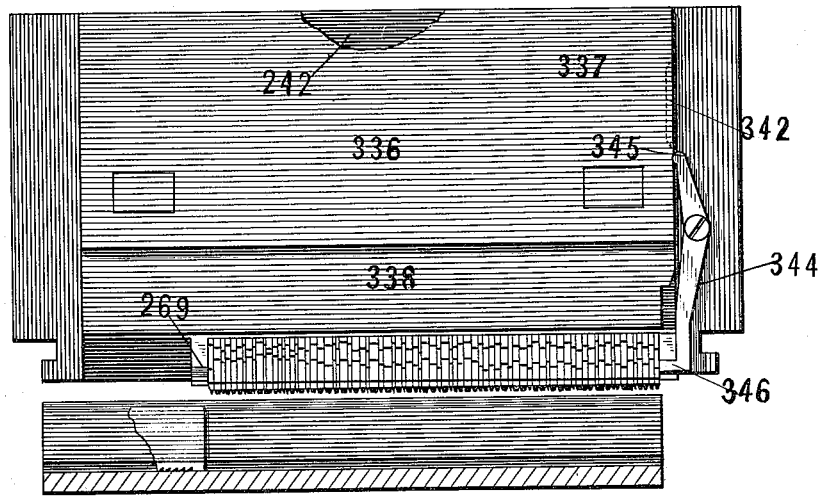
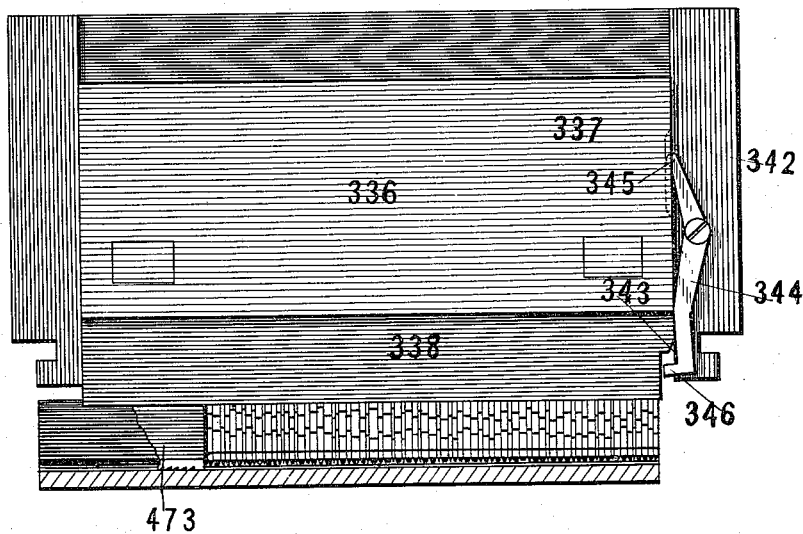
Fig. 80.
Witnesses
Frank H. Dupont
Charles E. Davis.
Inventor
J. W. Paige
By Attorney
H. W. Beadle & Co.

(No Model.) 163 Sheets—Sheet 37.
J. W. PAIGE.
MACHINE FOR DISTRIBUTING, SETTING, AND JUSTIFYING TYPE.
No. 547,860. Patented Oct. 15, 1895.
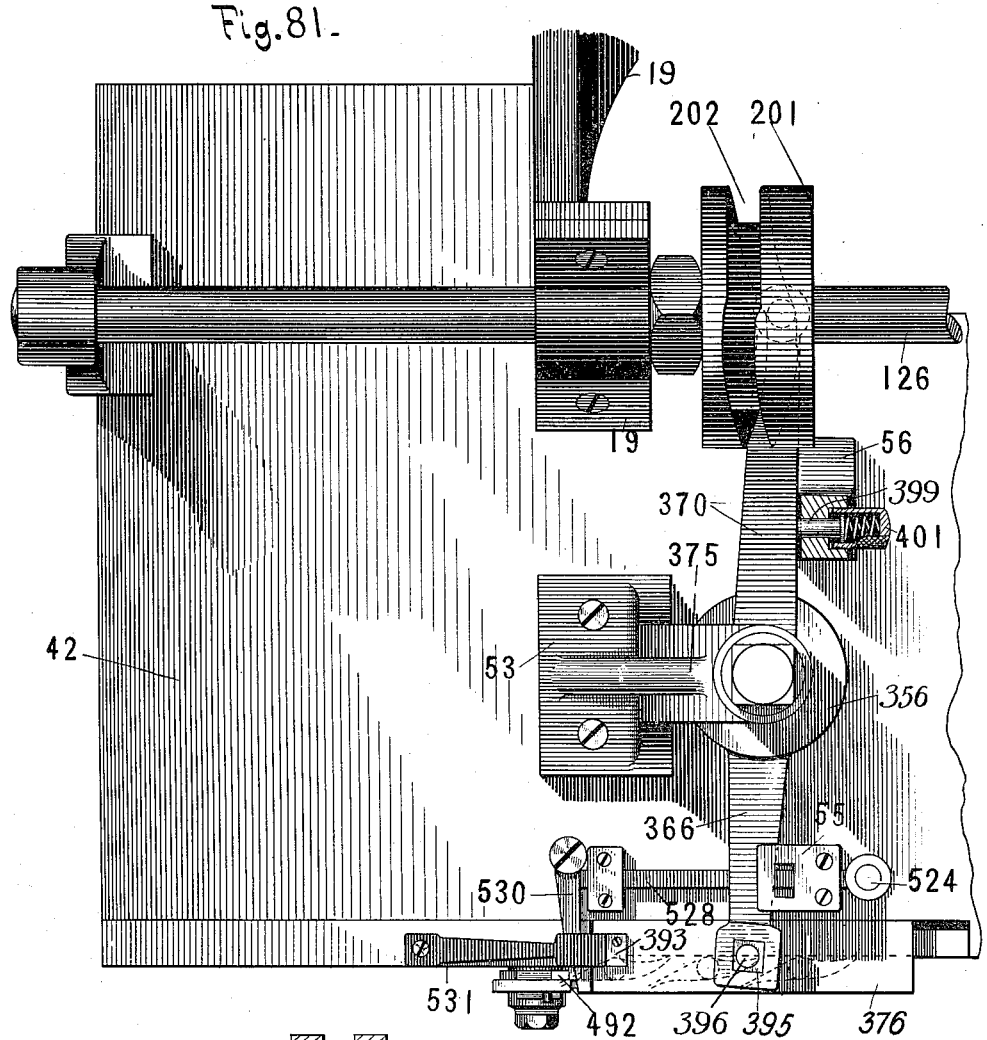
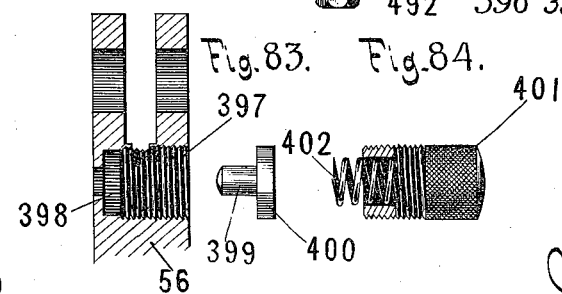

(No Model.) 163 Sheets—Sheet 38.
J. W. PAIGE.
MACHINE FOR DISTRIBUTING, SETTING, AND JUSTIFYING TYPE.
No. 547,860. Patented Oct. 15, 1895.
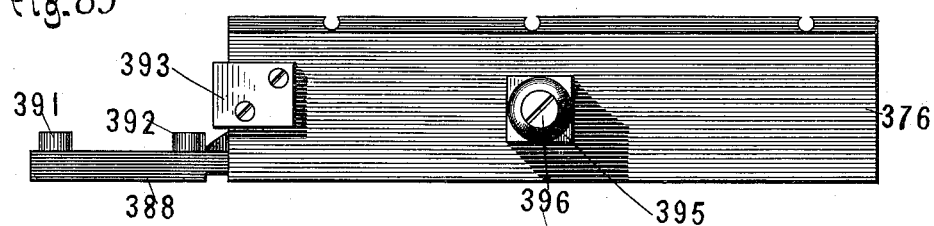
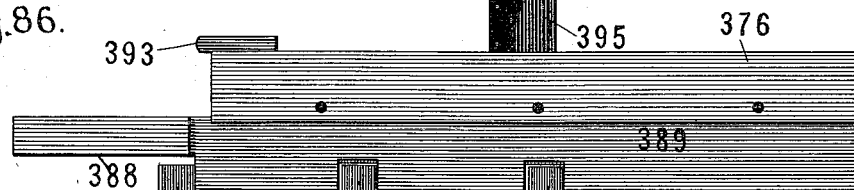
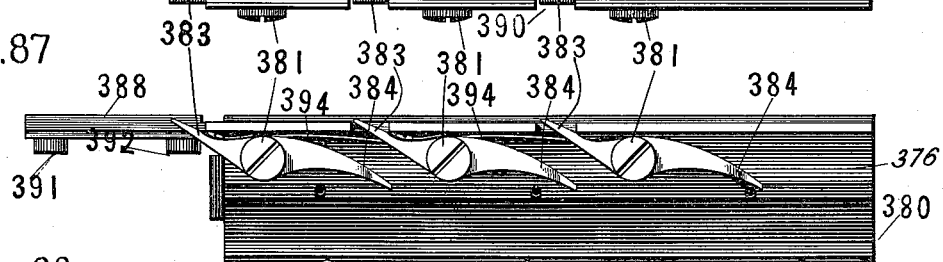
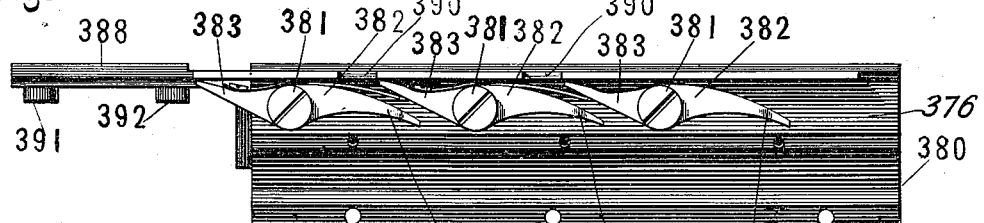
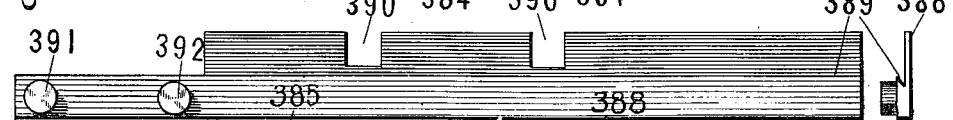
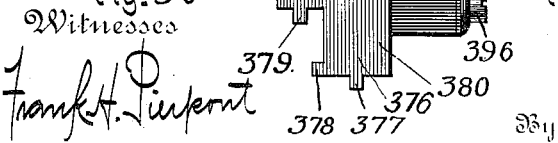
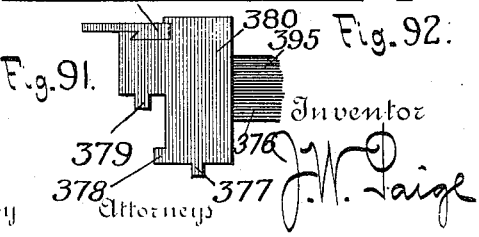

(No Model.) 163 Sheets—Sheet 39.
J. W. PAIGE.
MACHINE FOR DISTRIBUTING, SETTING, AND JUSTIFYING TYPE.
No. 547,860. Patented Oct. 15, 1895.
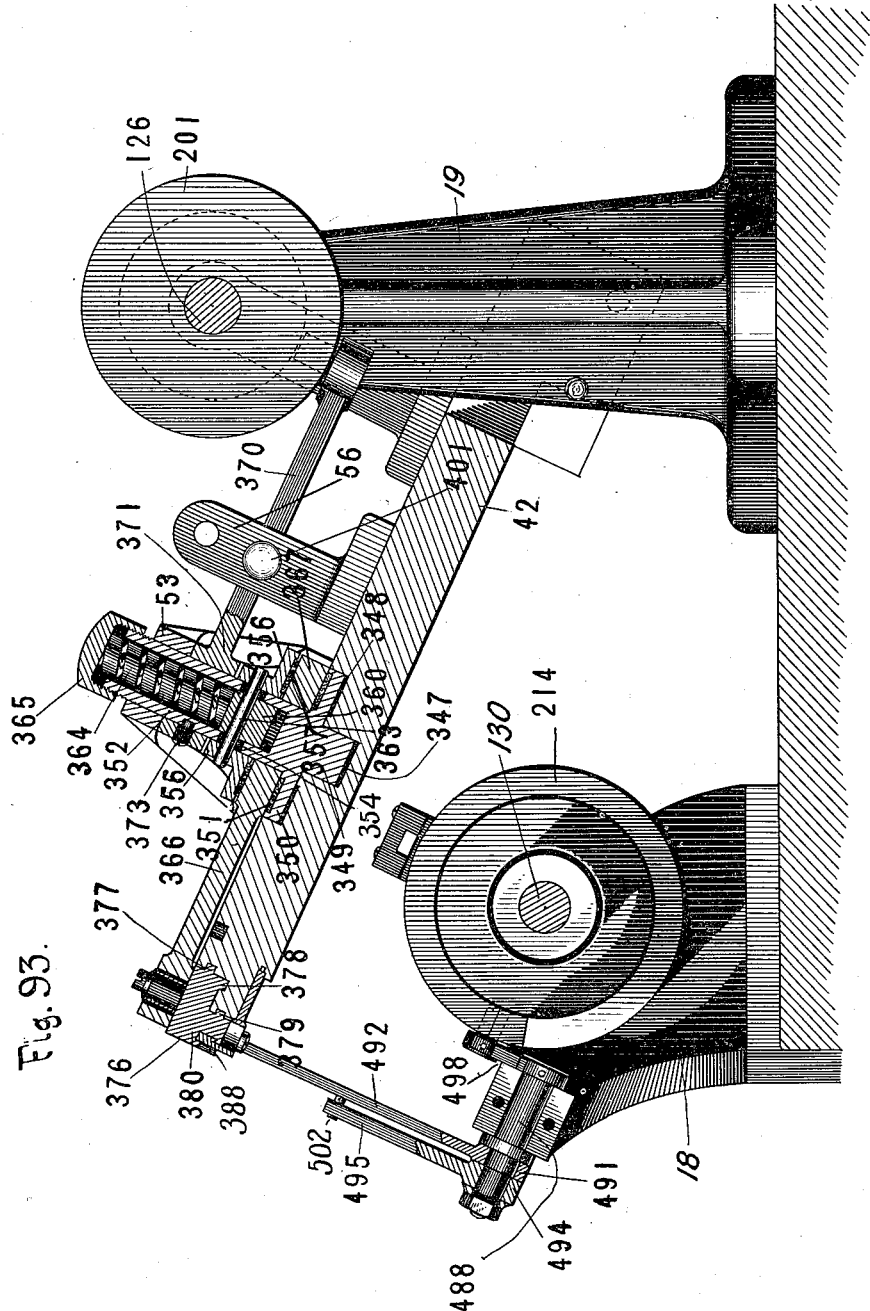

(No Model.) 163 Sheets—Sheet 40.
J. W. PAIGE.
MACHINE FOR DISTRIBUTING, SETTING, AND JUSTIFYING TYPE.
No. 547,860. Patented Oct. 15, 1895.

Witnesses
Frank H. Pierpont
Charles E. Davis.

Inventor
J. W. Paige
By Attorneys
H. W. Beadle + Co.

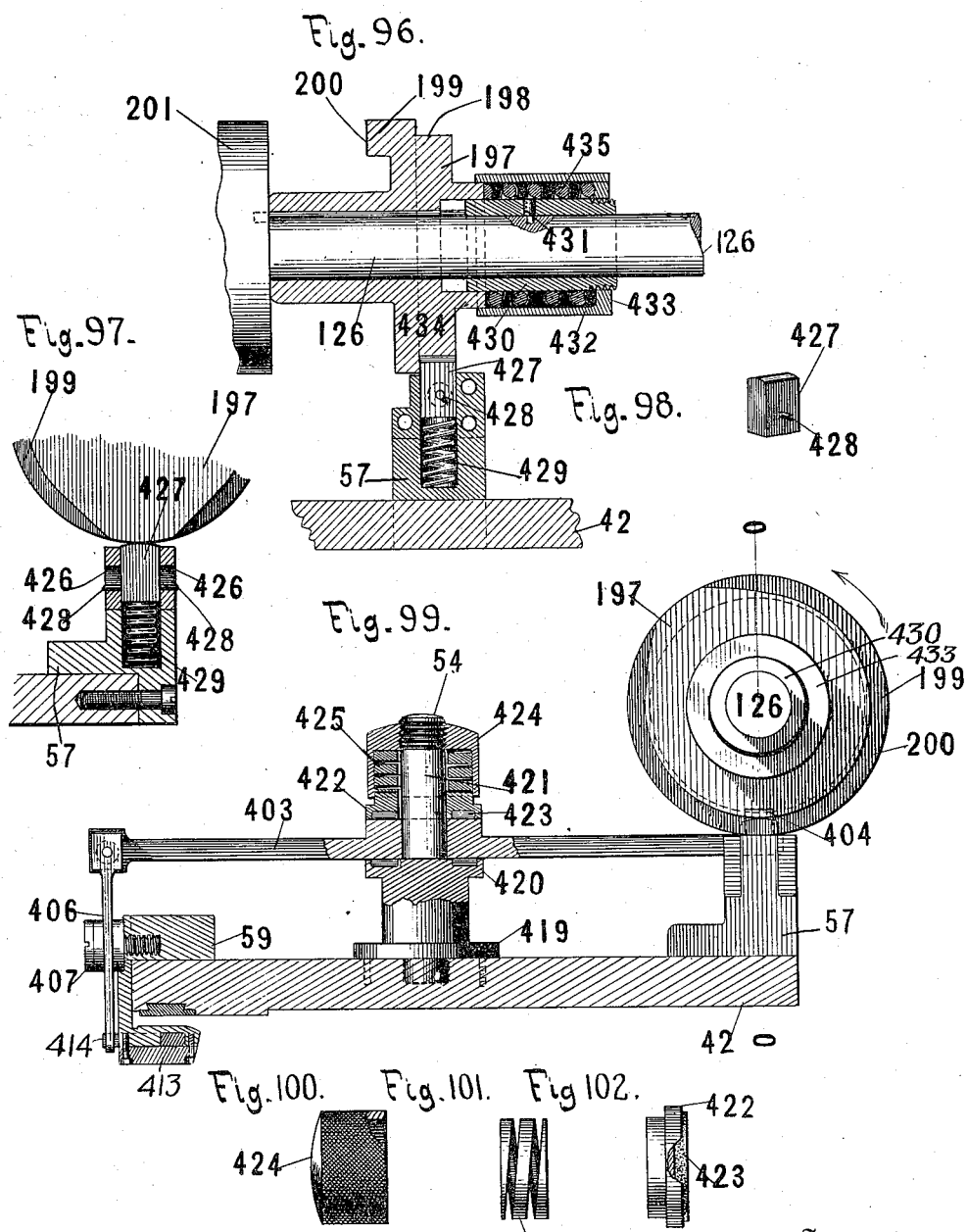

(No Model.) 163 Sheets—Sheet 42.
J. W. PAIGE.
MACHINE FOR DISTRIBUTING, SETTING, AND JUSTIFYING TYPE.
No. 547,860. Patented Oct. 15, 1895.
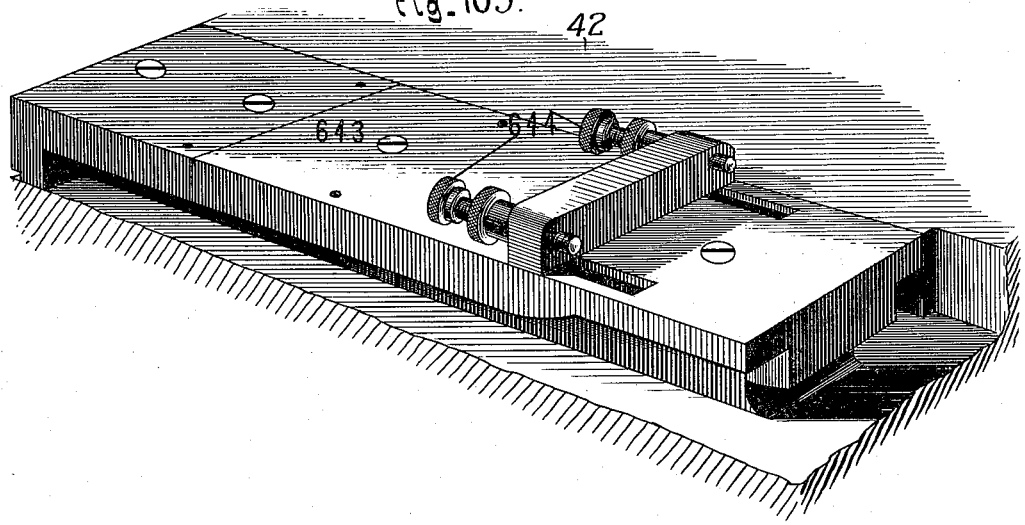
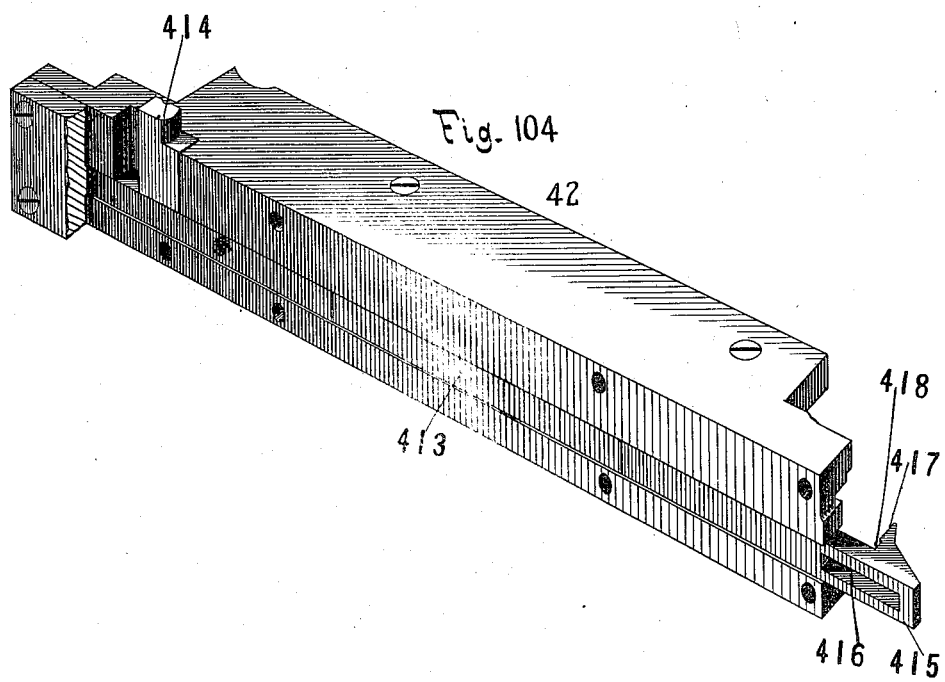

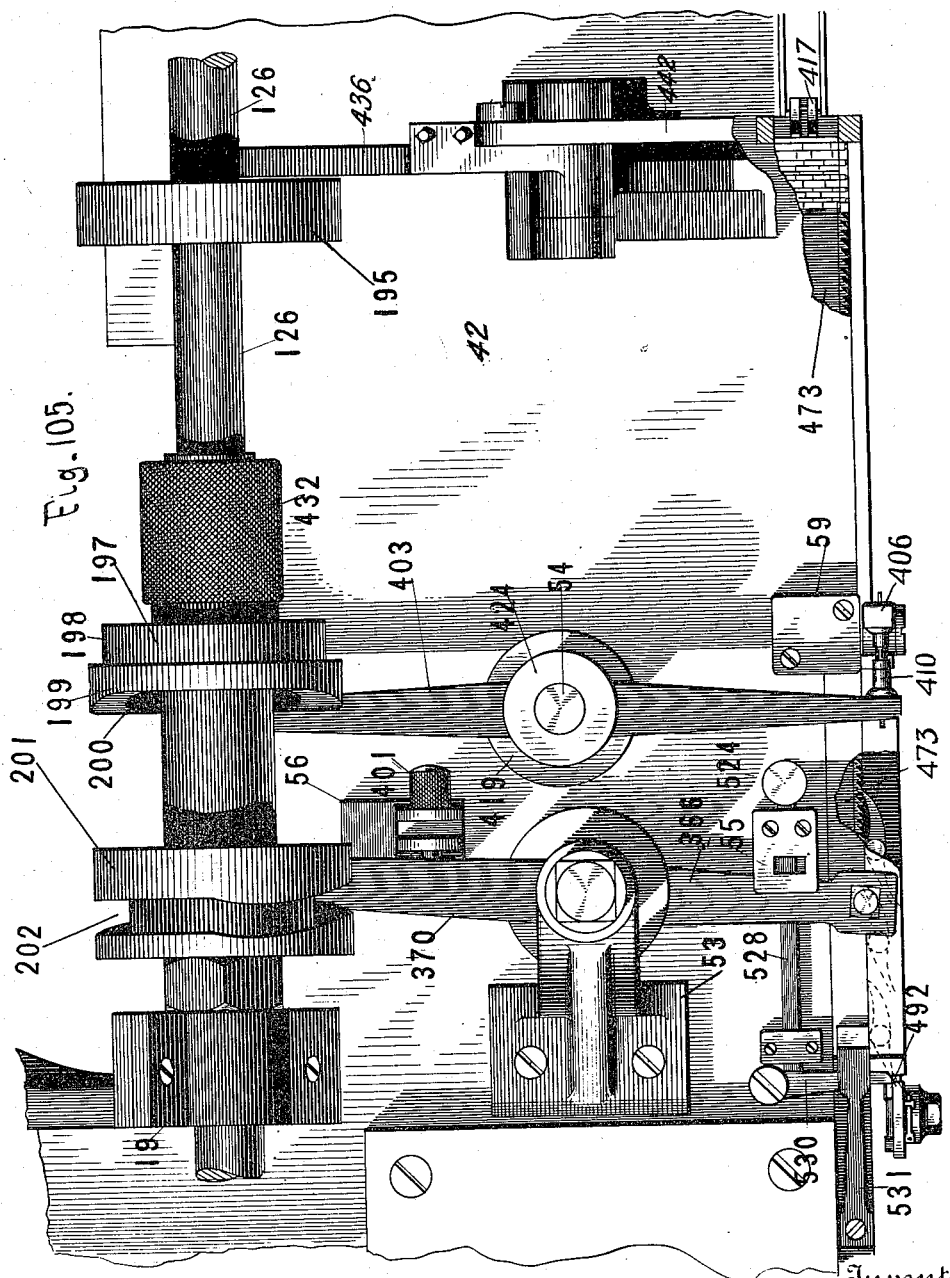

(No Model.)    163 Sheets—Sheet 44.
J. W. PAIGE.
MACHINE FOR DISTRIBUTING, SETTING, AND JUSTIFYING TYPE.
No. 547,860.    Patented Oct. 15, 1895.
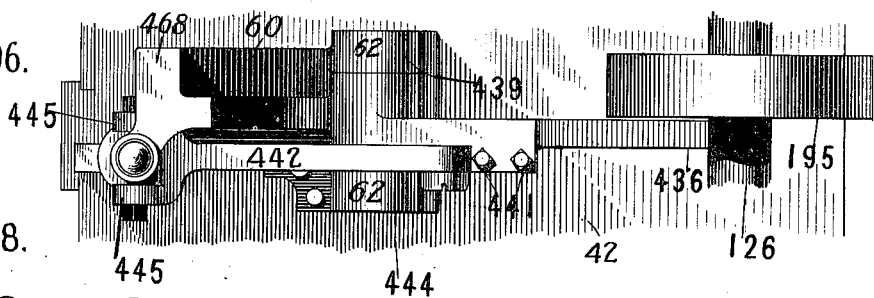
Fig. 106.
Fig. 108.
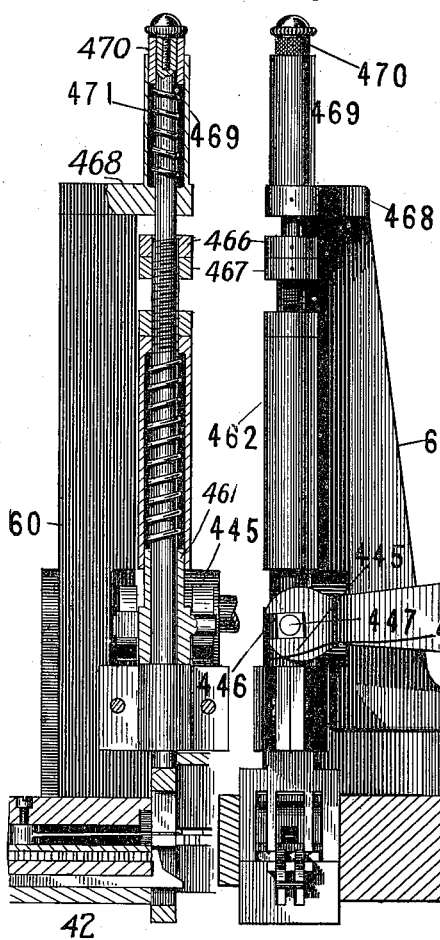
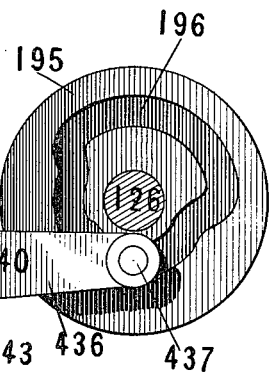
Fig. 107.
Witnesses
Frank H. Pinkont
Charles E. Davis.
Inventor
J. W. Paige
By Attorneys
H. W. Beader + Co.

(No Model.)

163 Sheets—Sheet 45.

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
H. W. Beadle + Co.
By Attorneys (No Model.)

J. W. PAIGE.

MACHINE FOR DISTRIBUTING, SETTING, AND JUSTIFYING TYPE.

No. 547,860. Patented Oct. 15, 1895.

J. W. PAIGE.
MACHINE FOR DISTRIBUTING, SETTING, AND JUSTIFYING TYPE.

No. 547,860. Patented Oct. 15, 1895.

(No Model.)
J. W. PAIGE.
MACHINE FOR DISTRIBUTING, SETTING, AND JUSTIFYING TYPE.
No. 547,860. Patented Oct. 15, 1895.
163 Sheets—Sheet 48.
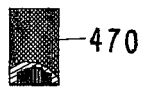
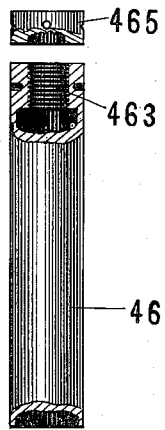
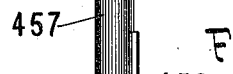
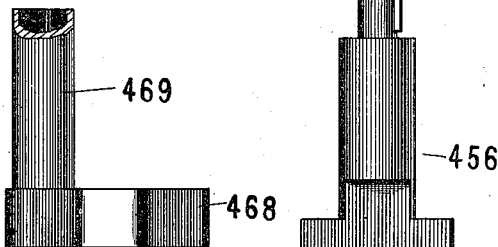
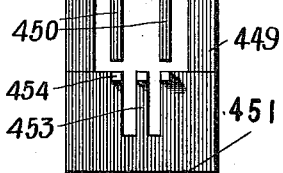
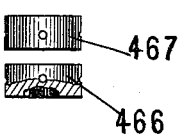
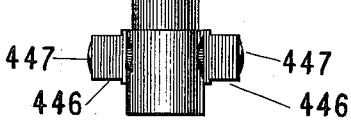
Witnesses
Frank H. Pierpont
Charles E. Davis
Inventor
J. W. Paige
By Attorneys
H. W. Beadle & Co.

(No Model.)
J. W. PAIGE.
MACHINE FOR DISTRIBUTING, SETTING, AND JUSTIFYING TYPE.
No. 547,860. Patented Oct. 15, 1895.
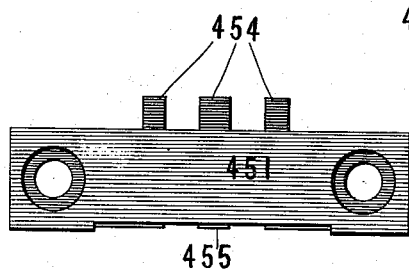
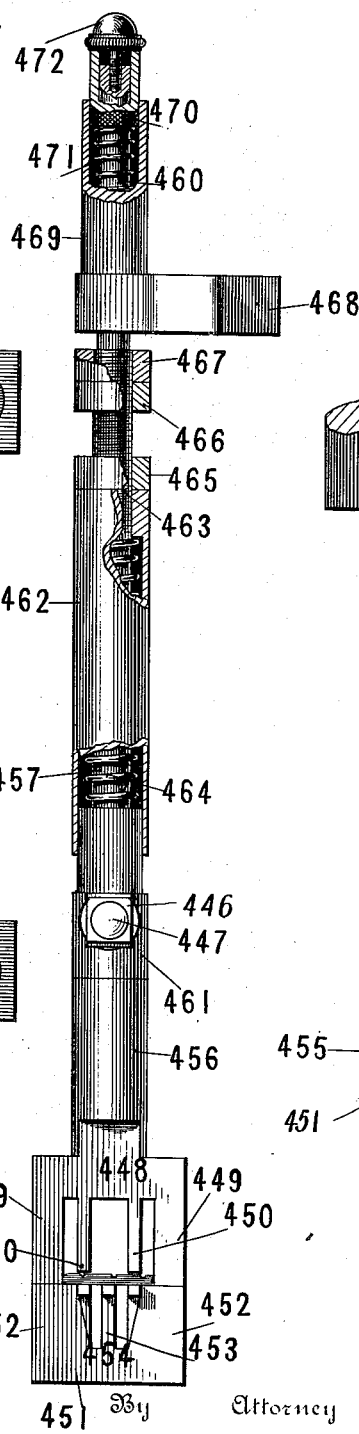
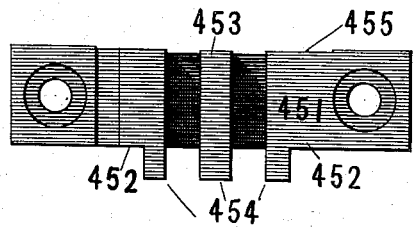
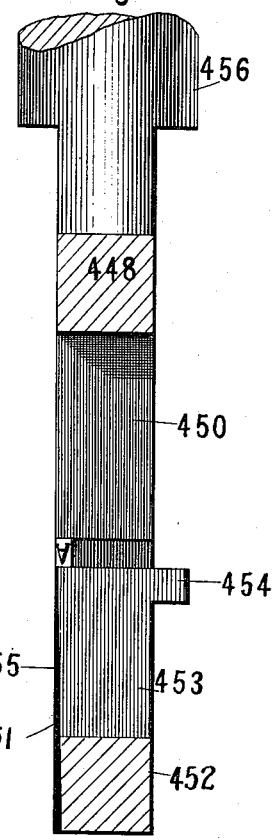

(No Model.)  163 Sheets—Sheet 50.

J. W. PAIGE.
MACHINE FOR DISTRIBUTING, SETTING, AND JUSTIFYING TYPE.

No. 547,860.  Patented Oct. 15, 1895.

Witnesses
Frank H. Pierpont
Charles E. Davis.

Inventor
J. W. Paige
By Attorneys
H. W. Beadle & Co.

(No Model.) 163 Sheets—Sheet 51.
J. W. PAIGE.
MACHINE FOR DISTRIBUTING, SETTING, AND JUSTIFYING TYPE.
No. 547,860. Patented Oct. 15, 1895.

Witnesses
Frank H. Pierpont
Charles E. Davis.

Inventor
J. W. Paige

By Attorneys
H. W. Beadle + Co.

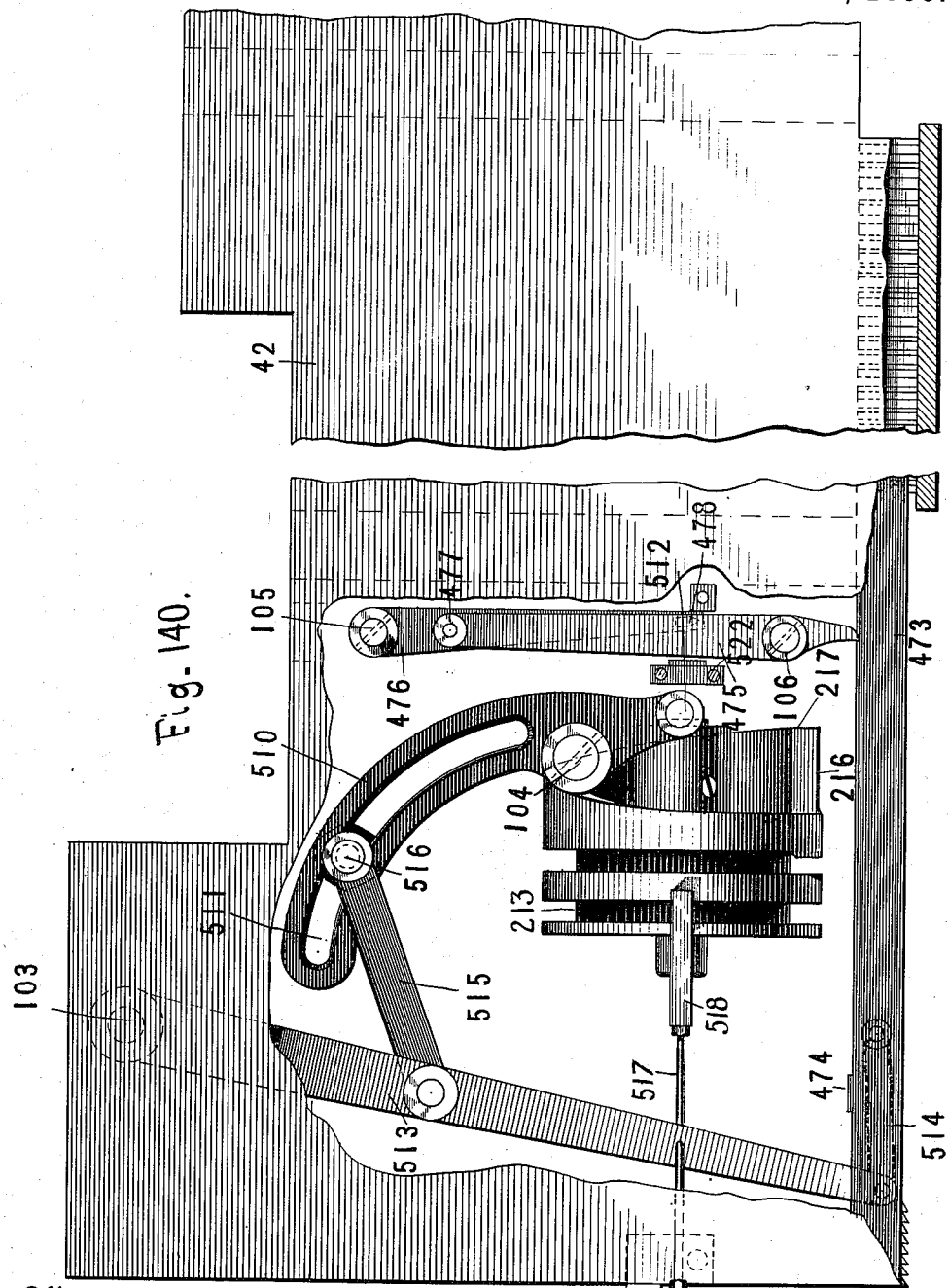

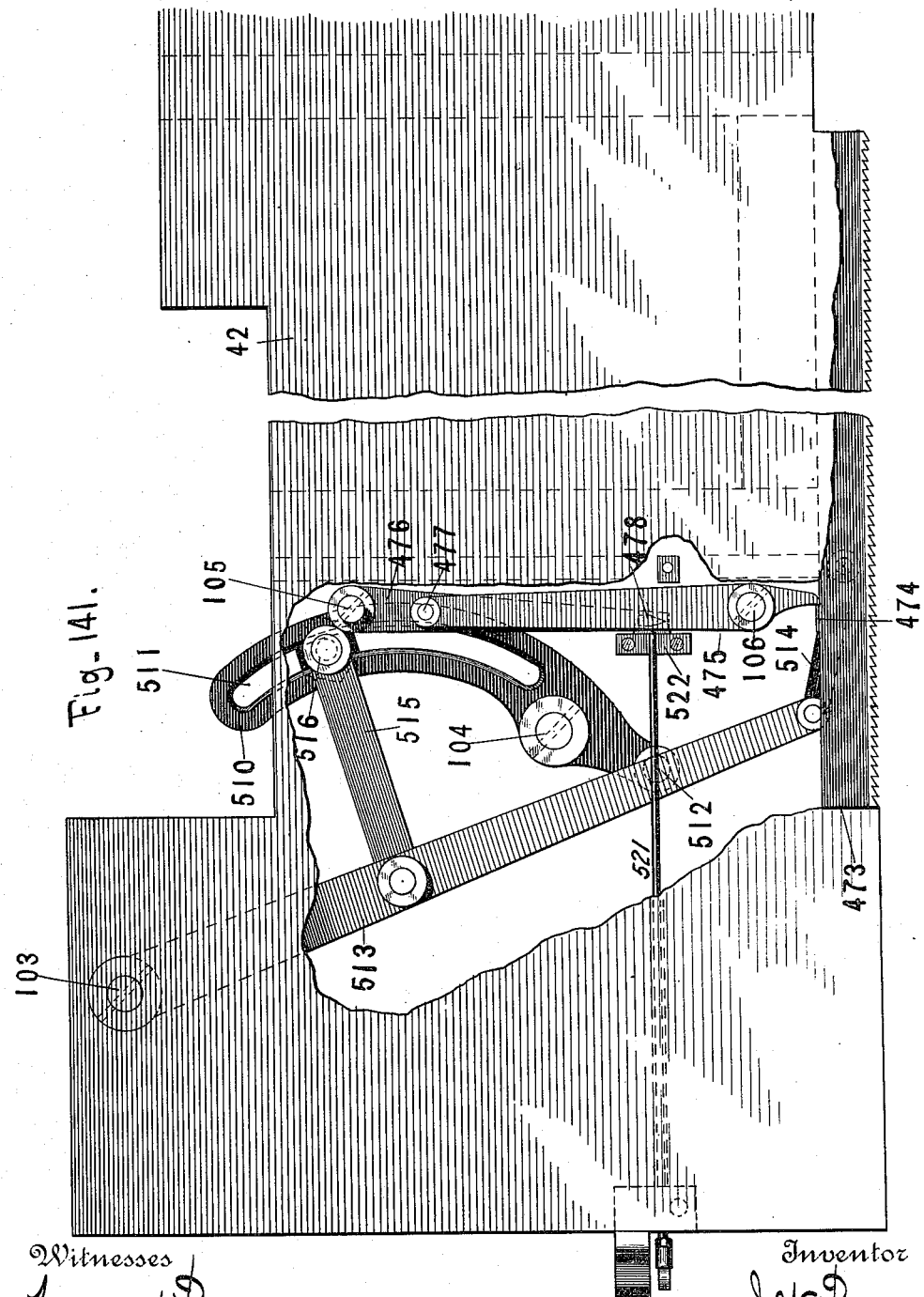

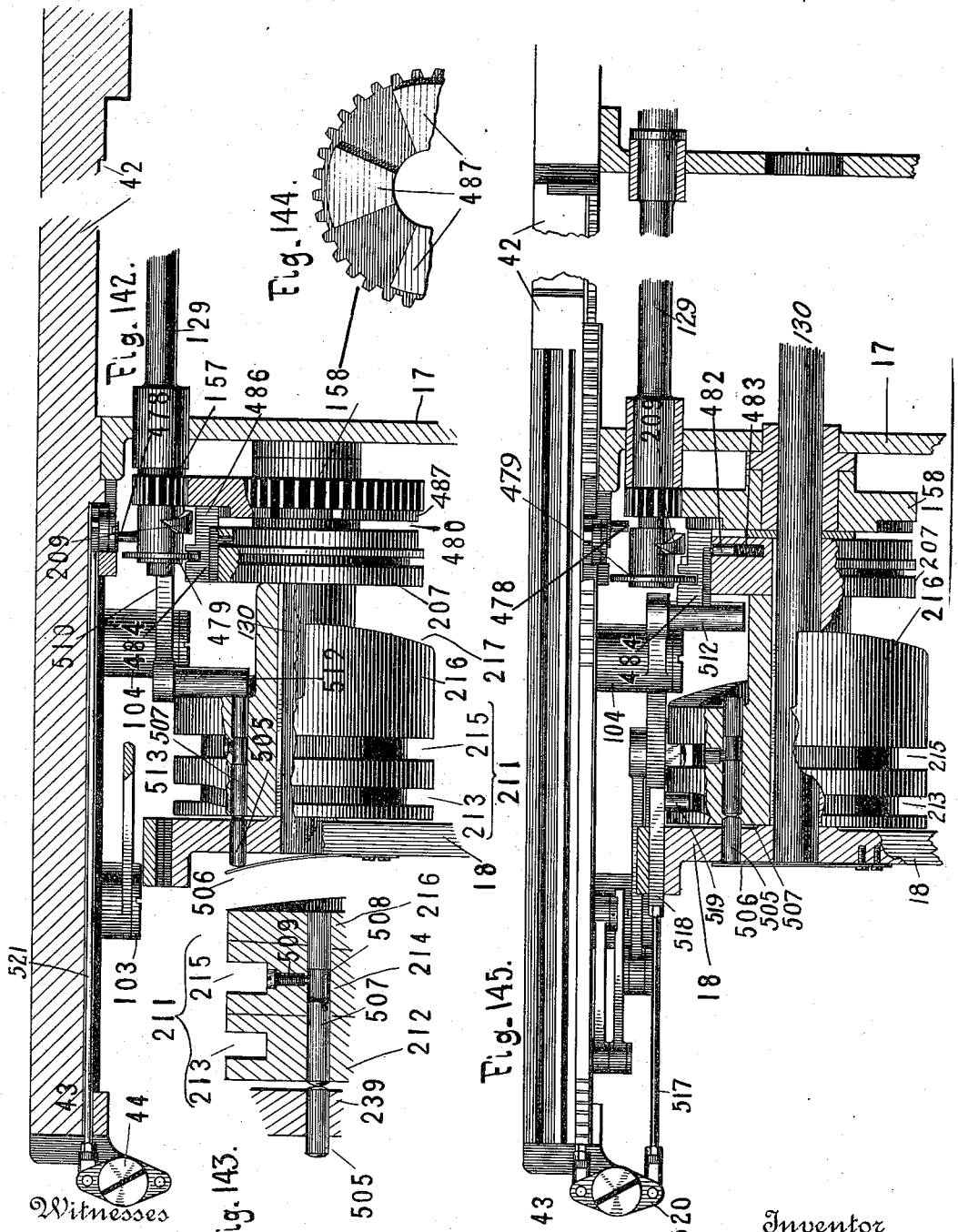

(No Model.)

163 Sheets—Sheet 55.

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadee & Co.

(No Model.)  163 Sheets—Sheet 56.
J. W. PAIGE.
MACHINE FOR DISTRIBUTING, SETTING, AND JUSTIFYING TYPE.
No. 547,860.  Patented Oct. 15, 1895.
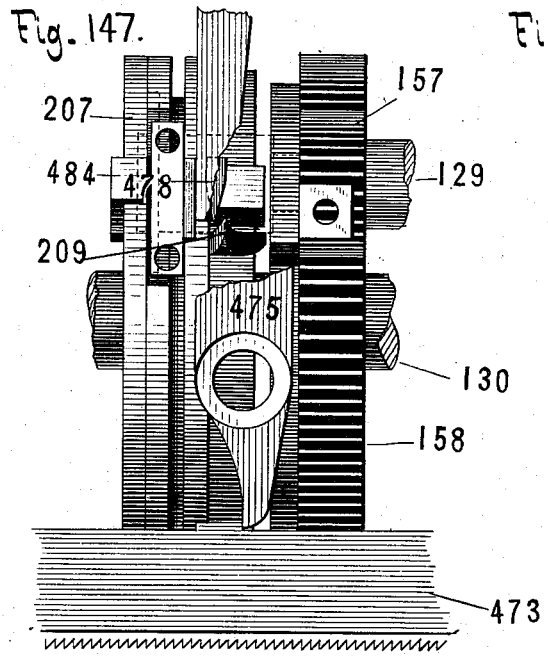
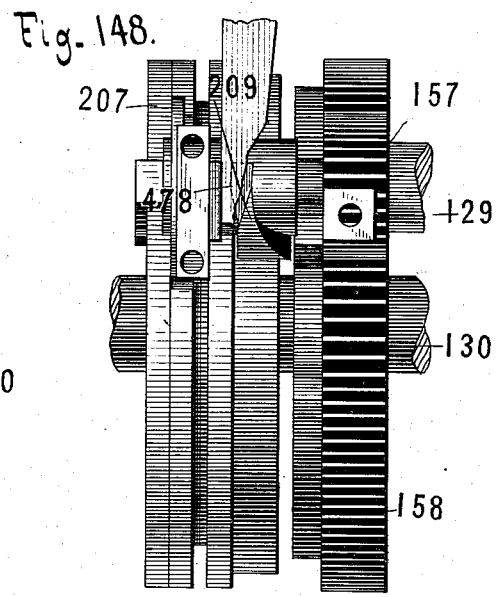
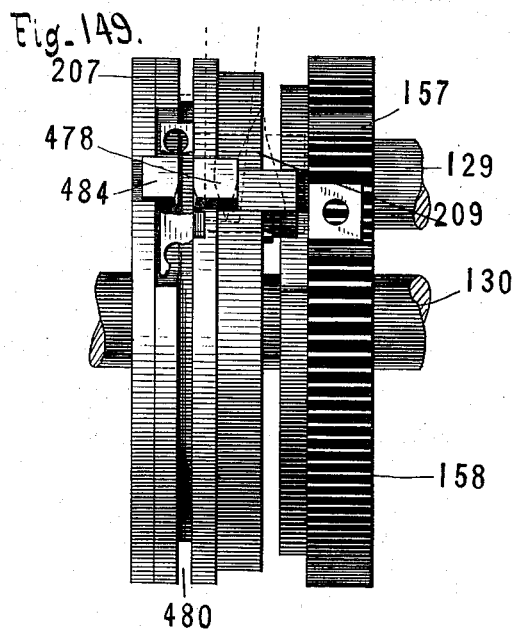
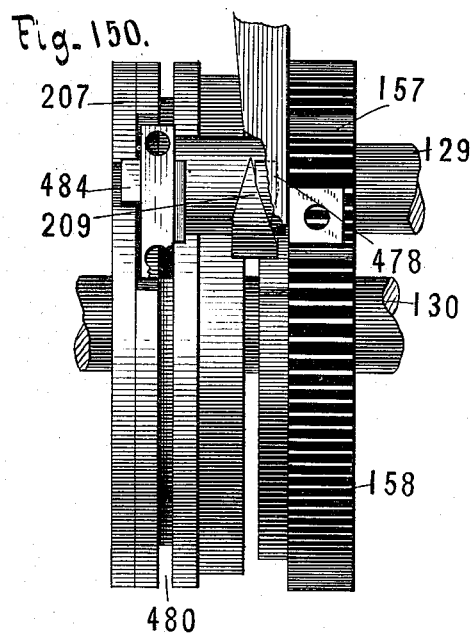
Witnesses
Frank H. Pierpont
Charles E. Davis.
Inventor
J. W. Paige
By Attorneys
H. W. Beadle + Co.

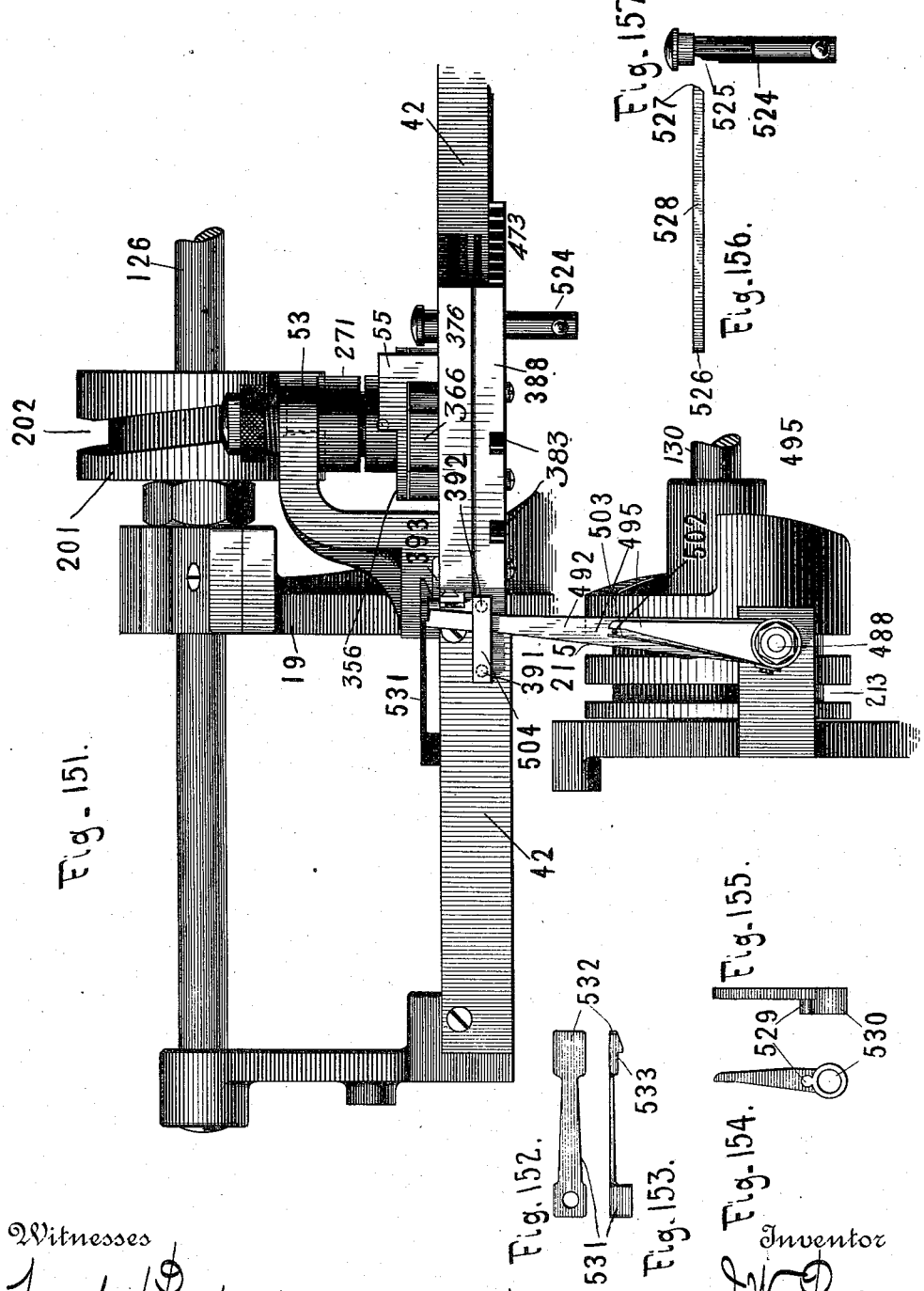

J. W. PAIGE.
MACHINE FOR DISTRIBUTING, SETTING, AND JUSTIFYING TYPE.
No. 547,860. Patented Oct. 15, 1895.
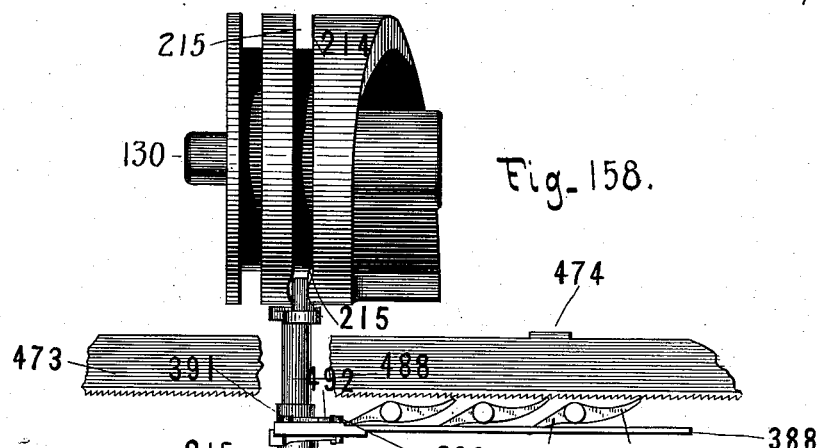
Fig. 158.
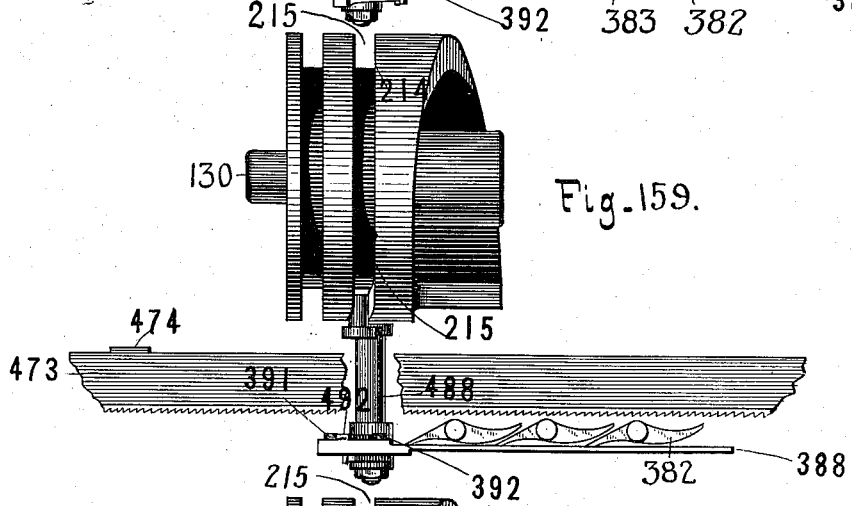
Fig. 159.
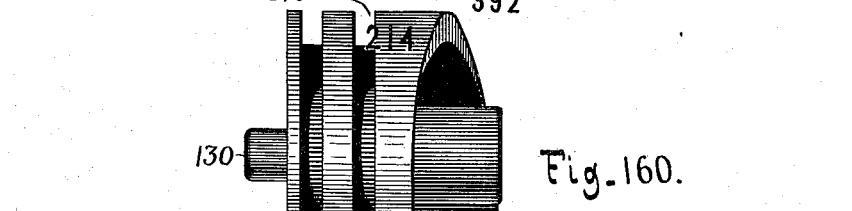
Fig. 160.
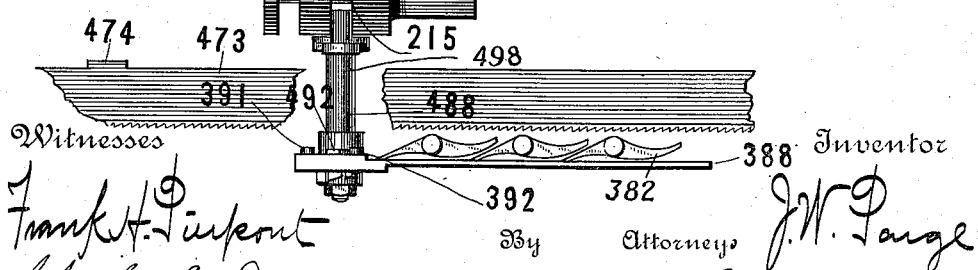

(No Model.)
J. W. PAIGE.
MACHINE FOR DISTRIBUTING, SETTING, AND JUSTIFYING TYPE.
No. 547,860.  Patented Oct. 15, 1895.
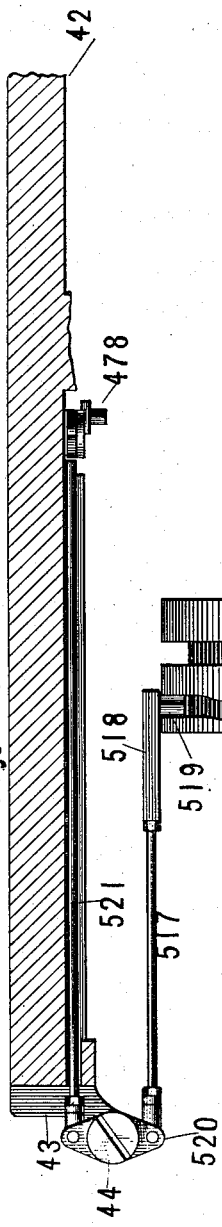
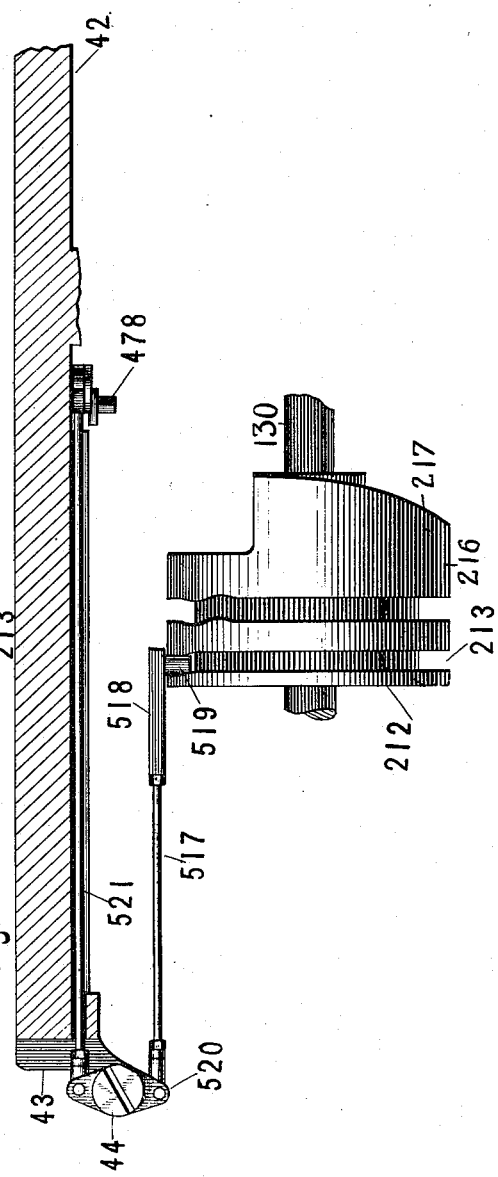

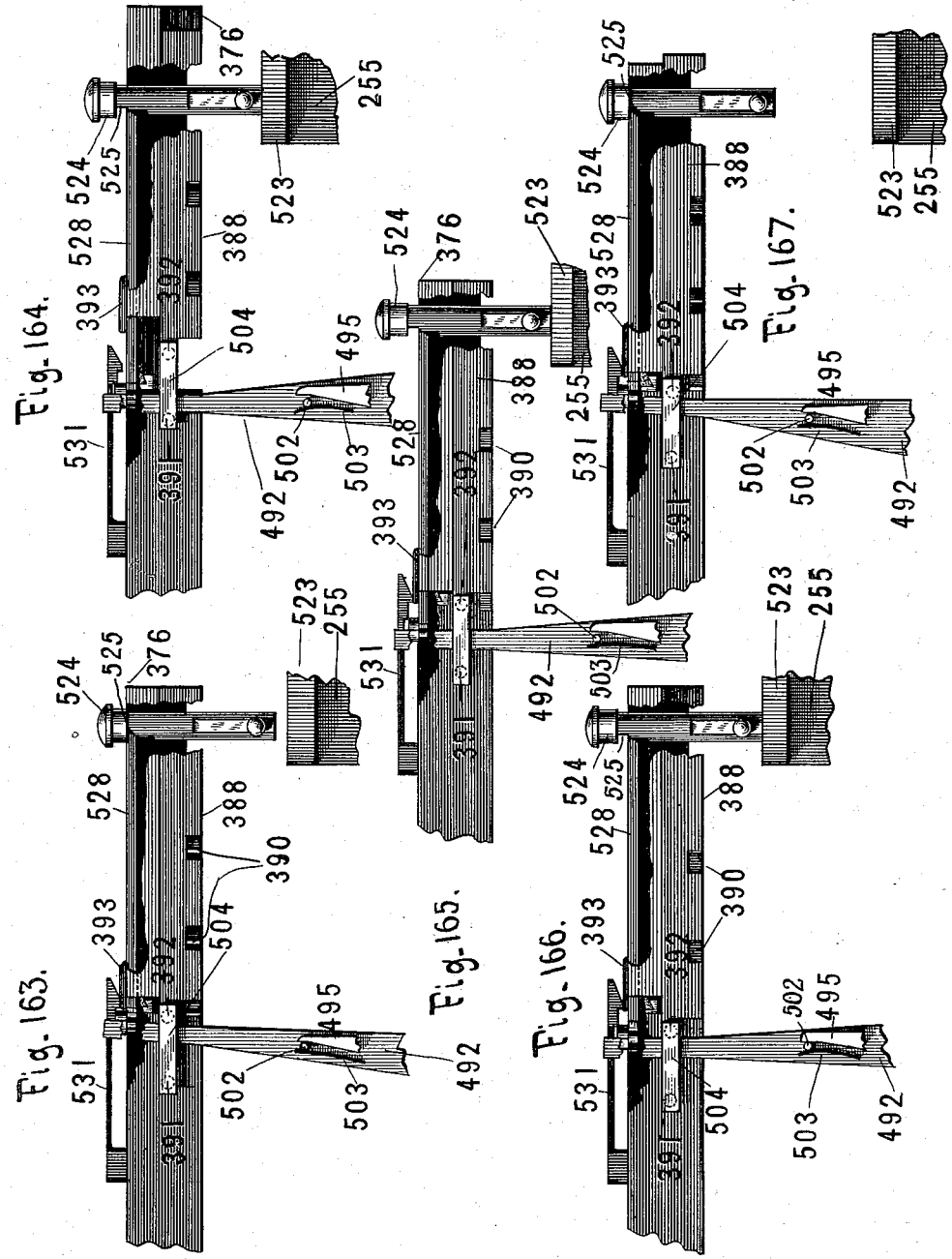

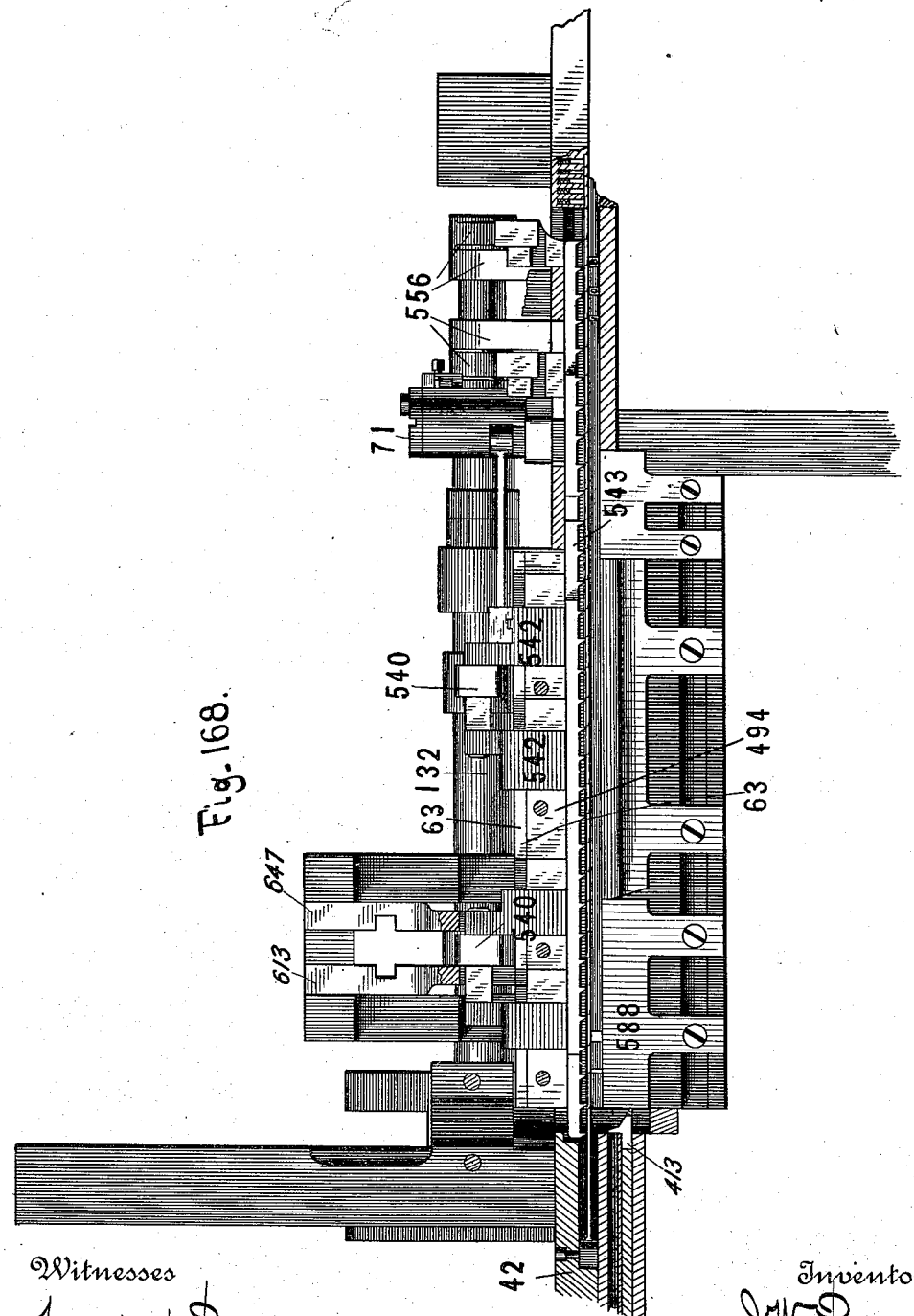

(No Model.) 163 Sheets—Sheet 62.
J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

By Attorneys
H. W. Beadle & Co.

Inventor
J. W. Paige (No Model.)
J. W. PAIGE.
MACHINE FOR DISTRIBUTING, SETTING, AND JUSTIFYING TYPE.
No. 547,860. Patented Oct. 15, 1895.
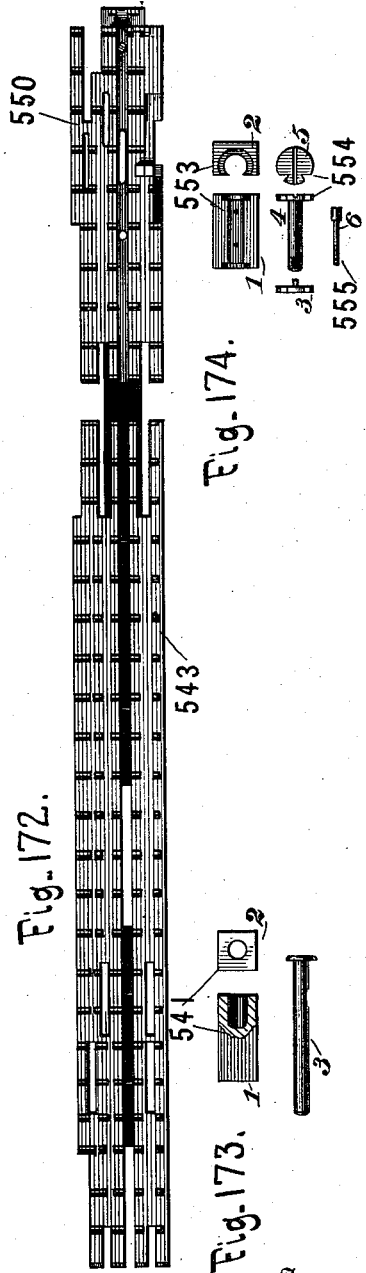

(No Model.)   
J. W. PAIGE.  
MACHINE FOR DISTRIBUTING, SETTING, AND JUSTIFYING TYPE.  
No. 547,860. Patented Oct. 15, 1895.

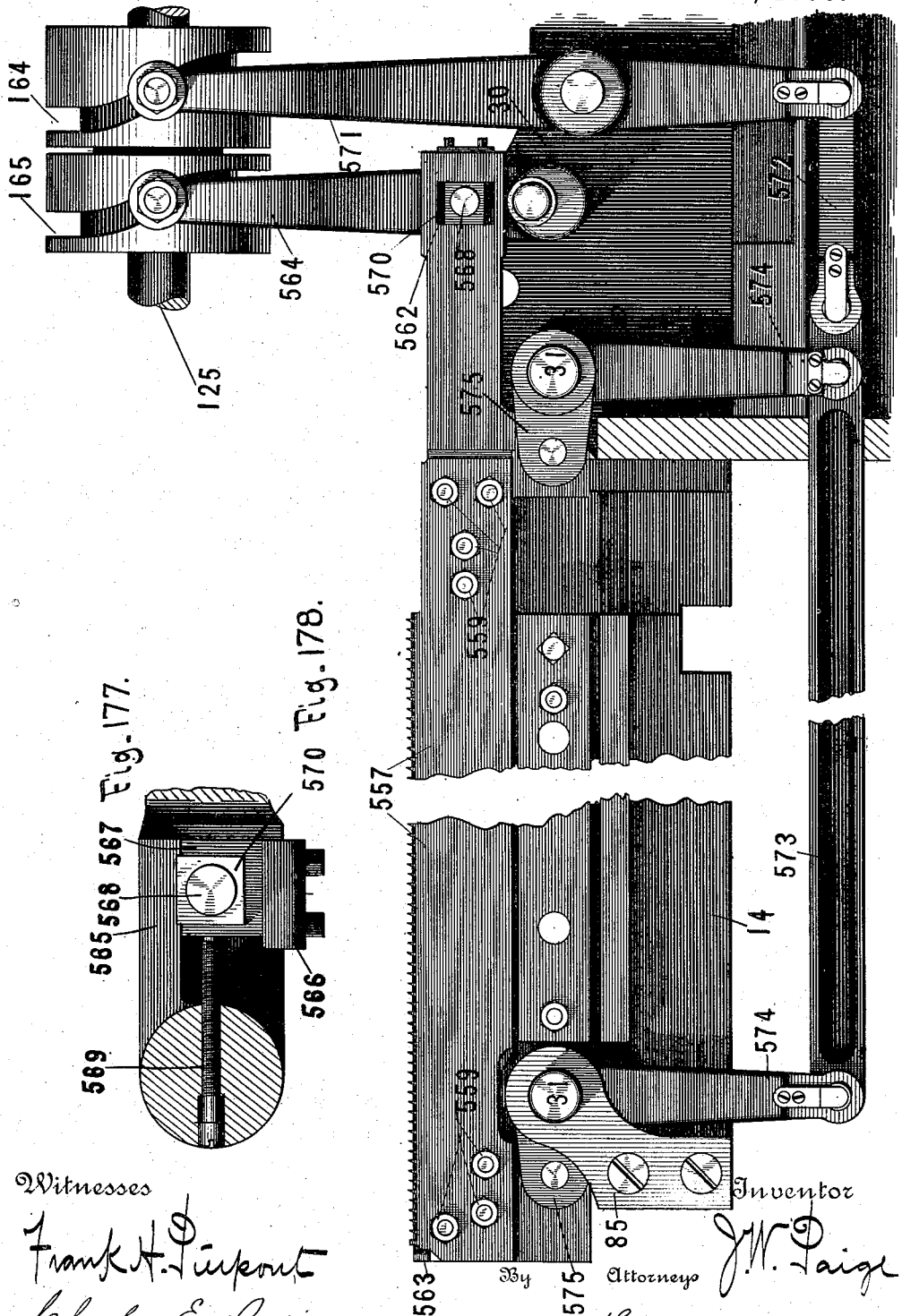

(No Model.)    163 Sheets—Sheet 66.

J. W. PAIGE.
MACHINE FOR DISTRIBUTING, SETTING, AND JUSTIFYING TYPE.

No. 547,860. Patented Oct. 15, 1895.

Witnesses
Frank H. Pinkont
Charles E. Davis

Inventor
J. W. Paige
By Attorneys
H. W. Beadle + Co.

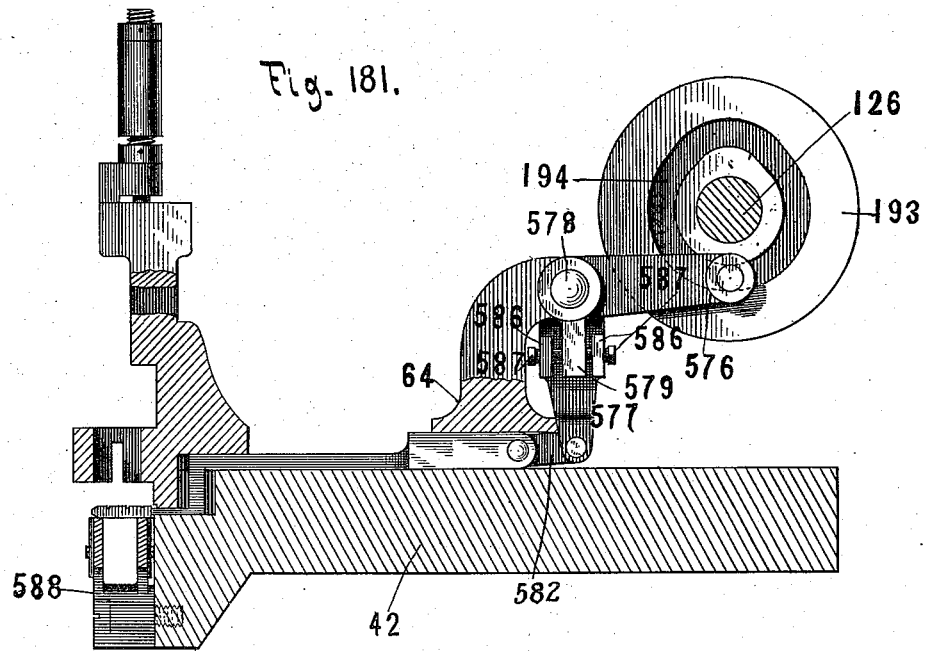
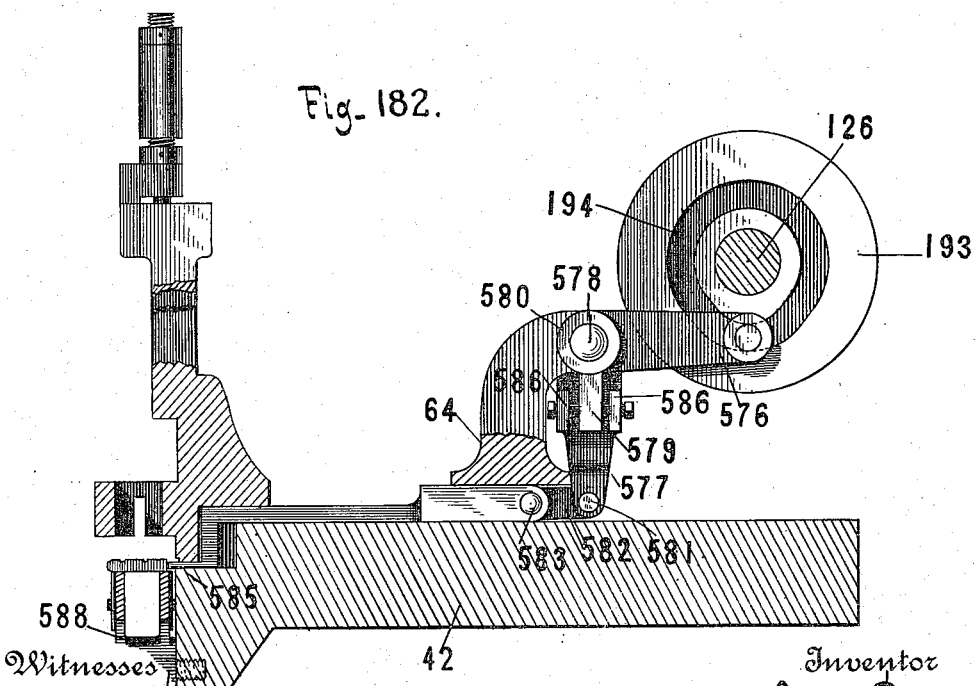

(No Model.) 163 Sheets—Sheet 68.
J. W. PAIGE.
MACHINE FOR DISTRIBUTING, SETTING, AND JUSTIFYING TYPE.
No. 547,860. Patented Oct. 15, 1895.
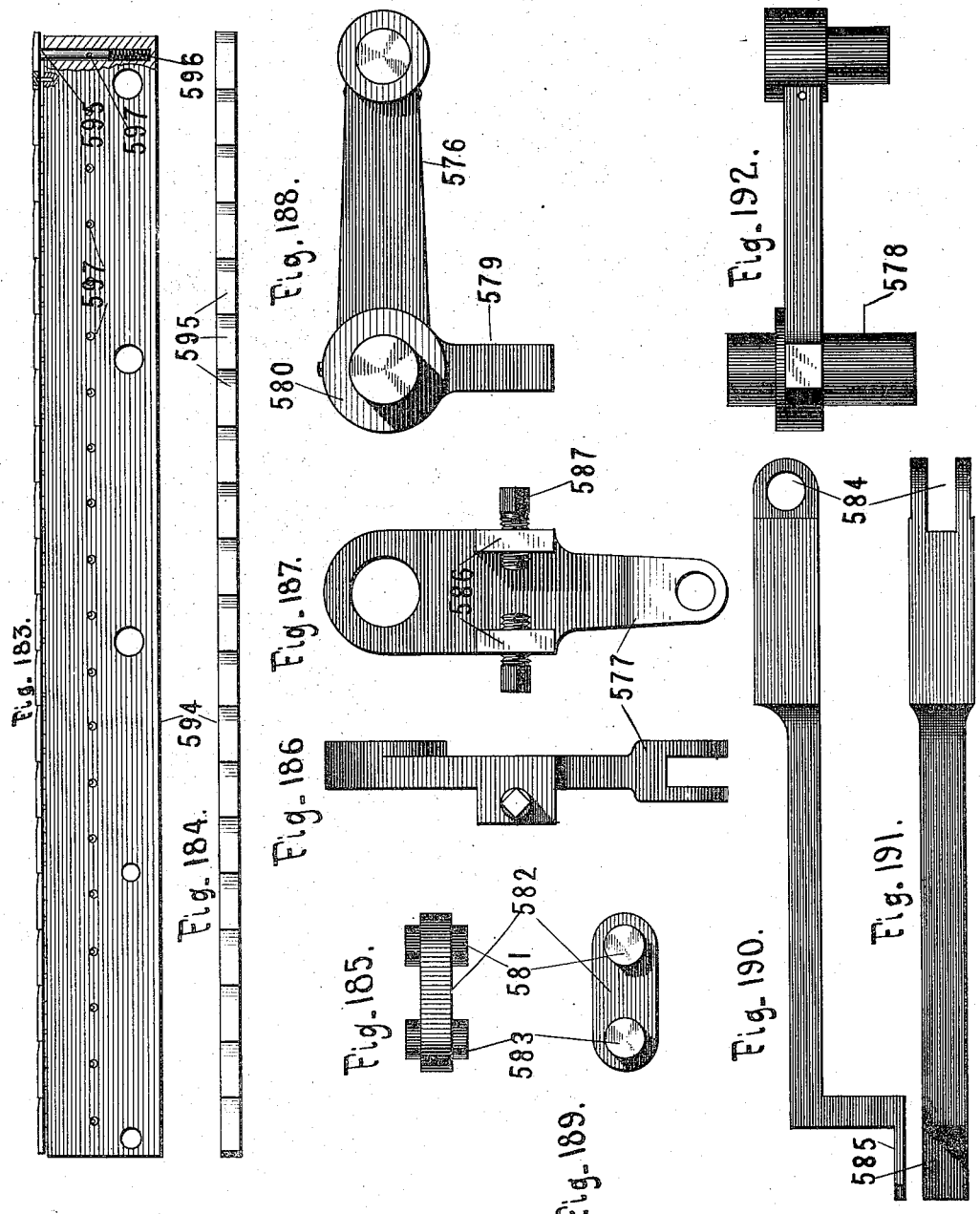

(No Model.)
163 Sheets—Sheet 69.
J. W. PAIGE.
MACHINE FOR DISTRIBUTING, SETTING, AND JUSTIFYING TYPE.
No. 547,860. Patented Oct. 15, 1895.
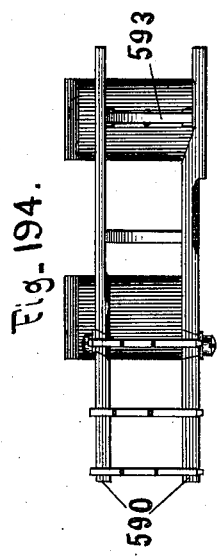
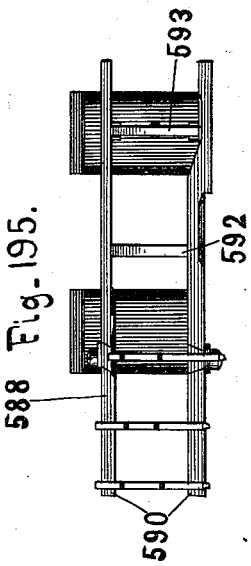
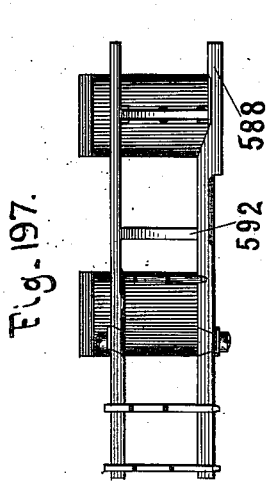
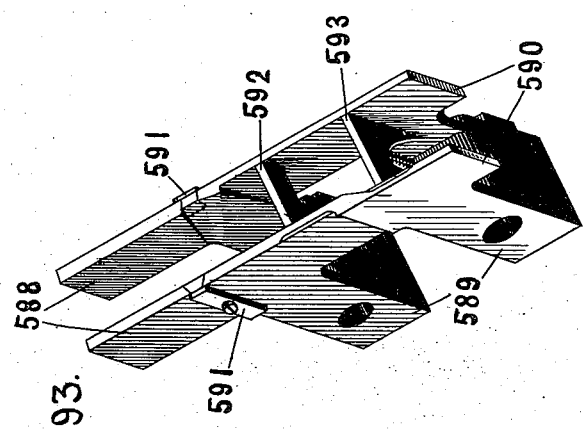
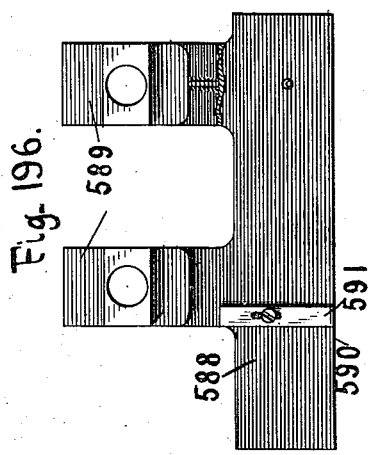

(No Model.)  163 Sheets—Sheet 70.

J. W. PAIGE.
MACHINE FOR DISTRIBUTING, SETTING, AND JUSTIFYING TYPE.

No. 547,860.  Patented Oct. 15, 1895.

Witnesses
Frank H. Pierpont
Charles E. Davis

Inventor
J. W. Paige
By Attorneys
H. W. Beadle & Co.

(No Model.)  163 Sheets—Sheet 71.
J. W. PAIGE.
MACHINE FOR DISTRIBUTING, SETTING, AND JUSTIFYING TYPE.
No. 547,860.  Patented Oct. 15, 1895.
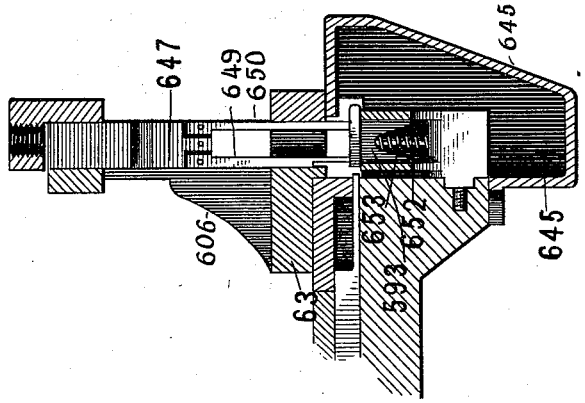
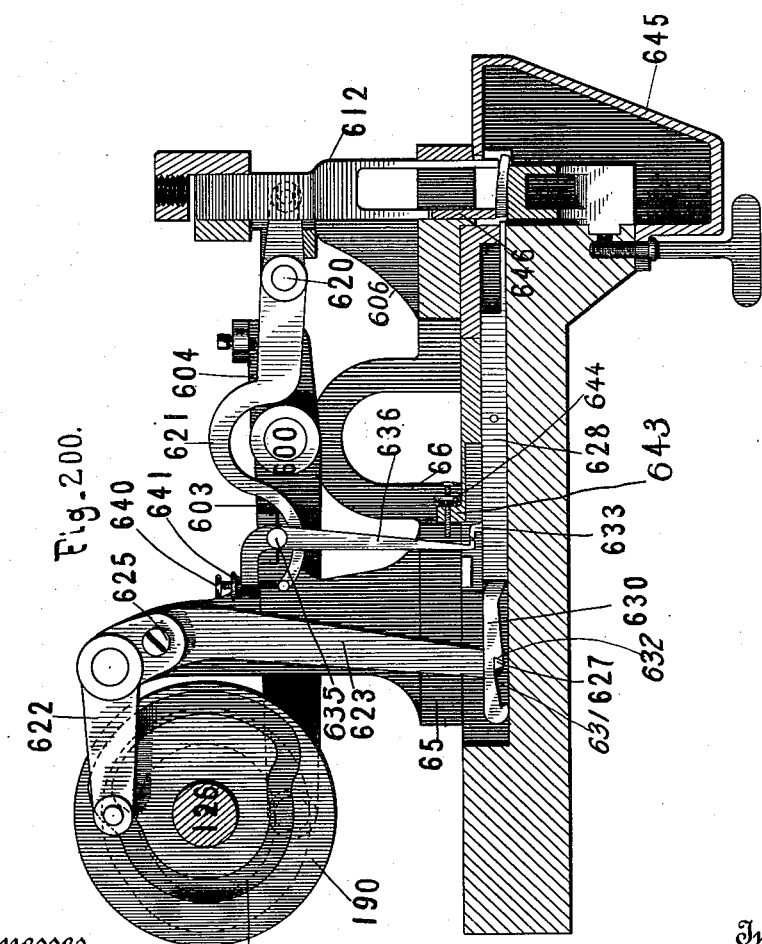
Witnesses  
Frank H. Pierpont  
Charles E. Davis.
Inventor  
J. W. Paige  
By Attorneys  
H. W. Beadle & Co.

(No Model.)   163 Sheets—Sheet 72.
J. W. PAIGE.
MACHINE FOR DISTRIBUTING, SETTING, AND JUSTIFYING TYPE.
No. 547,860.   Patented Oct. 15, 1895.
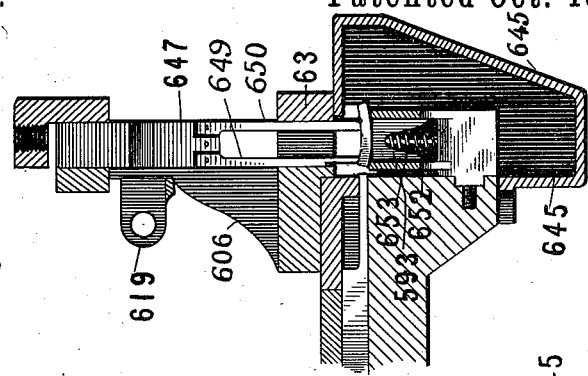
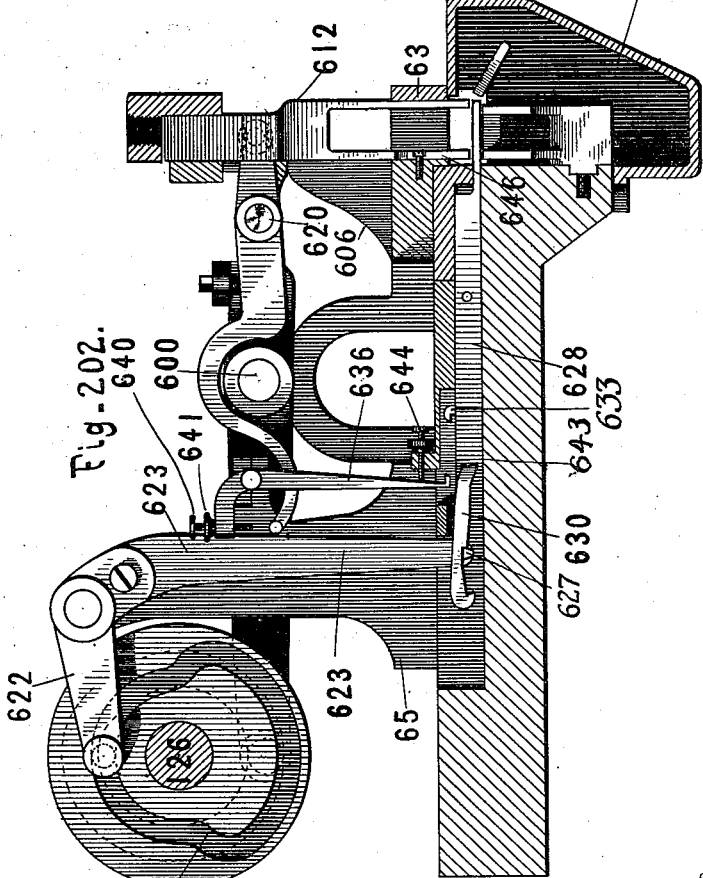
Witnesses
Frank H. Pierpont
Charles E. Davis
Inventor
J. W. Paige
By Attorneys
H. W. Beadle & Co.

(No Model.) 163 Sheets—Sheet 73.
J. W. PAIGE.
MACHINE FOR DISTRIBUTING, SETTING, AND JUSTIFYING TYPE.
No. 547,860. Patented Oct. 15, 1895.

(No Model.) 163 Sheets—Sheet 74.

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadle & Co.

(No Model.)  163 Sheets—Sheet 75.
J. W. PAIGE.
MACHINE FOR DISTRIBUTING, SETTING, AND JUSTIFYING TYPE.
No. 547,860. Patented Oct. 15, 1895.
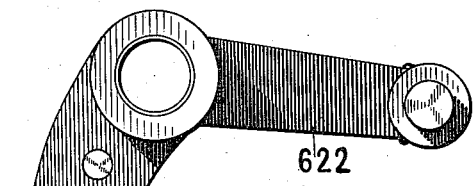
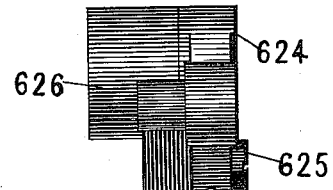
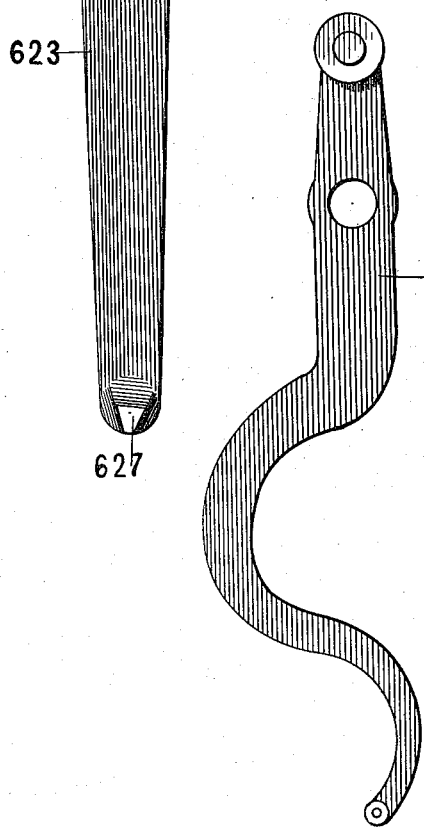
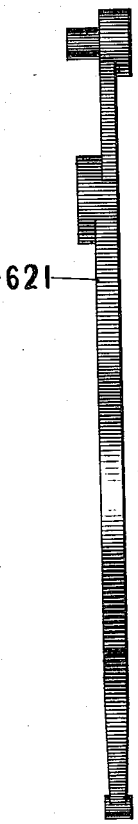
Witnesses
Frank H. Pierpont
Charles E. Davis.
Inventor
J. W. Paige
By Attorneys
H. W. Beadle & Co.

(No Model.) 163 Sheets—Sheet 76.
J. W. PAIGE.
MACHINE FOR DISTRIBUTING, SETTING, AND JUSTIFYING TYPE.
No. 547,860. Patented Oct. 15, 1895.
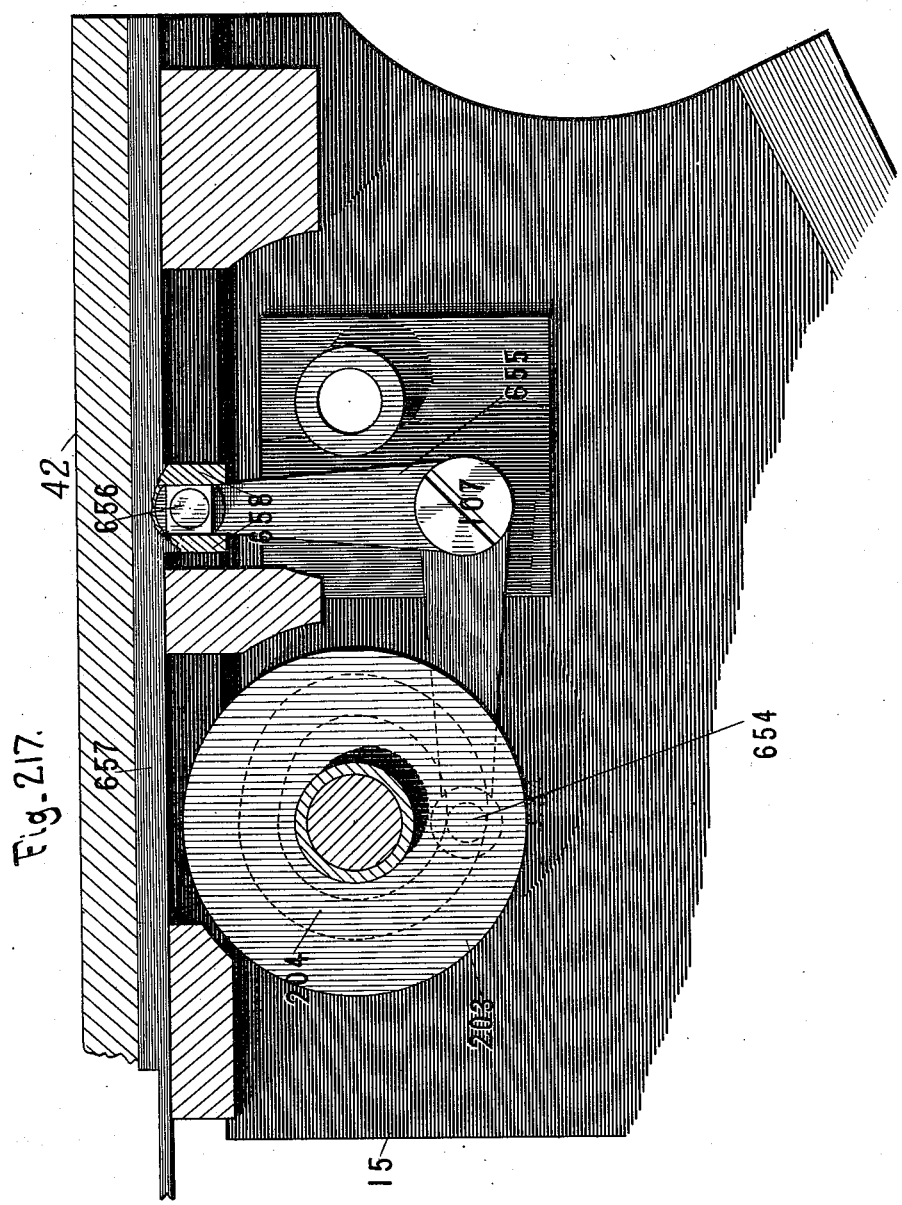

(No Model.)

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadle & Co.

(No Model.) 163 Sheets—Sheet 78.

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis

Inventor
J. W. Paige
By Attorneys
H. W. Beadle + Co.

(No Model.) 163 Sheets—Sheet 79.
J. W. PAIGE.
MACHINE FOR DISTRIBUTING, SETTING, AND JUSTIFYING TYPE.
No. 547,860. Patented Oct. 15, 1895.
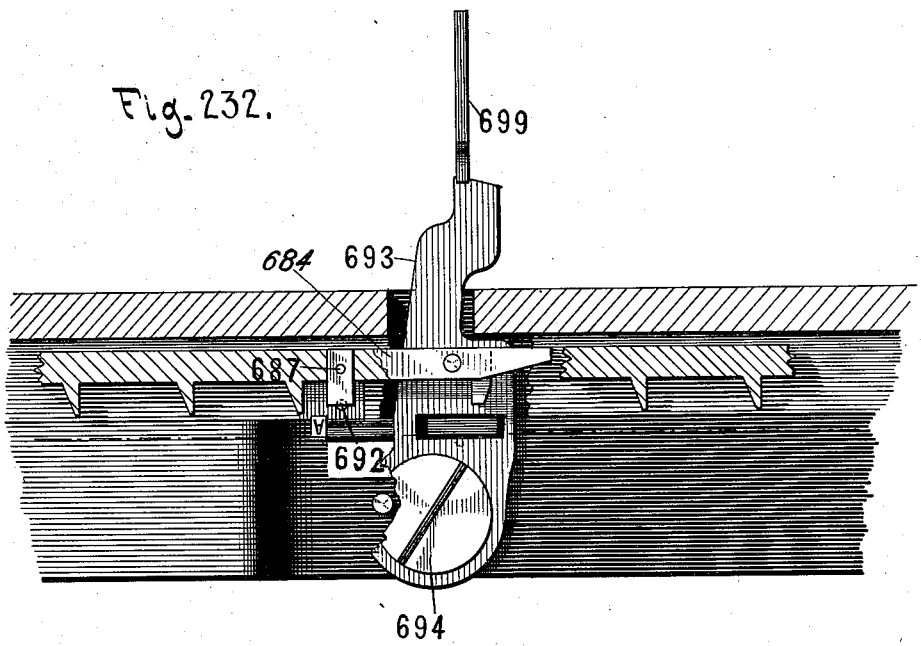
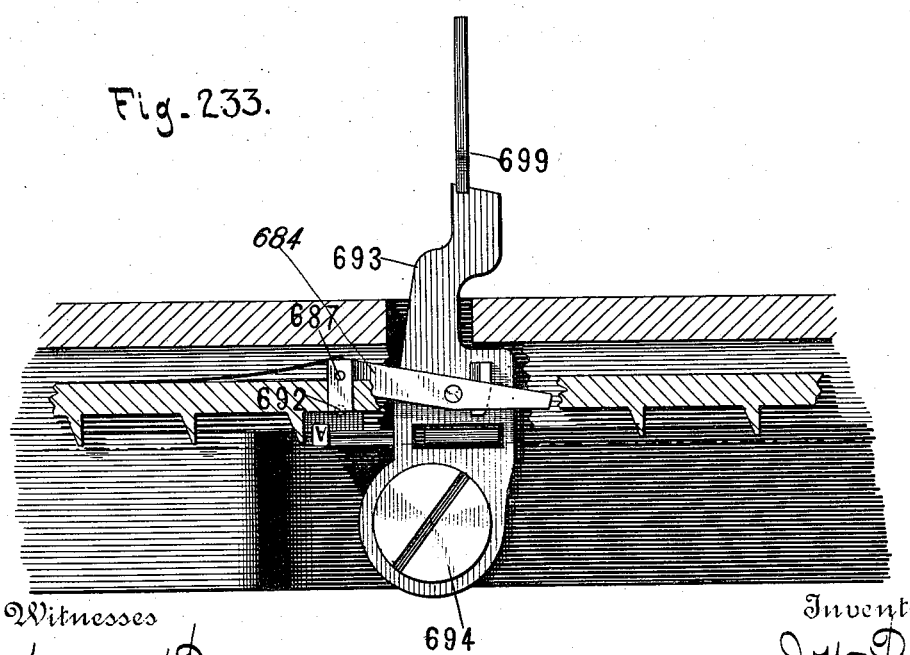

(No Model.)
J. W. PAIGE.
MACHINE FOR DISTRIBUTING, SETTING, AND JUSTIFYING TYPE.
No. 547,860. Patented Oct. 15, 1895.
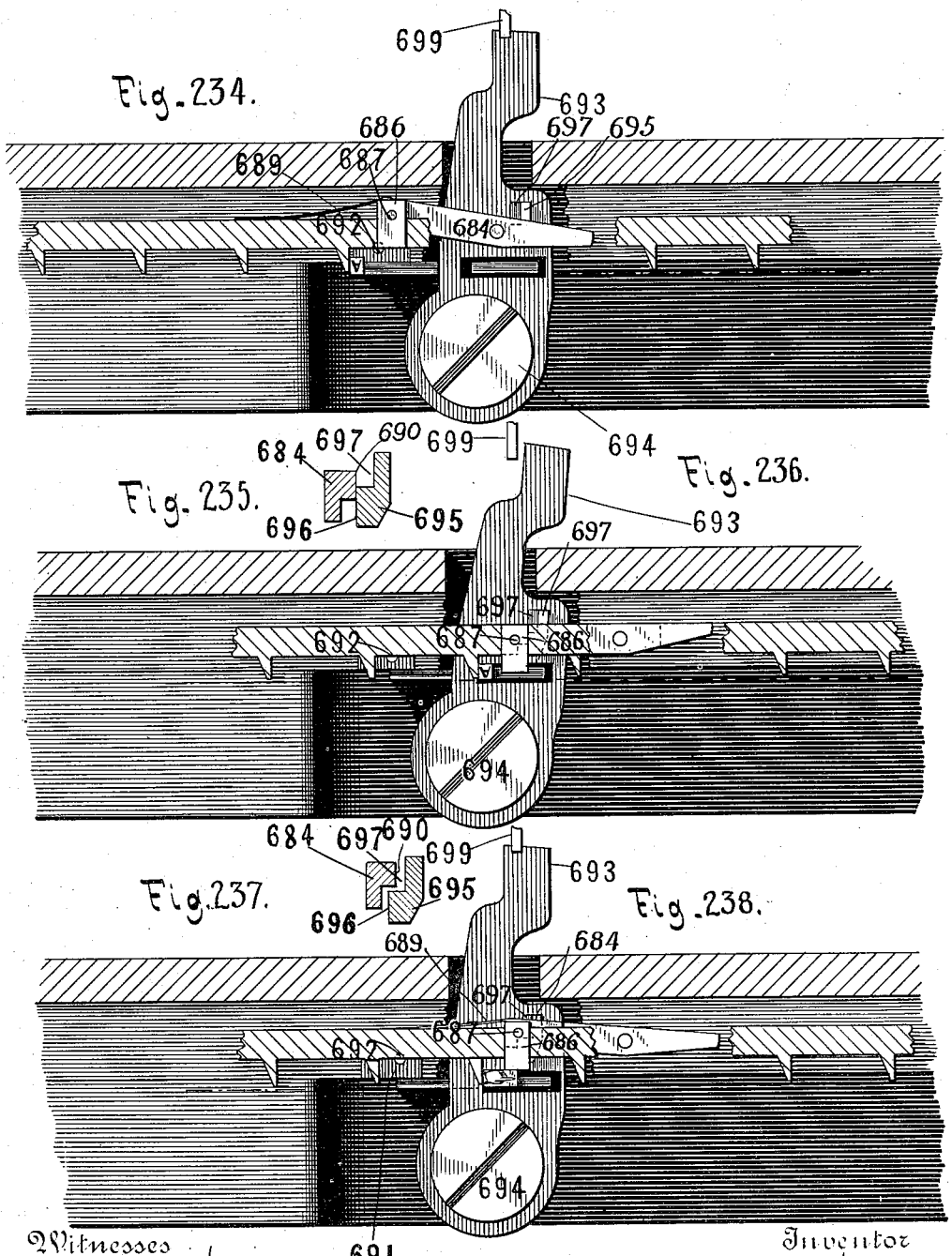

(No Model.)  163 Sheets—Sheet 81.

J. W. PAIGE.
MACHINE FOR DISTRIBUTING, SETTING, AND JUSTIFYING TYPE.

No. 547,860. Patented Oct. 15, 1895.

(No Model.)
163 Sheets—Sheet 82.
J. W. PAIGE.
MACHINE FOR DISTRIBUTING, SETTING, AND JUSTIFYING TYPE.
No. 547,860.
Patented Oct. 15, 1895.
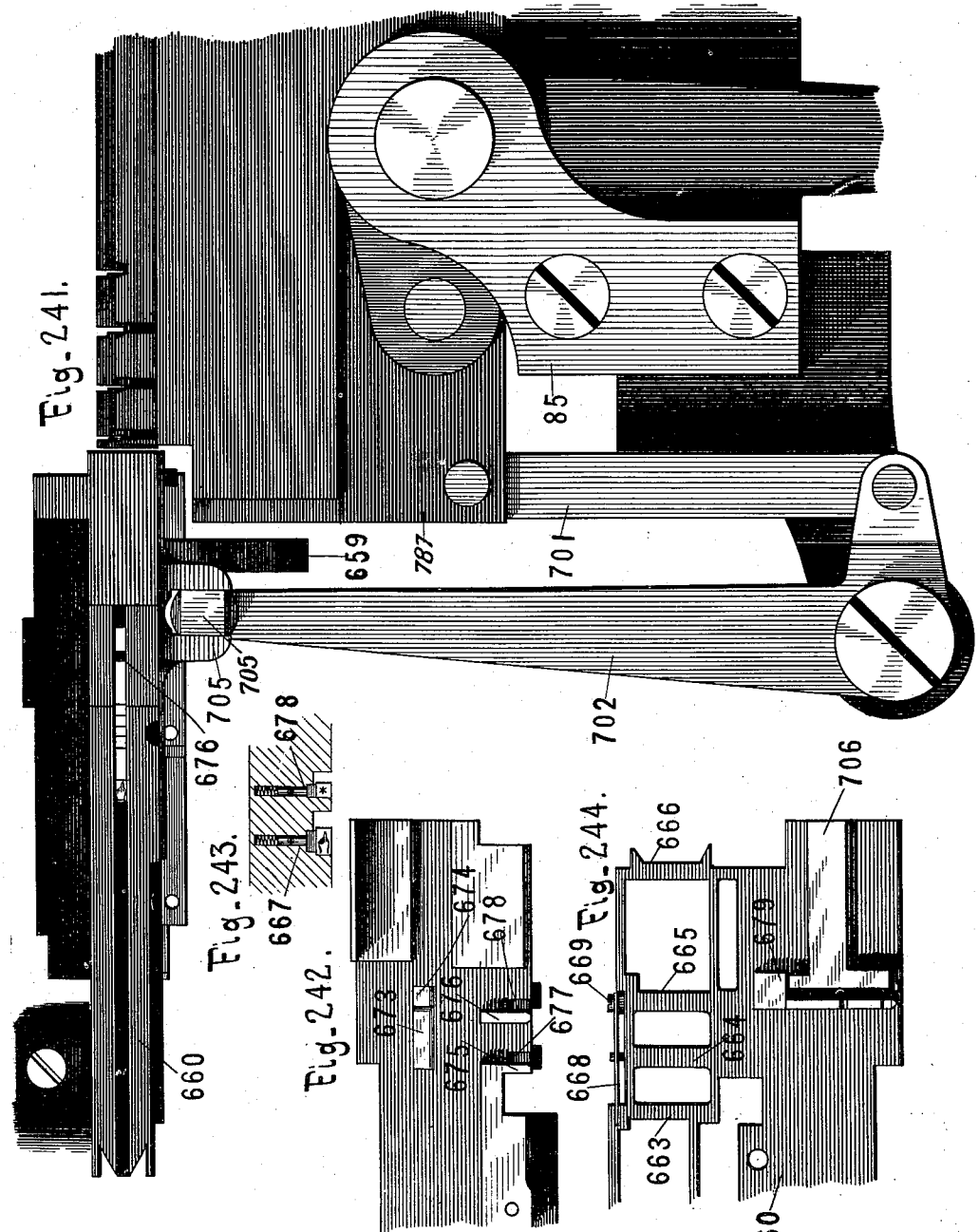
Witnesses
Frank H. Pierpont
Charles E. Davis.
Inventor
J. W. Paige
By Attorneys
H. W. Beadle & Co.

(No Model.) 163 Sheets—Sheet 83.
J. W. PAIGE.
MACHINE FOR DISTRIBUTING, SETTING, AND JUSTIFYING TYPE.
No. 547,860. Patented Oct. 15, 1895.
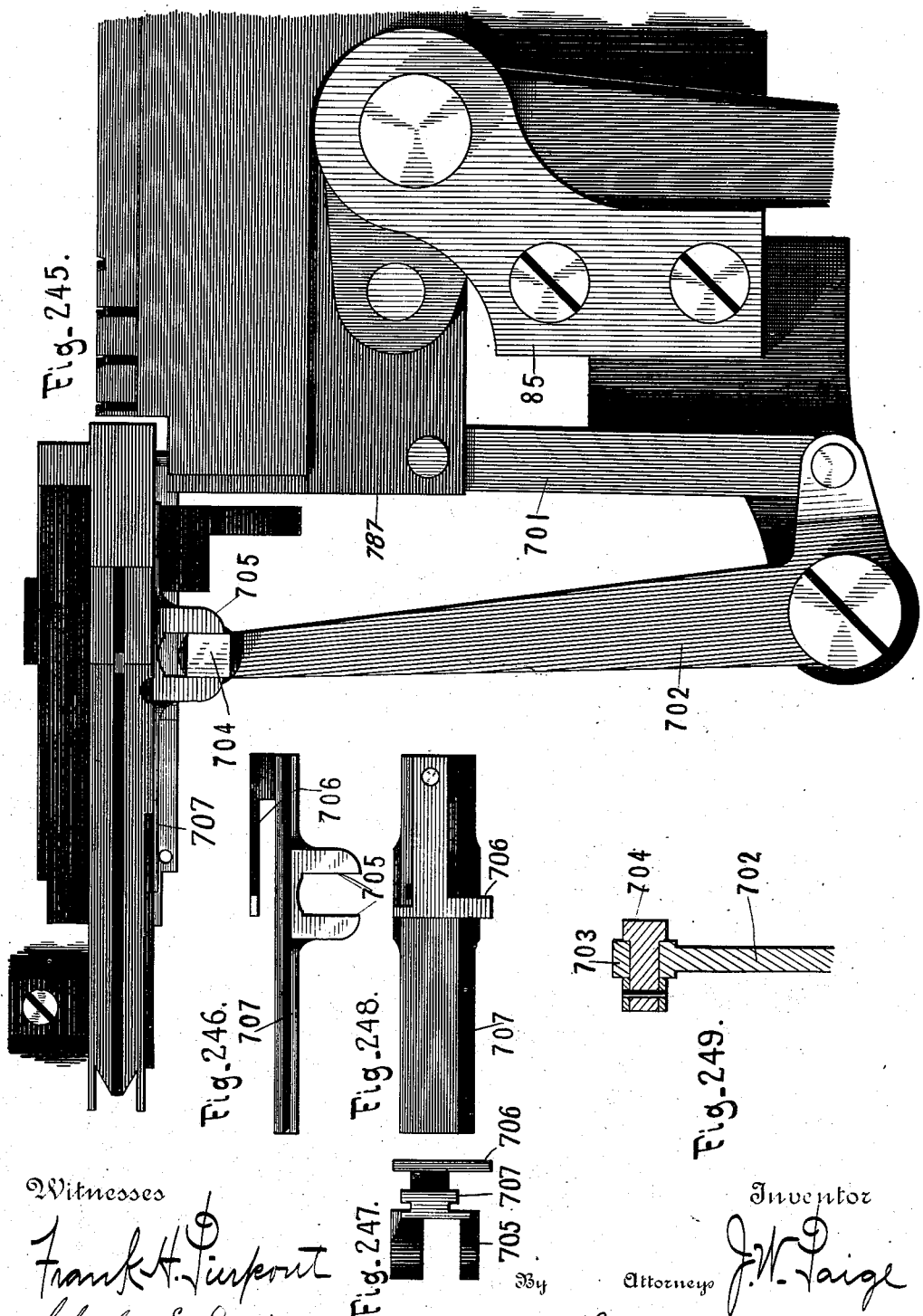

(No Model.) 163 Sheets—Sheet 84.
J. W. PAIGE.
MACHINE FOR DISTRIBUTING, SETTING, AND JUSTIFYING TYPE.
No. 547,860. Patented Oct. 15, 1895.
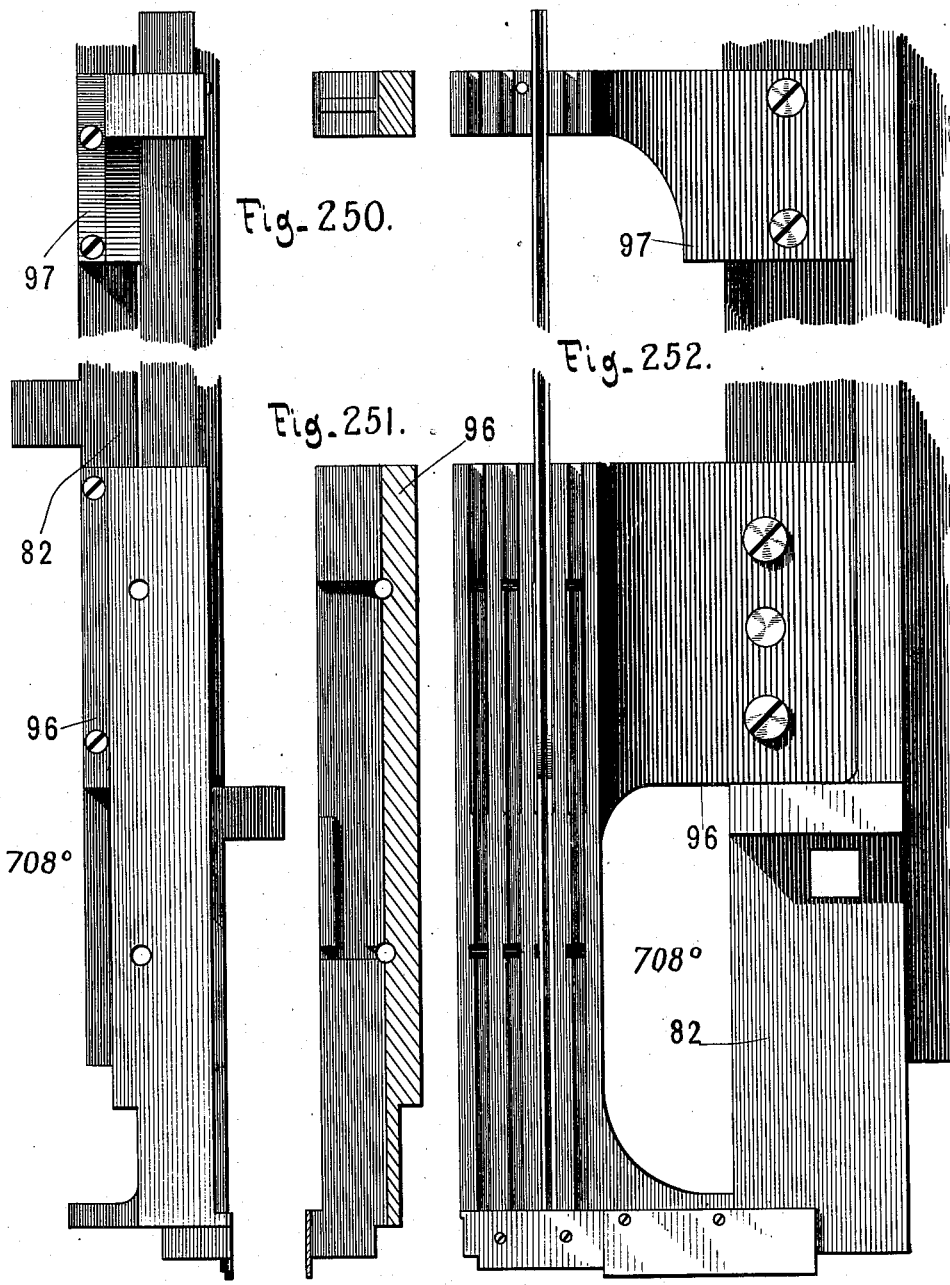

(No Model.)  
J. W. PAIGE.  
MACHINE FOR DISTRIBUTING, SETTING, AND JUSTIFYING TYPE.  
No. 547,860.  
163 Sheets—Sheet 85.  
Patented Oct. 15, 1895.

Witnesses  
Frank H. Pierpont  
Charles E. Davis.

Inventor  
J. W. Paige  
By Attorneys  
H. W. Beadle & Co.

(No Model.)   163 Sheets—Sheet 86.
J. W. PAIGE.
MACHINE FOR DISTRIBUTING, SETTING, AND JUSTIFYING TYPE.
No. 547,860.   Patented Oct. 15, 1895.

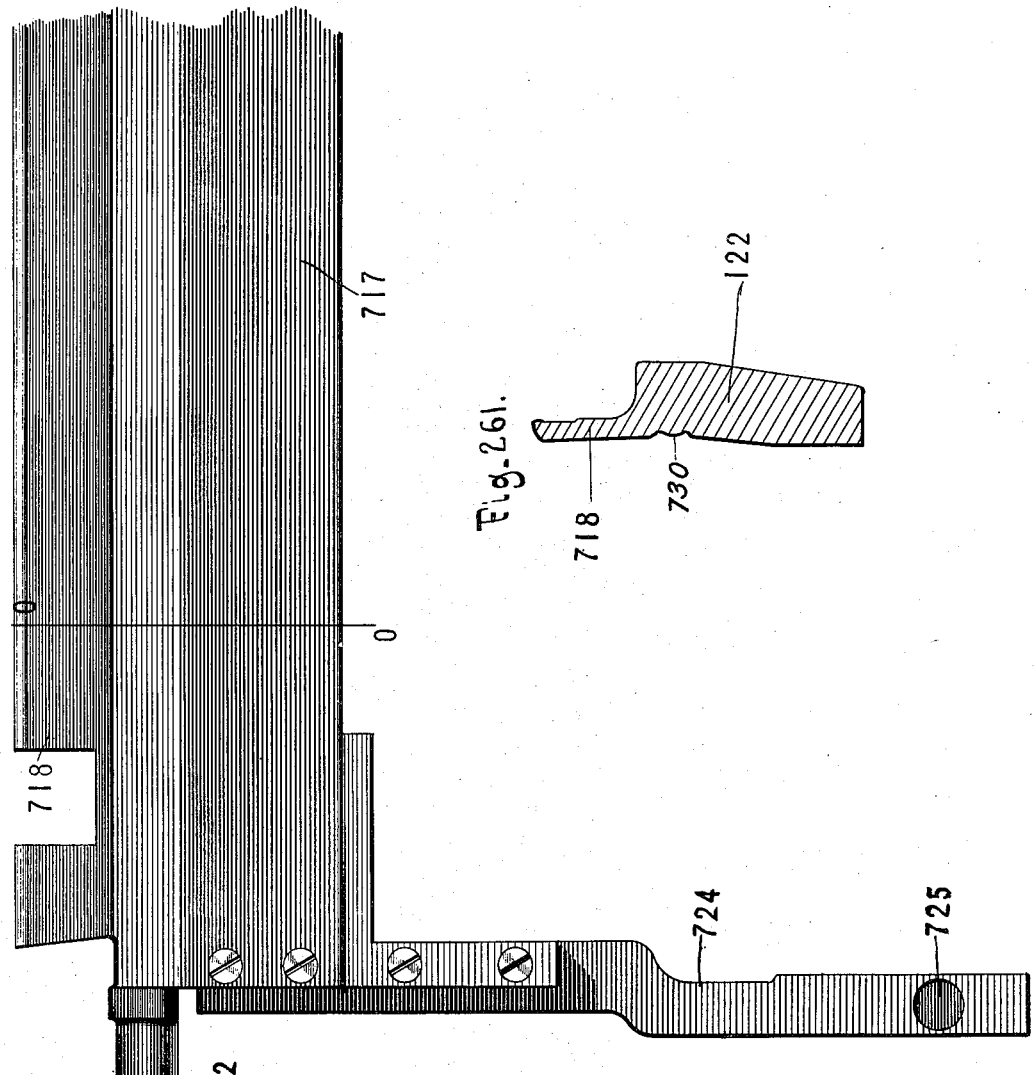

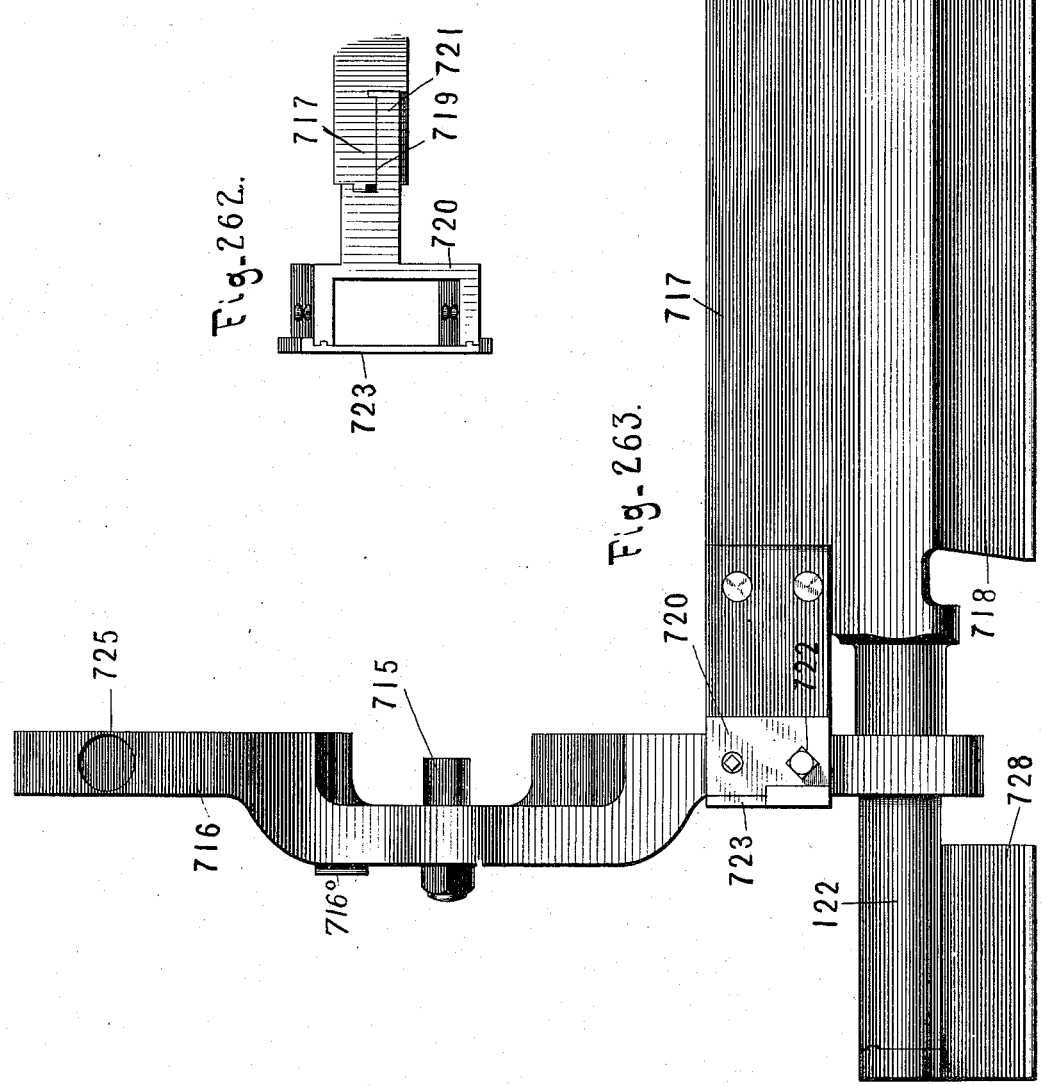

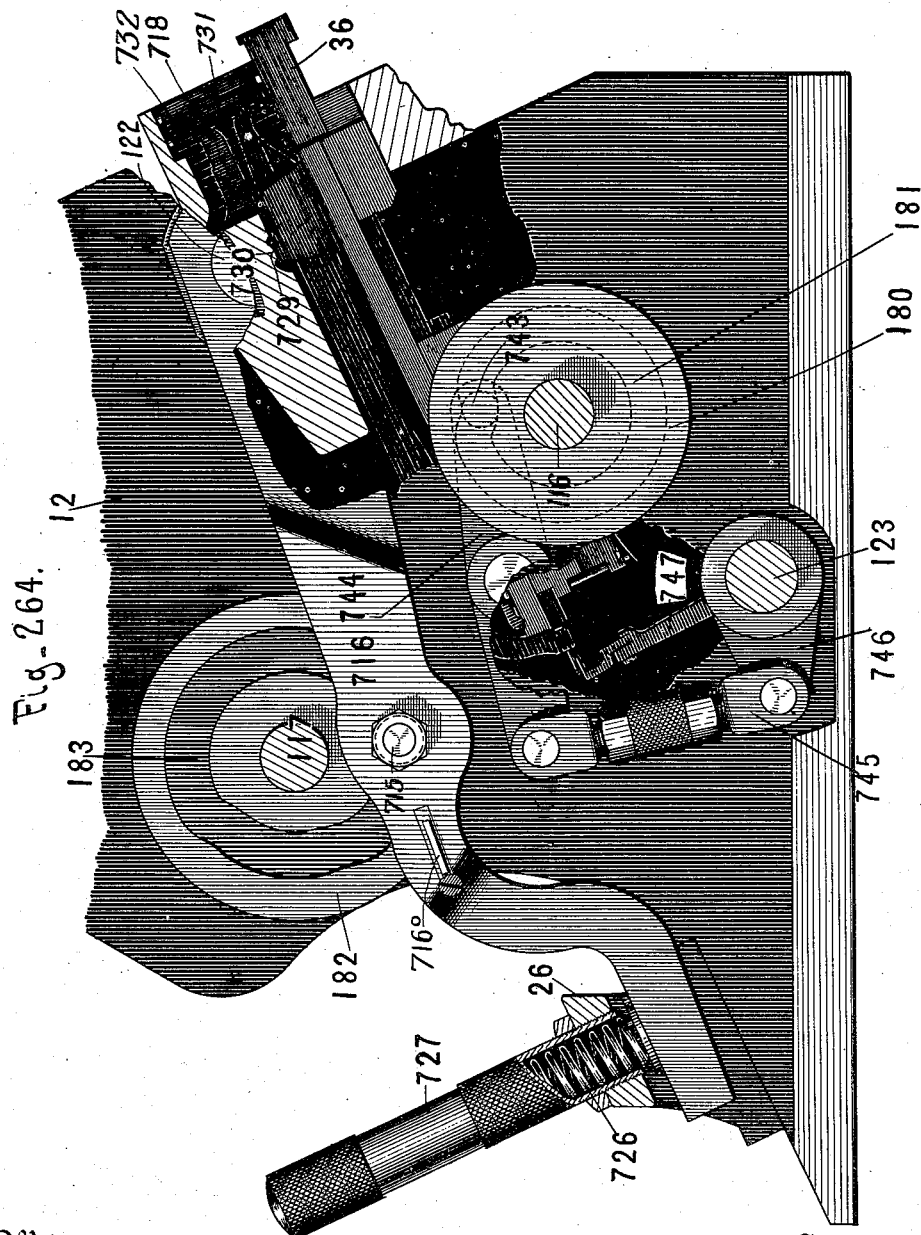

(No Model.)
J. W. PAIGE.
MACHINE FOR DISTRIBUTING, SETTING, AND JUSTIFYING TYPE.
No. 547,860. Patented Oct. 15, 1895.
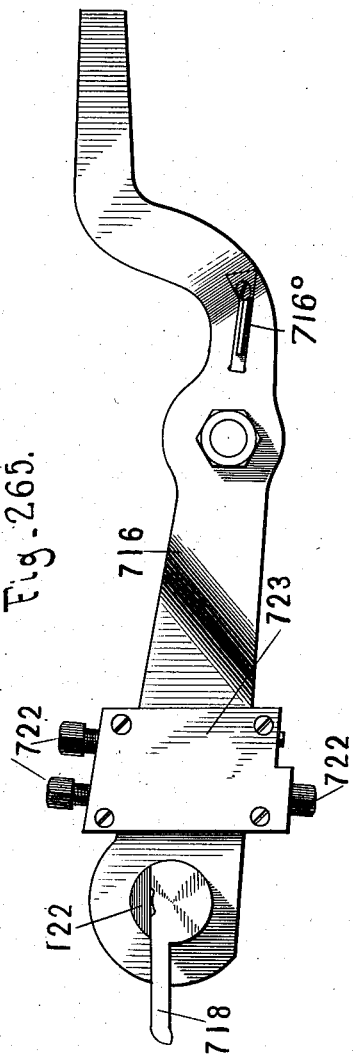
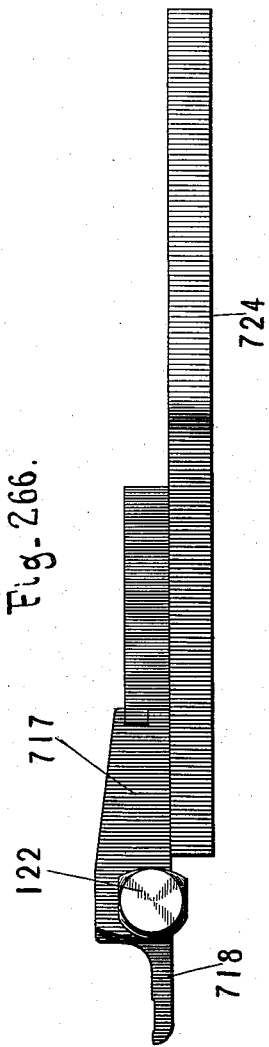

(No Model.)
J. W. PAIGE.
MACHINE FOR DISTRIBUTING, SETTING, AND JUSTIFYING TYPE.
No. 547,860. Patented Oct. 15, 1895.
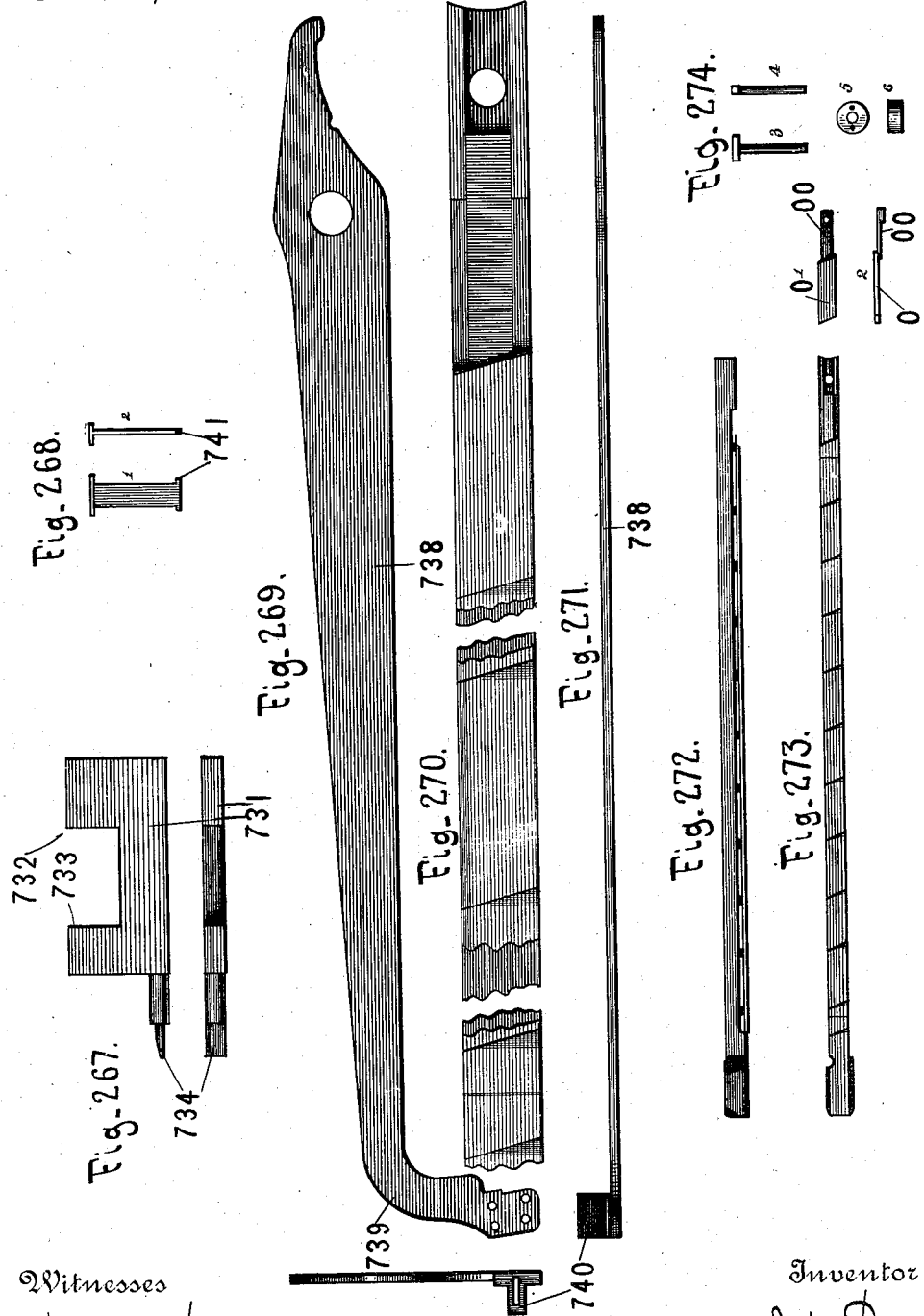

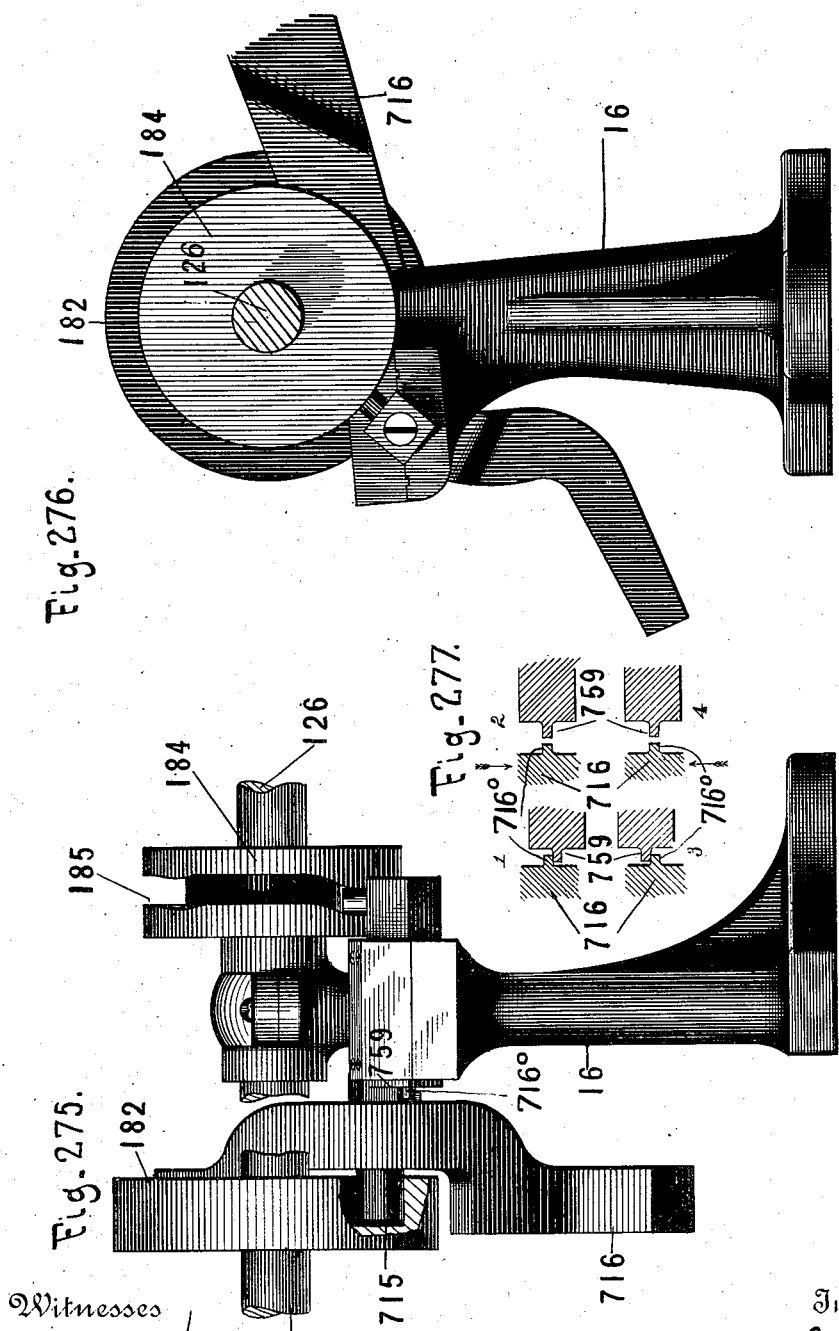

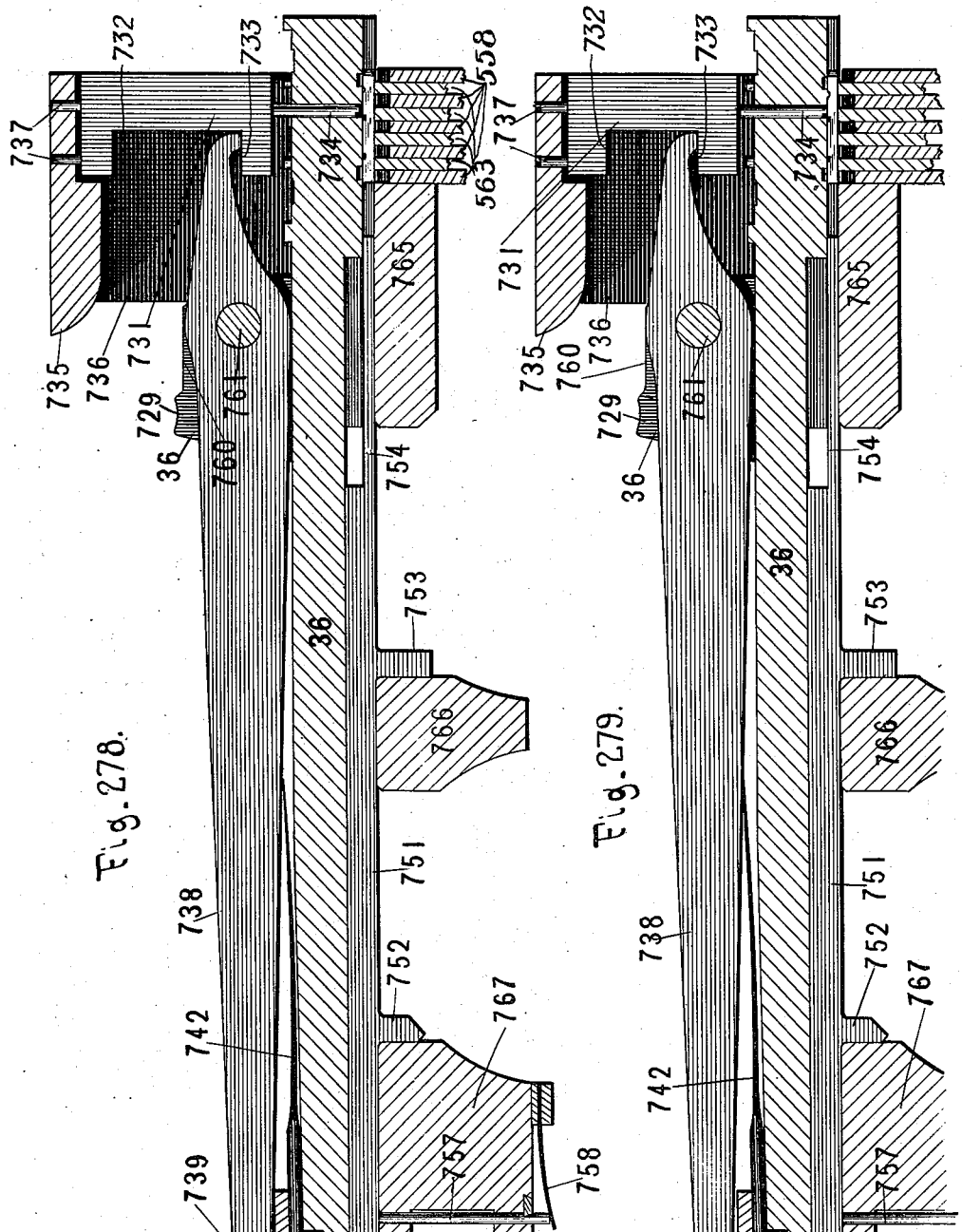

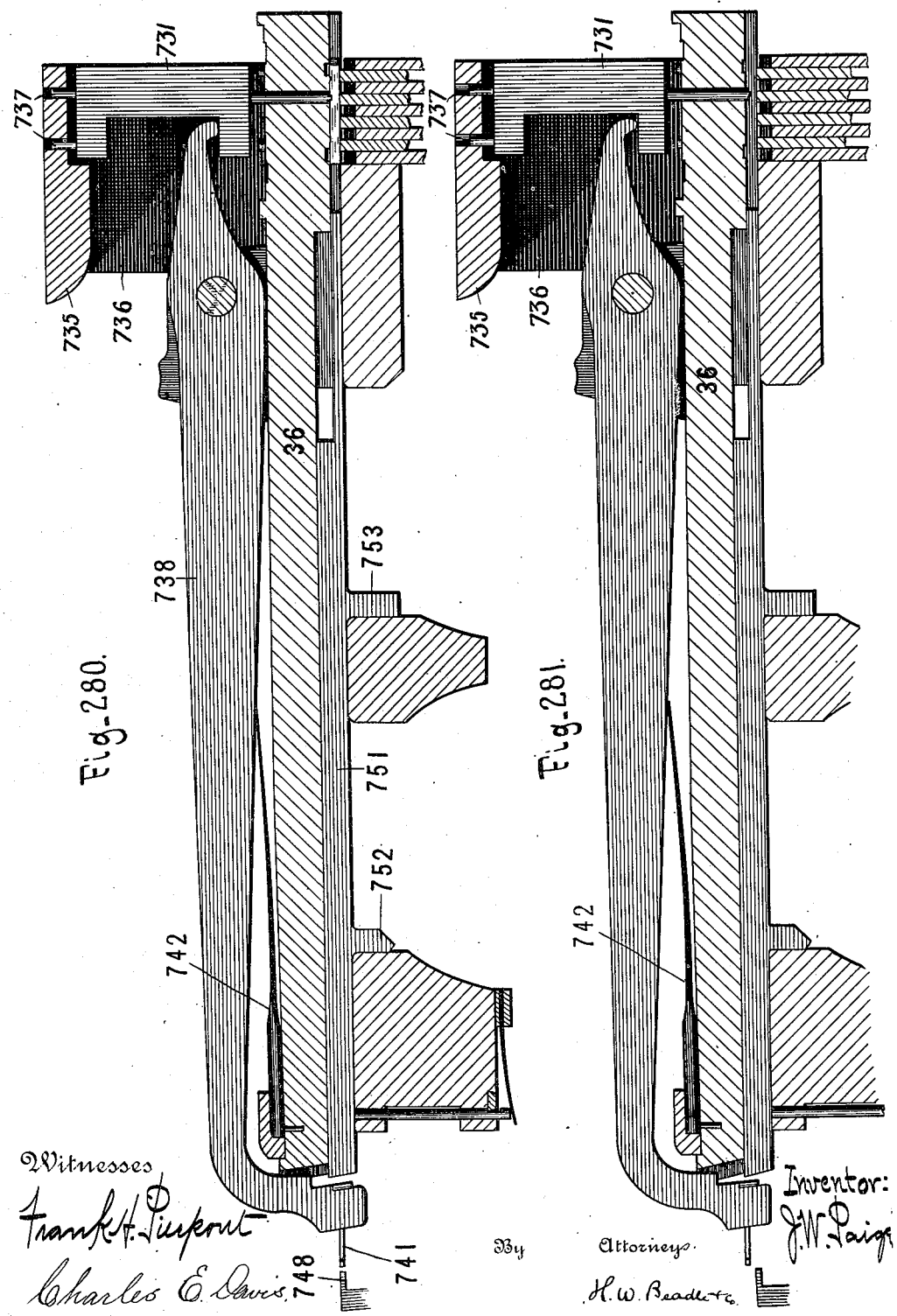

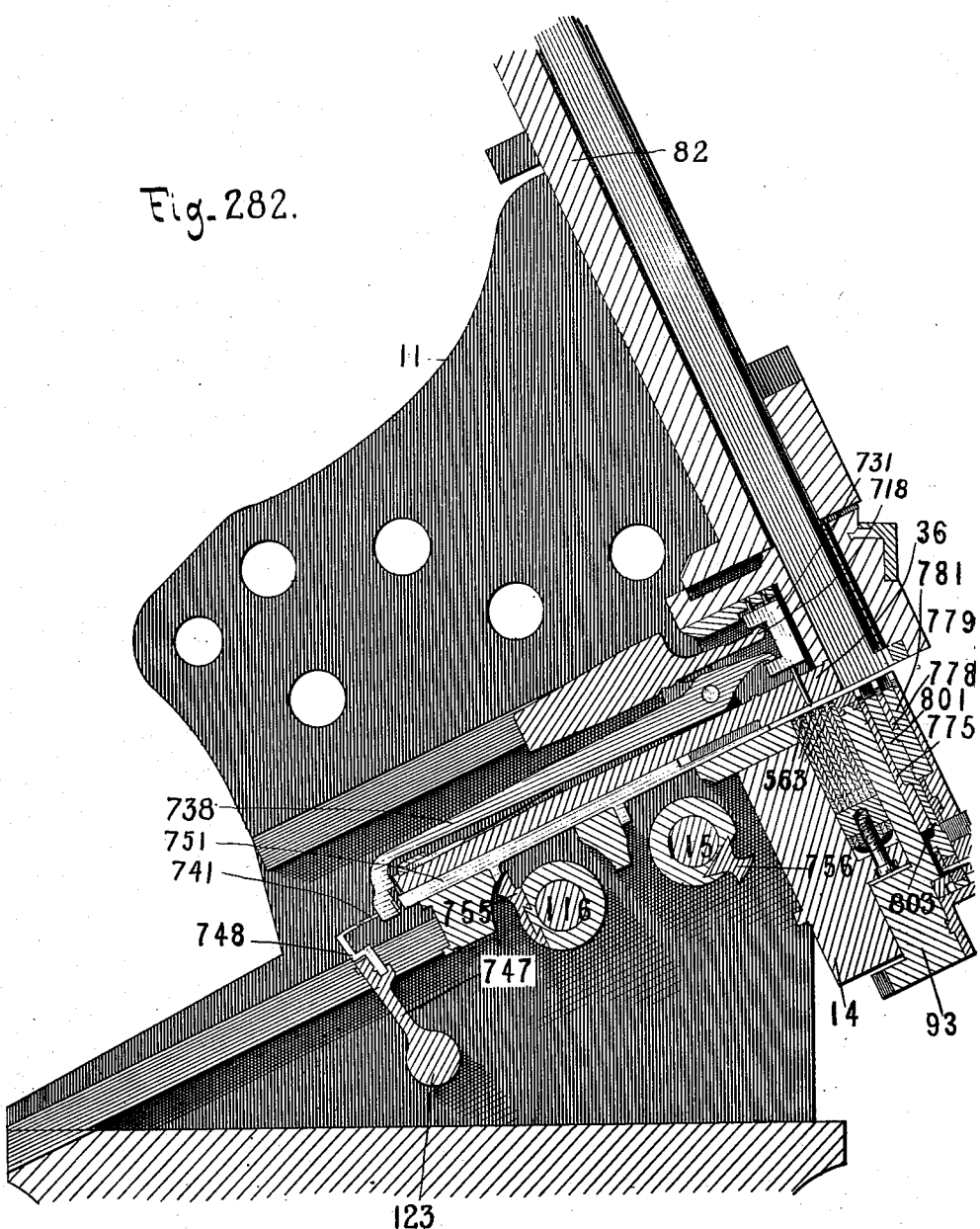

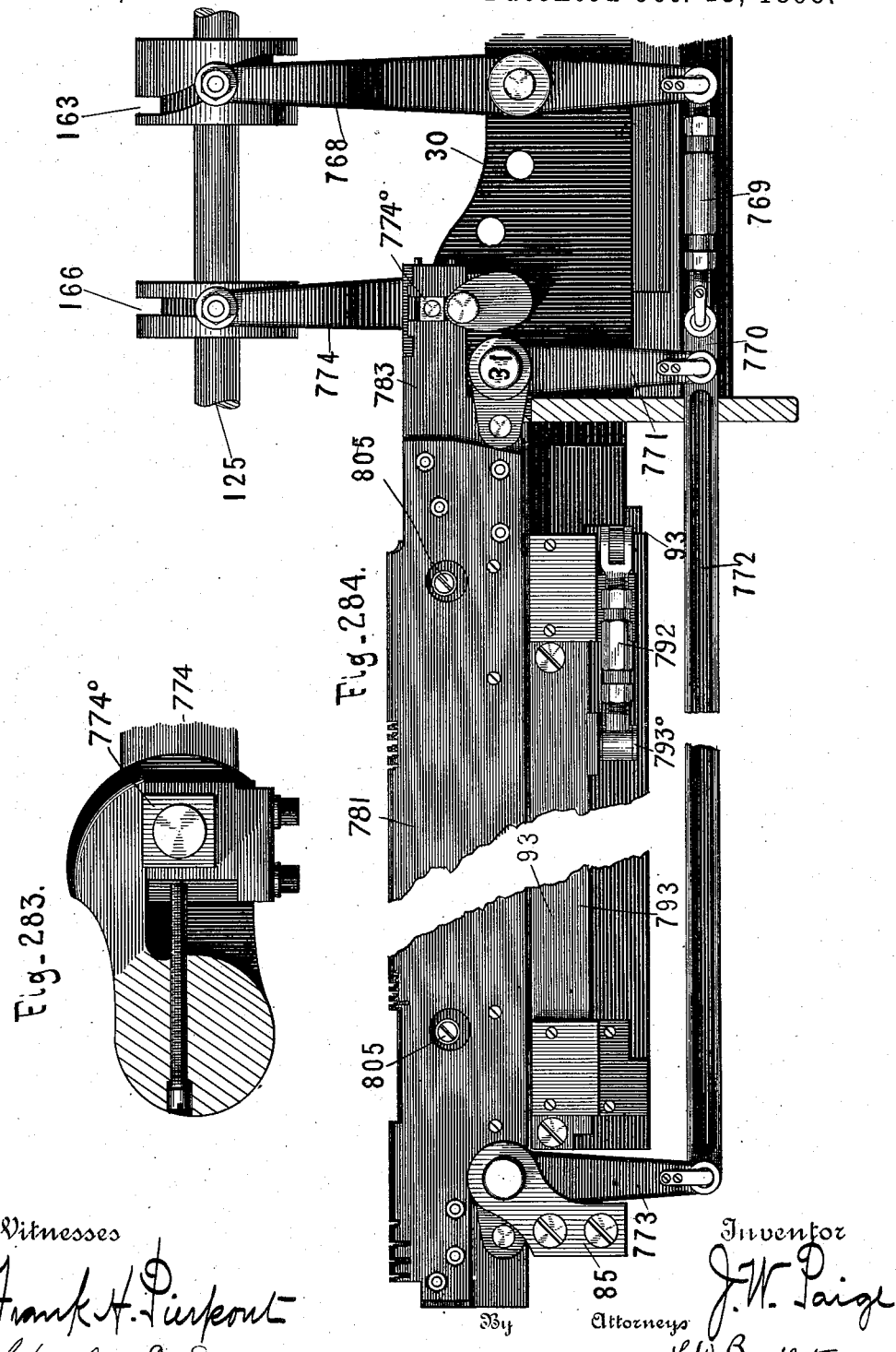

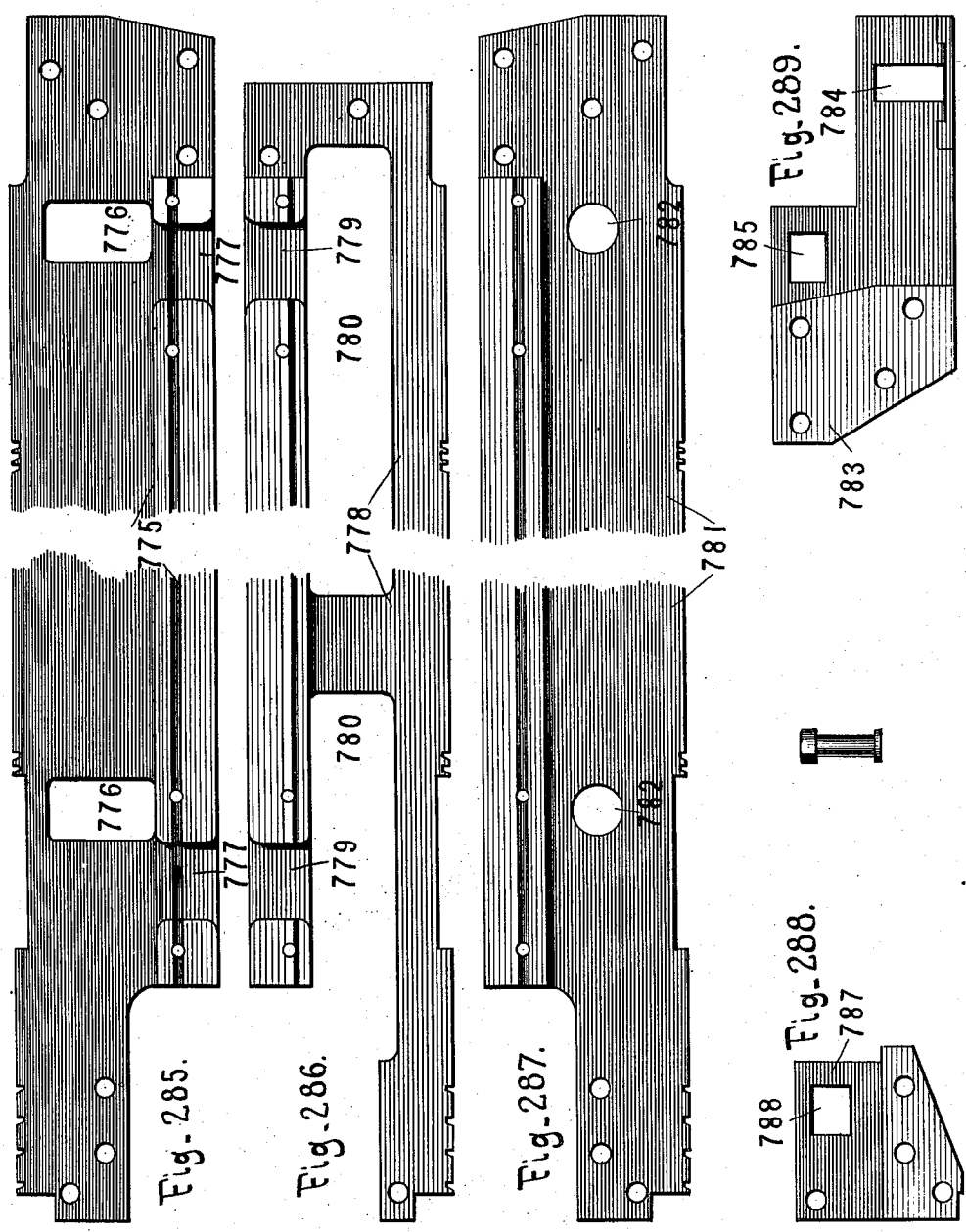

(No Model.) 163 Sheets—Sheet 98.
J. W. PAIGE.
MACHINE FOR DISTRIBUTING, SETTING, AND JUSTIFYING TYPE.
No. 547,860. Patented Oct. 15, 1895.
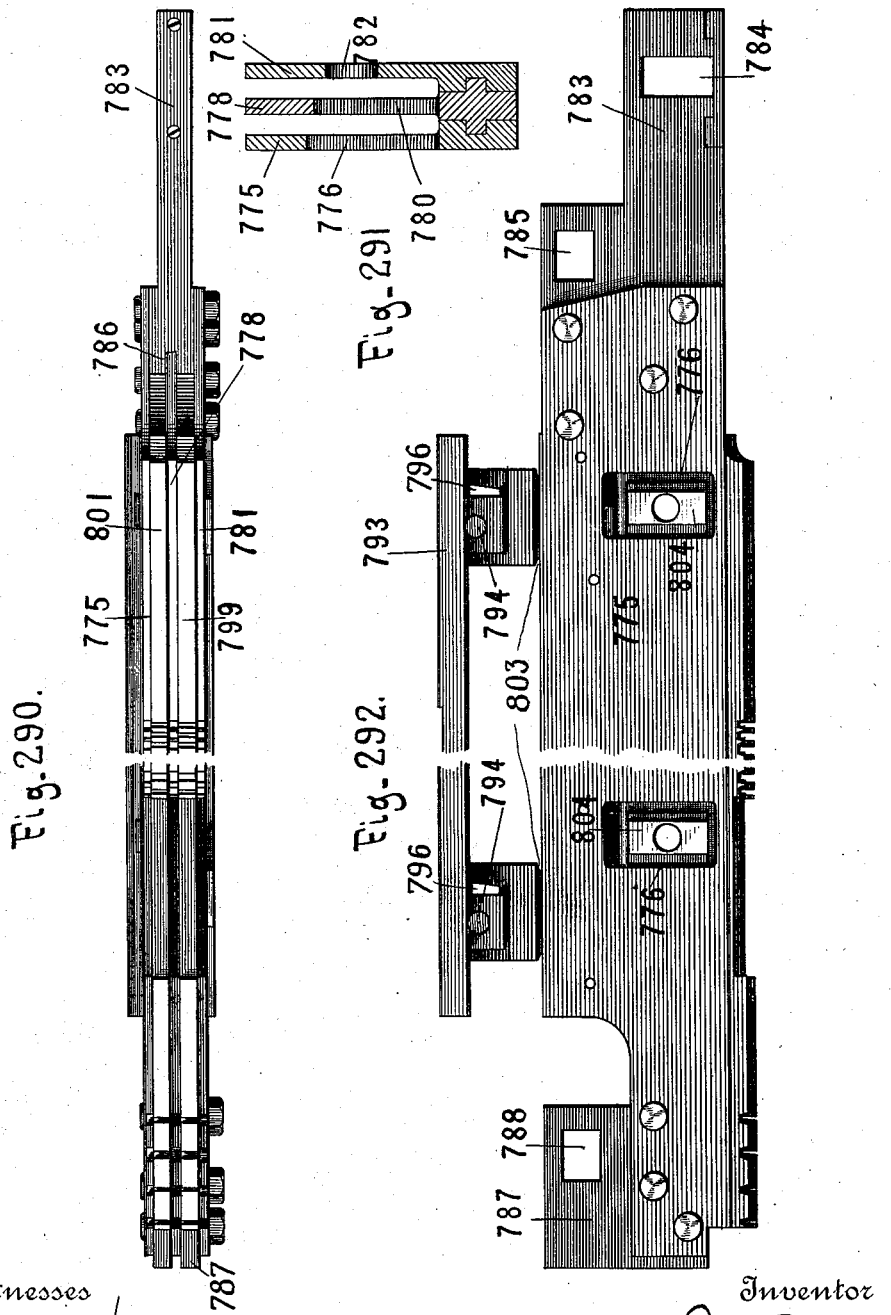

(No Model.) 163 Sheets—Sheet 99.
J. W. PAIGE.
MACHINE FOR DISTRIBUTING, SETTING, AND JUSTIFYING TYPE.
No. 547,860. Patented Oct. 15, 1895.
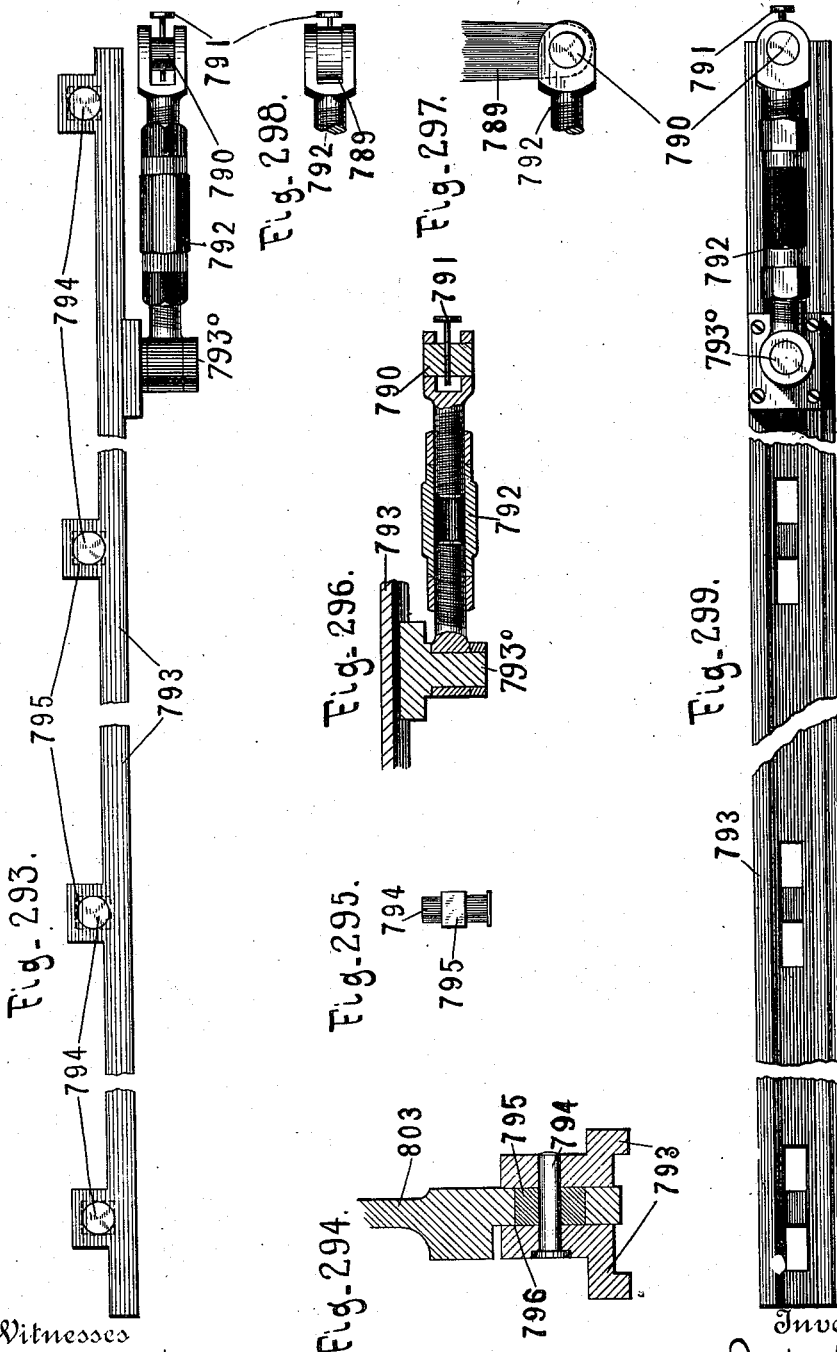

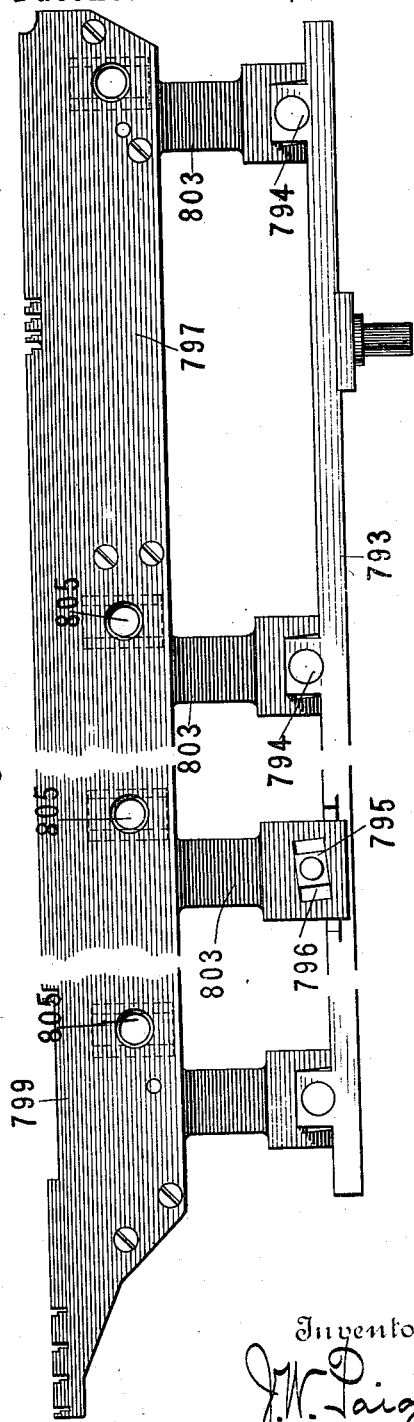

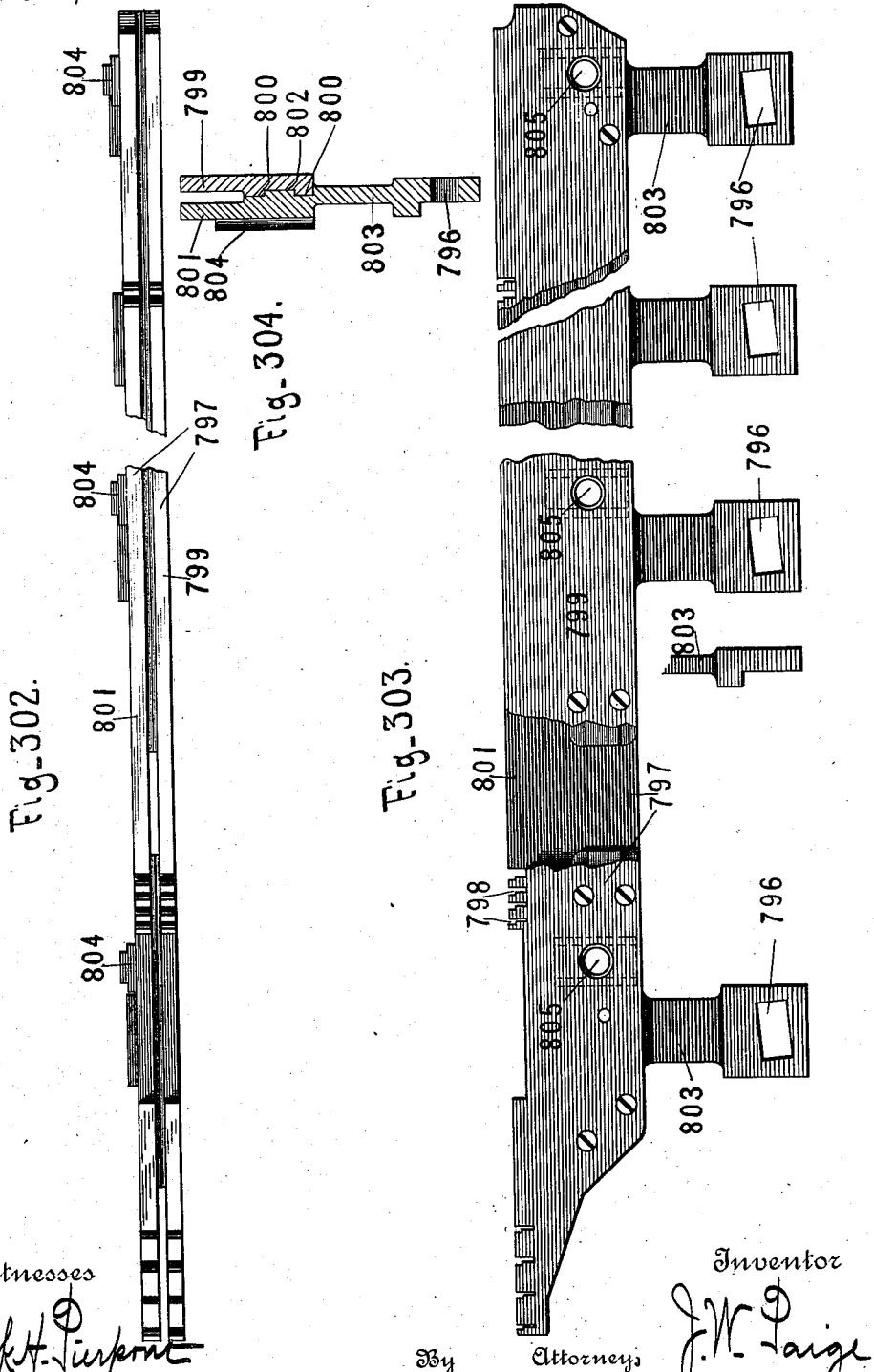

(No Model.)
163 Sheets—Sheet 102.

J. W. PAIGE.
MACHINE FOR DISTRIBUTING, SETTING, AND JUSTIFYING TYPE.

No. 547,860.
Patented Oct. 15, 1895.

834   834
797   781

834   834
797   781

798

Witnesses
Frank H. Pierpont
Charles E. Davis.

Inventor
J. W. Paige
By Attorneys
H. W. Beadle & Co.

Fig. 314.

| Nicks | Characters | №  | Nicks | Characters | №  | Nicks | Characters | №  | Nicks | Characters | №  | Nicks | Characters | №  |
|-------|------------|----|-------|------------|----|-------|------------|----|-------|------------|----|-------|------------|----|
| 1-2   |            |    | 2-3   |            |    | 3-4   |            |    | 4-5   |            |    | 5-6   |            |    |
| 1-3   |            |    | 2-4   |            |    | 3-5   |            |    | 4-6   |            |    | 5-7   |            |    |
|       |            |    |       |            |    |       |            |    |       |            |    | 5-23  |            |    |
|       |            |    |       |            |    | 3-23  |            |    | 4-23  |            |    |       |            |    |
|       |            |    | 2-23  |            |    |       |            |    |       |            |    |       |            |    |
| 1-23  |            |    |       |            |    |       |            |    |       |            |    |       |            |    |

| Nicks | Characters | №  | Nicks | Characters | №  | Nicks | Characters | №  | Nicks | Characters | №  | Nicks | Characters | №  |
|-------|------------|----|-------|------------|----|-------|------------|----|-------|------------|----|-------|------------|----|
| 6-7   | Lower case v | 15 | 7-8  | Figure 5   | 97 | 8-9   | Semi Colon ; | 49 | 9-10  | Lower case z | 10 | 10-11 | Small Cap H | 56 |
| 6-8   | Cap O      | 74 | 7-9   | Cap N      | 79 | 8-10  | Lower case fi | 3 | 9-11  | Small Cap O | 71 | 10-12 | Em Dash —  | 48 |
|       |            |    |       |            |    |       |            |    | 9-23  |            |    | 10-23 |            |    |
|       |            |    |       |            |    | 8-23  |            |    |       |            |    |       |            |    |
|       |            |    | 7-23  |            |    |       |            |    |       |            |    |       |            |    |
| 6-23  |            |    |       |            |    |       |            |    |       |            |    |       |            |    |

| Nicks | Characters | №  | Nicks | Characters | №  | Nicks | Characters | №  | Nicks | Characters | №  | Nicks | Characters | №  |
|-------|------------|----|-------|------------|----|-------|------------|----|-------|------------|----|-------|------------|----|
| 11-12 | Cap K      | 84 | 12-13 | Lower case q | 30 | 13-14 | Lower case fl | 2 | 14-15 | Lower case f | 7 | 15-16 | Lower Cap D | 16 |
| 11-13 | ,,    R    | 78 | 12-14 |            |    | 13-15 | Cap X      | 85 | 14-16 | ,, ,, ffl  | 40 | 15-17 | ,, ,, Y    | 104 |
|       |            |    |       |            |    |       |            |    |       |            |    | 15-23 |            |    |
|       |            |    |       |            |    |       |            |    | 14-23 |            |    |       |            |    |
|       |            |    | 12-23 |            |    | 13-23 |            |    |       |            |    |       |            |    |
| 11-23 |            |    |       |            |    |       |            |    |       |            |    |       |            |    |

| Nicks | Characters | №  | Nicks | Characters | №  | Nicks | Characters | №  | Nicks | Characters | №  | Nicks | Characters | №  |
|-------|------------|----|-------|------------|----|-------|------------|----|-------|------------|----|-------|------------|----|
| 16-17 | Inverted comma ' | 5 | 17-18 | Regular Pi | | 18-19 | Lower case e | 19 | 19-20 | Small Cap M | 61 | 20-21 | Cap D | 83 |
| 16-18 | Cap V      | 66 | 17-19 | Cap F      | 75 | 18-20 | ,, ,, w    | 14 | 19-21 | Cap H      | 68 | 20-22 |            |    |
|       |            |    |       |            |    |       |            |    |       |            |    | 20-23 |            |    |
|       |            |    |       |            |    |       |            |    | 19-23 |            |    |       |            |    |
|       |            |    |       |            |    | 18-23 |            |    |       |            |    |       |            |    |
|       |            |    | 17-23 |            |    |       |            |    |       |            |    |       |            |    |
| 16-23 |            |    |       |            |    |       |            |    |       |            |    |       |            |    |

| Nicks | Characters | № | Nicks | Characters | № |
|-------|------------|---|-------|------------|---|
| 21-22 |            |   | 22-23 |            |   |
| 21-23 |            |   |       |            |   |

*NOTE.*

| | |
|---|---|
| Whole number of nicks in the system, | 23 |
| Distance from center to center, | .0297 |
| Width of Round nicks | .050 |
| Depth of ,, ,, | .016 |
| Width of Square ,, | .036 |
| Depth ,, ,, ,, | .010 |
| Center of №1 nick from foot | .0806 |
| ,, ,, ,, 23 ,, ,, ,, | .734 |
| Nicks used on type, range from | 6 to 21 |

Quads and Spaces may be nicked so as to be reversible; in which case they will have a round nick at foot and face.

Round nicks are used to determine faces, turned type, etc.

Type     Ordinary Quad     Reversible Quad

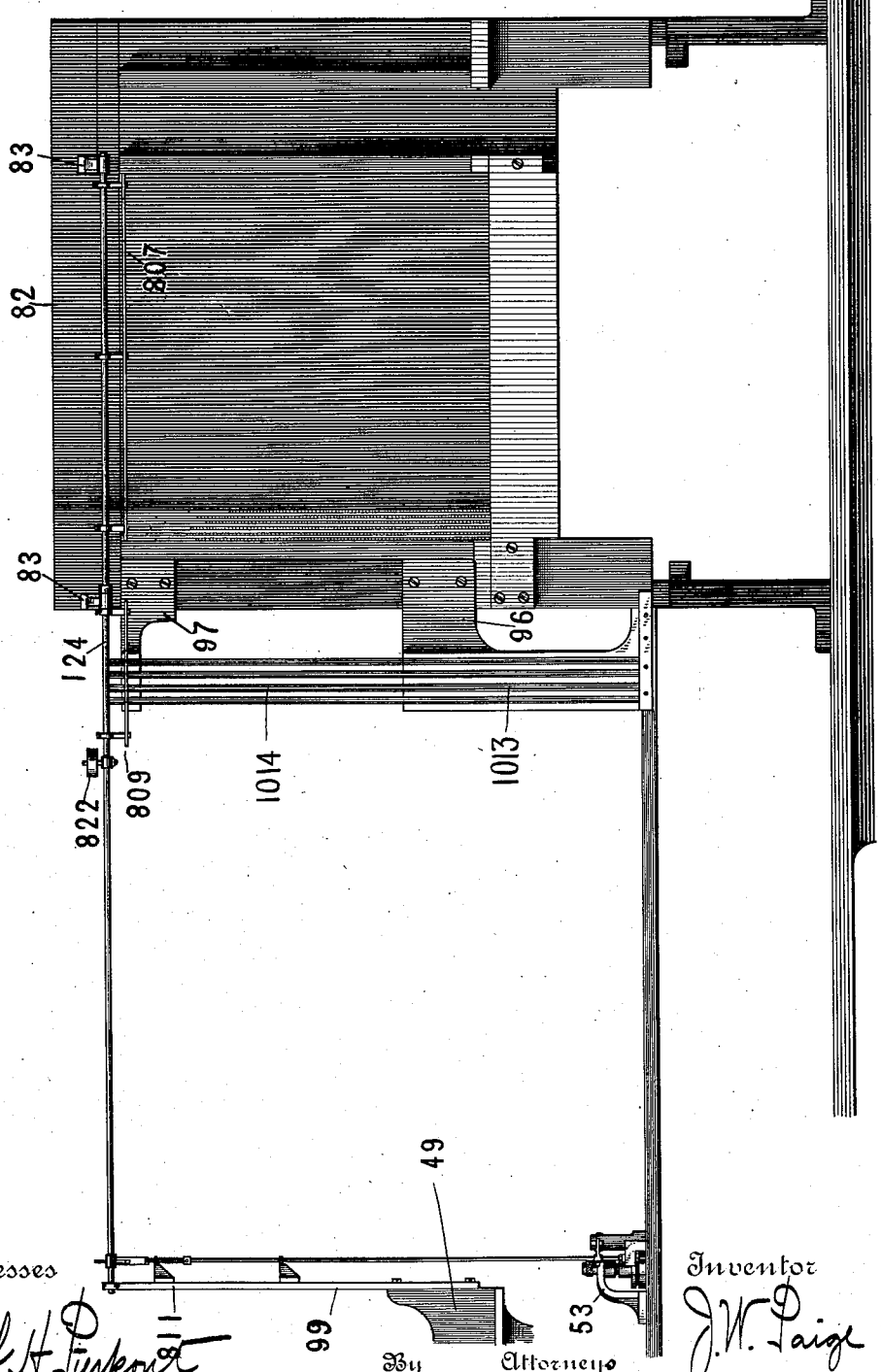

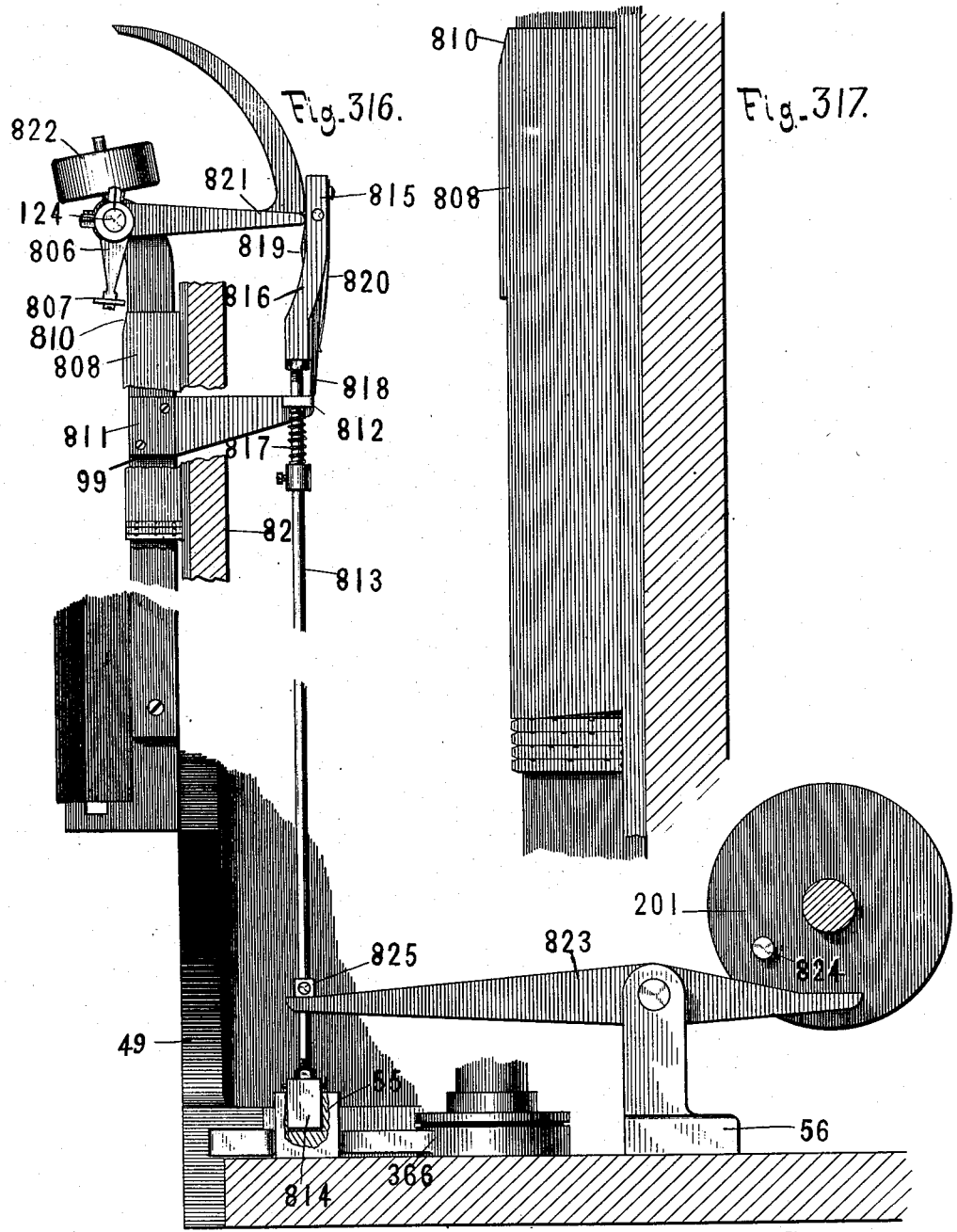

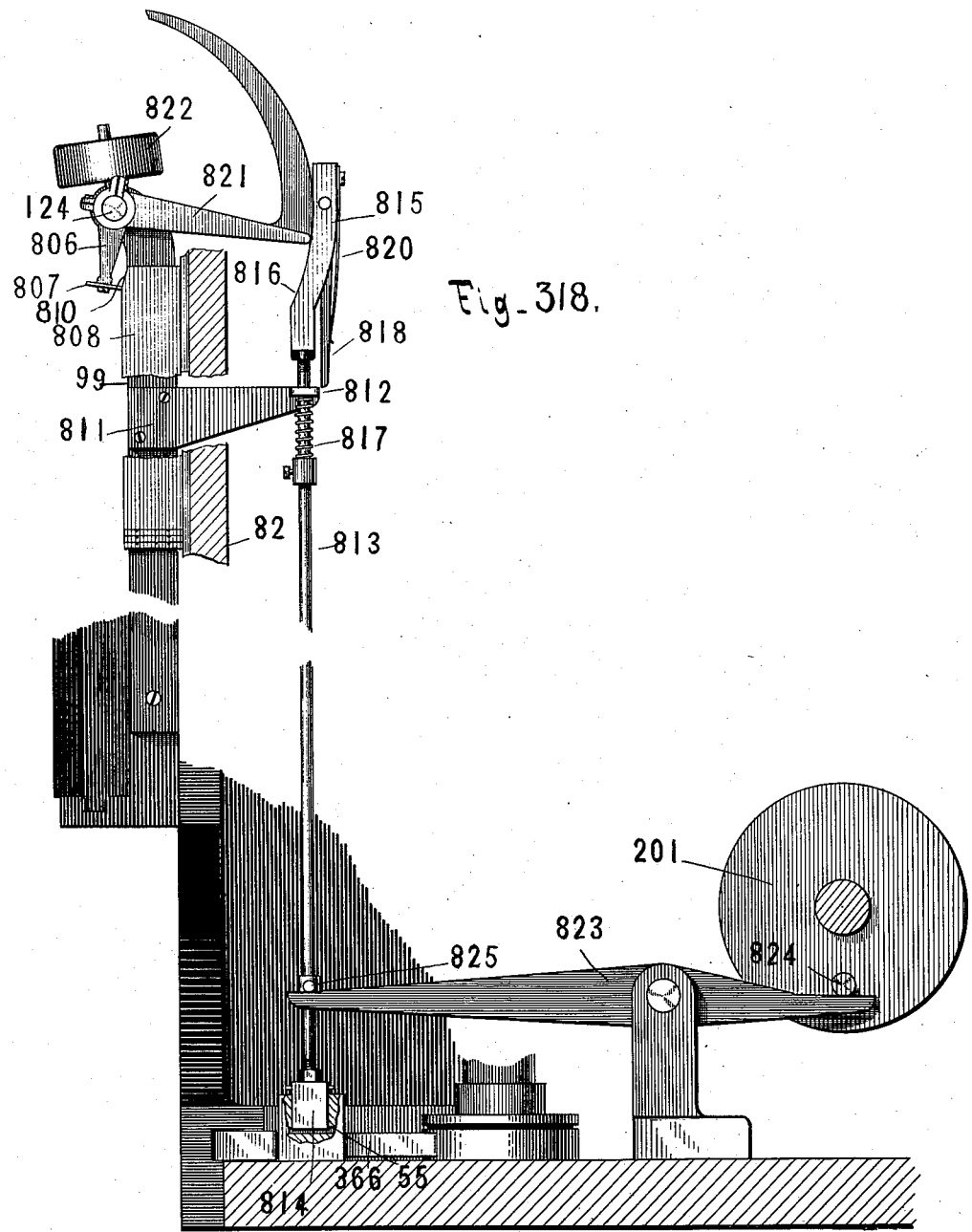

(No Model.)
J. W. PAIGE.
MACHINE FOR DISTRIBUTING, SETTING, AND JUSTIFYING TYPE.
No. 547,860. Patented Oct. 15, 1895.
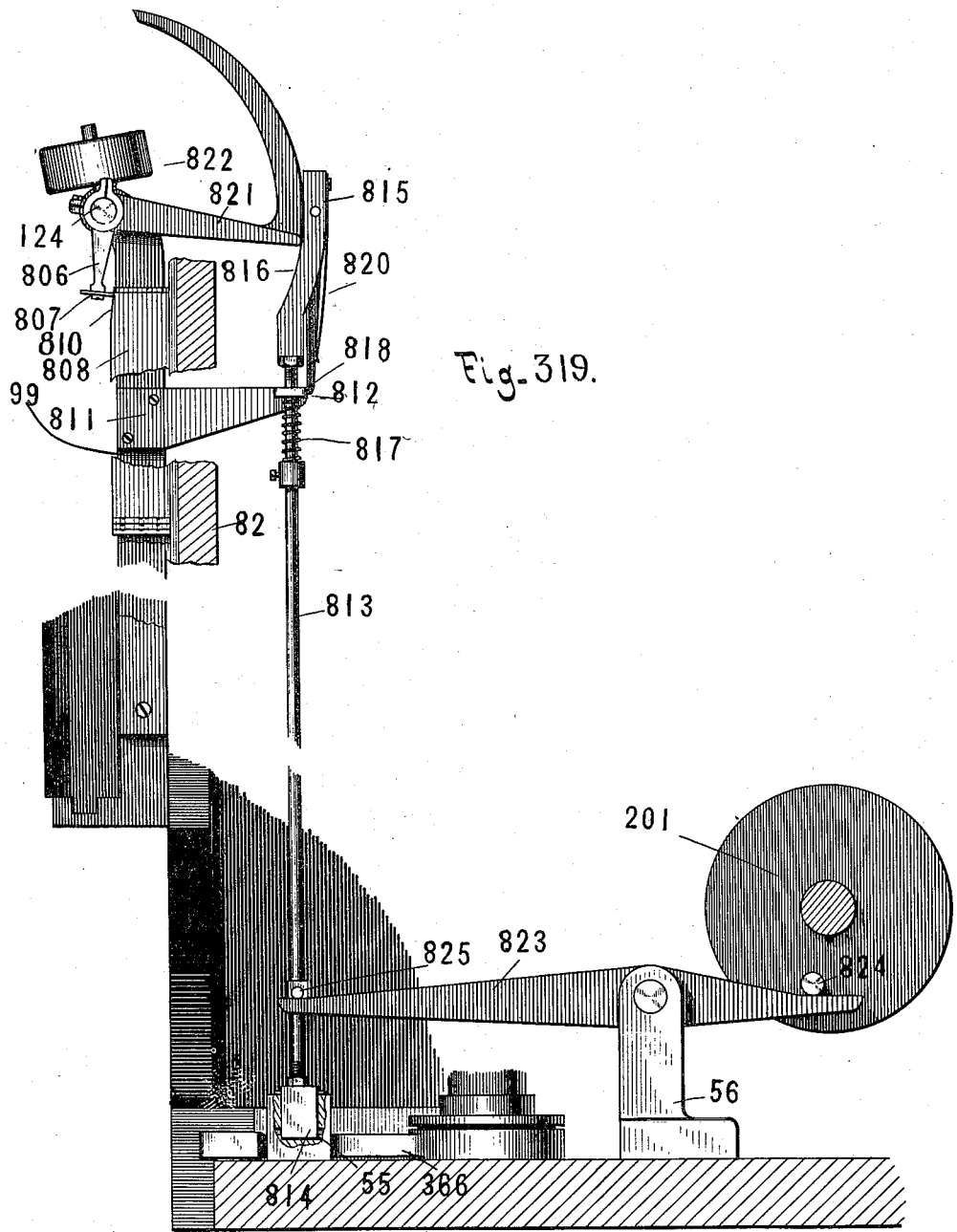

(No Model.) 163 Sheets—Sheet 108.
J. W. PAIGE.
MACHINE FOR DISTRIBUTING, SETTING, AND JUSTIFYING TYPE.
No. 547,860. Patented Oct. 15, 1895.
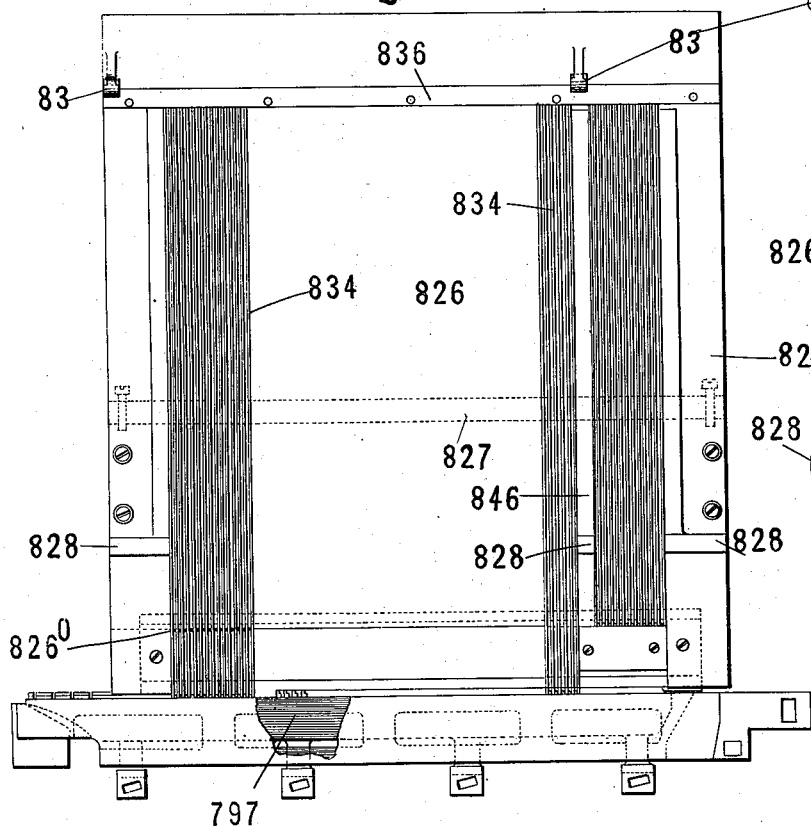
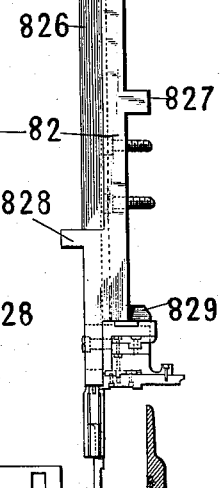
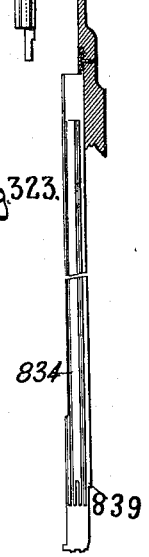
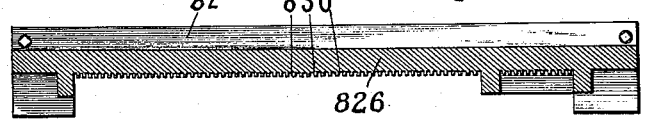
WITNESSES:
Frank H. Pierpont
Charles E. Davis.
INVENTOR
J. W. Paige
BY H. W. Beadle & Co.
ATTORNEYS (No Model.) 163 Sheets—Sheet 109.
J. W. PAIGE.
MACHINE FOR DISTRIBUTING, SETTING, AND JUSTIFYING TYPE.
No. 547,860. Patented Oct. 15, 1895.
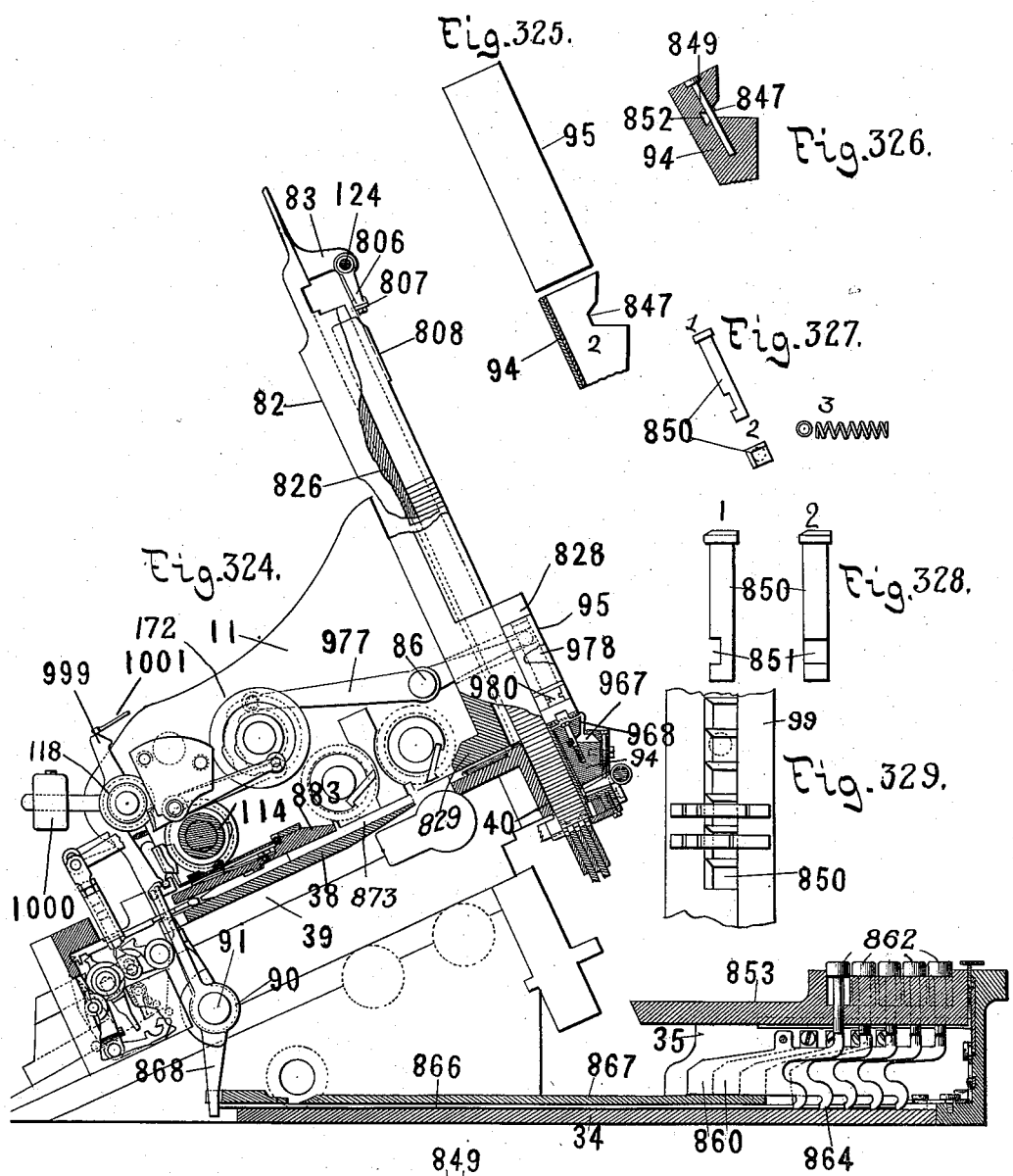
WITNESSES:
Frank H. Pierpont
Charles E. Davis.
INVENTOR
J. W. Paige
BY H. W. Beadle + Co.
ATTORNEYS

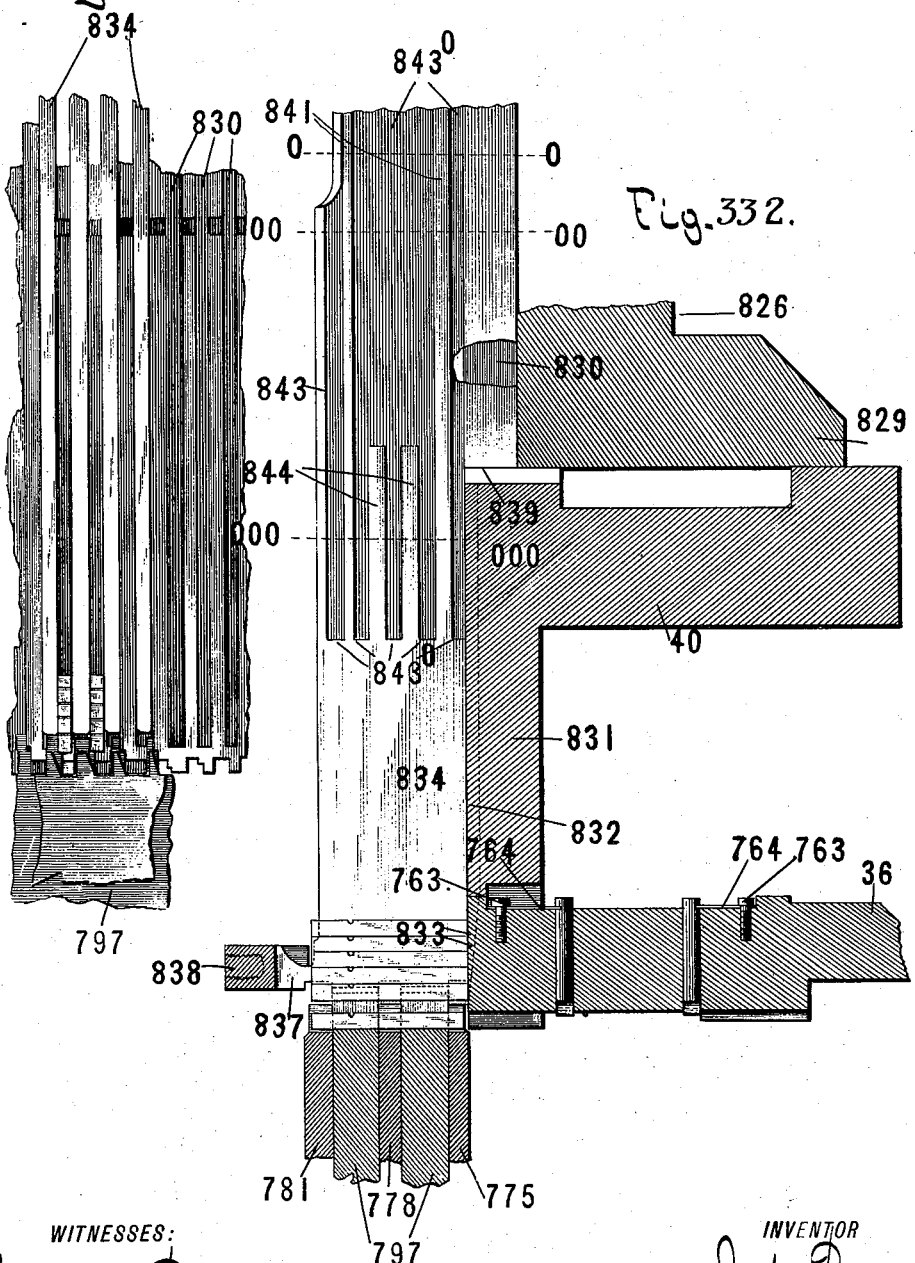

(No Model.) 163 Sheets—Sheet 111.
J. W. PAIGE.
MACHINE FOR DISTRIBUTING, SETTING, AND JUSTIFYING TYPE.
No. 547,860. Patented Oct. 15, 1895.
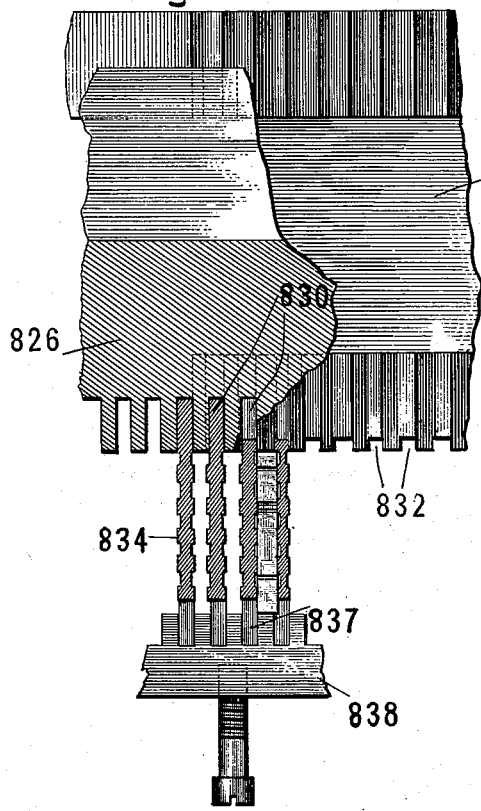
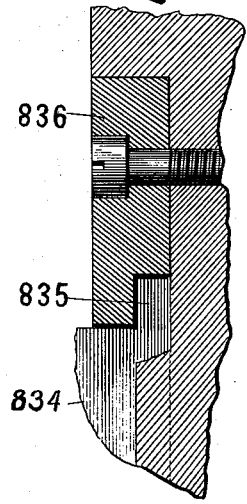
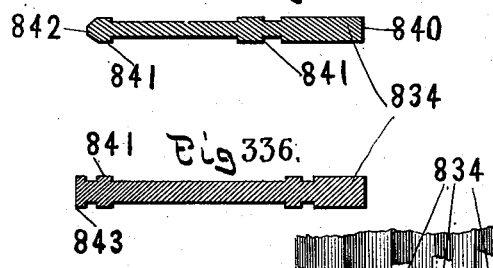
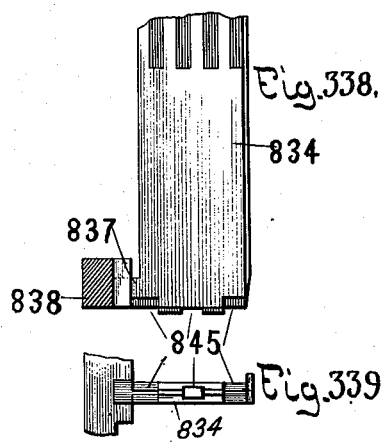
WITNESSES:
INVENTOR
ATTORNEYS (No Model.) 163 Sheets—Sheet 112.
J. W. PAIGE.
MACHINE FOR DISTRIBUTING, SETTING, AND JUSTIFYING TYPE.
No. 547,860. Patented Oct. 15, 1895.

Witnesses
Frank H. Pierpont
Charles E. Davis.

Inventor
J. W. Paige
By Attorneys
H. W. Beadle + Co.

(No Model.) 163 Sheets—Sheet 113.
J. W. PAIGE.
MACHINE FOR DISTRIBUTING, SETTING, AND JUSTIFYING TYPE.
No. 547,860. Patented Oct. 15, 1895.
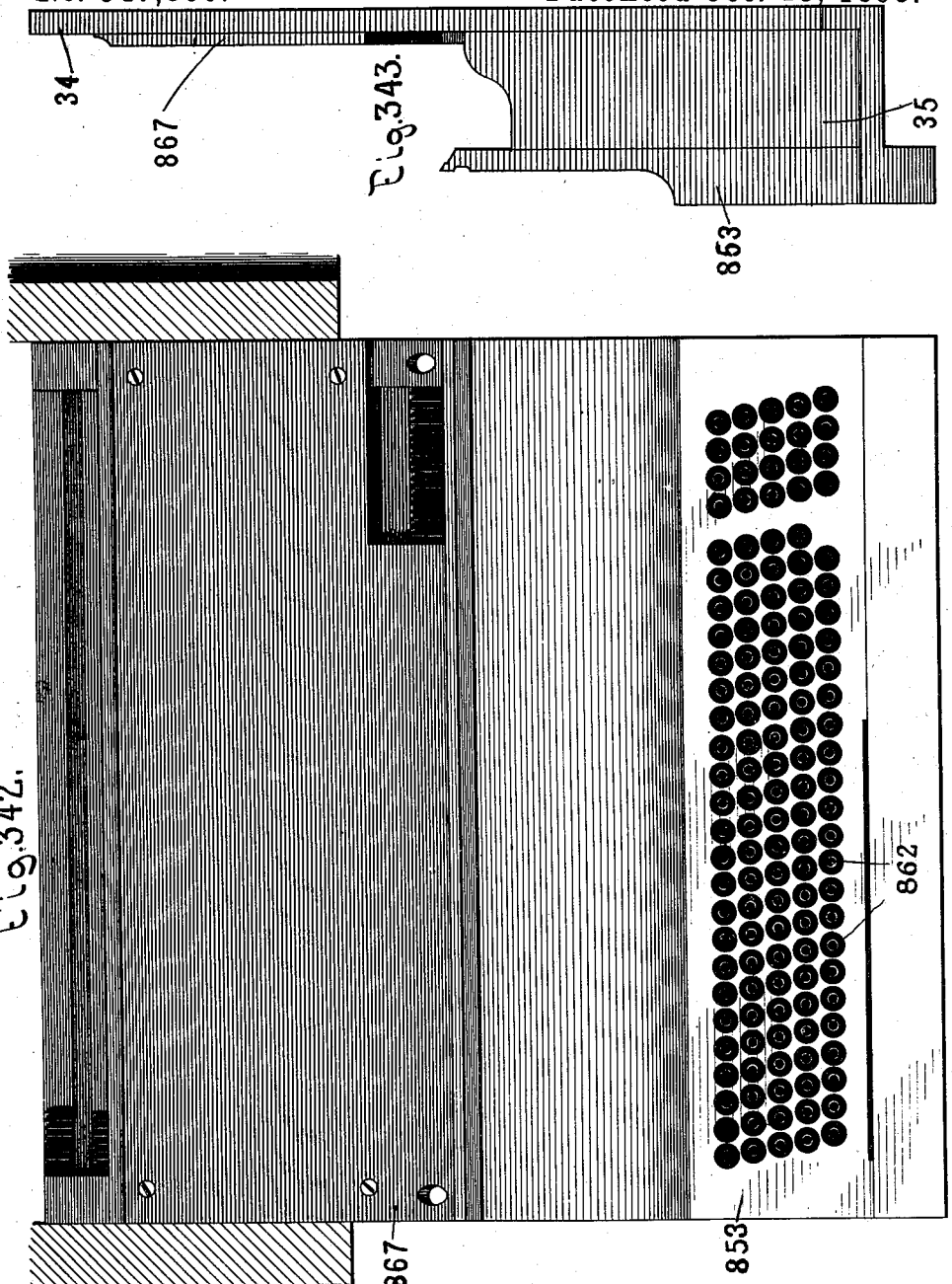

(No Model.)

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadle & Co.

(No Model.)  163 Sheets—Sheet 115.
J. W. PAIGE.
MACHINE FOR DISTRIBUTING, SETTING, AND JUSTIFYING TYPE.
No. 547,860. Patented Oct. 15, 1895.
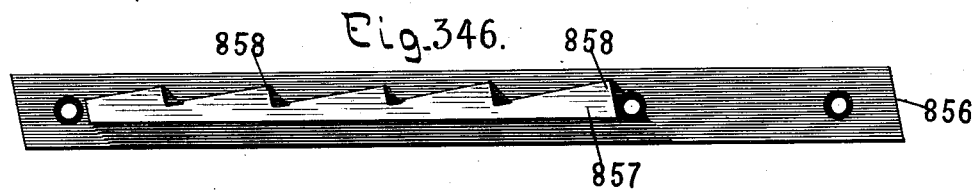
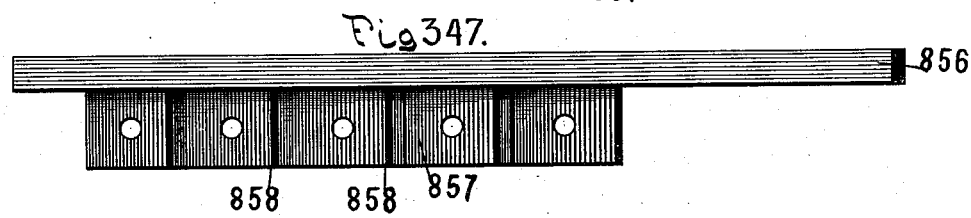
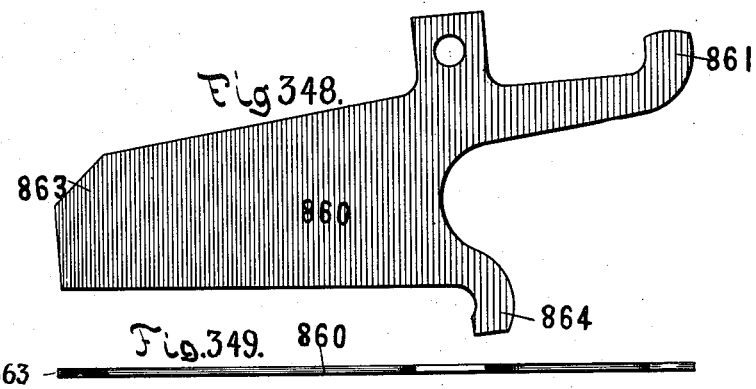
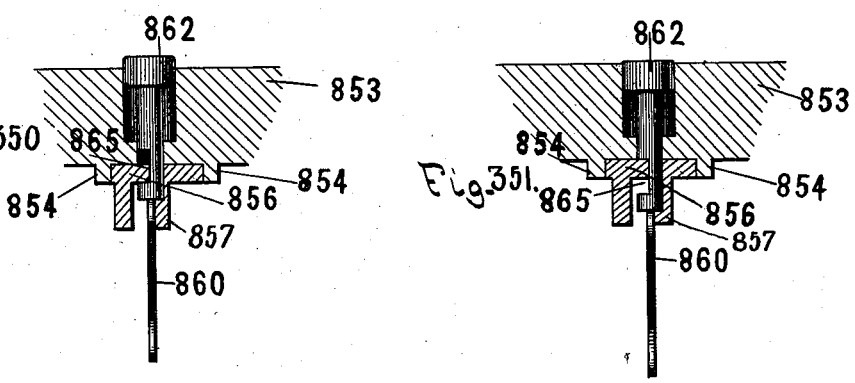
Witnesses
Frank H. Pierpont
Charles E. Davis.
Inventor
J. W. Paige
By Attorneys
H. W. Beadle & Co.

(No Model.) 163 Sheets—Sheet 116.

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadle + Co.

(No Model.) 163 Sheets—Sheet 117.
J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadle & Co.

(No Model.)
J. W. PAIGE.
MACHINE FOR DISTRIBUTING, SETTING, AND JUSTIFYING TYPE.
No. 547,860. Patented Oct. 15, 1895.
163 Sheets—Sheet 118.
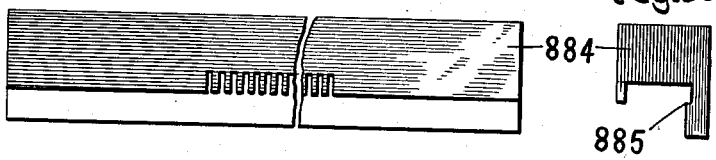
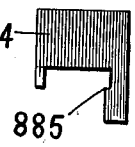
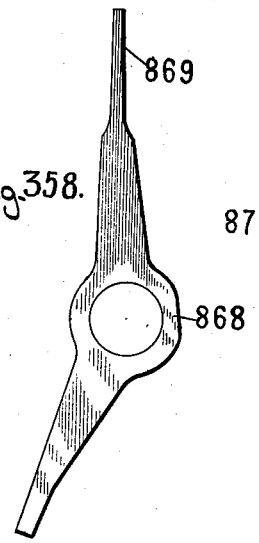
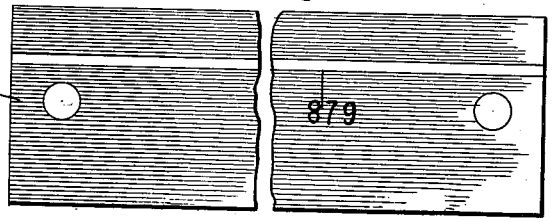
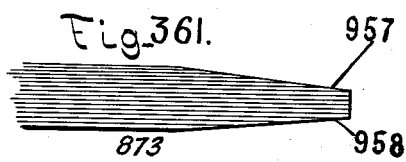
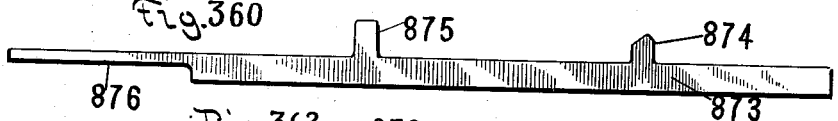
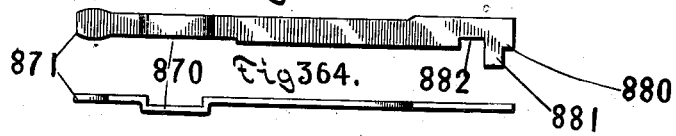
Witnesses
Frank H. Pierpont
Charles E. Davis.
Inventor
J. W. Paige
By Attorneys
H. W. Beadle & Co.

(No Model.) 163 Sheets—Sheet 119.
J. W. PAIGE.
MACHINE FOR DISTRIBUTING, SETTING, AND JUSTIFYING TYPE.
No. 547,860. Patented Oct. 15, 1895.
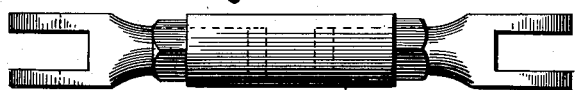
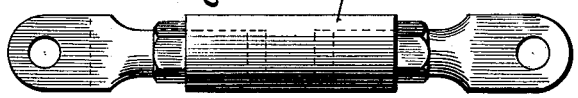
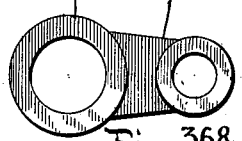
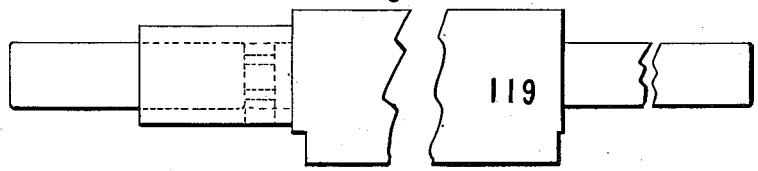
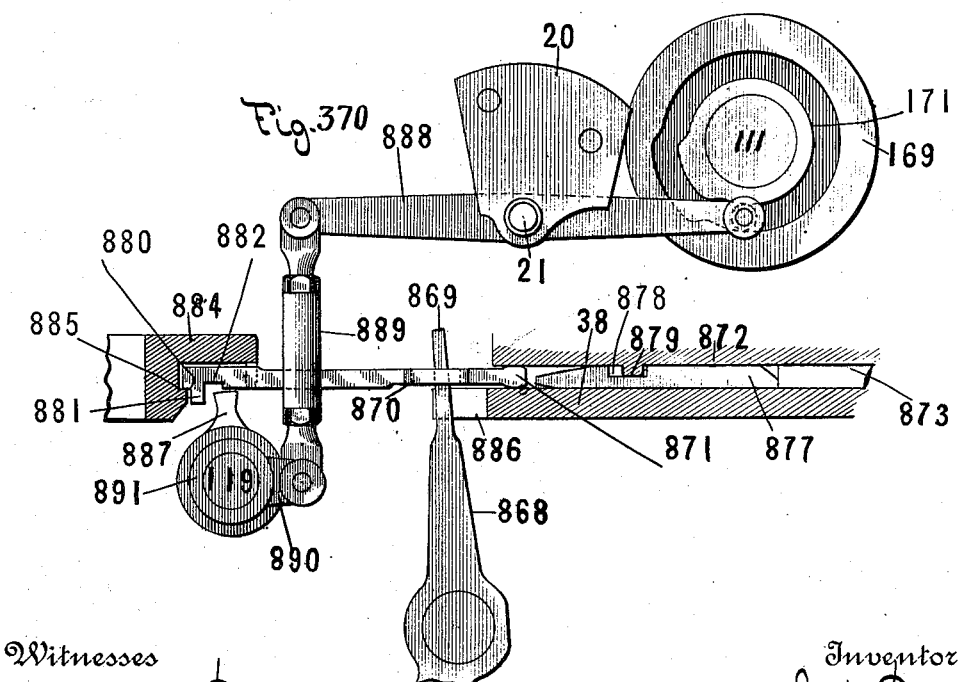
Witnesses
Frank H. Pierpont
Charles E. Davis.
Inventor
J. W. Paige
By Attorneys
H. W. Beadle & Co.

(No Model.)
J. W. PAIGE.
MACHINE FOR DISTRIBUTING, SETTING, AND JUSTIFYING TYPE.
No. 547,860. Patented Oct. 15, 1895.
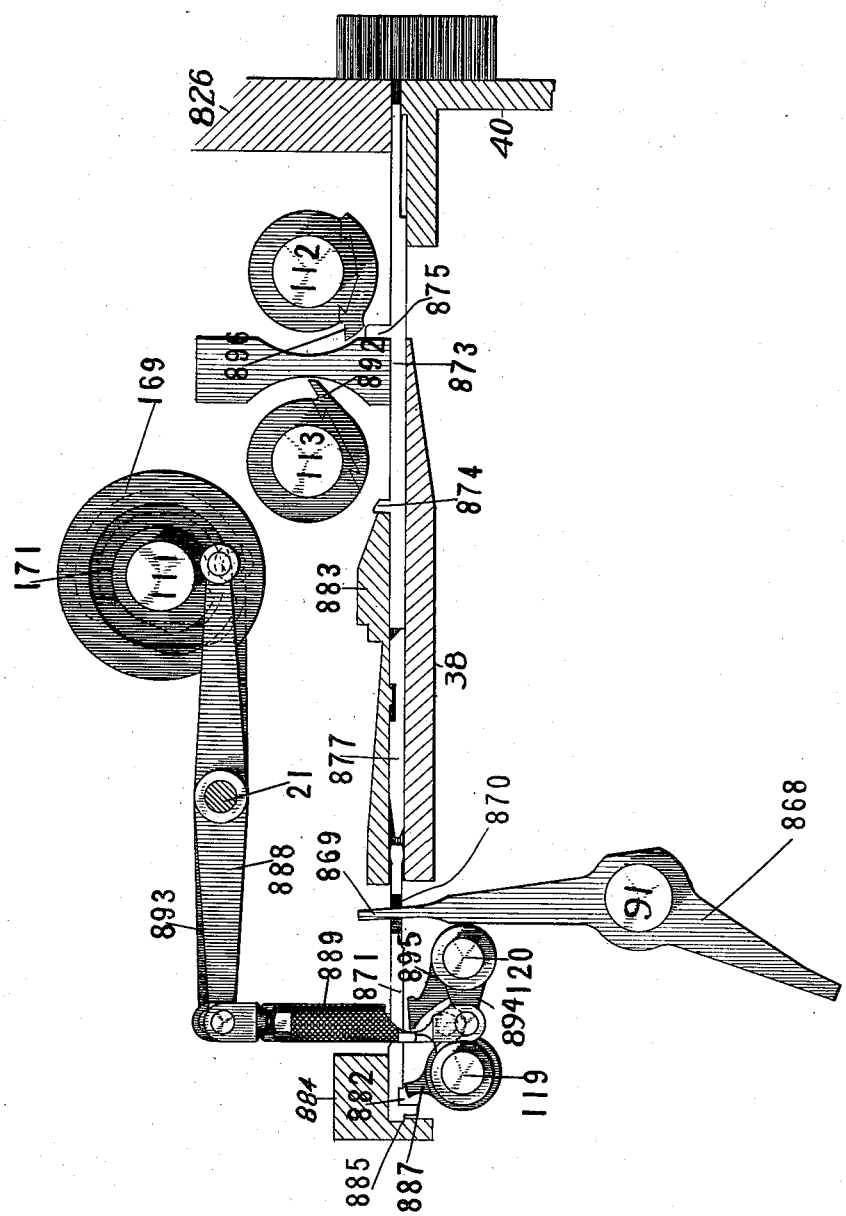

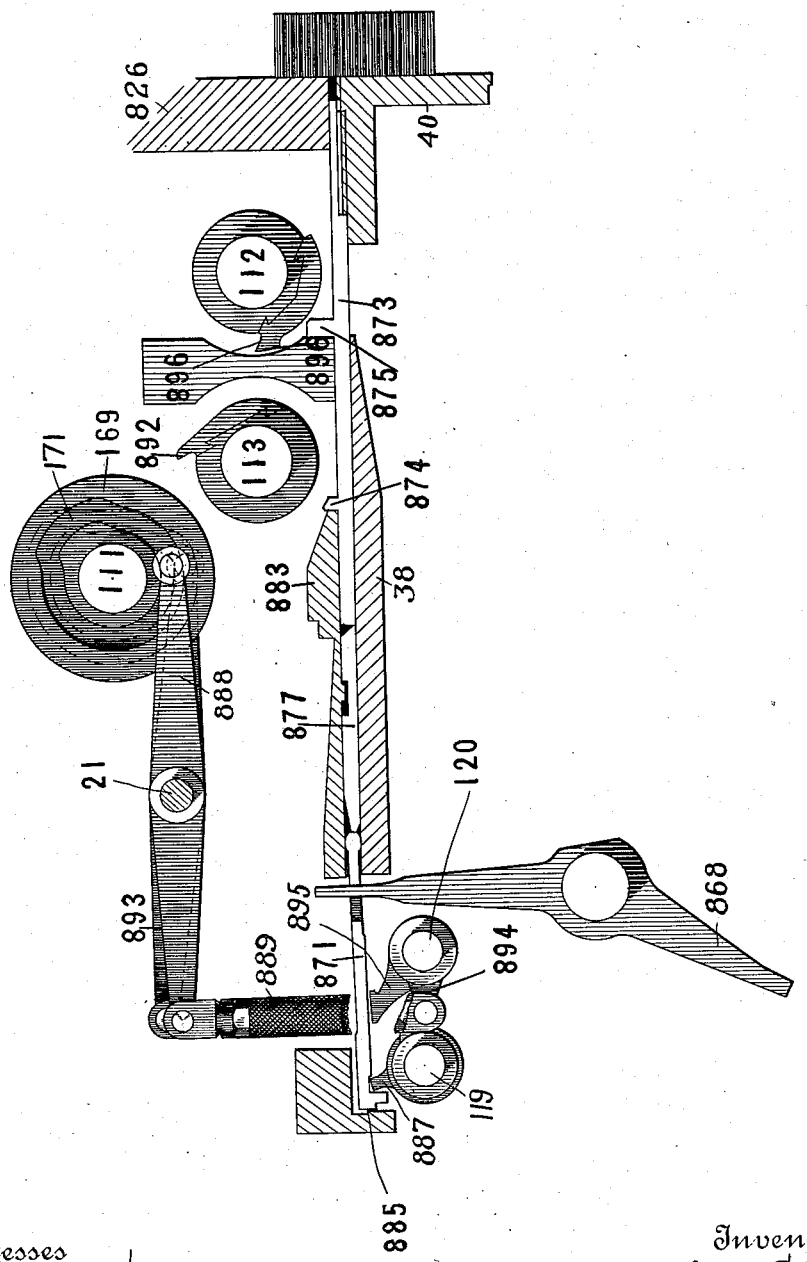

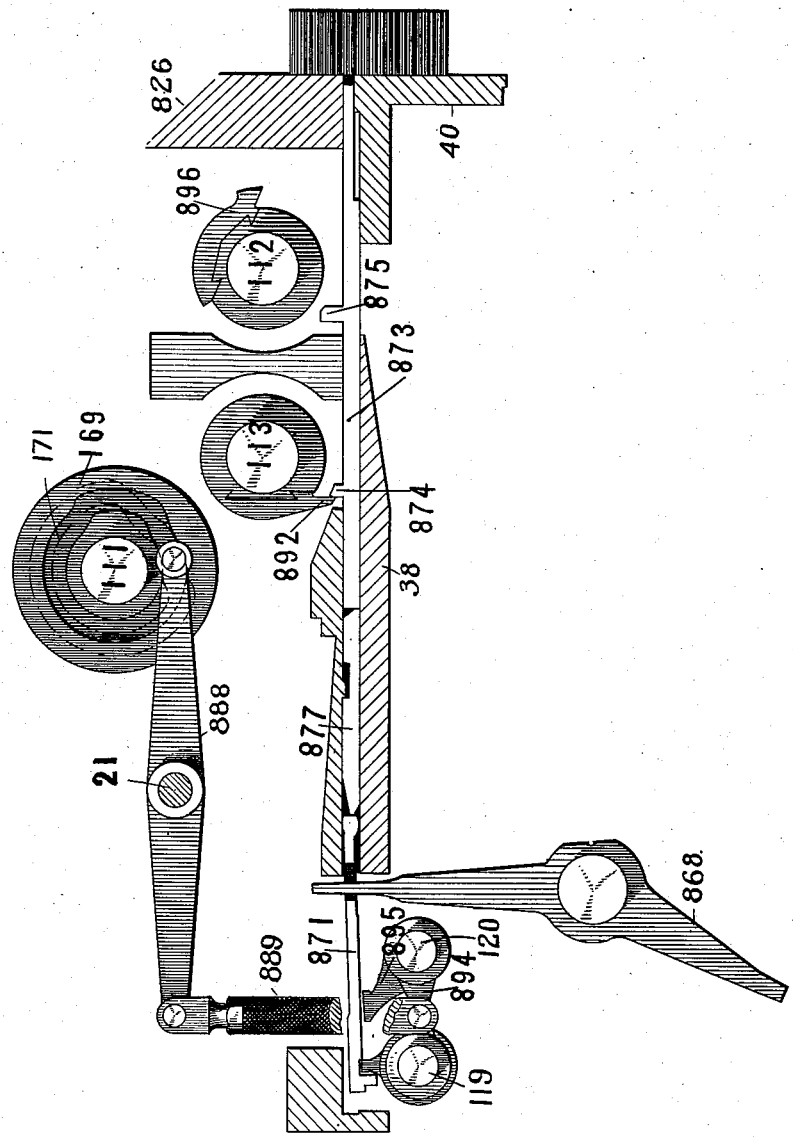

(No Model.) 163 Sheets—Sheet 123.
J. W. PAIGE.
MACHINE FOR DISTRIBUTING, SETTING, AND JUSTIFYING TYPE.
No. 547,860. Patented Oct. 15, 1895.
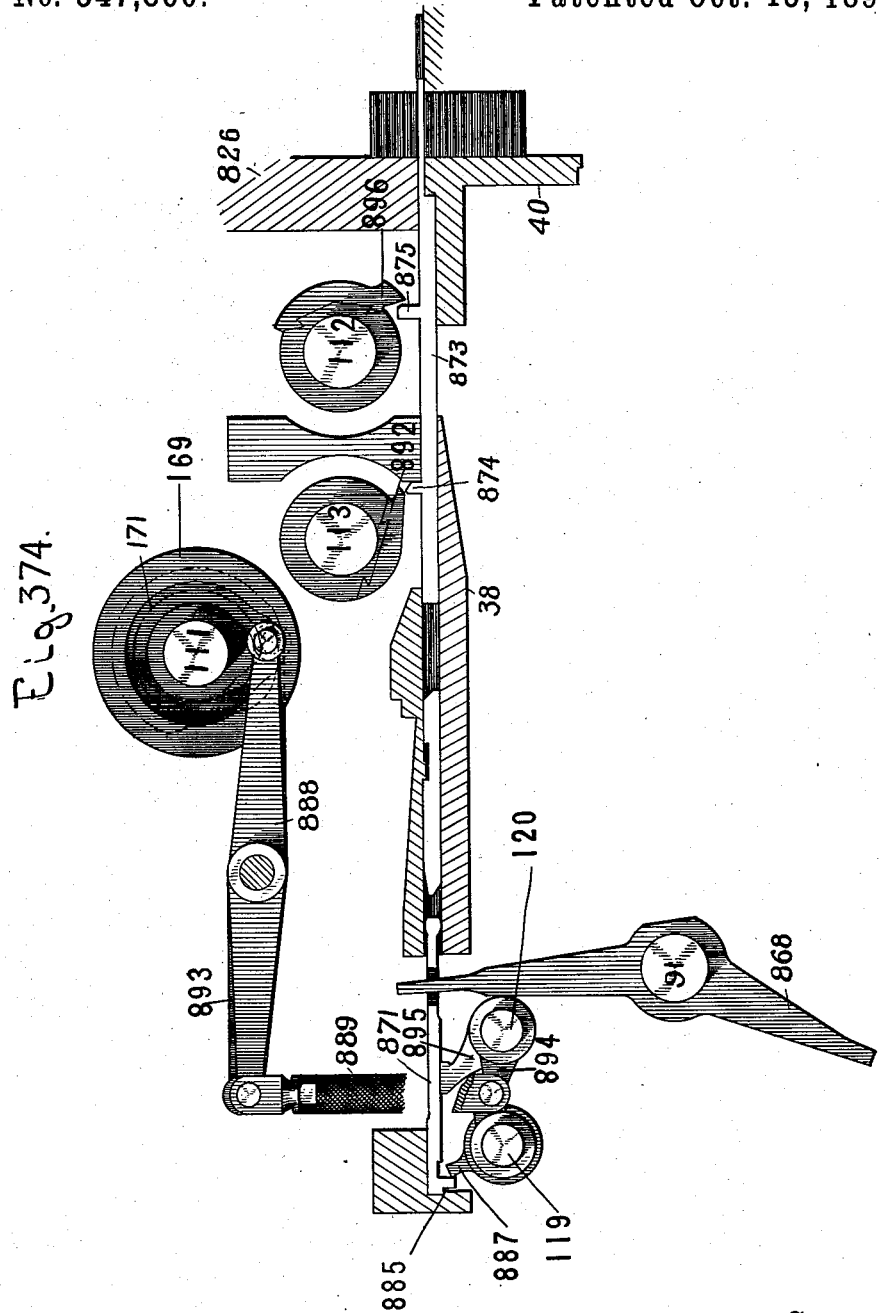

(No Model.) 163 Sheets—Sheet 124.
J. W. PAIGE.
MACHINE FOR DISTRIBUTING, SETTING, AND JUSTIFYING TYPE.
No. 547,860. Patented Oct. 15, 1895.

Witnesses
Frank H. Pierpont
Charles E. Davis.

Inventor
J. W. Paige
By Attorneys
H. W. Beadle & Co.

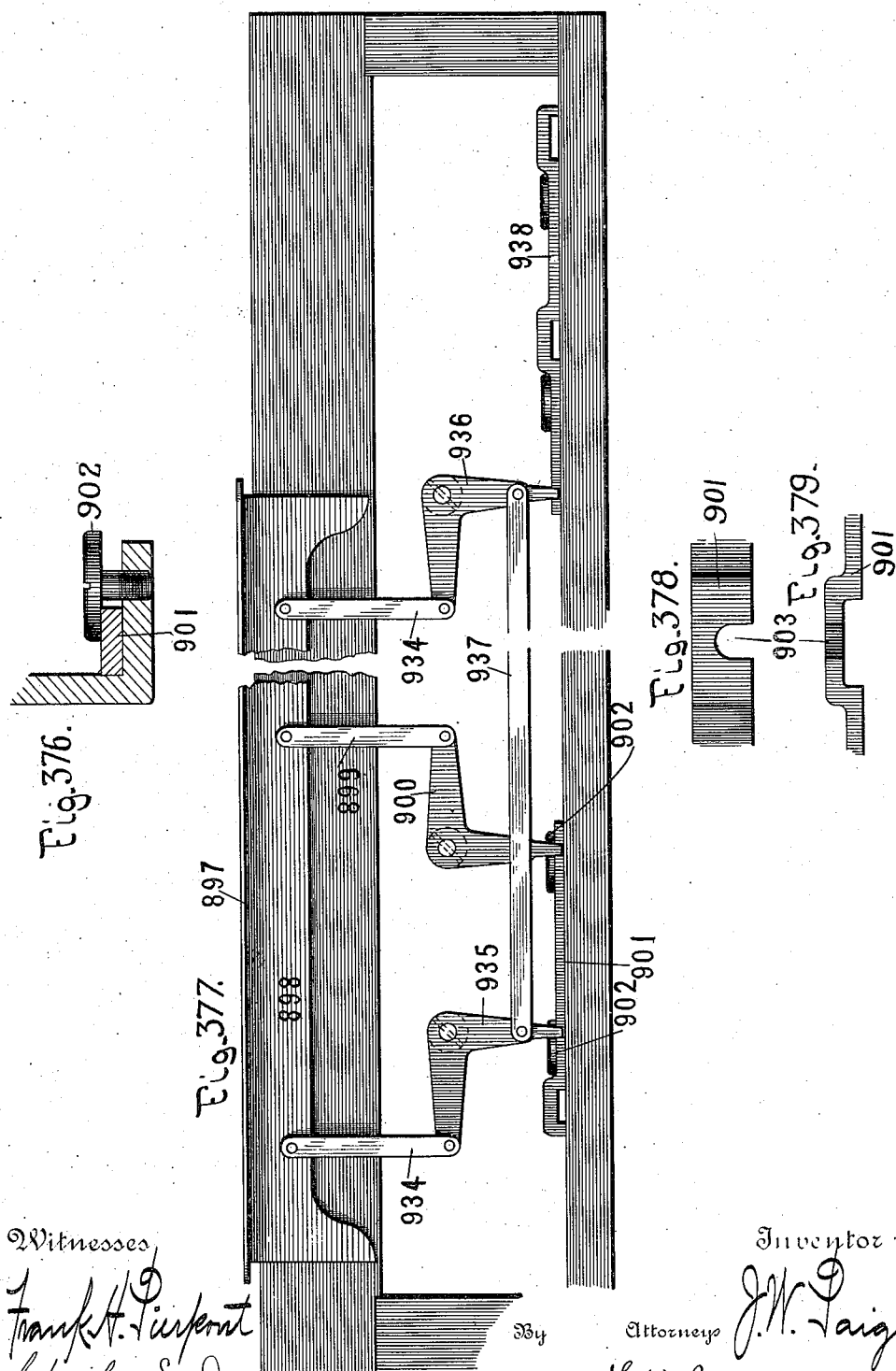

(No Model.)

J. W. PAIGE.

MACHINE FOR DISTRIBUTING, SETTING, AND JUSTIFYING TYPE.

No. 547,860. Patented Oct. 15, 1895.

(No Model.) 163 Sheets—Sheet 127.
J. W. PAIGE.
MACHINE FOR DISTRIBUTING, SETTING, AND JUSTIFYING TYPE.
No. 547,860. Patented Oct. 15, 1895.

(No Model.)

J. W. PAIGE.

MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadle &Co.

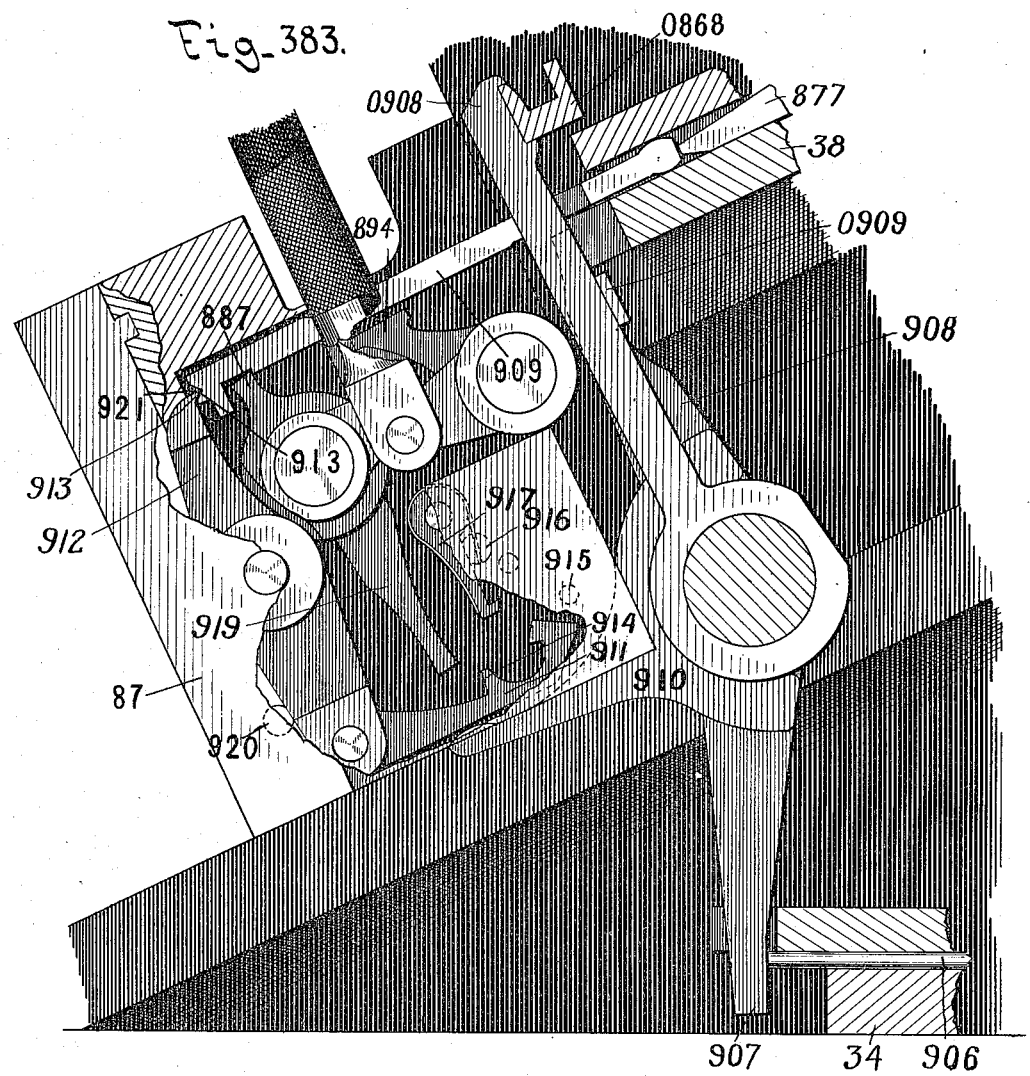

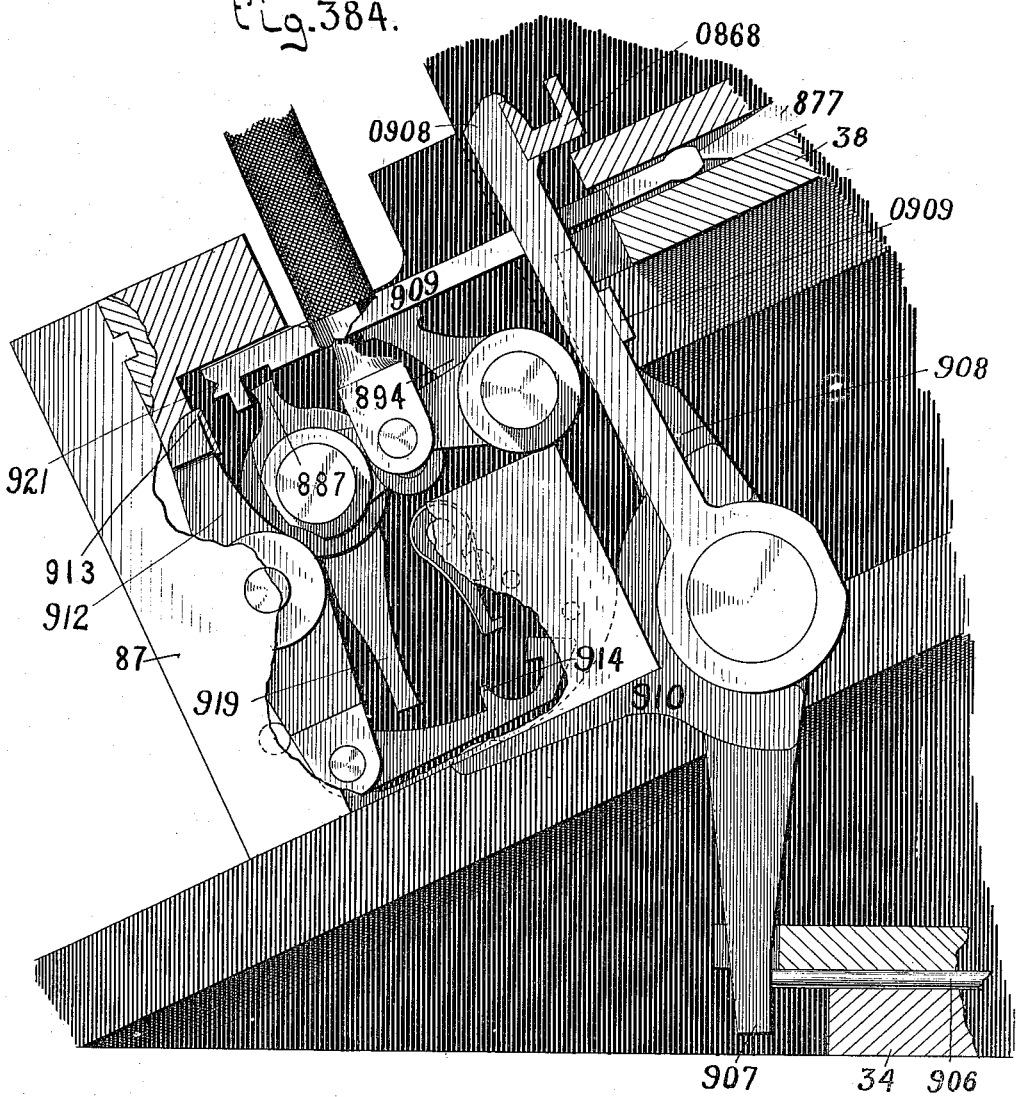

(No Model.)
163 Sheets—Sheet 131.
J. W. PAIGE.
MACHINE FOR DISTRIBUTING, SETTING, AND JUSTIFYING TYPE.
No. 547,860.
Patented Oct. 15, 1895.
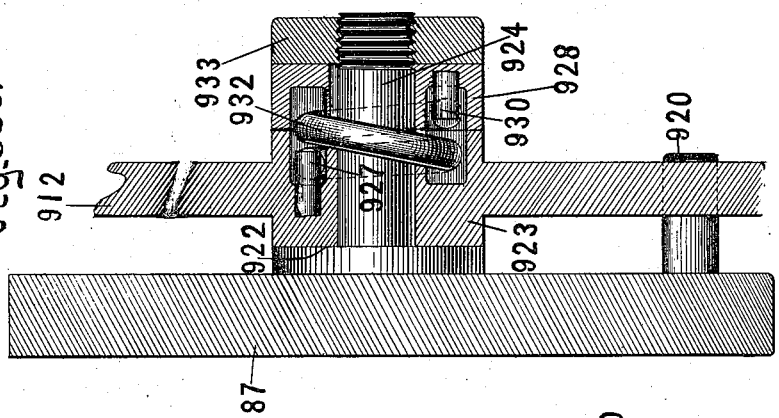
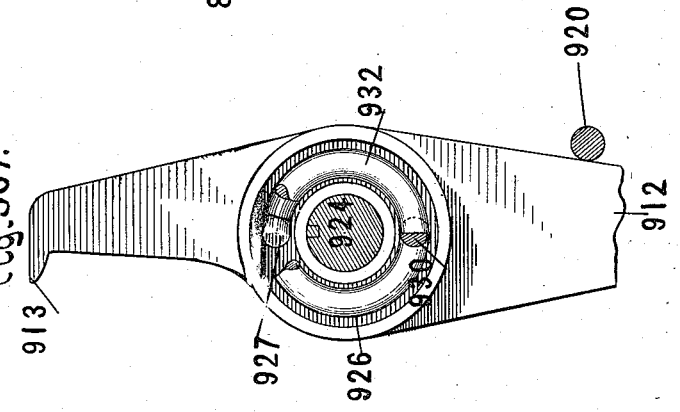
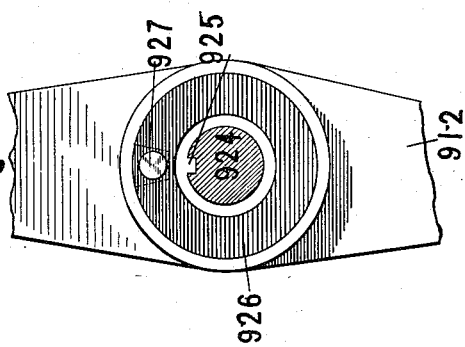
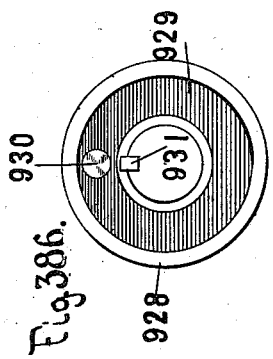
WITNESSES
Frank H. Pierpont
Charles E. Davis.
INVENTOR
J. W. Paige
by Attorneys
H. W. Beadle & Co.

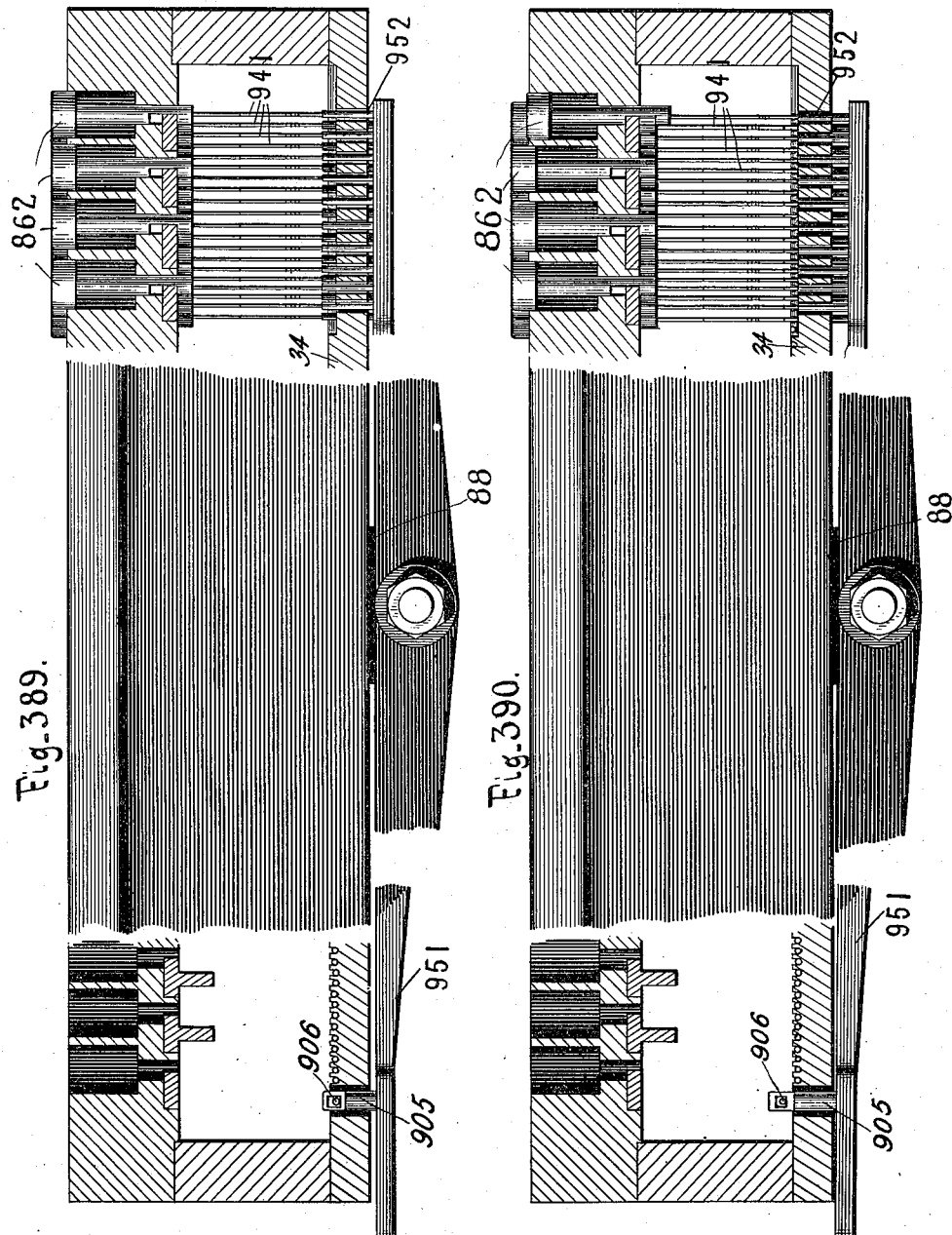

(No Model.) 163 Sheets—Sheet 133.

J. W. PAIGE.
MACHINE FOR DISTRIBUTING, SETTING, AND JUSTIFYING TYPE.

No. 547,860. Patented Oct. 15, 1895.

Witnesses
Frank H. Purport
Charles E. Davis.

Inventor
J. W. Paige
By Attorneys
H. W. Beadle & Co.

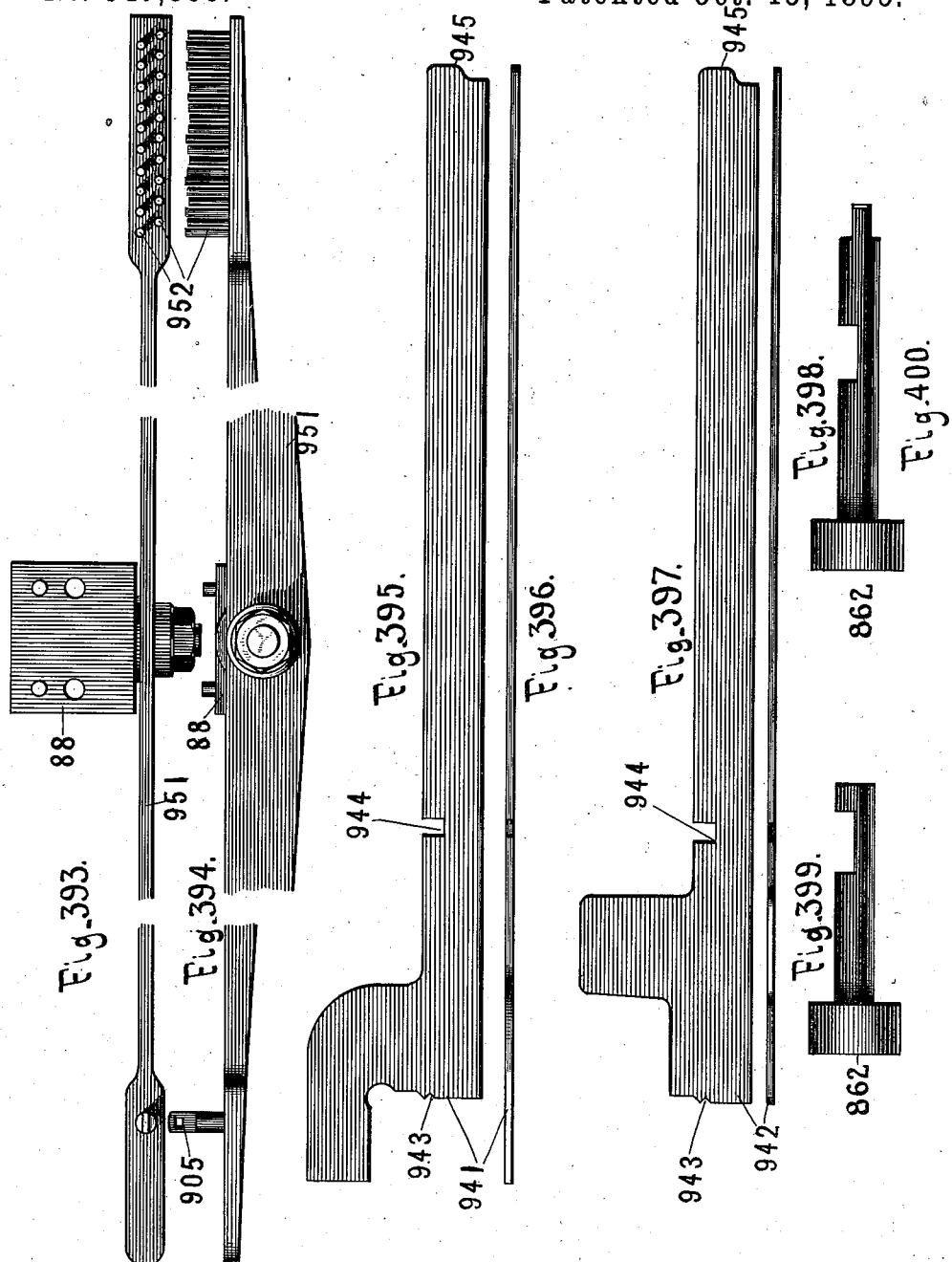

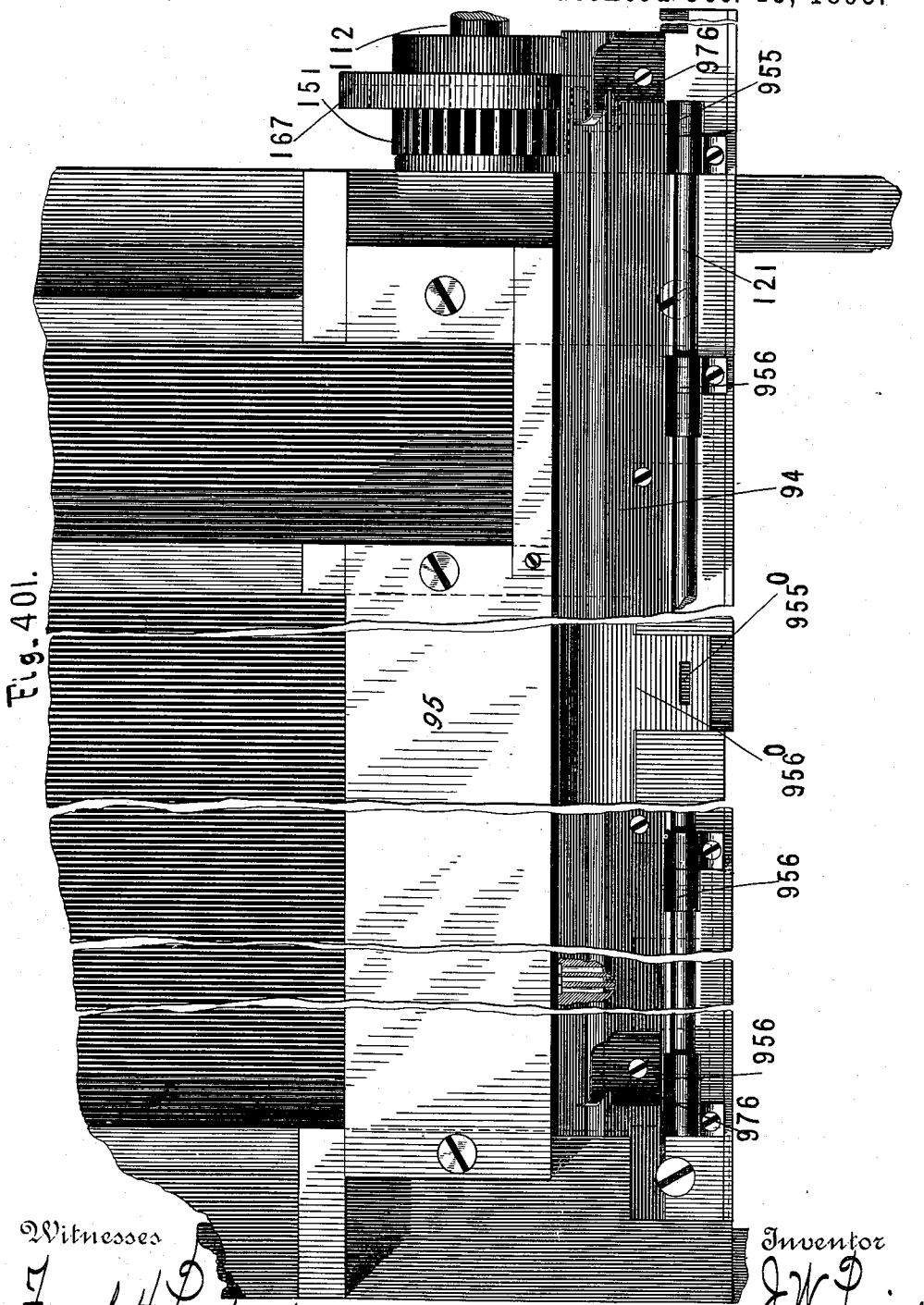

(No Model.) 163 Sheets—Sheet 136.
J. W. PAIGE.
MACHINE FOR DISTRIBUTING, SETTING, AND JUSTIFYING TYPE.
No. 547,860. Patented Oct. 15, 1895.
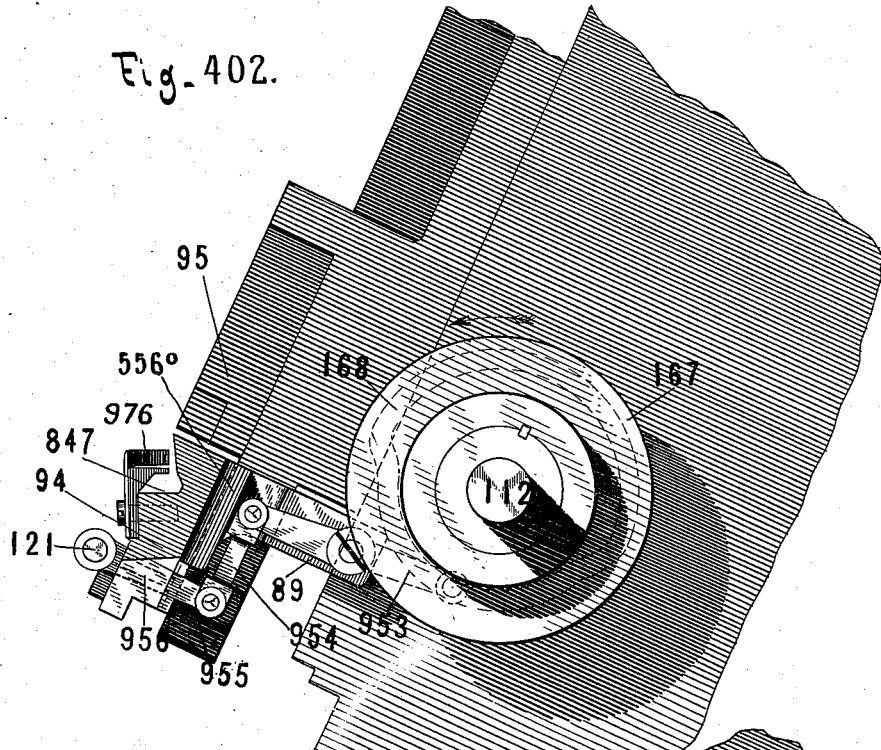
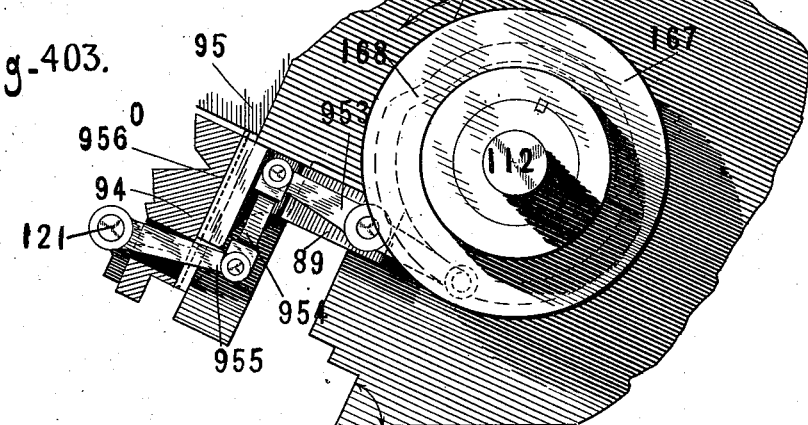
Witnesses
Frank H. Pierpont
Charles E. Davis.
Inventor
J. W. Paige
By Attorneys
H. W. Beadle + Co.

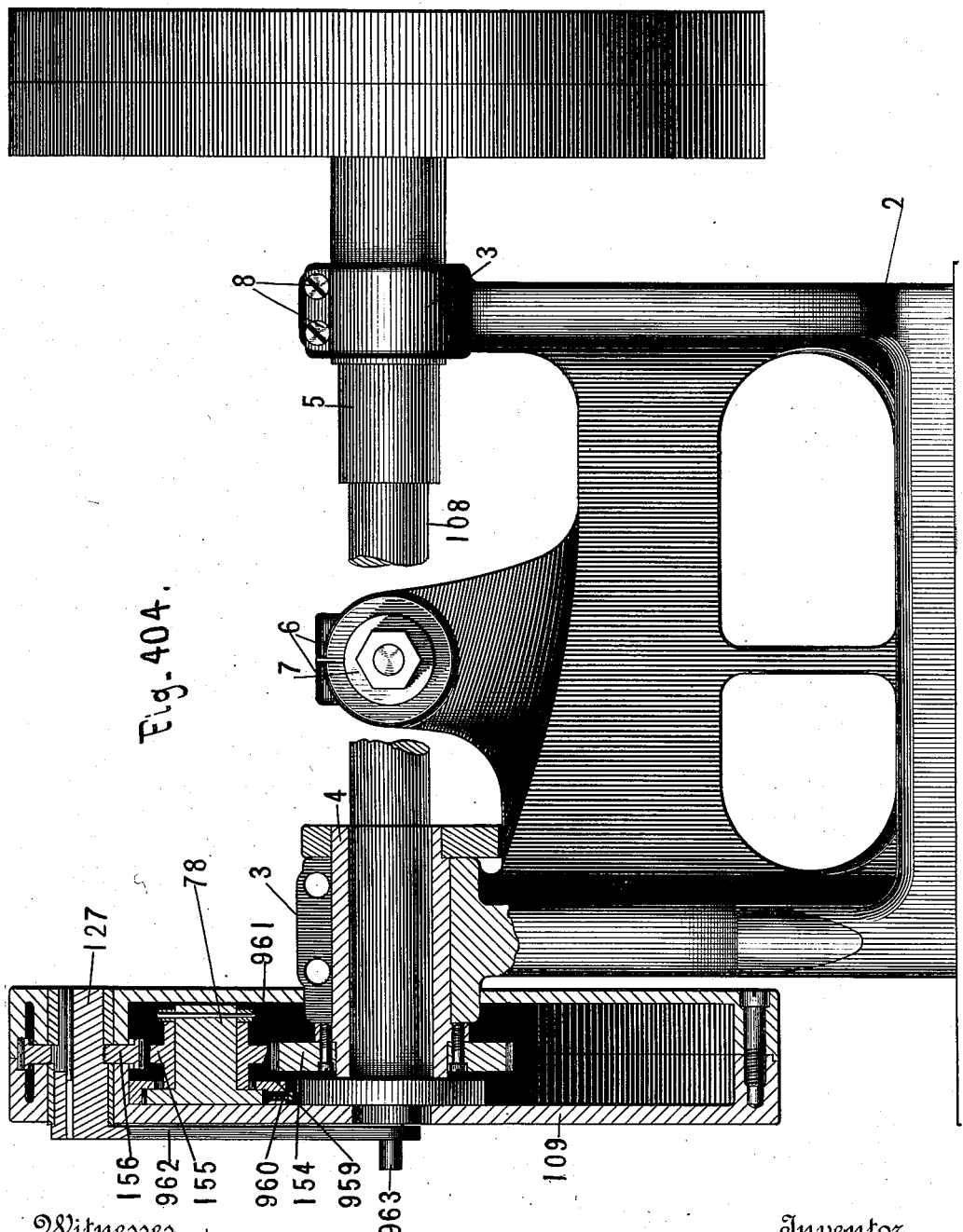

(No Model.)
163 Sheets—Sheet 138.
J. W. PAIGE.
MACHINE FOR DISTRIBUTING, SETTING, AND JUSTIFYING TYPE.
No. 547,860.
Patented Oct. 15, 1895.
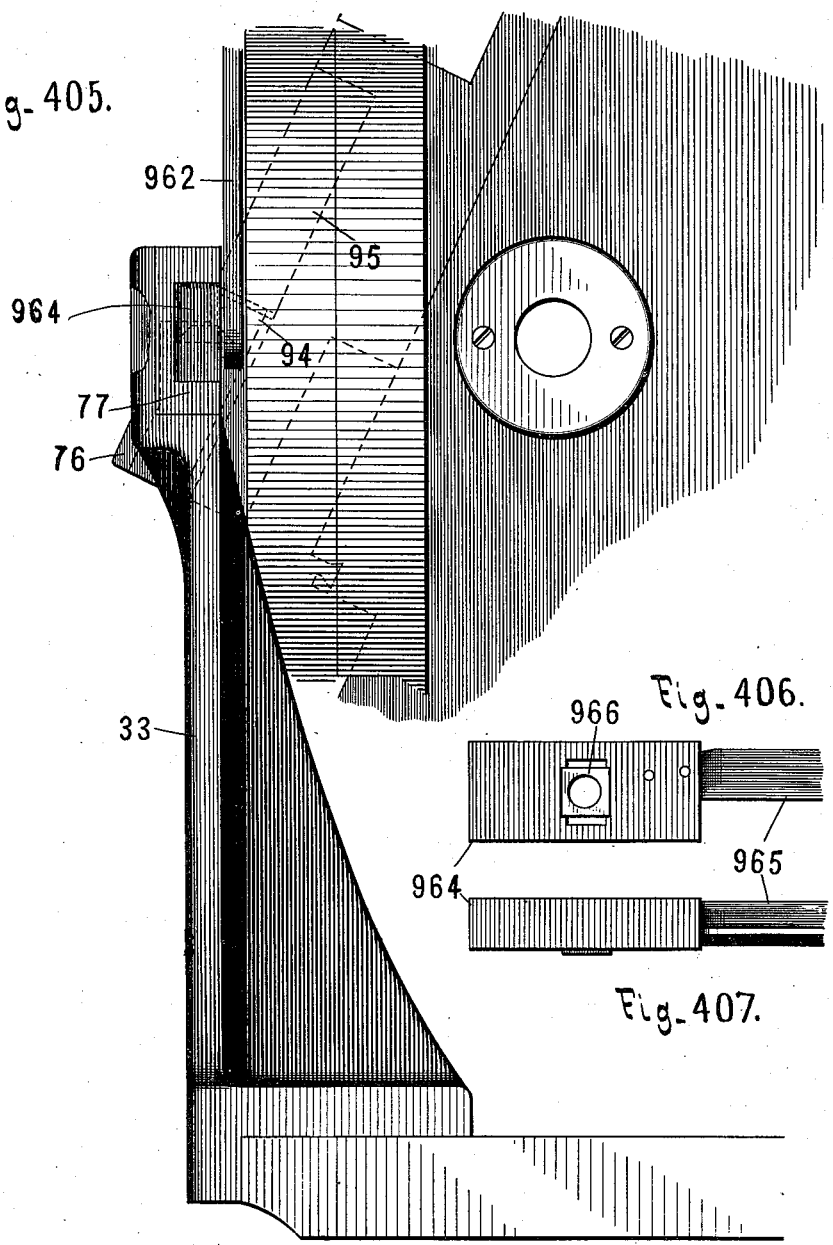
Witnesses
Frank H. Pierpont
Charles E. Davis.
Inventor
J. W. Paige
By Attorneys
Hall Reade + Co.

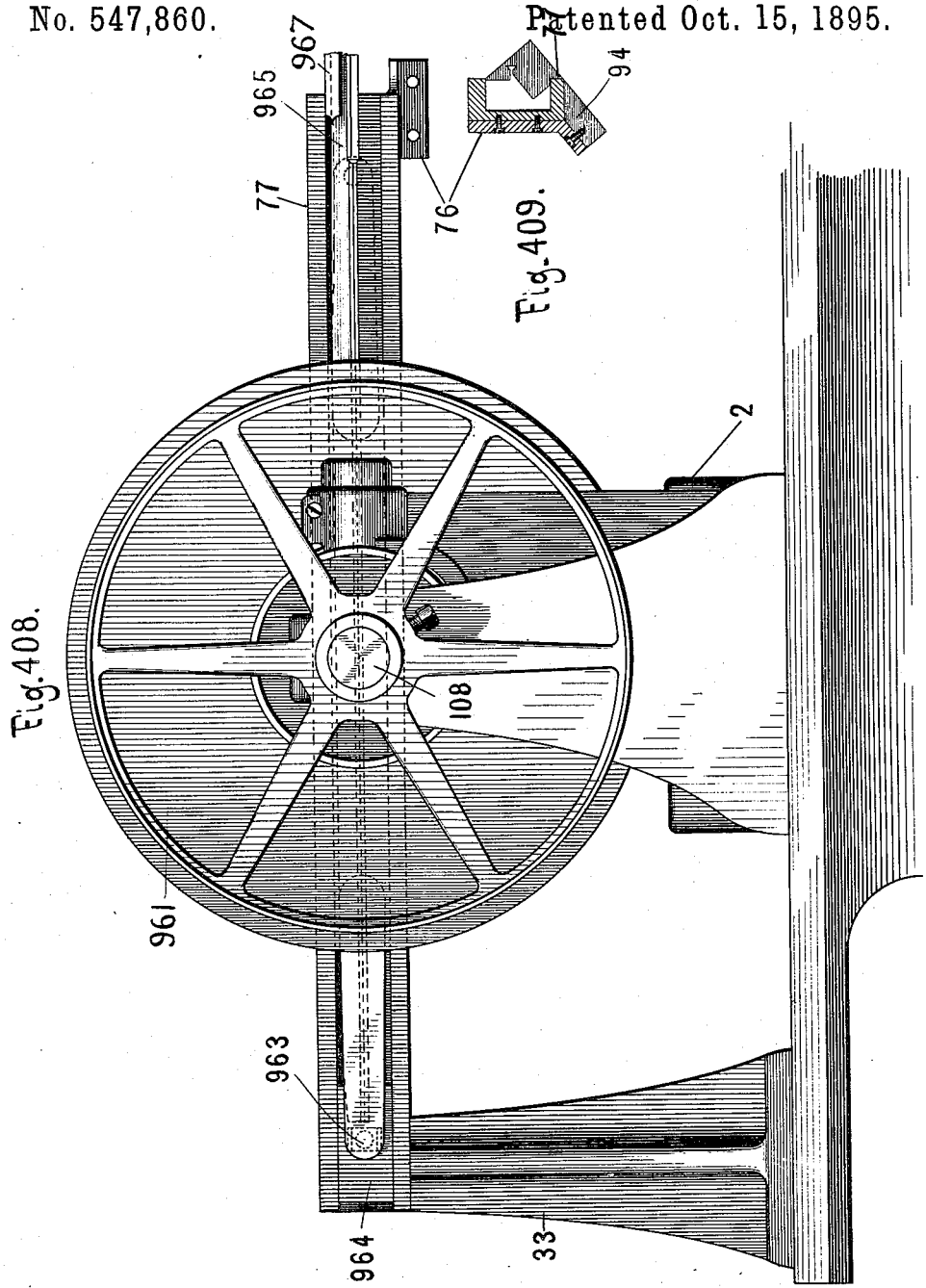

(No Model.)  
163 Sheets—Sheet 140.

J. W. PAIGE.
MACHINE FOR DISTRIBUTING, SETTING, AND JUSTIFYING TYPE.

No. 547,860. Patented Oct. 15, 1895.

(No Model.)

J. W. PAIGE.
MACHINE FOR DISTRIBUTING, SETTING, AND JUSTIFYING TYPE.

No. 547,860.

Patented Oct. 15, 1895.

Witnesses
Frank H. Pierpont
Charles E. Davis

By Attorneys
H. W. Beadle & Co.

Inventor
J. W. Paige

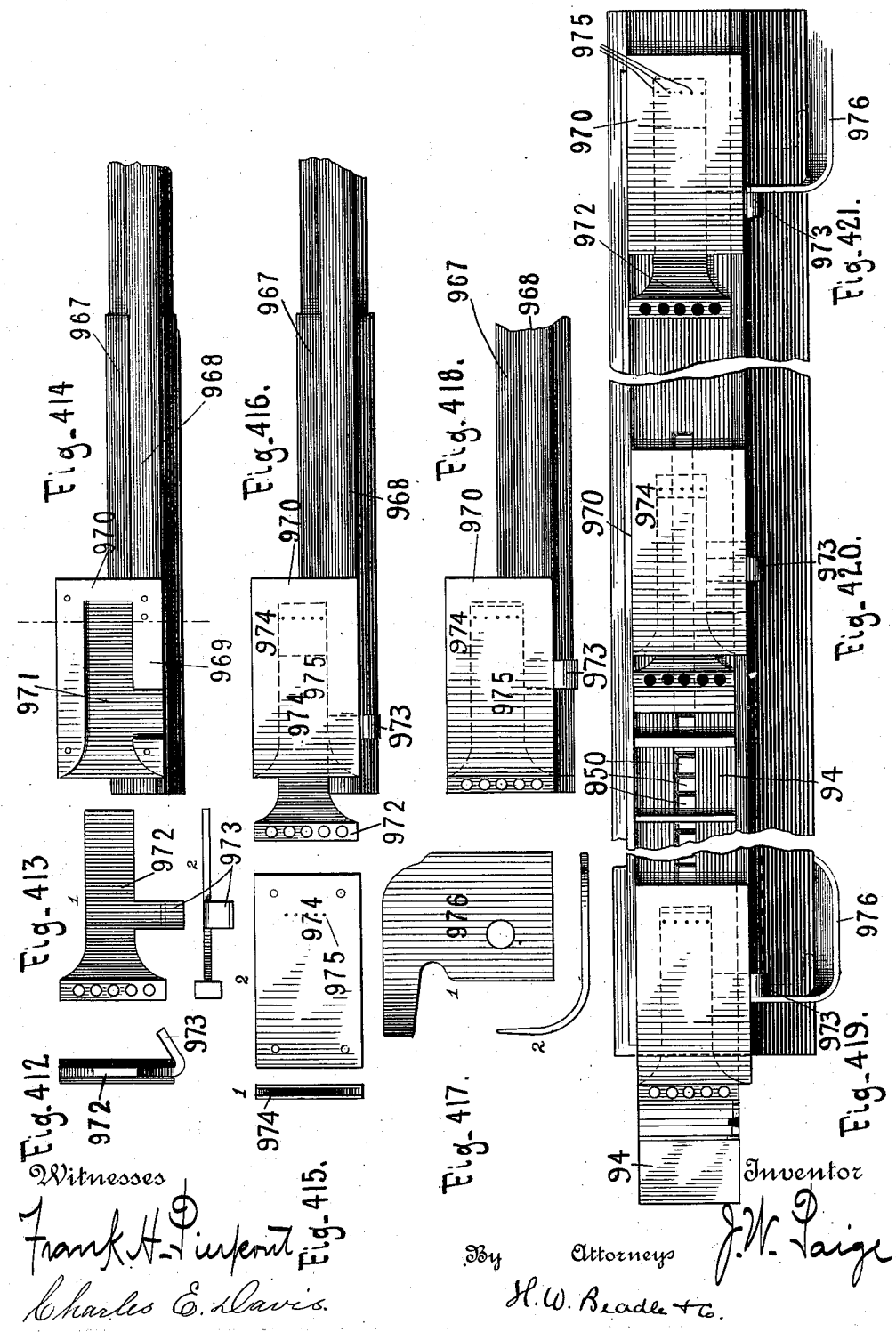

(No Model.)  
163 Sheets—Sheet 143.
J. W. PAIGE.
MACHINE FOR DISTRIBUTING, SETTING, AND JUSTIFYING TYPE.
No. 547,860. Patented Oct. 15, 1895.
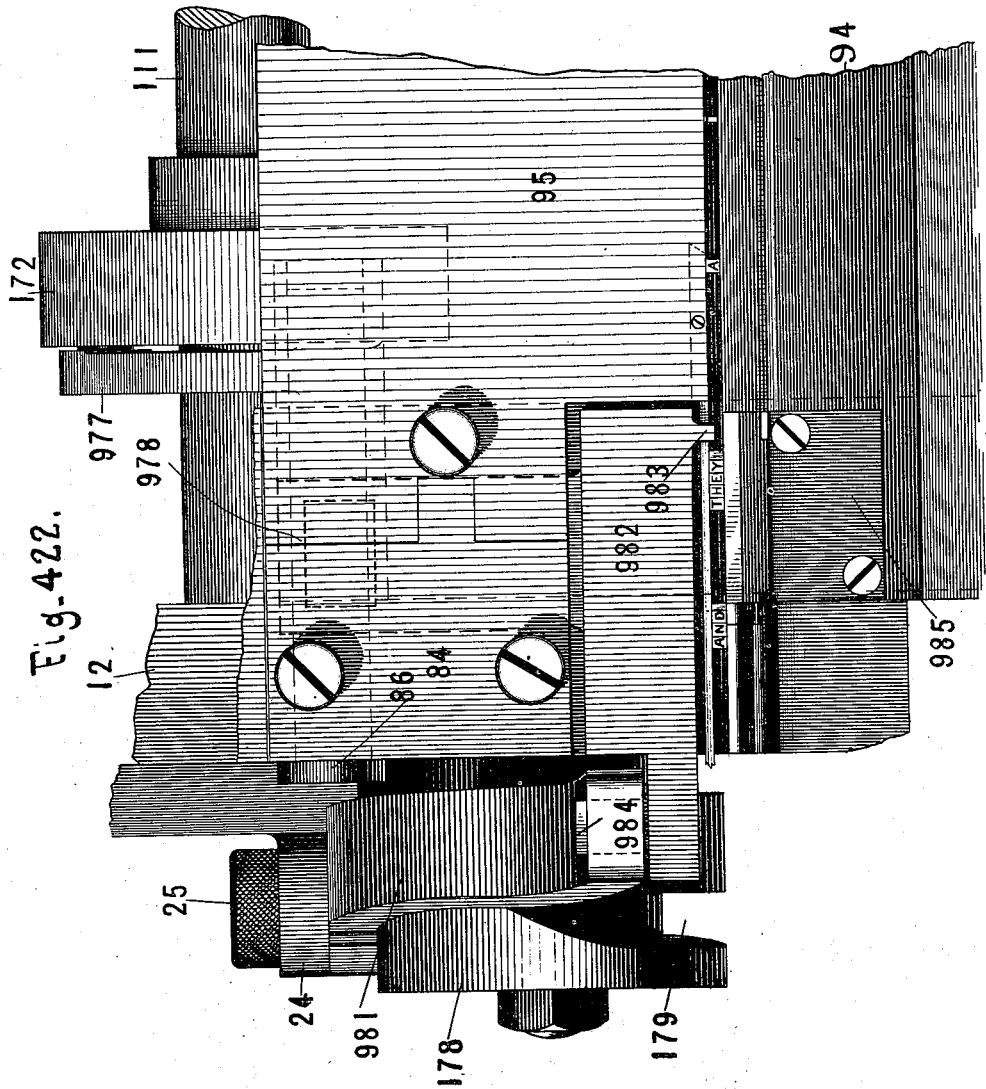
Witnesses  
Frank H. Pierpont  
Charles E. Davis.
Inventor  
J. W. Paige  
By Attorneys  
H. W. Beadle & Co.

(No Model.) 163 Sheets—Sheet 144.
J. W. PAIGE.
MACHINE FOR DISTRIBUTING, SETTING, AND JUSTIFYING TYPE.
No. 547,860. Patented Oct. 15, 1895.

Witnesses
Frank H. Pierpont
Charles E. Davis.

Inventor
J. W. Paige
By Attorneys
H. W. Beadle & Co.

(No Model.) 163 Sheets—Sheet 145.
J. W. PAIGE.
MACHINE FOR DISTRIBUTING, SETTING, AND JUSTIFYING TYPE.
No. 547,860. Patented Oct. 15, 1895.

Witnesses
Frank H. Pierpont
Charles E. Davis.

Inventor
J. W. Paige
By Attorneys
H. W. Beadle & Co.

(No Model.)

J. W. PAIGE.
MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige

By Attorneys
H. W. Beadle & Co.

(No Model.)

163 Sheets—Sheet 149.

J. W. PAIGE.
MACHINE FOR DISTRIBUTING, SETTING, AND JUSTIFYING TYPE.

No. 547,860. Patented Oct. 15, 1895.

(No Model.)

163 Sheets—Sheet 150.

J. W. PAIGE.
MACHINE FOR DISTRIBUTING, SETTING, AND JUSTIFYING TYPE.

No. 547,860.

Patented Oct. 15, 1895.

Witnesses
Frank H. Pinkert
Charles E. Davis.

Inventor
J. W. Paige
By Attorneys
H. W. Beadle + Co.

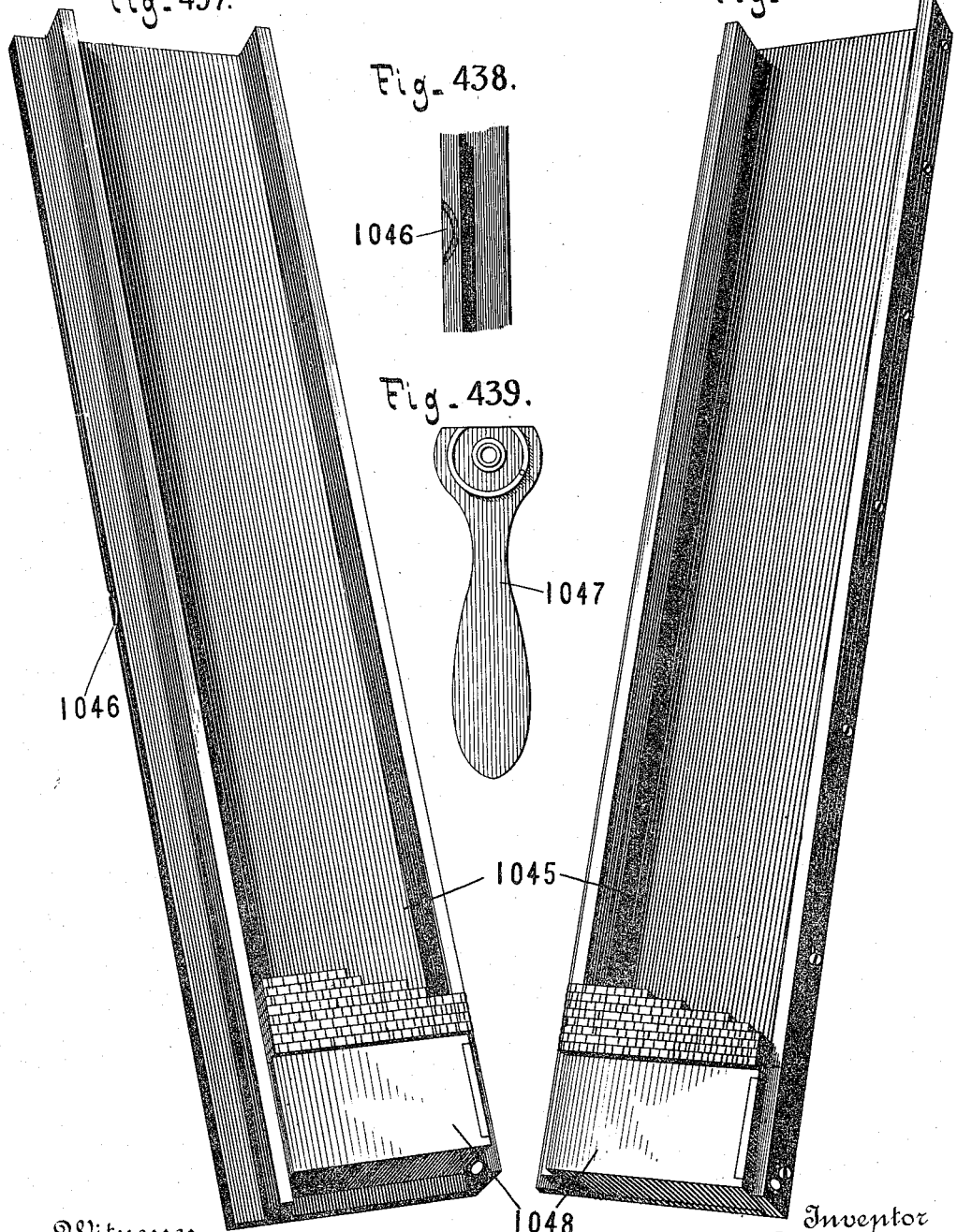

(No Model.) 163 Sheets—Sheet 152.
J. W. PAIGE.
MACHINE FOR DISTRIBUTING, SETTING, AND JUSTIFYING TYPE.
No. 547,860. Patented Oct. 15, 1895.
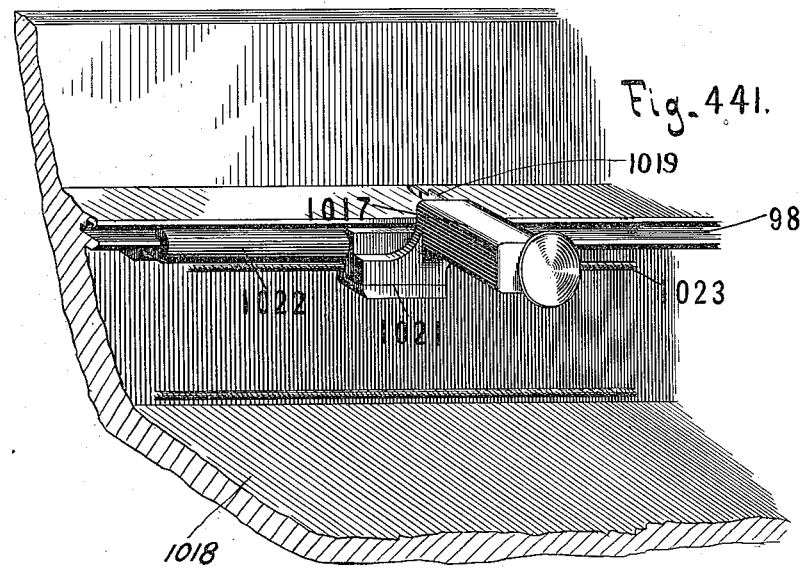
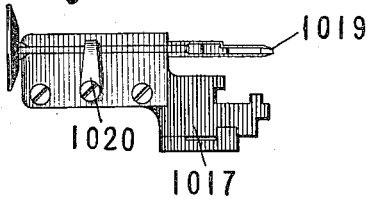
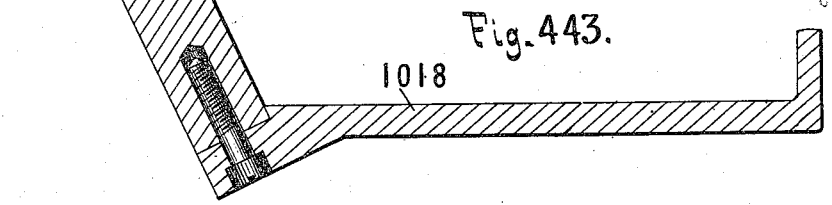
Witnesses
Frank H. Pierpont
Charles E. Davis.
Inventor
J. W. Paige
By Attorneys
H. W. Beadle & Co.

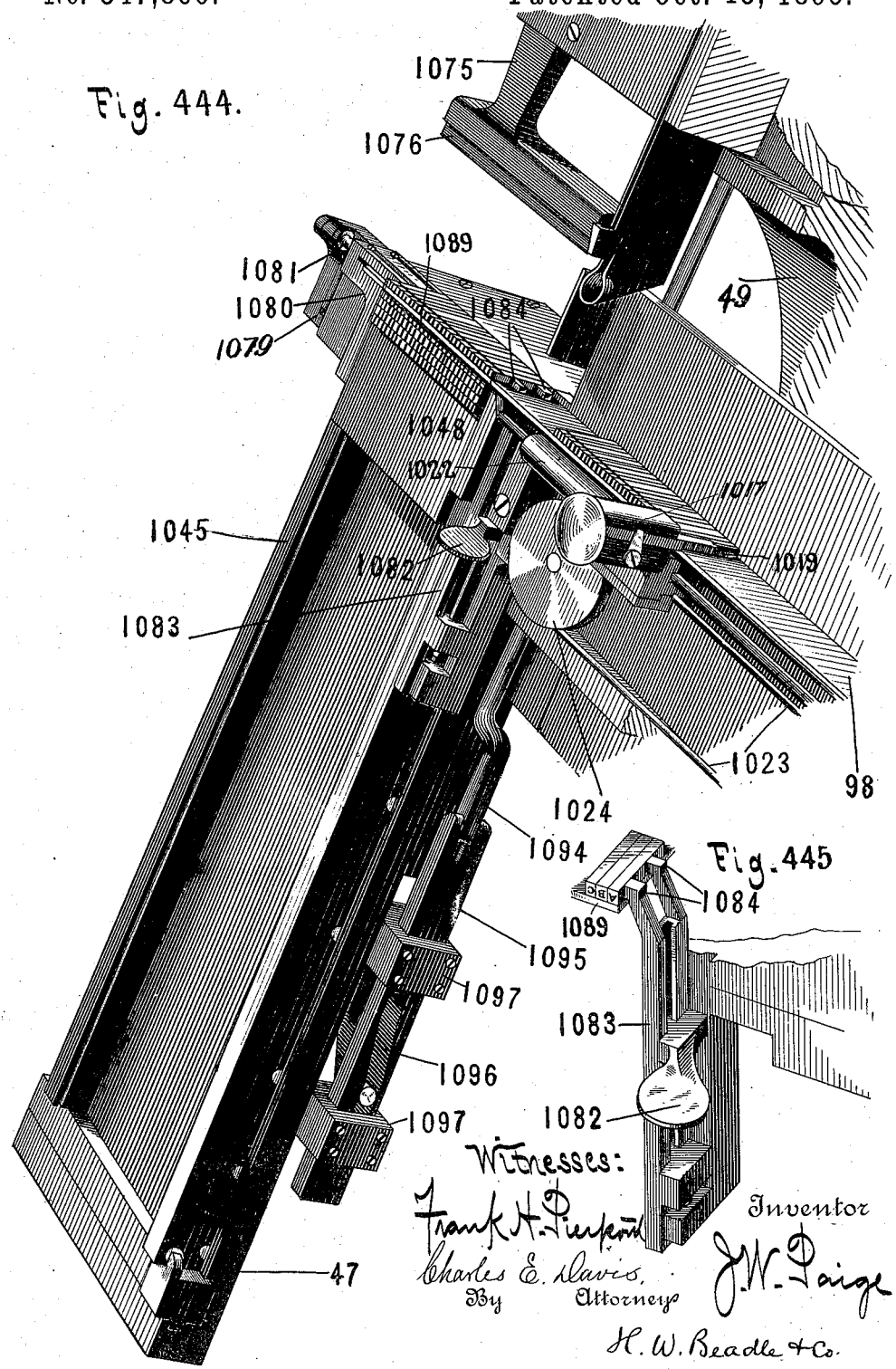

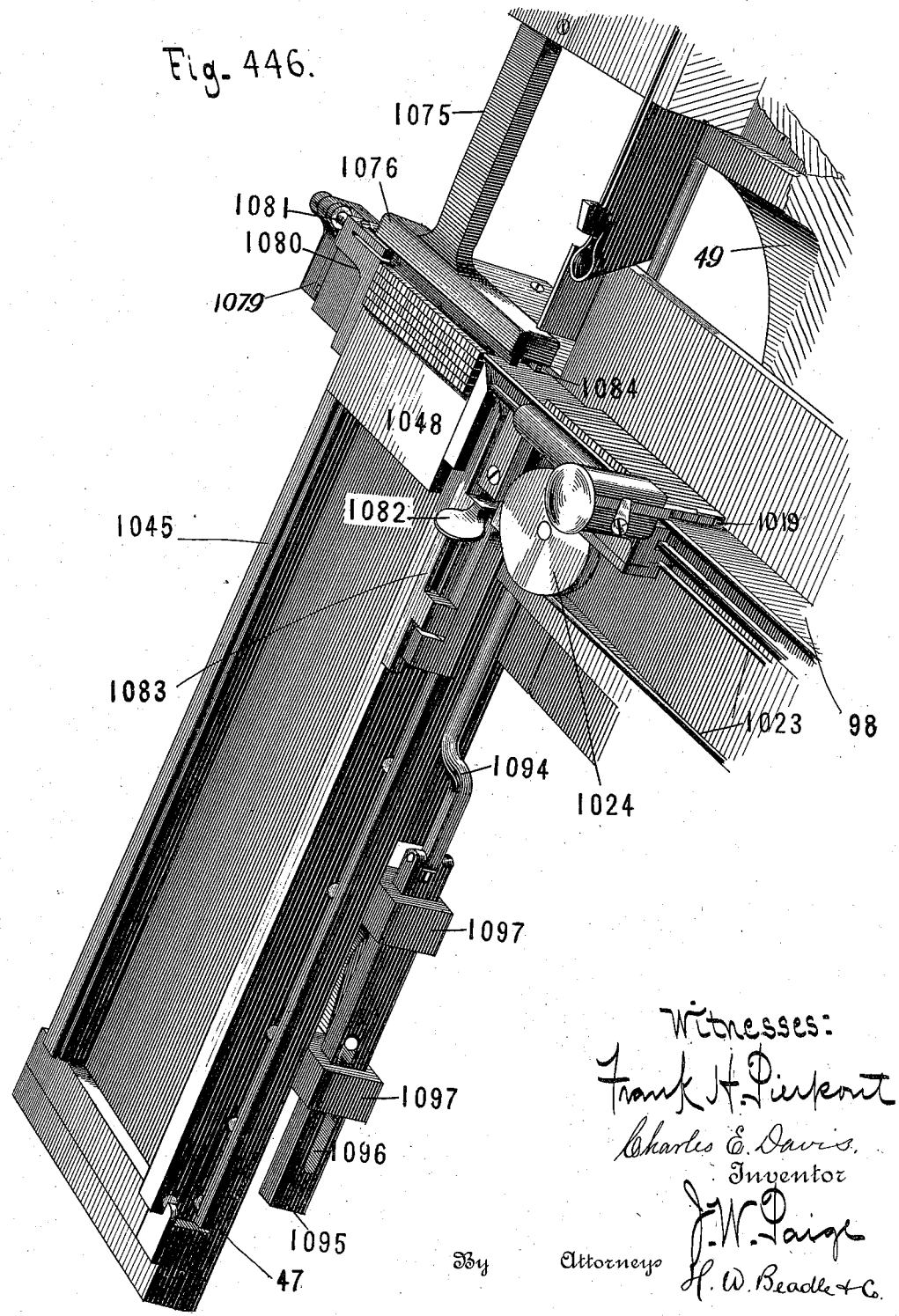

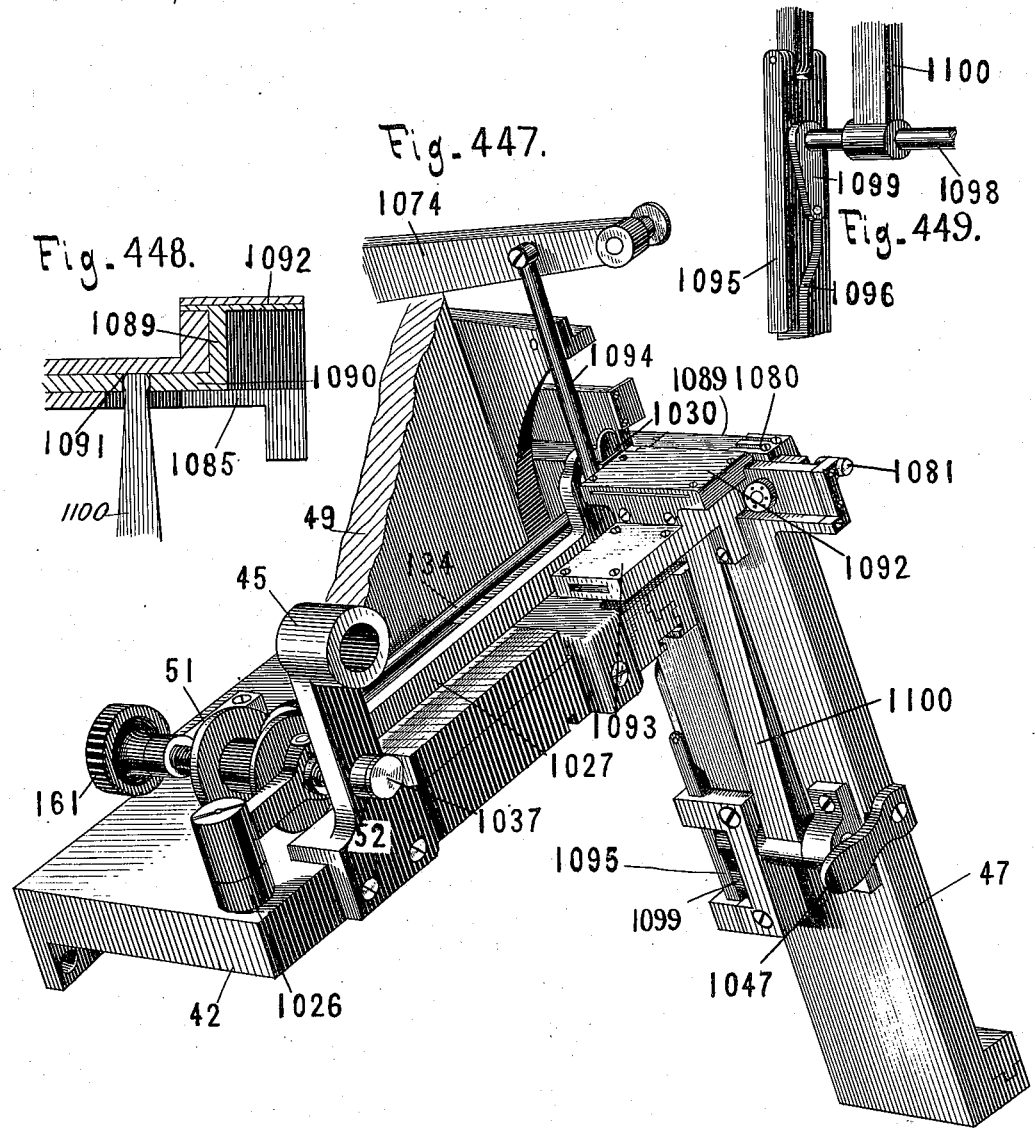

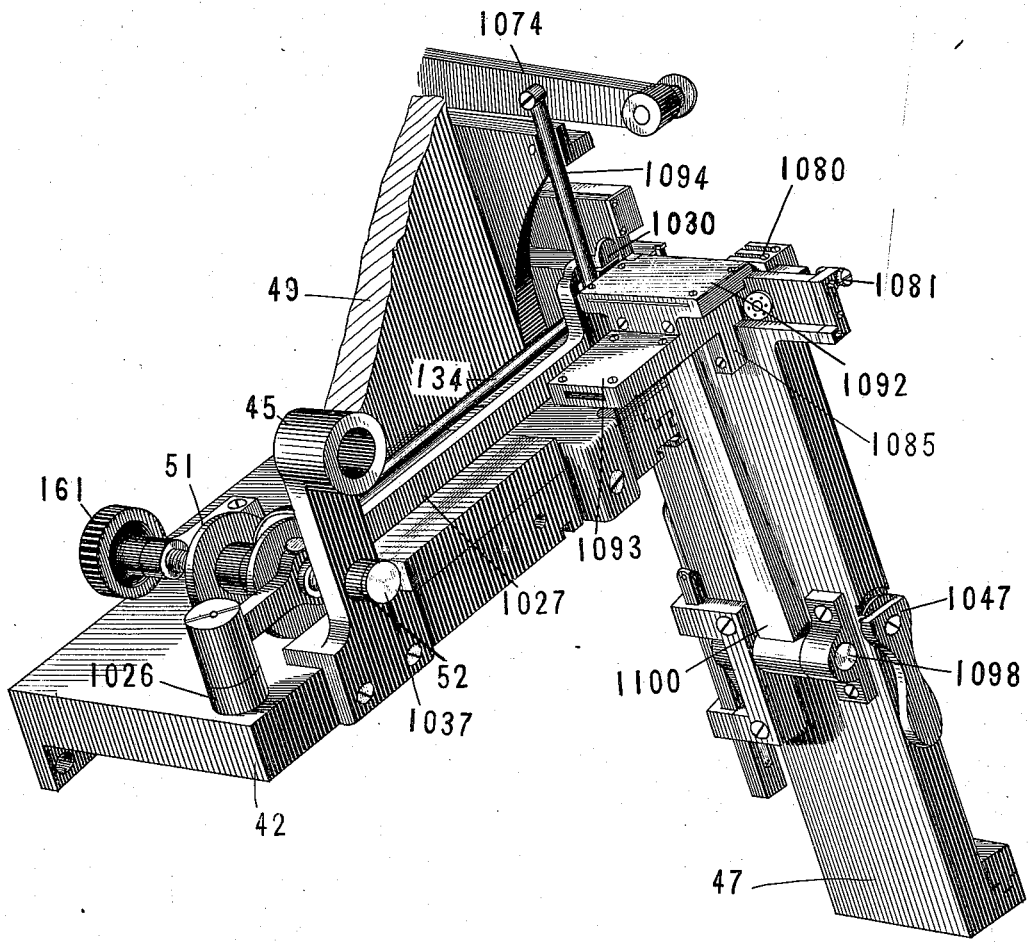

(No Model.) 163 Sheets—Sheet 157.

J. W. PAIGE.

MACHINE FOR DISTRIBUTING, SETTING, AND JUSTIFYING TYPE.

No. 547,860. Patented Oct. 15, 1895.

Witnesses
Frank H. Pierpont
Charles E. Davis.

Inventor
J. W. Paige
By Attorneys
H. W. Beadle + Co.

(No Model.)
163 Sheets—Sheet 158.
J. W. PAIGE.
MACHINE FOR DISTRIBUTING, SETTING, AND JUSTIFYING TYPE.
No. 547,860. Patented Oct. 15, 1895.
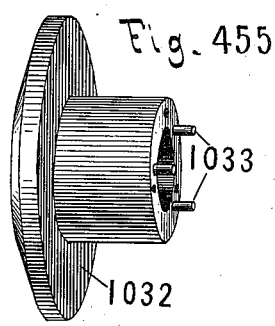
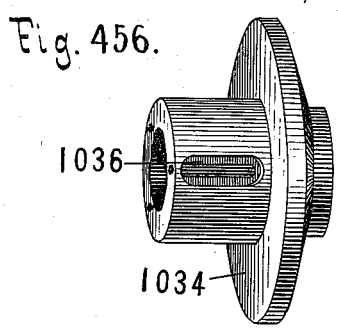
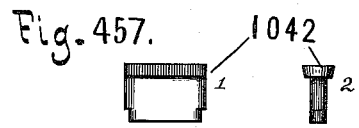
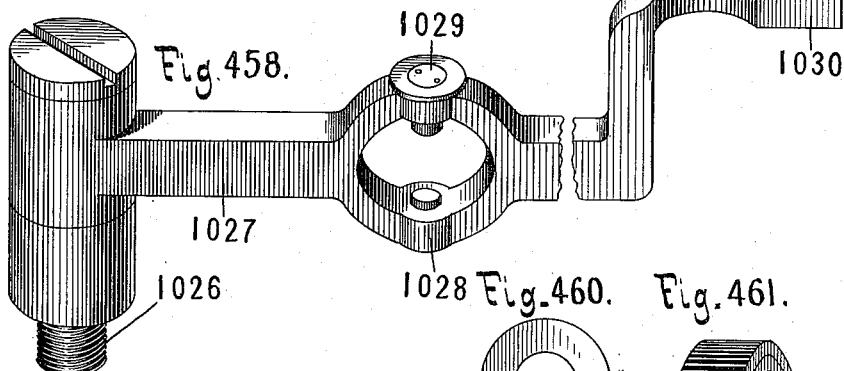
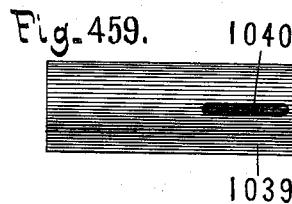
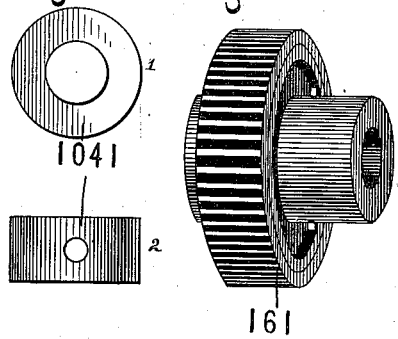
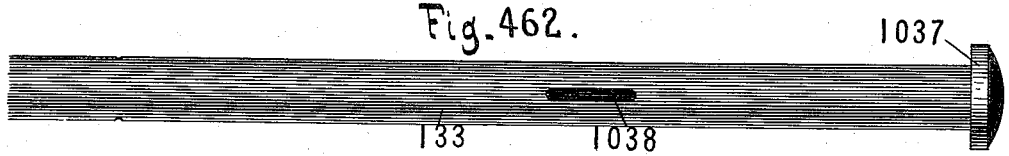
Witnesses
Frank H. Pierpont
Charles E. Davis
Inventor
J. W. Paige
By Attorneys
H. W. Beadle + Co.

(No Model.)
J. W. PAIGE.
MACHINE FOR DISTRIBUTING, SETTING, AND JUSTIFYING TYPE.
No. 547,860. Patented Oct. 15, 1895.
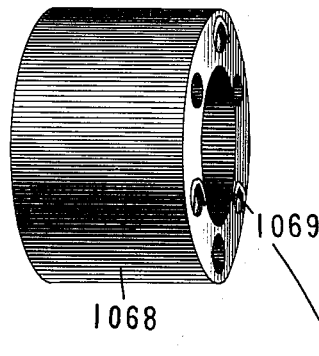
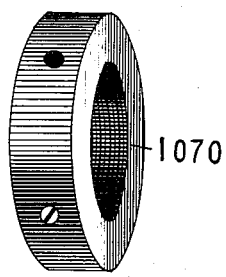
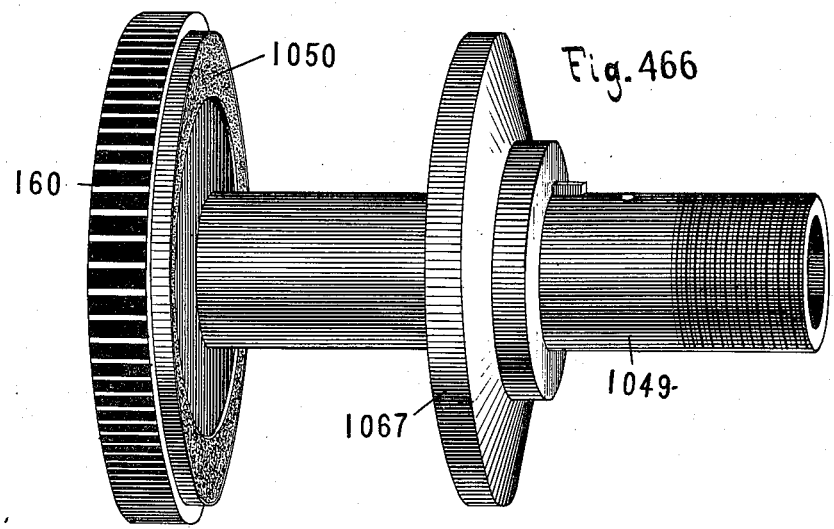
Witnesses
Frank H. Pierpont
Charles E. Davis
Inventor
J. W. Paige
By Attorneys
H. W. Beadle & Co.

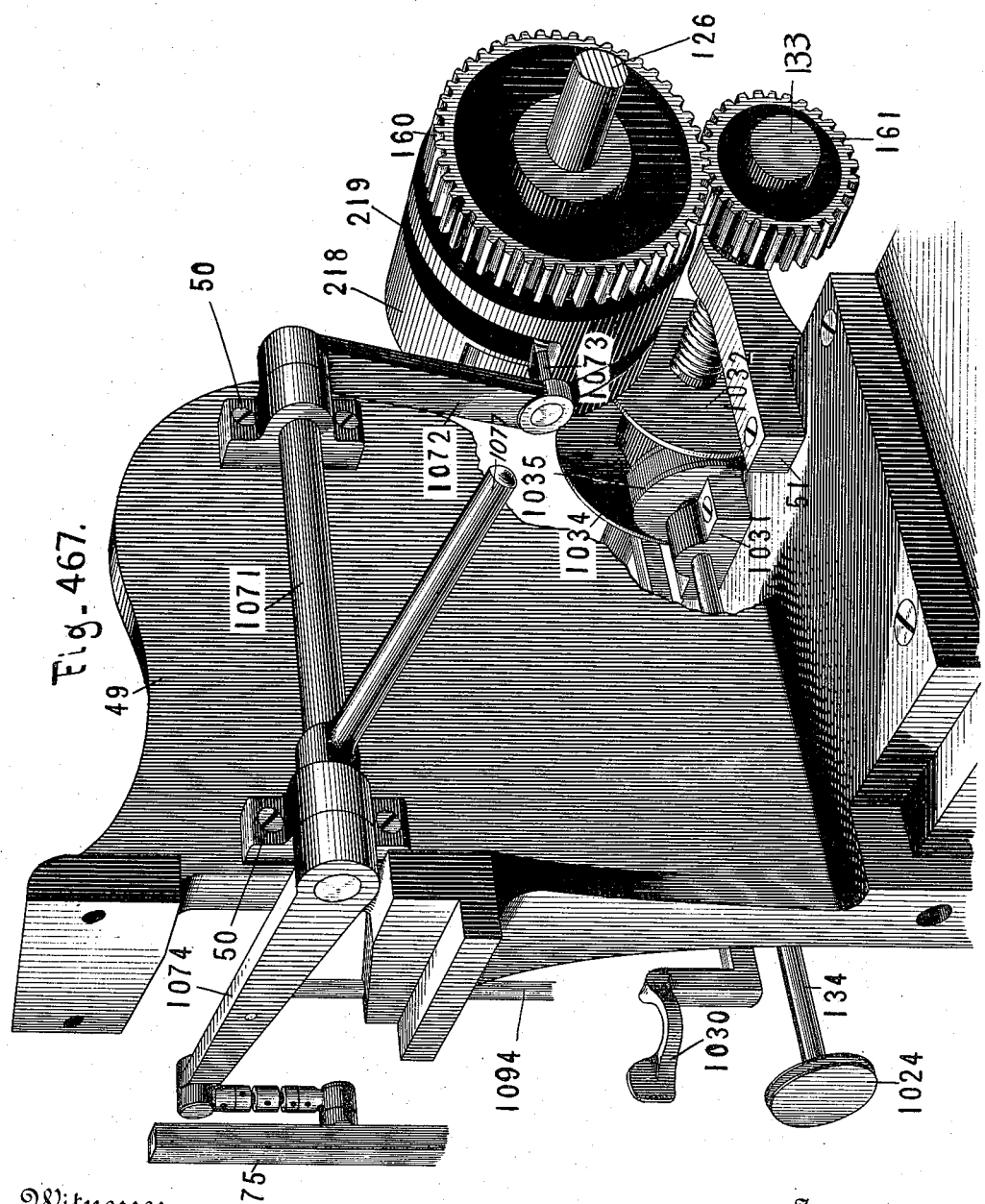

(No Model.) 163 Sheets—Sheet 161.
J. W. PAIGE.
MACHINE FOR DISTRIBUTING, SETTING, AND JUSTIFYING TYPE.
No. 547,860. Patented Oct. 15, 1895.

Witnesses
Frank H. Pierpont
Charles E. Davis.

Inventor
J. W. Paige
By Attorneys
H. W. Beadle + Co.

(No Model.) 163 Sheets—Sheet 162.
J. W. PAIGE.
MACHINE FOR DISTRIBUTING, SETTING, AND JUSTIFYING TYPE.
No. 547,860. Patented Oct. 15, 1895.

(No Model.)  
163 Sheets—Sheet 163.

J. W. PAIGE.
MACHINE FOR DISTRIBUTING, SETTING, AND JUSTIFYING TYPE.

No. 547,860. Patented Oct. 15, 1895.

Witnesses  
Frank H. Pierpont  
Charles E. Davis.

Inventor  
J. W. Paige  
By Attorneys  
H. W. Beadle & Co.

UNITED STATES PATENT OFFICE.

JAMES WILLIAM PAIGE, OF HARTFORD, CONNECTICUT.

MACHINE FOR DISTRIBUTING, SETTING, AND JUSTIFYING TYPE.

SPECIFICATION forming part of Letters Patent No. 547,860, dated October 15, 1895.

Application filed August 19, 1887. Serial No. 247,325. (No model.)

*To all whom it may concern:*

Be it known that I, JAMES WILLIAM PAIGE, of Hartford, in the county of Hartford and State of Connecticut, have invented a new and Improved Machine for Setting, Distributing, and Justifying Type; and I do hereby declare that the following is a full, clear, and exact description of the same, reference being had to the accompanying drawings, forming a part of this specification.

This invention has for its main object the distributing, setting, and justification of types in a more certain and perfect manner and with greater rapidity than has heretofore been done.

To this end my invention consists, first, in novel means for advancing the column in the distributing-galley; second, in novel means for removing the line from the "dead-matter" column; third, in novel means for advancing the removed line of type upon the raceway; fourth, in novel means for controlling the advance of the type-line for distribution; fifth, in novel means for separating or cutting off the individual types from the end of the line; sixth, in novel means for returning the line-follower and other connected mechanisms to their normal positions; seventh, in novel means for forwarding the line of separated types from the cut-off to the main forwarder; eighth, in novel means for moving each individual type longitudinally on the distributing-raceway to bring it into the proper position for presentation to the testing mechanisms; ninth, in novel means for testing each type and for removing defective type from the line; tenth, in novel means for moving each individual type longitudinally upon the distributing raceway to bring it into proper position for presentation to the selecting mechanisms; eleventh, in novel means for selecting and removing from the line of separated type any type that may be turned end for end or which may be otherwise disarranged; twelfth, in novel means for selecting and removing from the line of separated type the wide type which are not provided for in the type-case; thirteenth, in novel means for selecting and removing from the line of separated type the regular "pi" characters—such as the star, dagger, &c.—which characters are not provided for in the type-case; fourteenth, in novel means for forwarding the separated type from the position in which they are left by the first forwarder to the extreme end of the distributing-raceway; fifteenth, in novel means for selecting and lifting into the auxiliary transfer-channels outside of the type-case the spaces used in justifying; sixteenth, in novel means for selecting and lifting into the main channels of the type-case the regular characters which are provided for in the type-case; seventeenth, in novel means for stopping the feeding of the type-line when any one of the character-channels is full; eighteenth, in novel means in connection with the time-lock for overcoming the resistance of the returning-bar upon the partial depression of a key; nineteenth, in novel means for selecting the ordinary characters of the type-case for composition; twentieth, in novel means for ejecting the selected characters from the type-case into the raceway; twenty-first, in novel means for selecting the three-em space; twenty-second, in novel means for setting the three-em space from the auxiliary space-channels of the type-case; twenty-third, in novel means for closing the setter-raceway on the rear side while the type are being swept into the line of composition; twenty-fourth, in novel means for giving the type ejected from the type-case into the raceway their principal movement; twenty-fifth, in novel means for continuing the movement of the type upon the raceway; twenty-sixth, in novel means for facilitating the justification of the type.

It consists, further, in the legitimate combinations of the features referred to with each other and with other features not yet alluded to, and in numerous other subordinate but important combinations, and also in certain specific features of construction, all of which will be fully described hereinafter.

Figure 15:
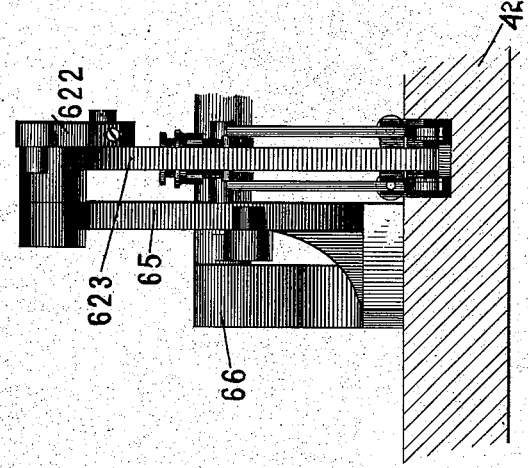
Figure 14:
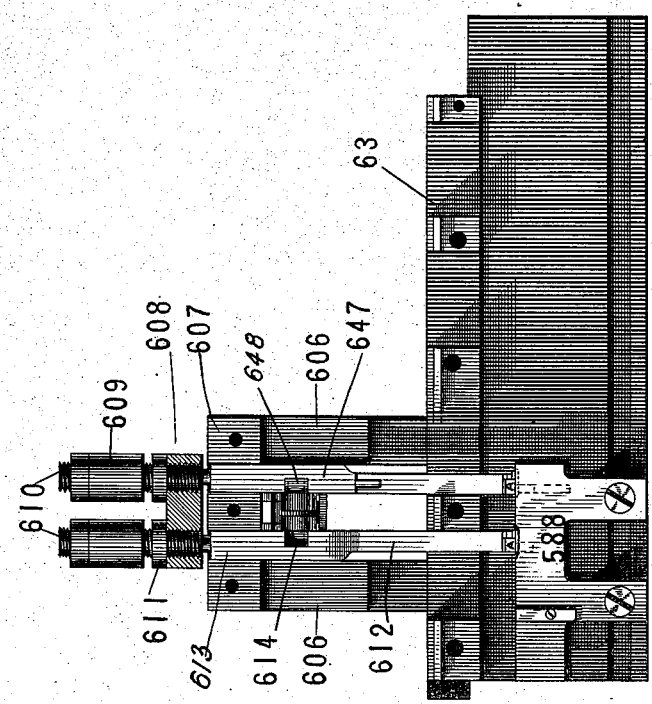
Figure 16:
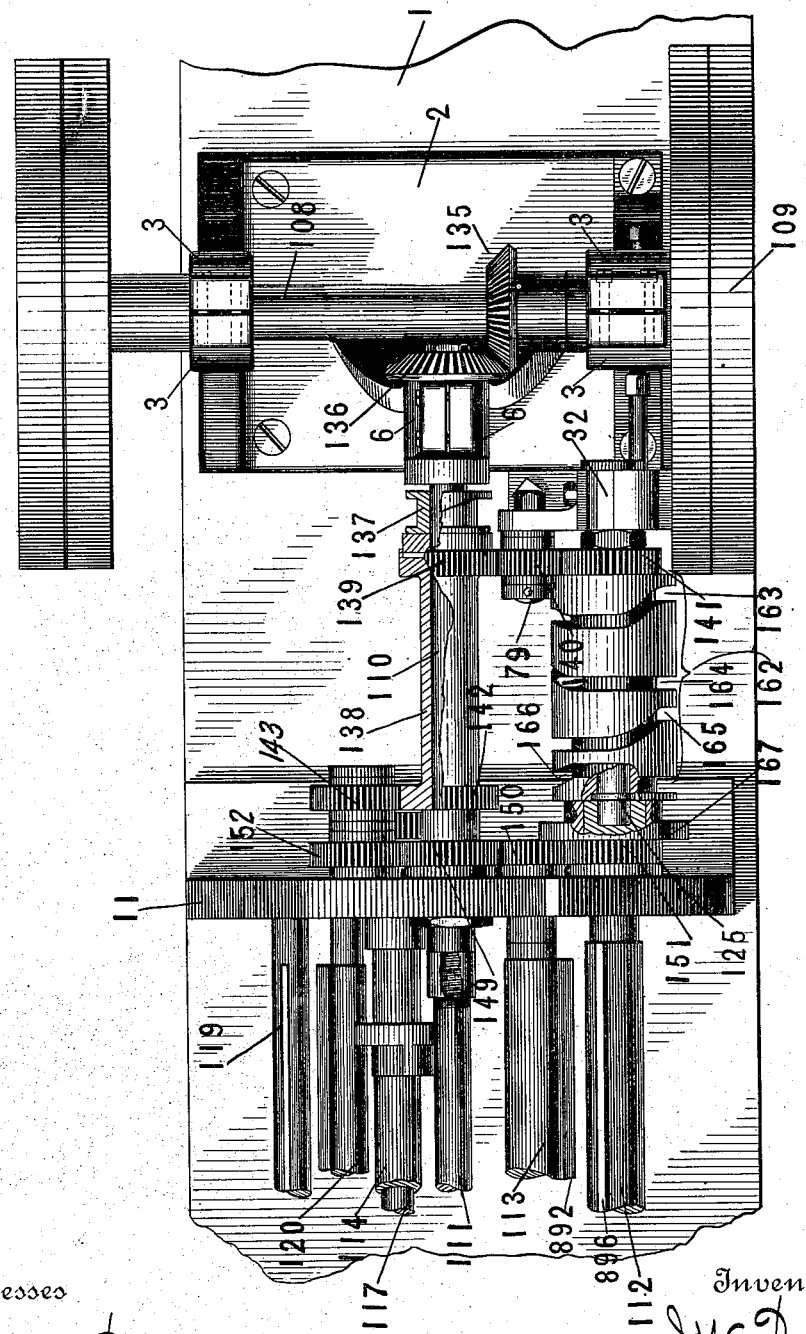
Figure 17:
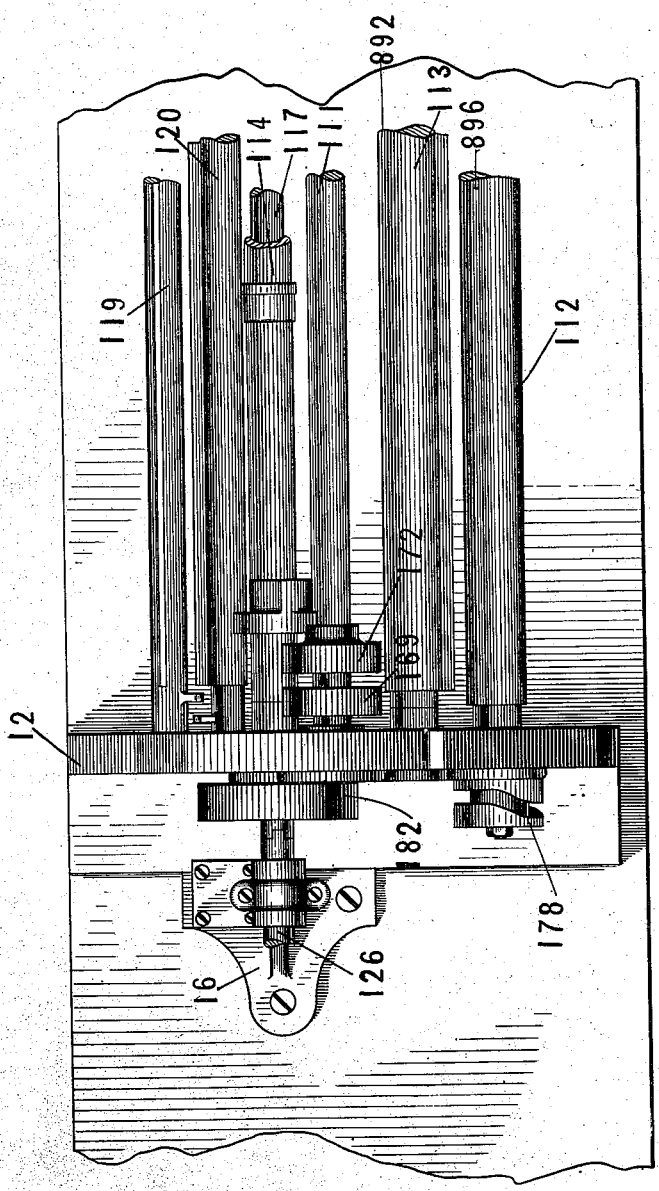
Figure 18:
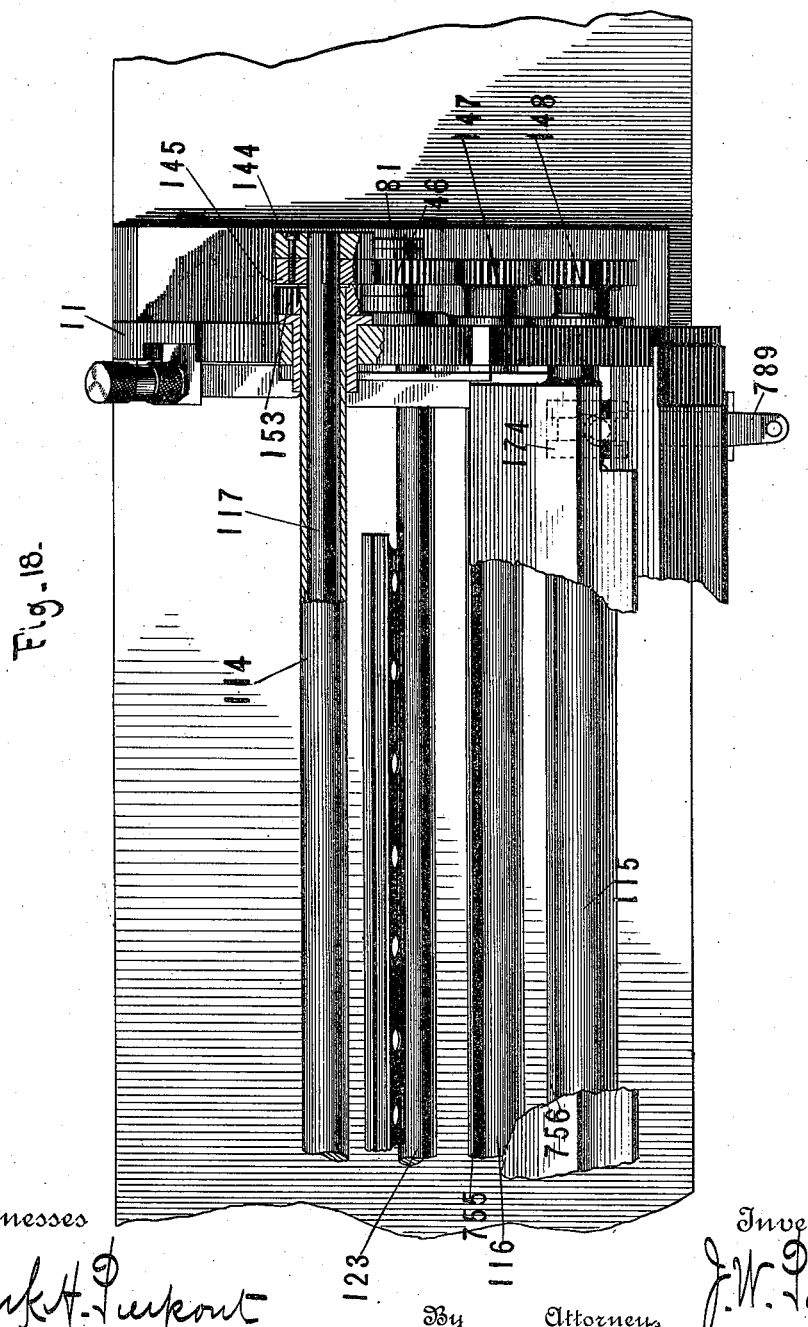
Figure 19:
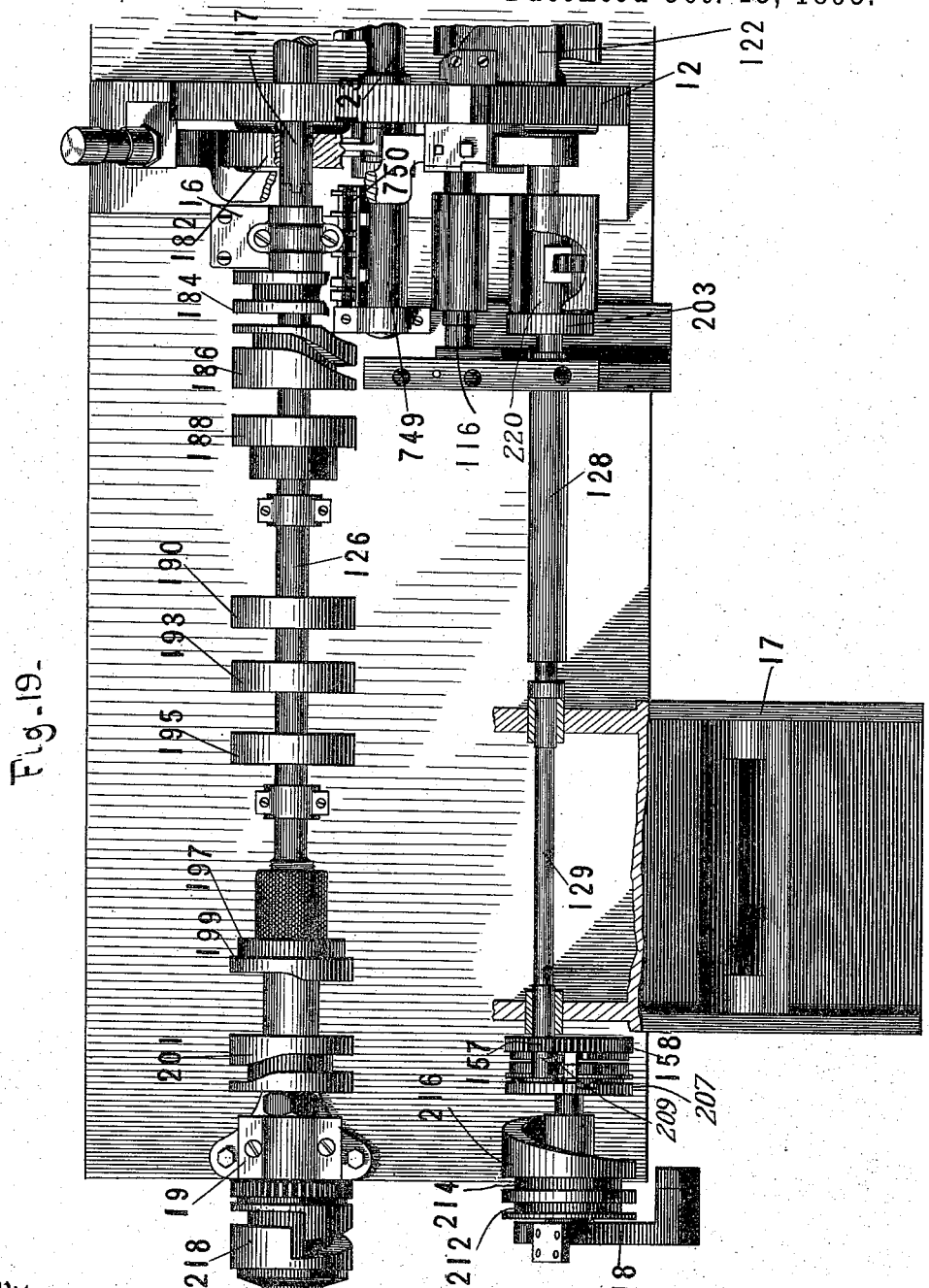
Figure 20:
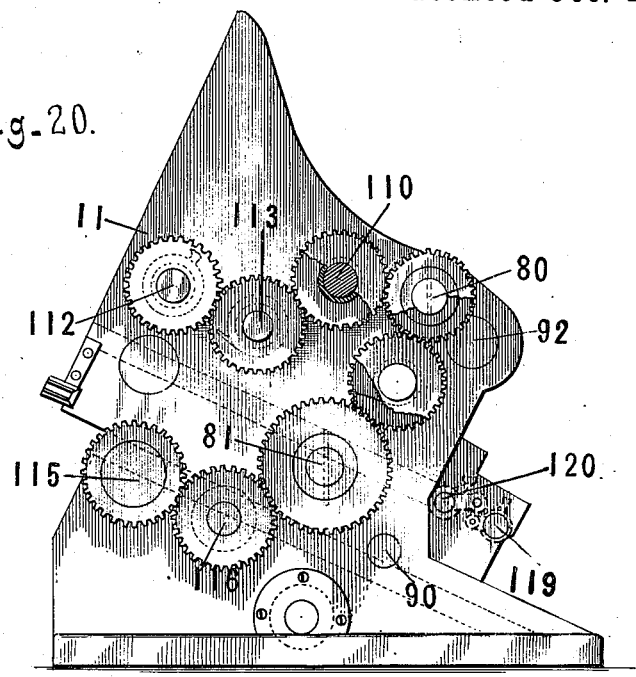
Figure 21:
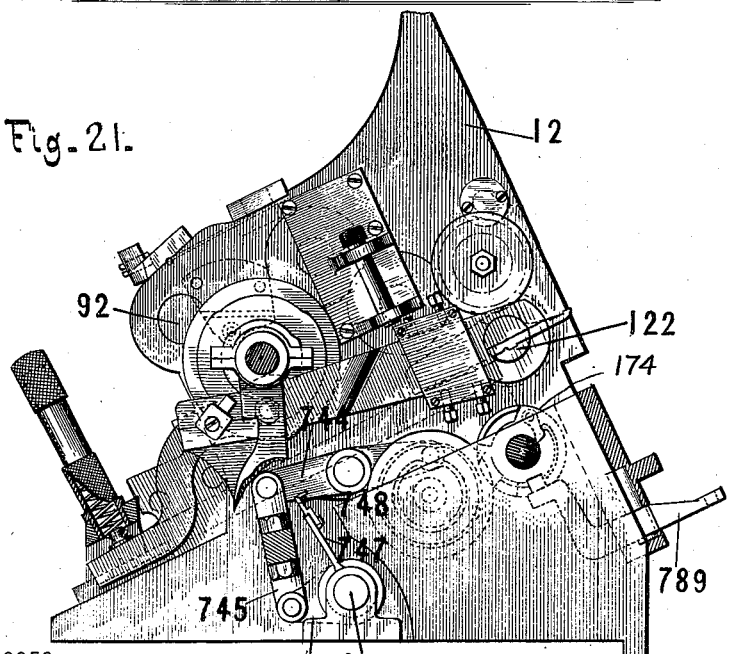
Figure 33:
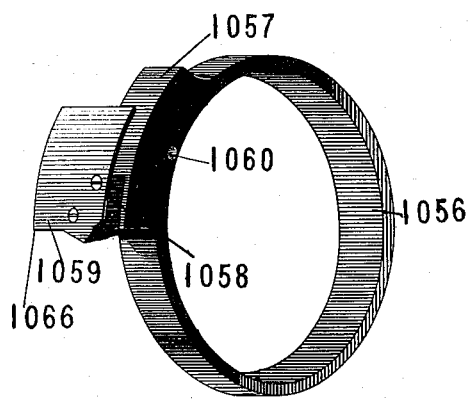
Figure 34:
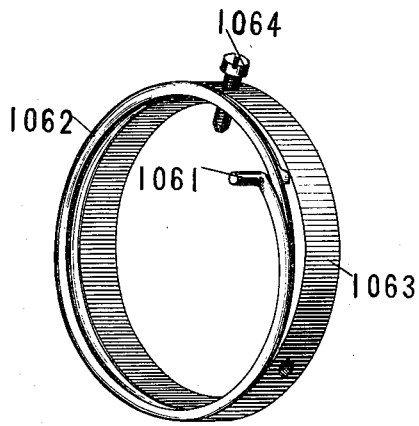
Figure 35:
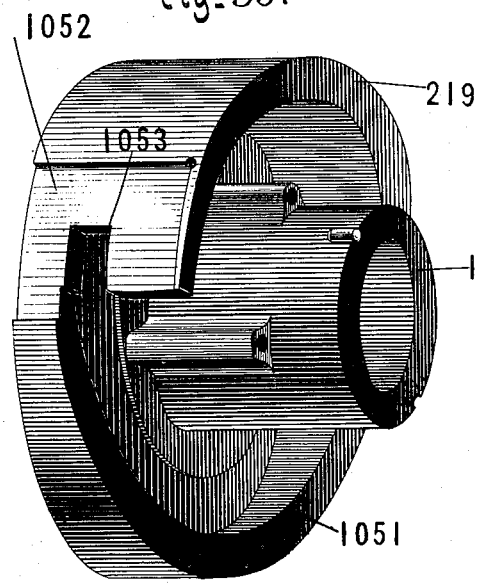
Figure 36:
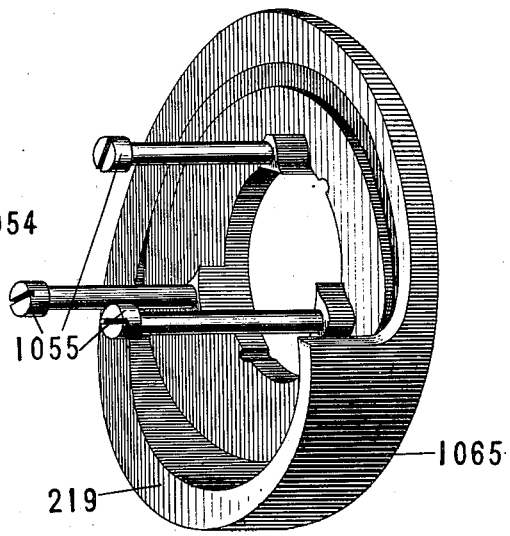
Figure 42:
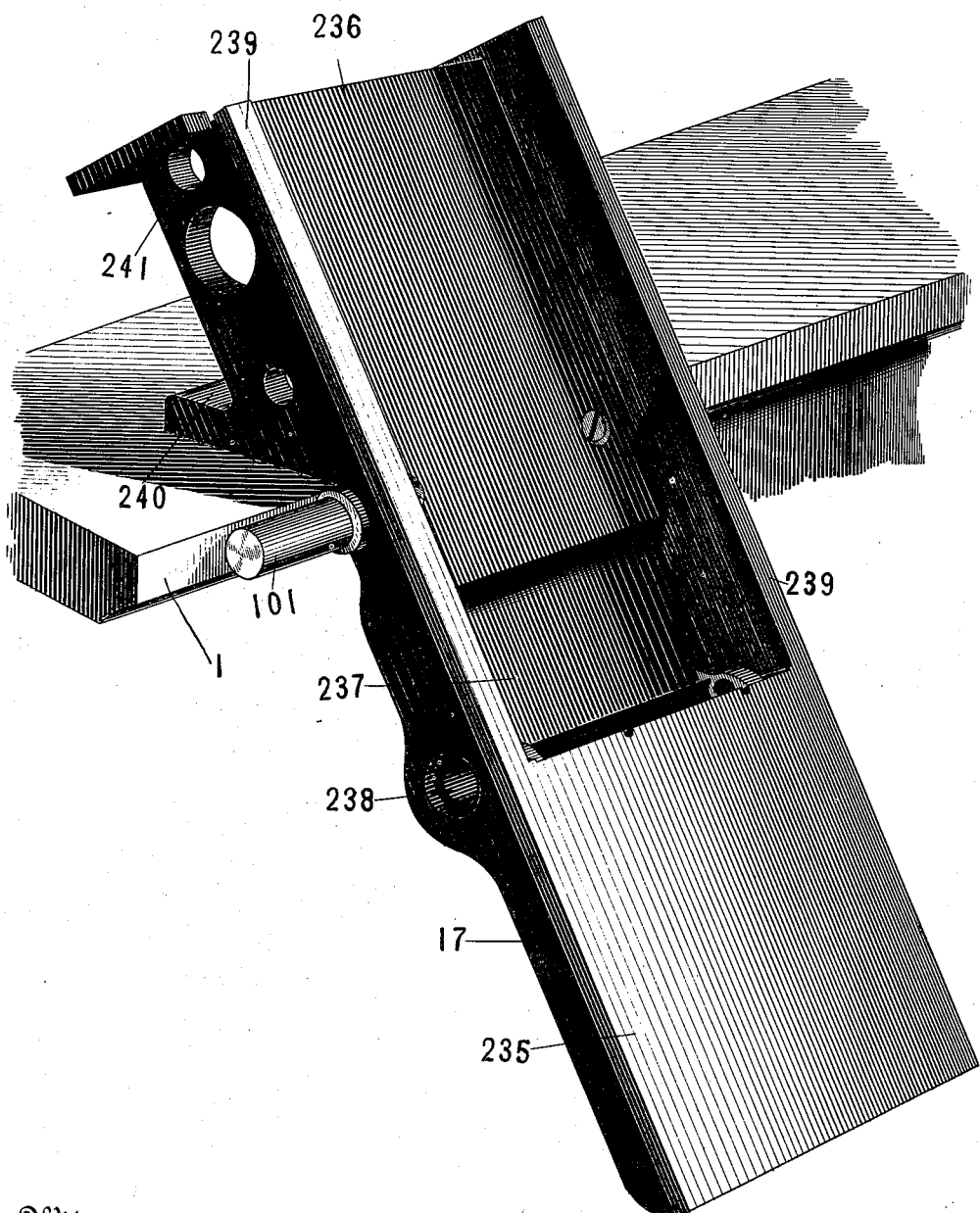
Figure 43:
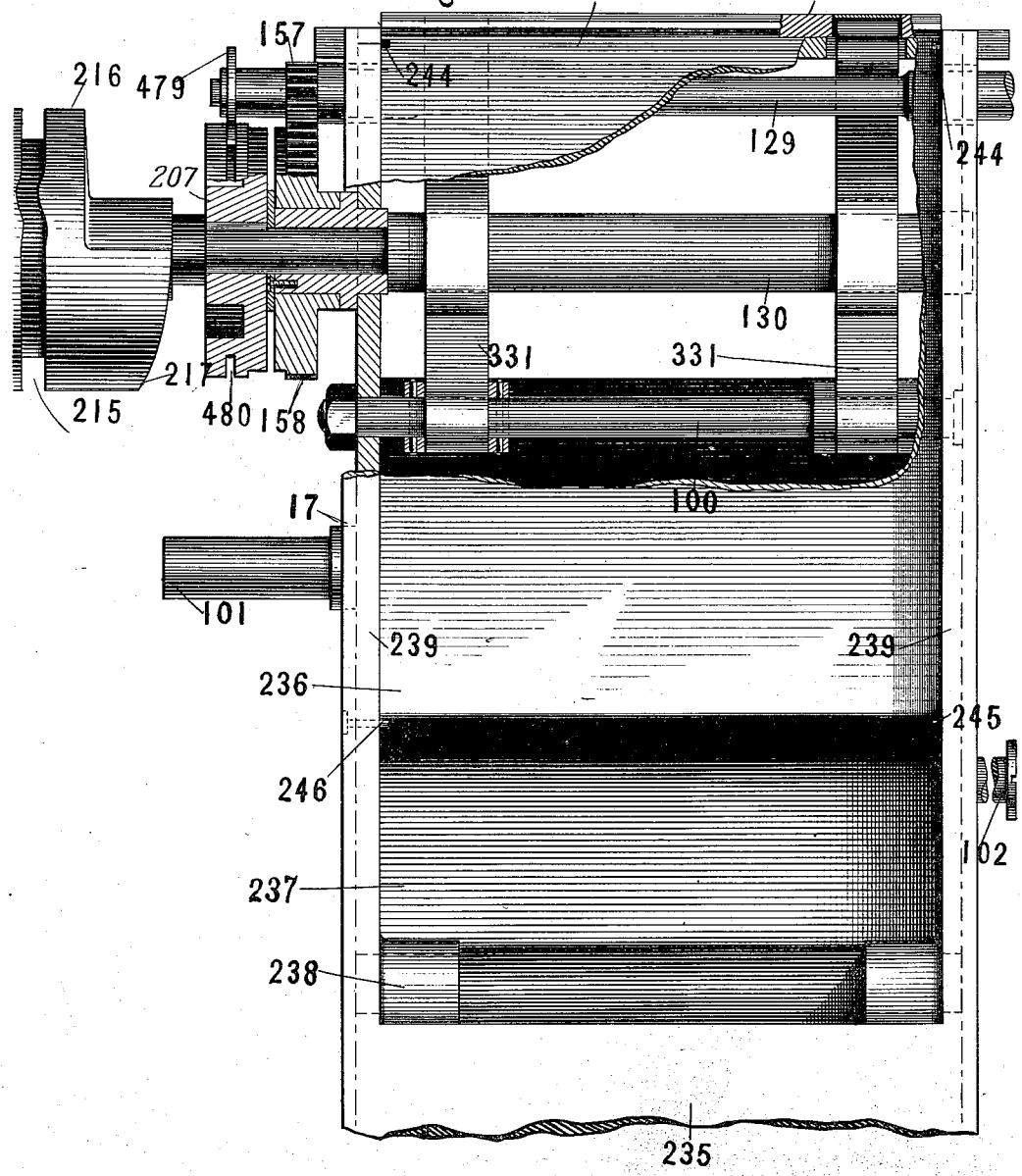
Figure 44:
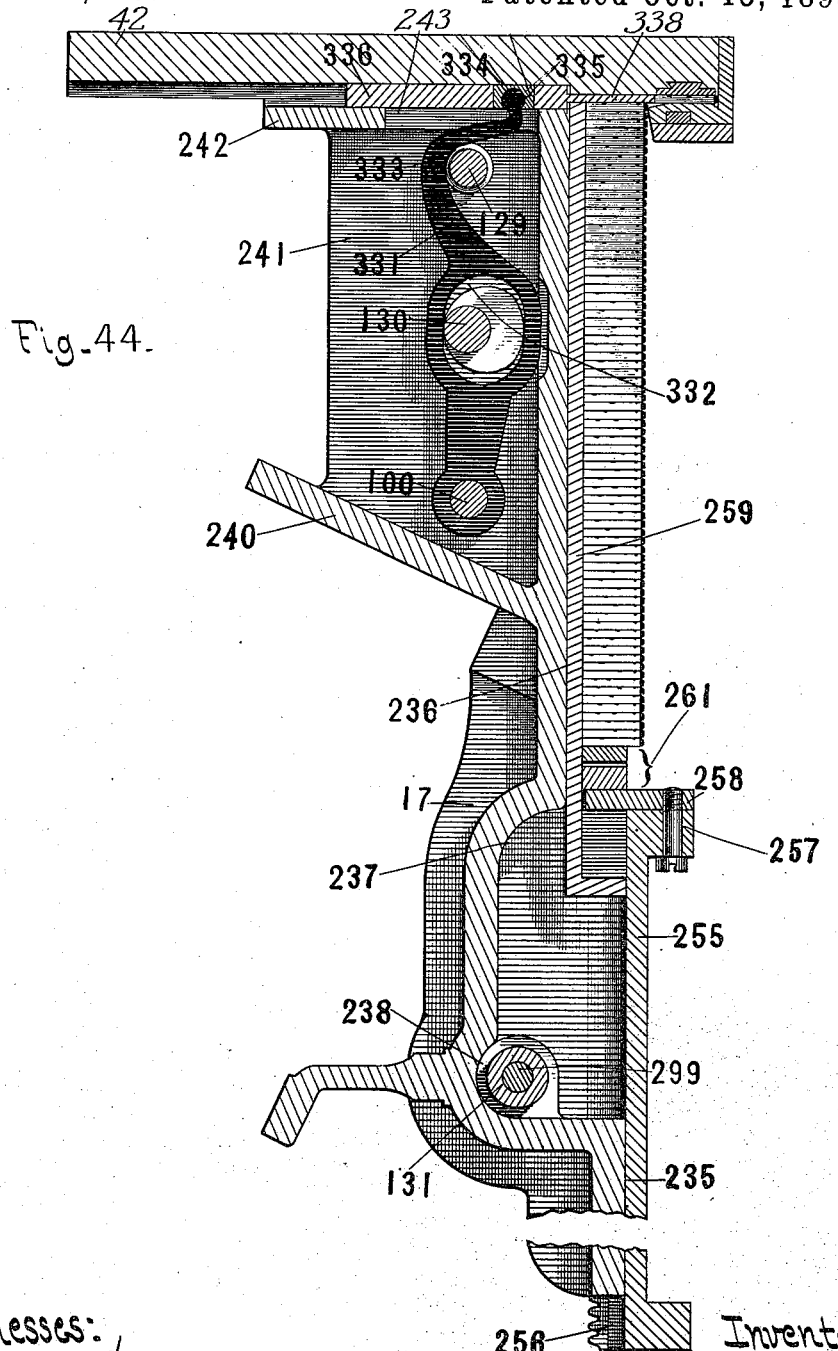
Figure 45:
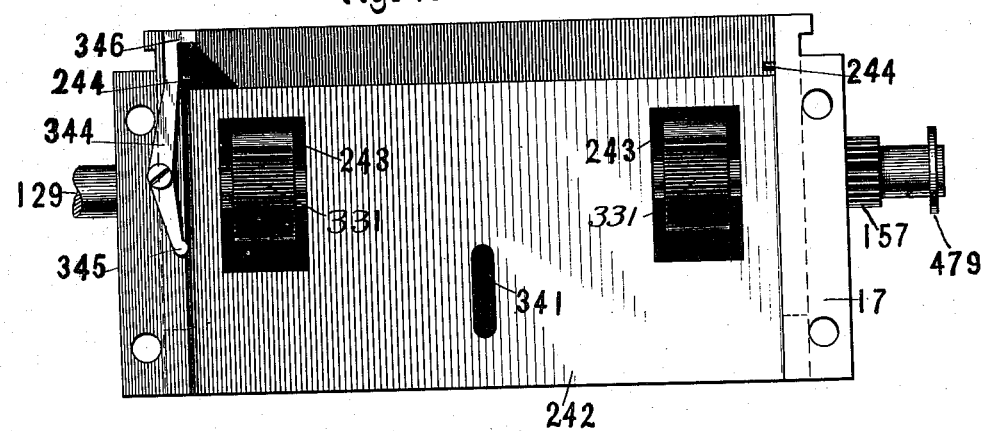
Figure 46:
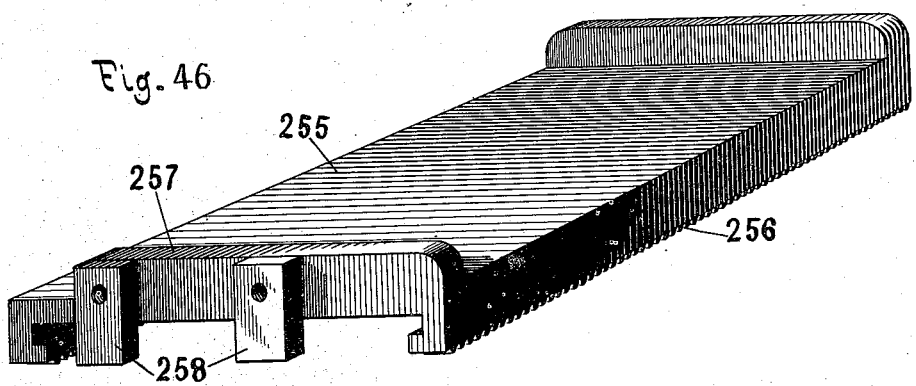
Figure 47:
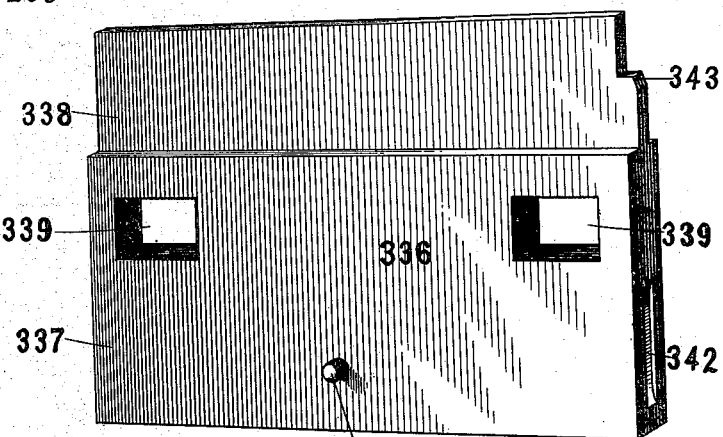
Figure 63:
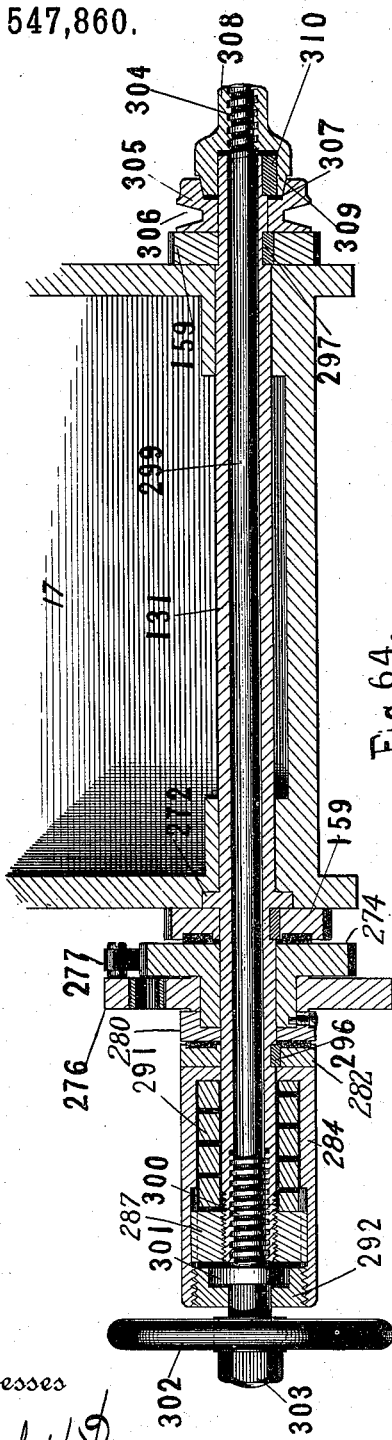
Figure 64:
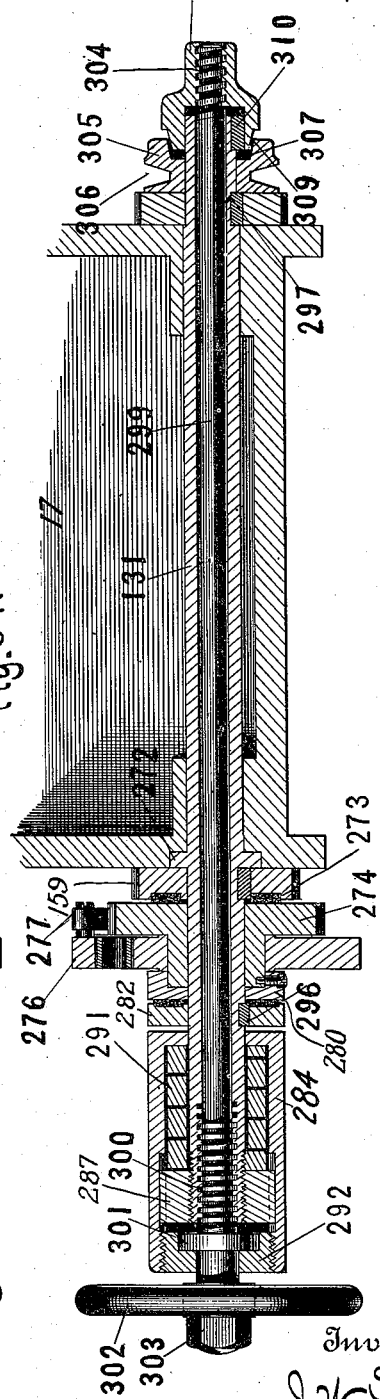
Figure 65:
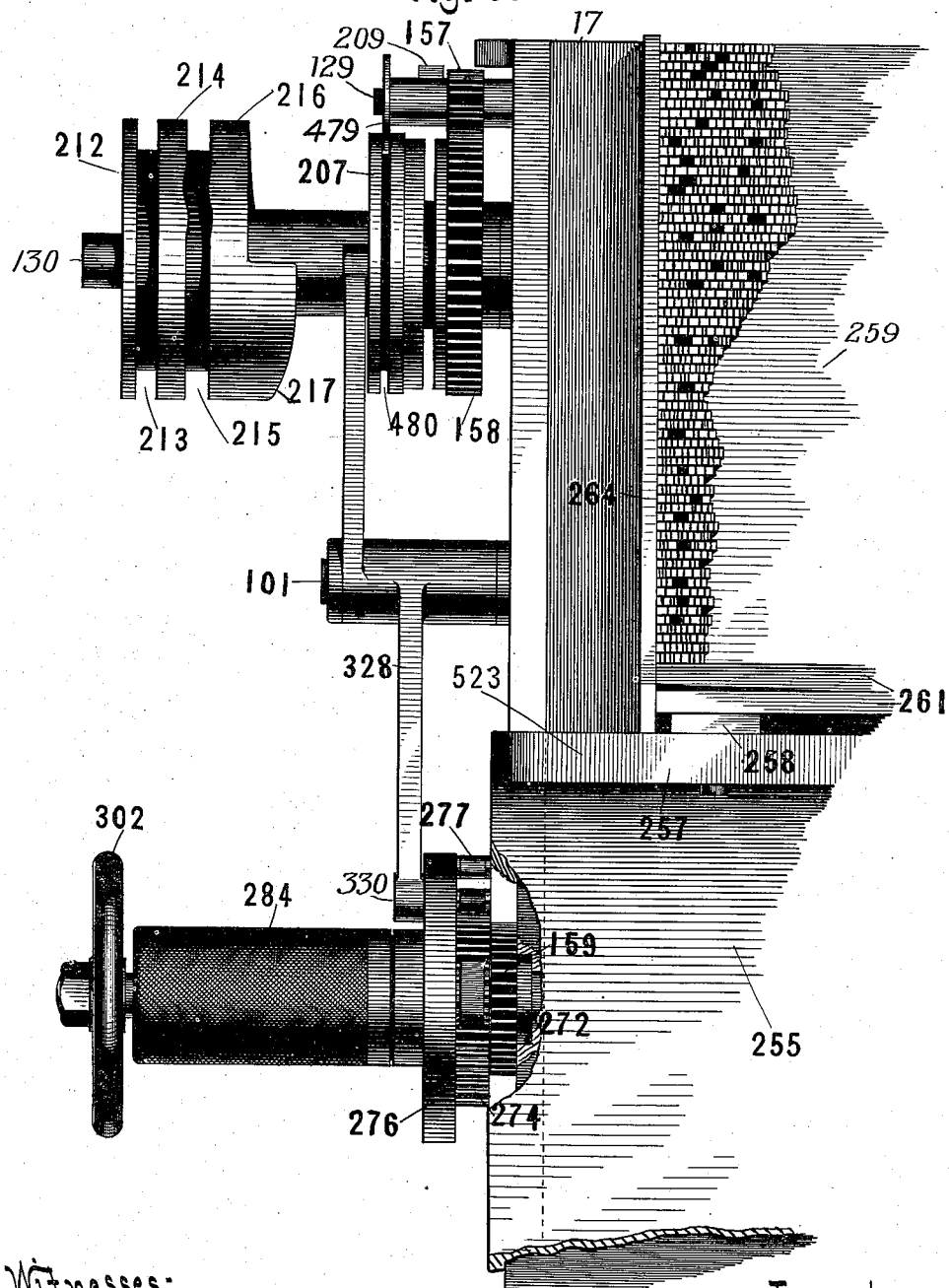
Figure 66:
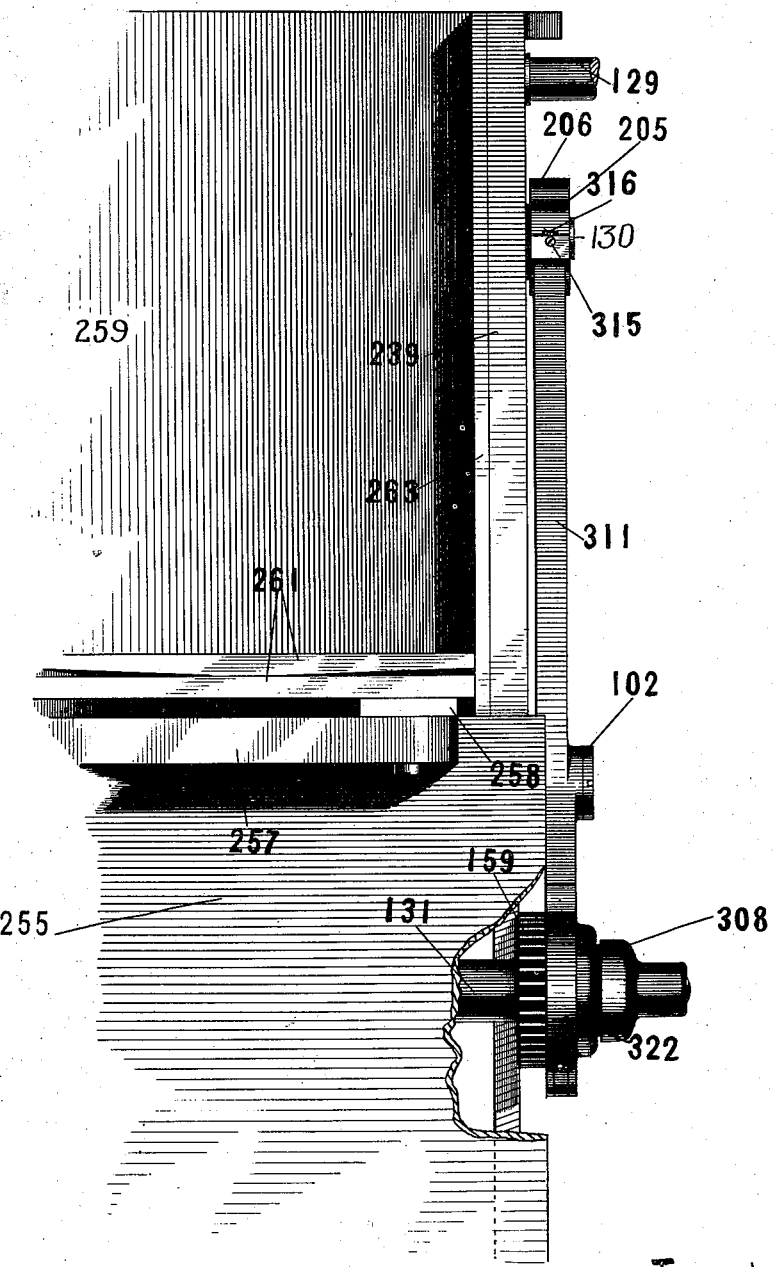
Figure 67:
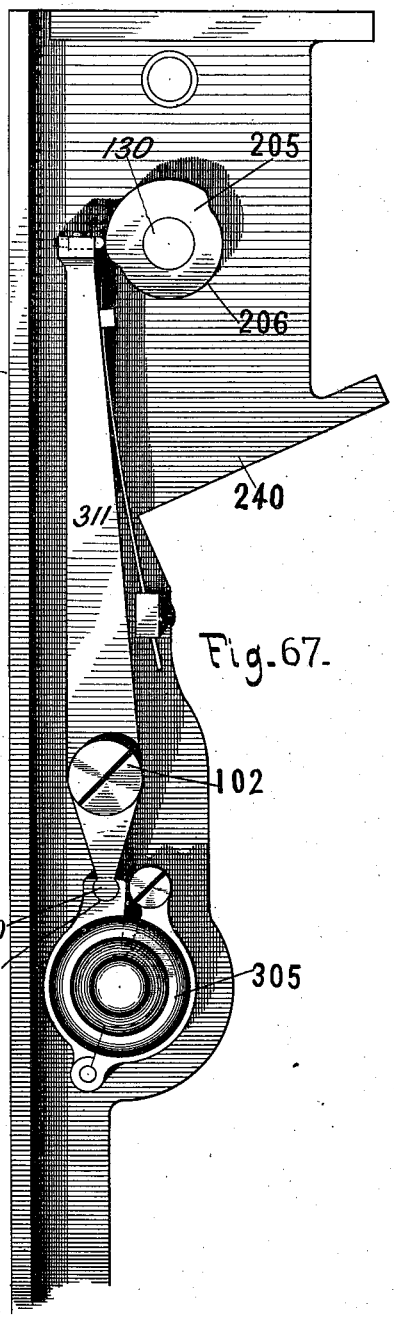
Figure 68:
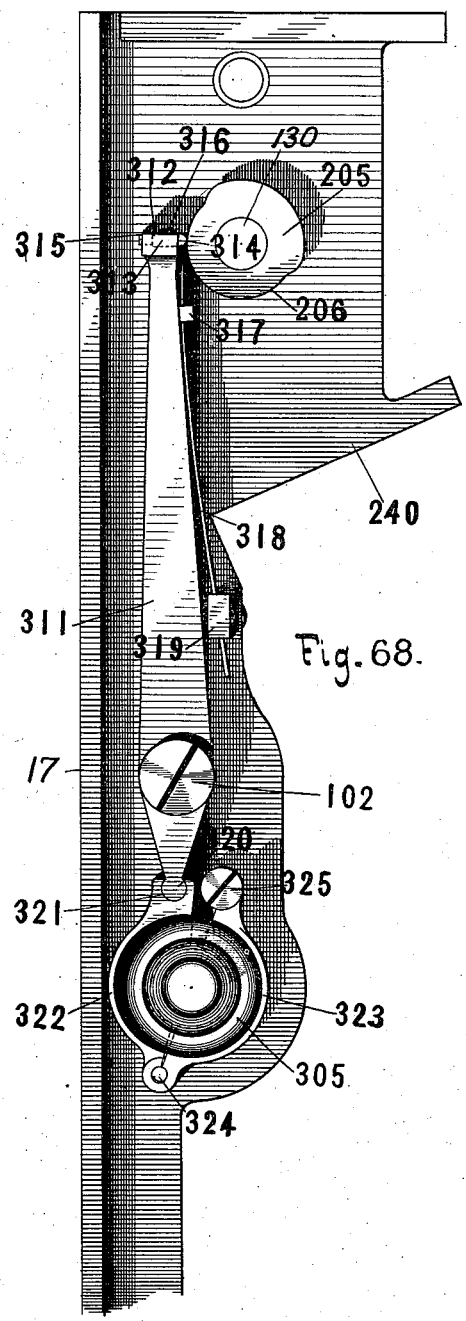
Figure 69:
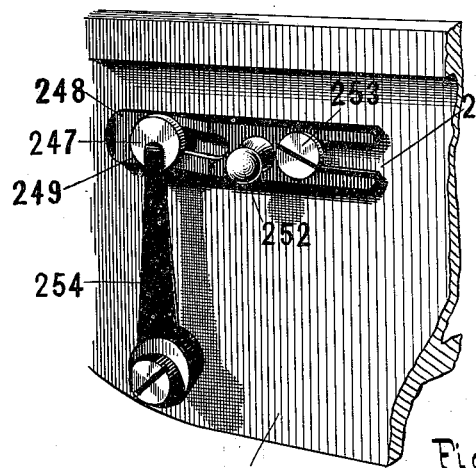
Figure 70:
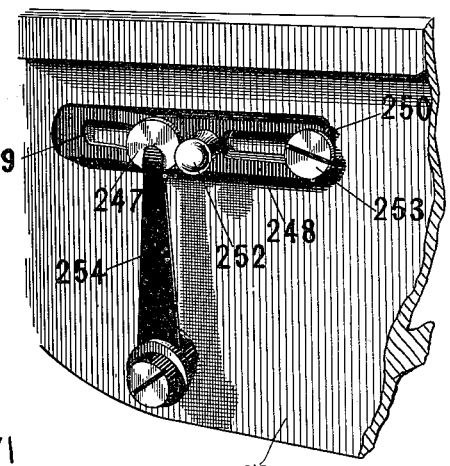
Figure 71:
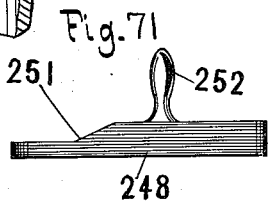
Figure 72:
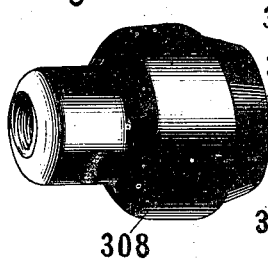
Figure 73:
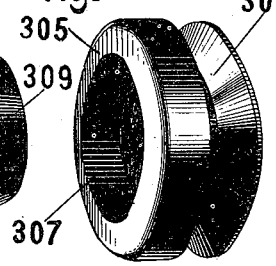
Figure 74:
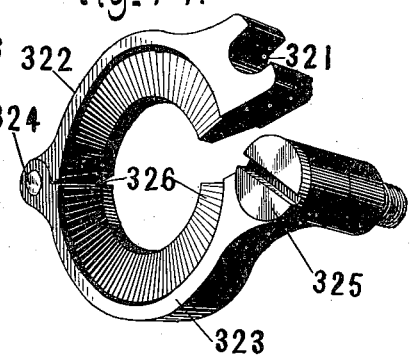
Figure 75:
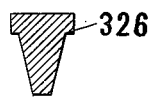
Figure 76:
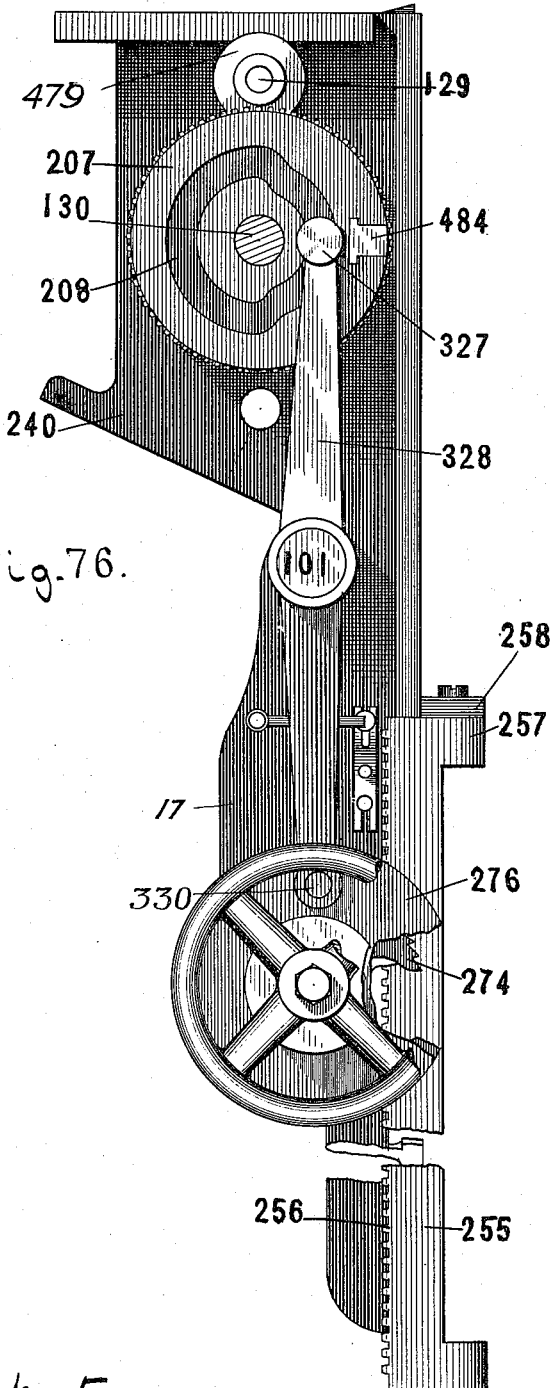
Figure 77:
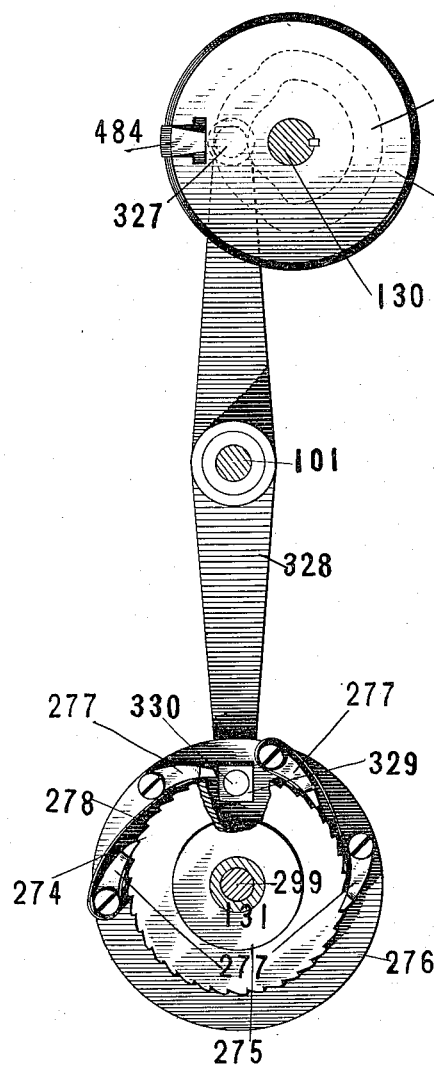
Figure 78:
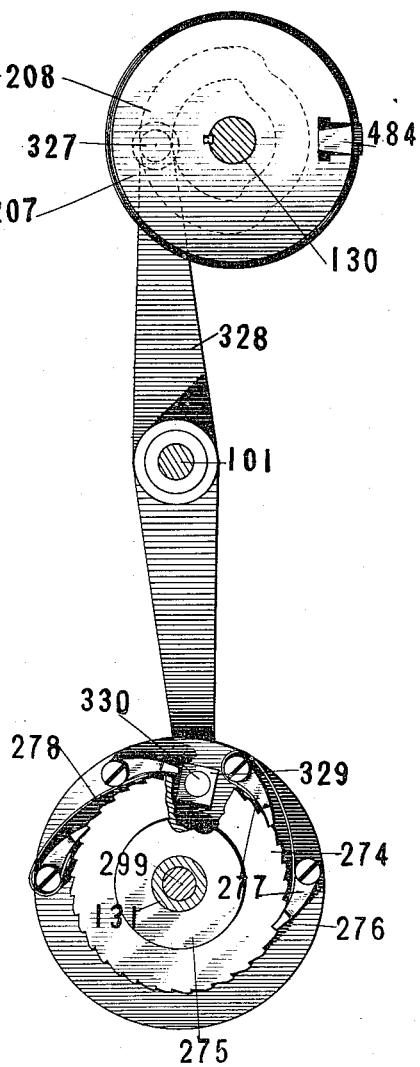
Figure 94:
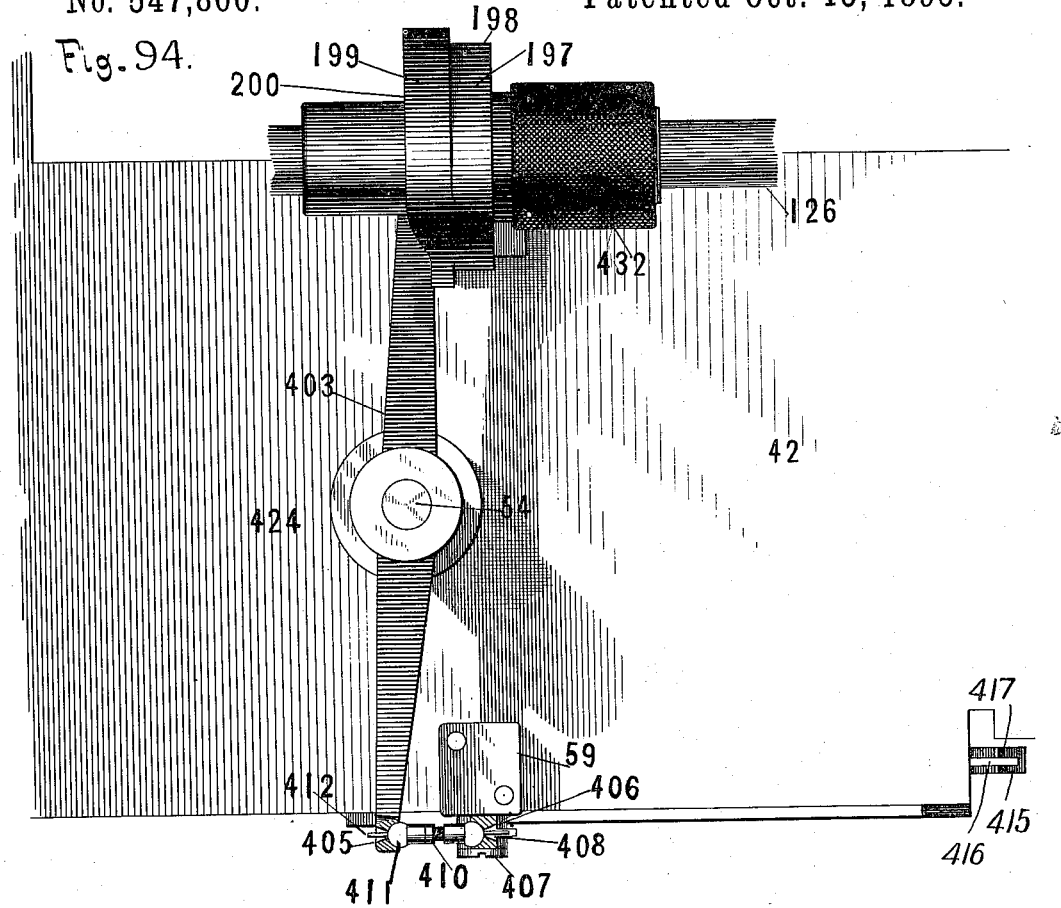
Figure 95:
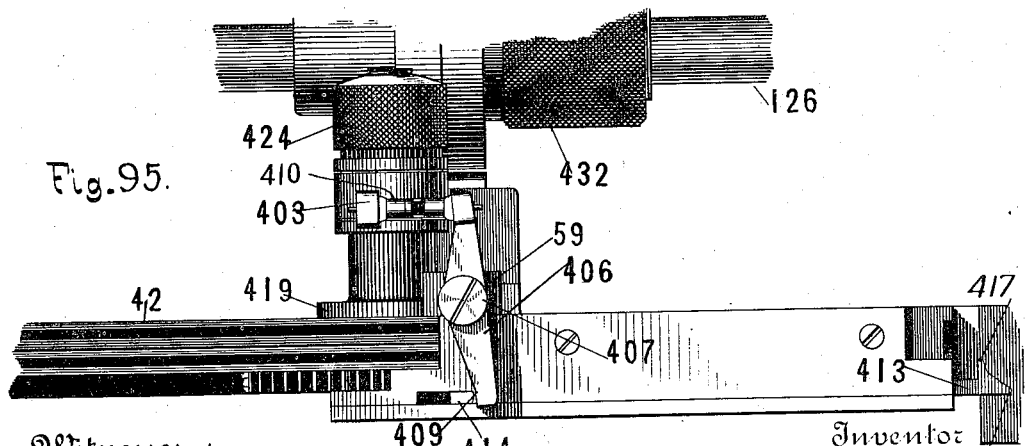
Figures 109, 110:
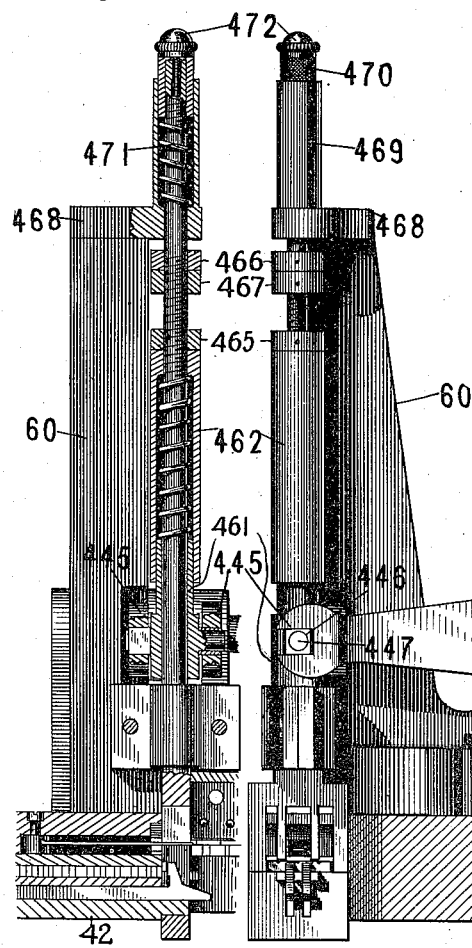
Figure 111:
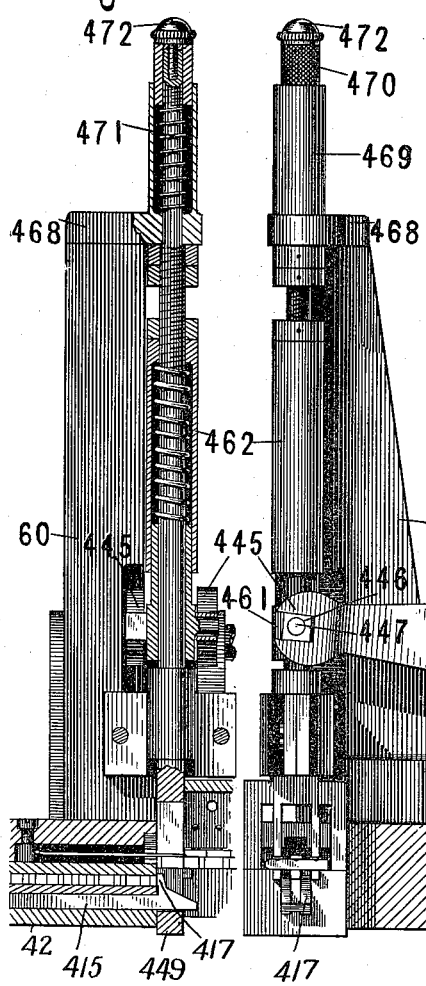
Figure 112:
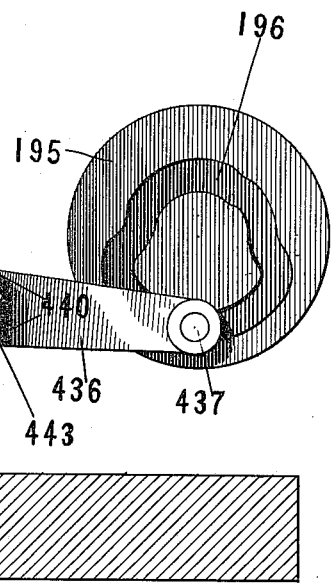
Figure 113:
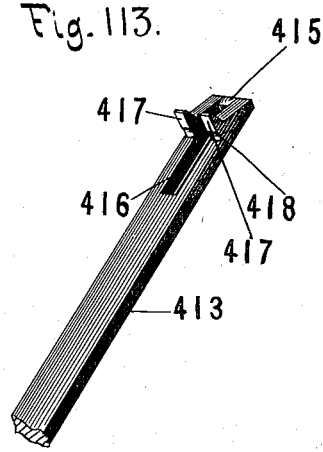
Figure 114:
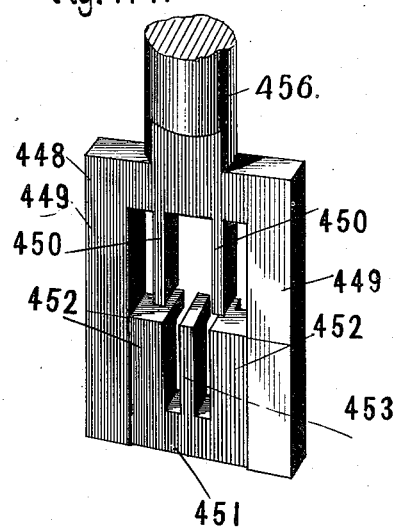
Figure 115:
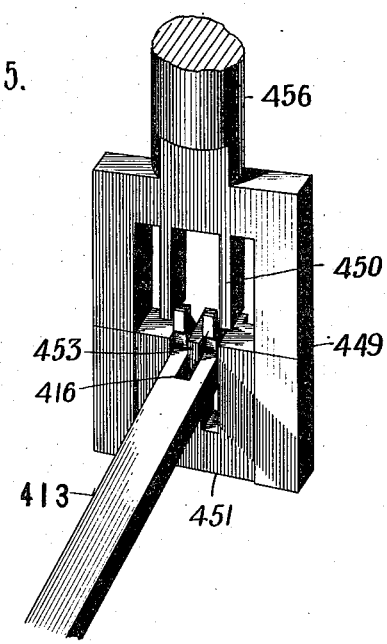
Figure 131:
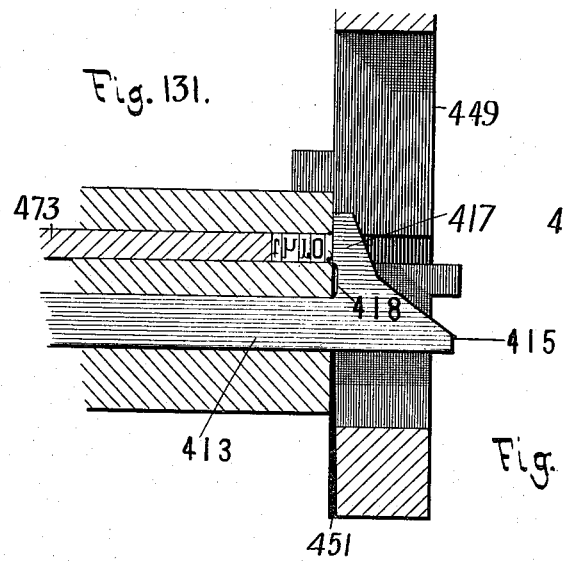
Figure 132:
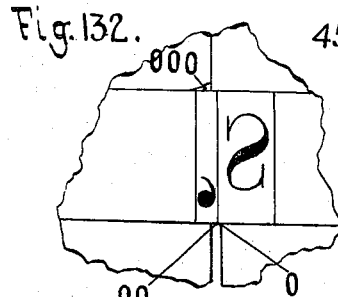
Figure 146:
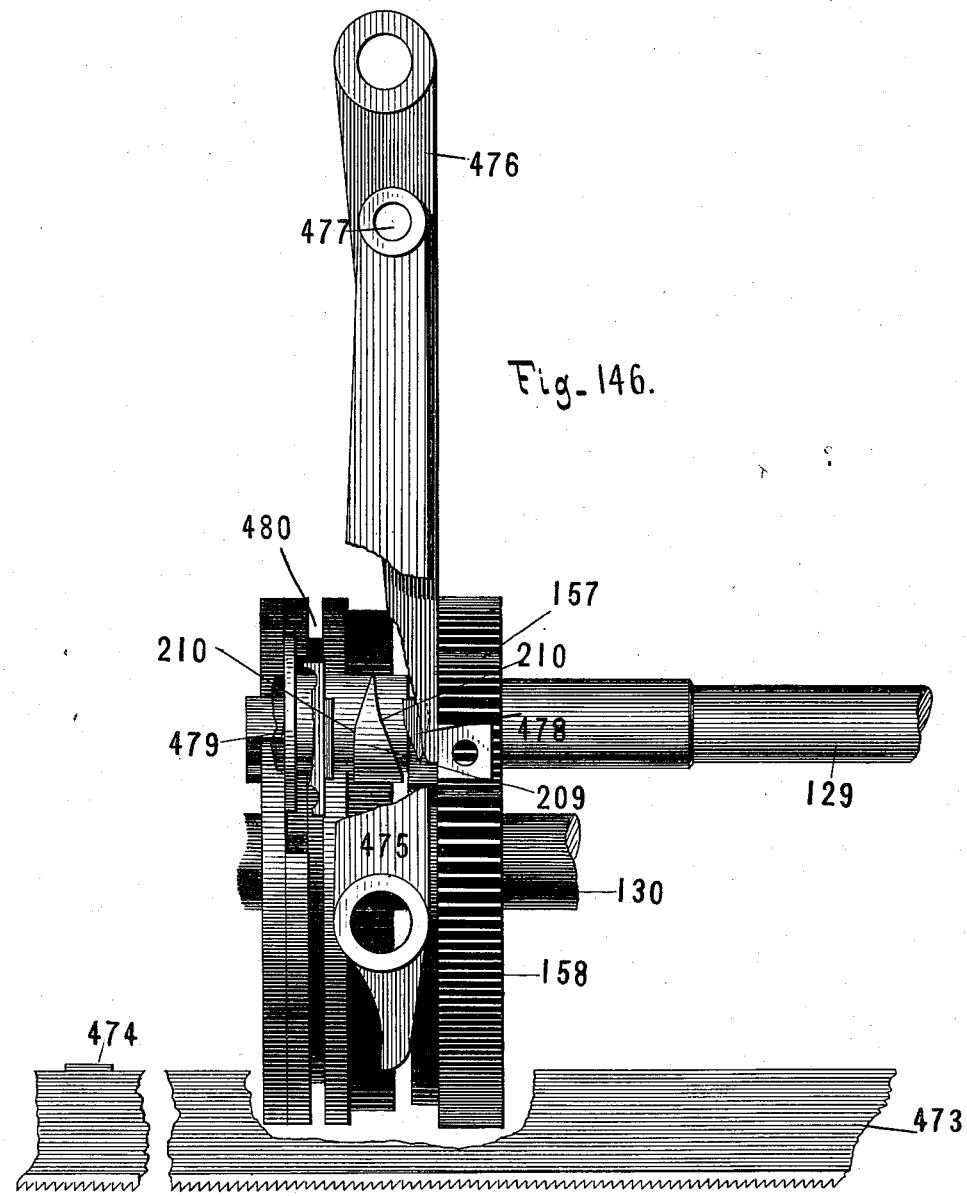
Figure 169:
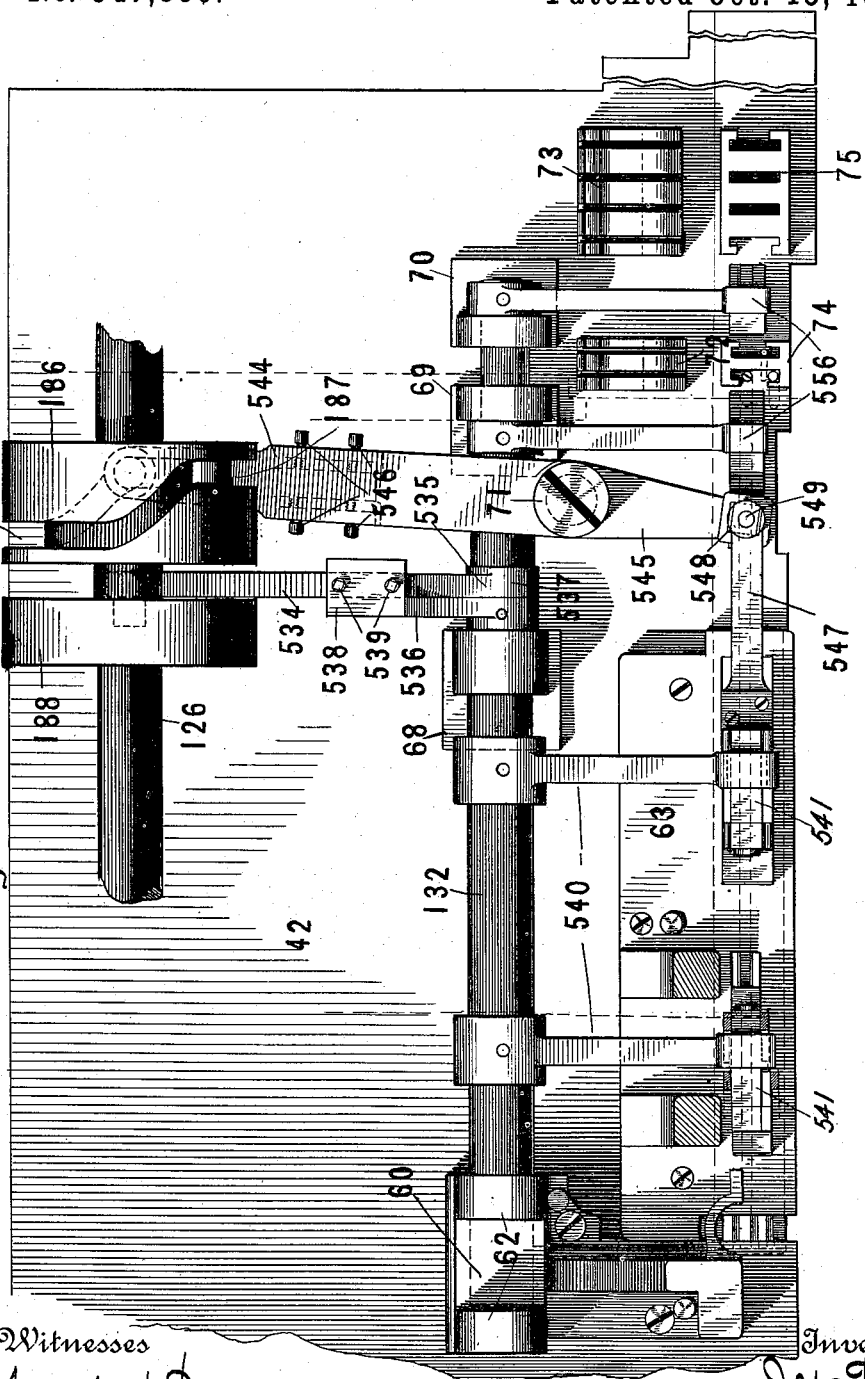
Figure 175:
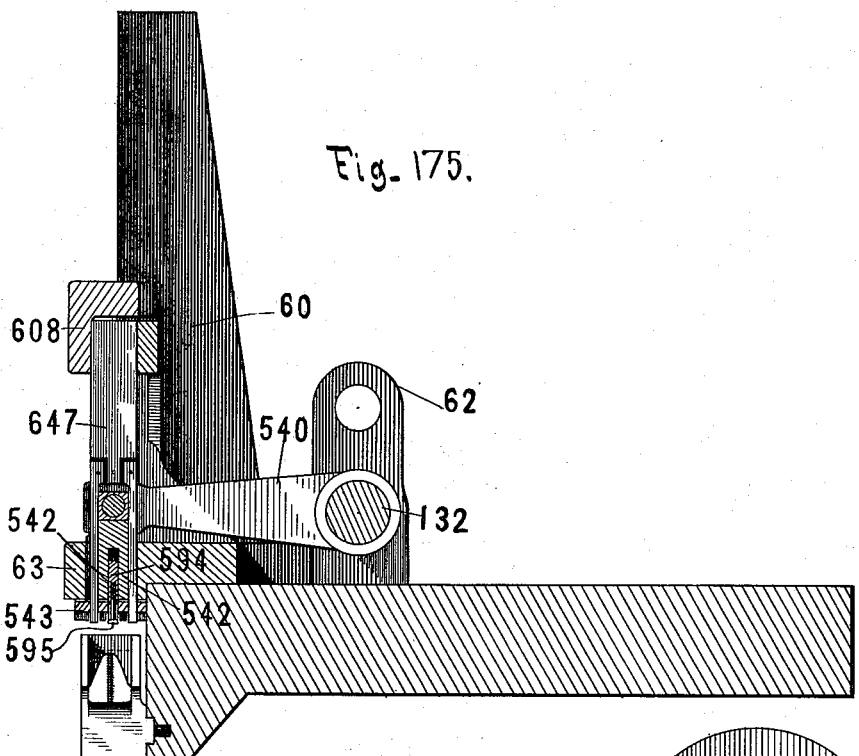
Figure 176:
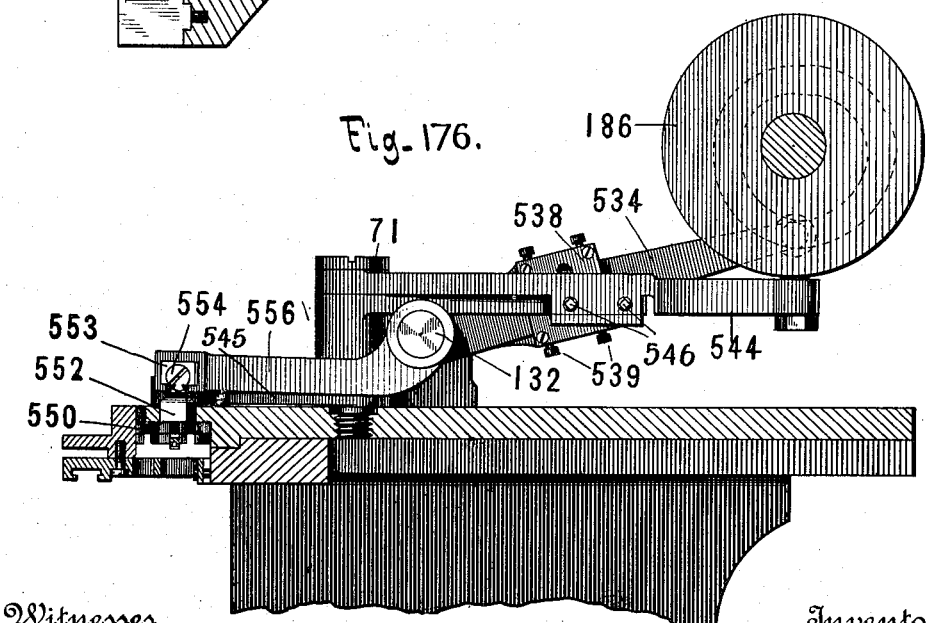
Figure 179:
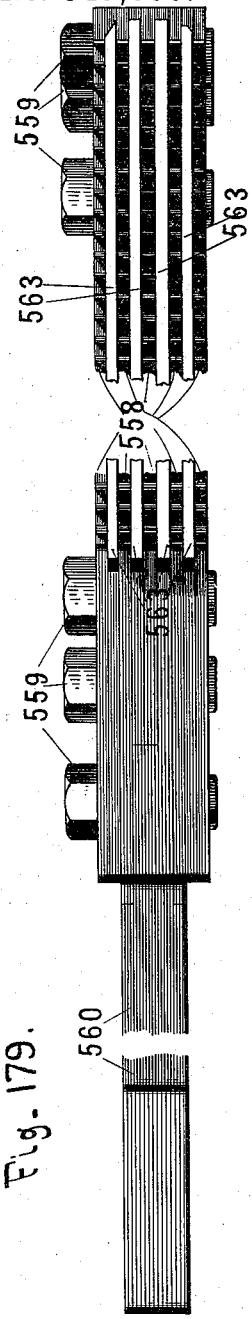
Figure 180:
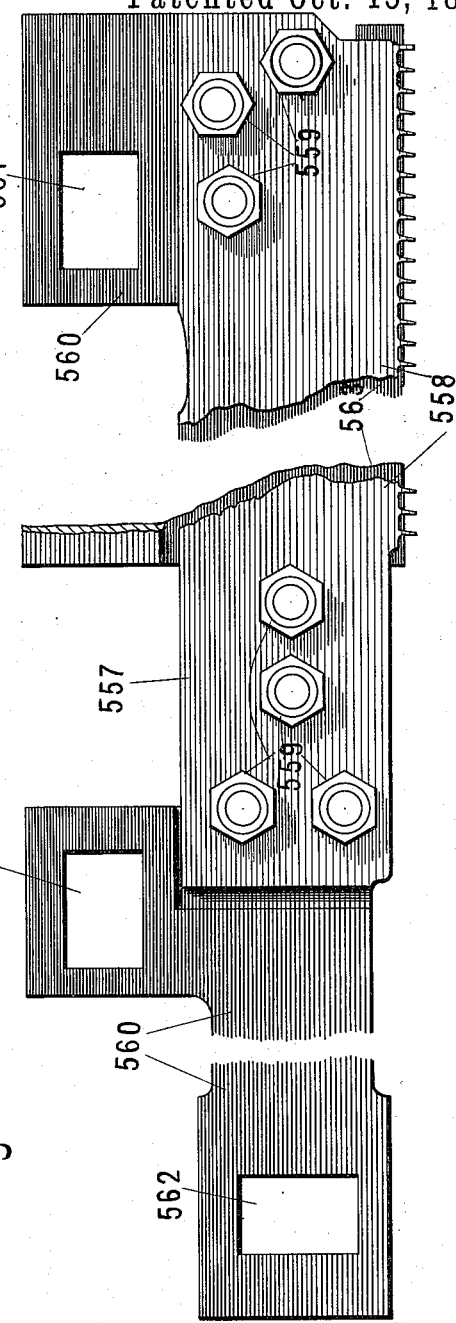
Figure 198:
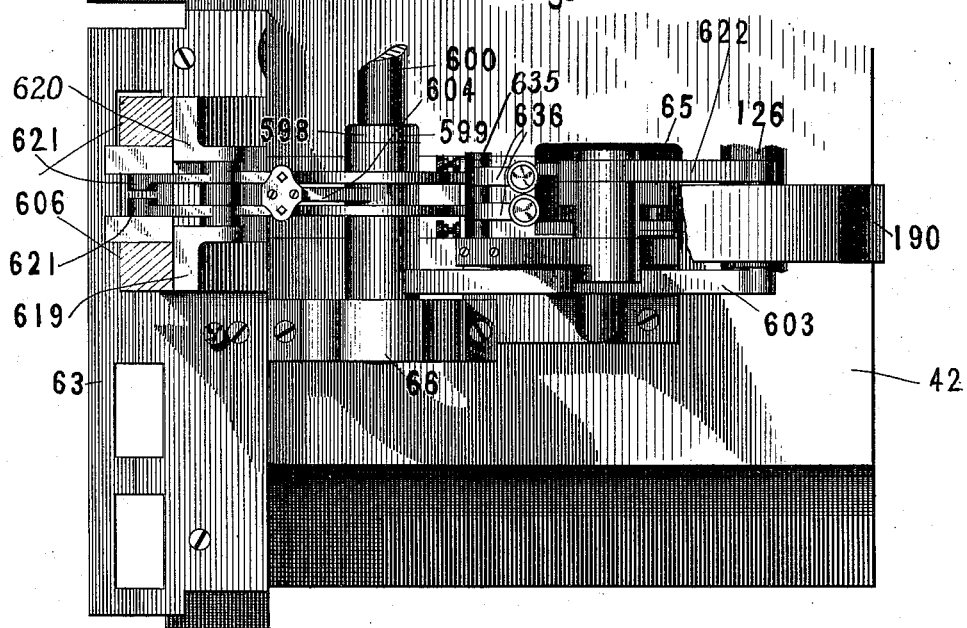
Figure 199:
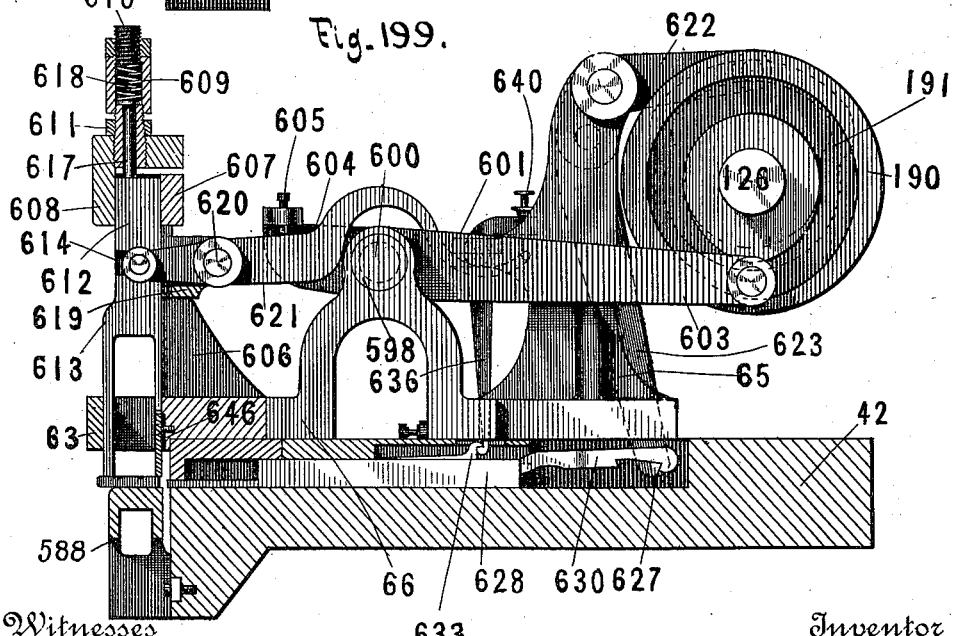
Figure 204:
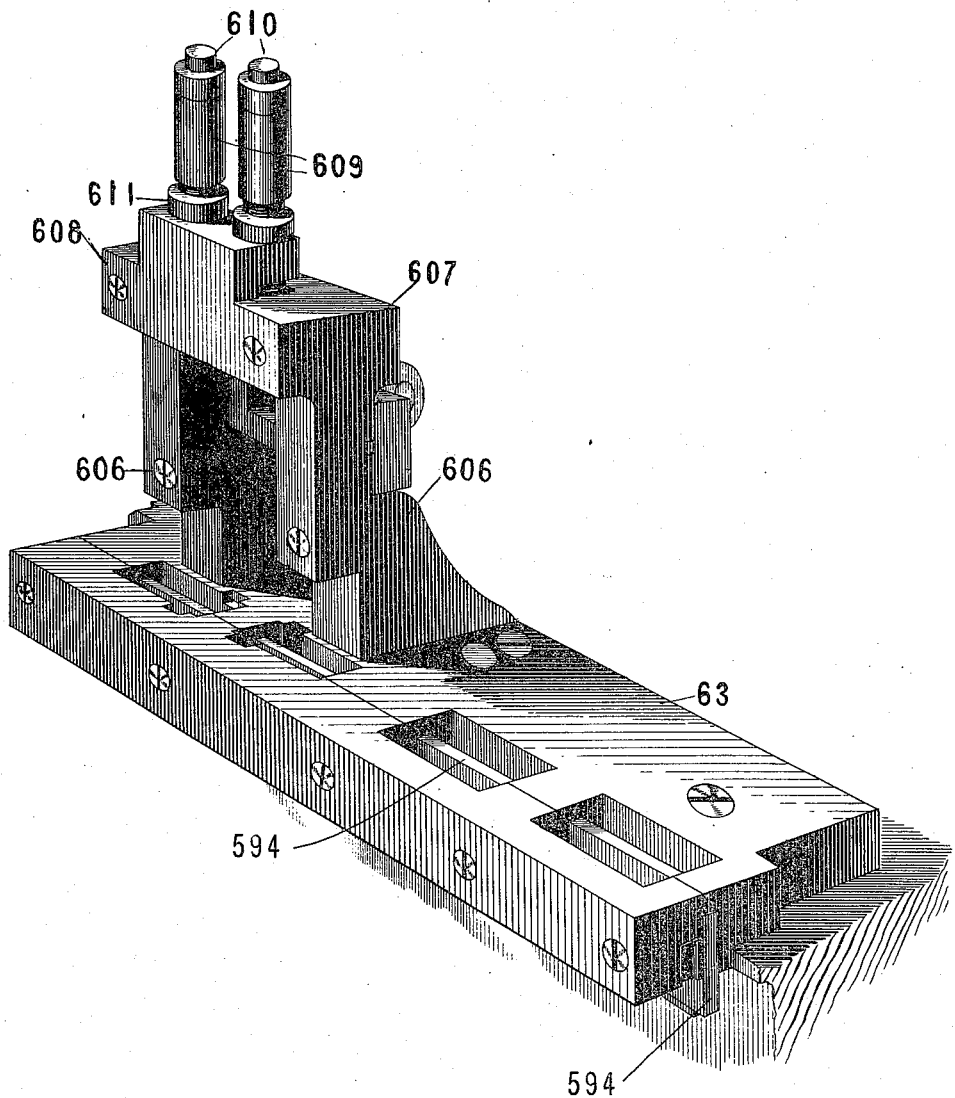
Figures 205, 206:
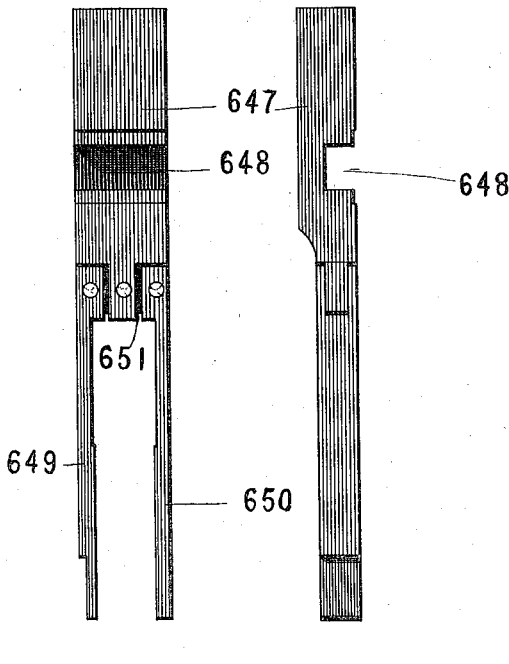
Figures 207, 208:
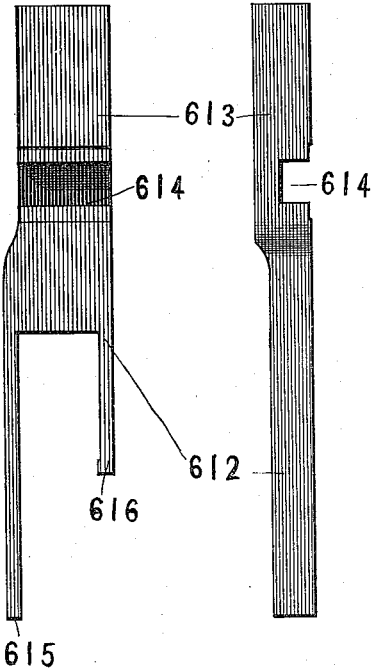
Figure 209:
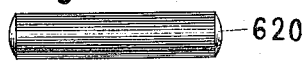
Figure 210:
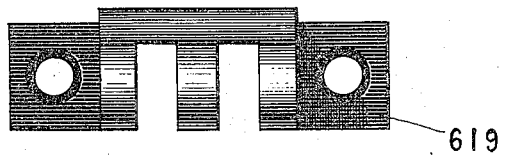
Figure 211:
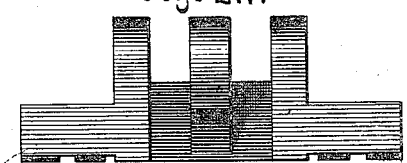
Figure 212:
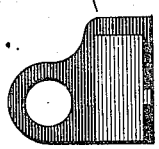
Figure 218:
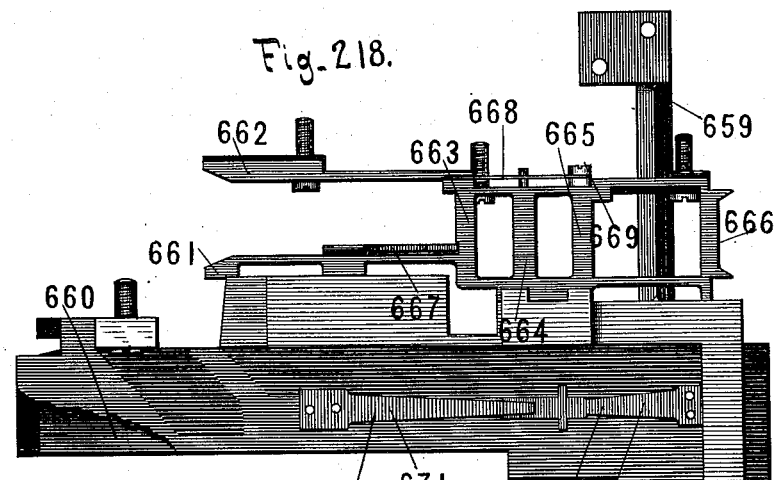
Figure 220:
Figure 219:
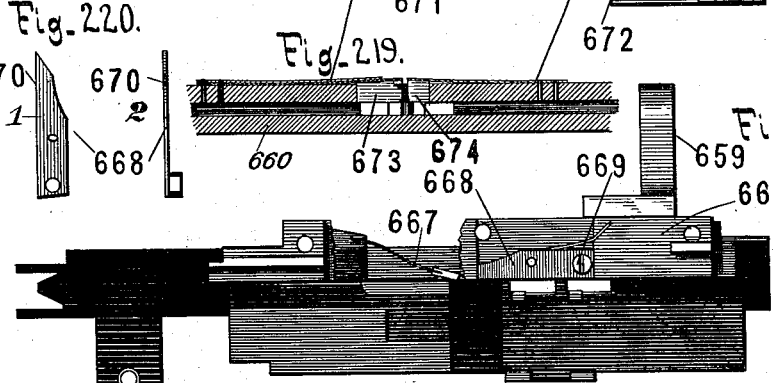
Figure 221:
Figure 222:
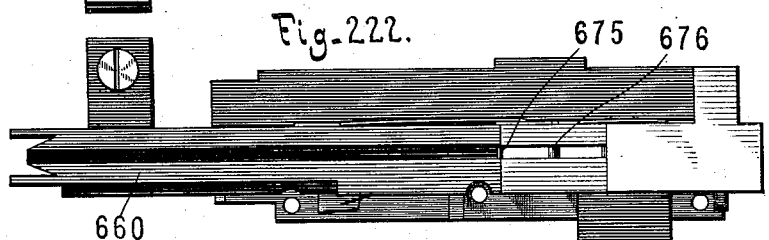
Figure 223:
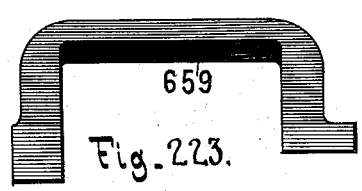
Figure 224:
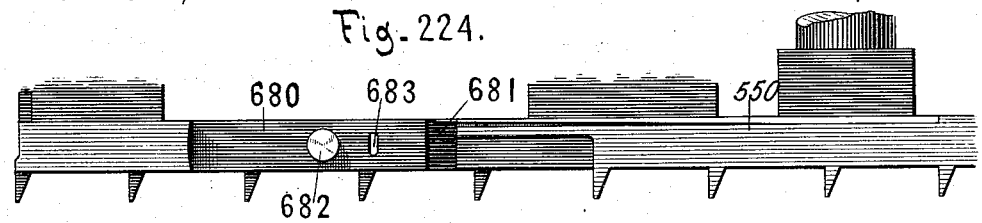
Figure 225:
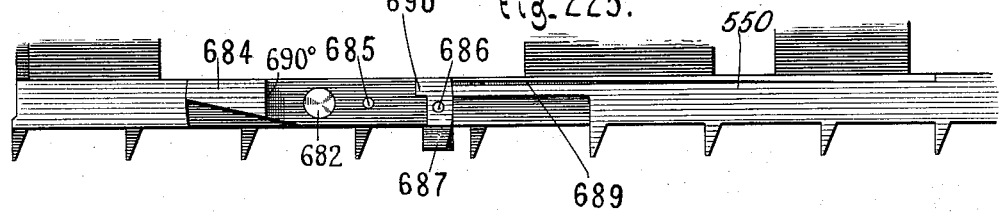
Figure 226:
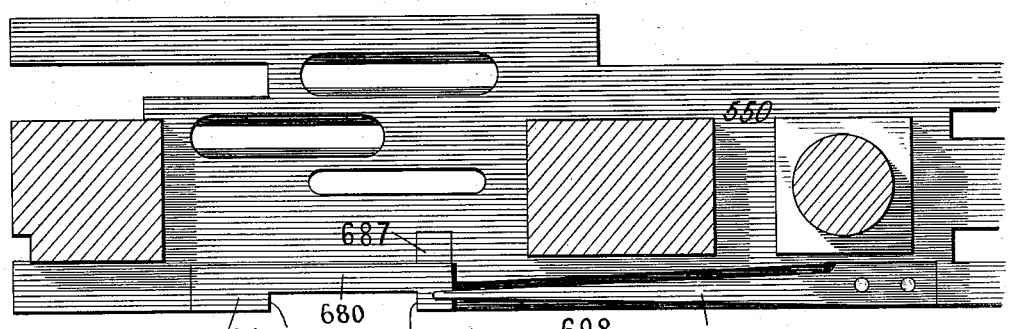
Figure 227:
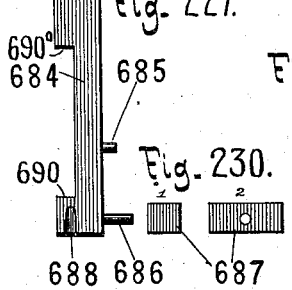
Figure 230:
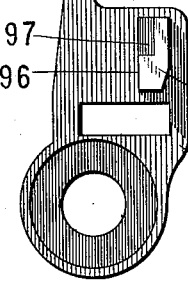
Figures 228, 229:
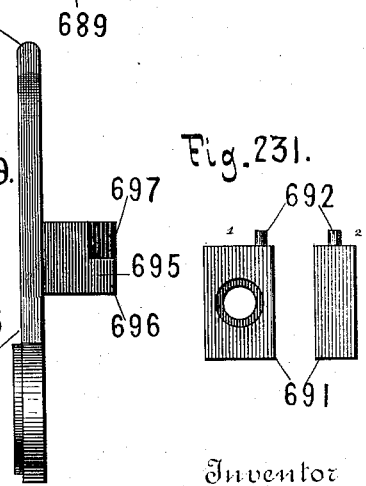
Figure 231:
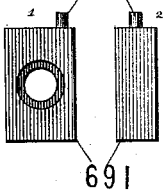
Figure 239:
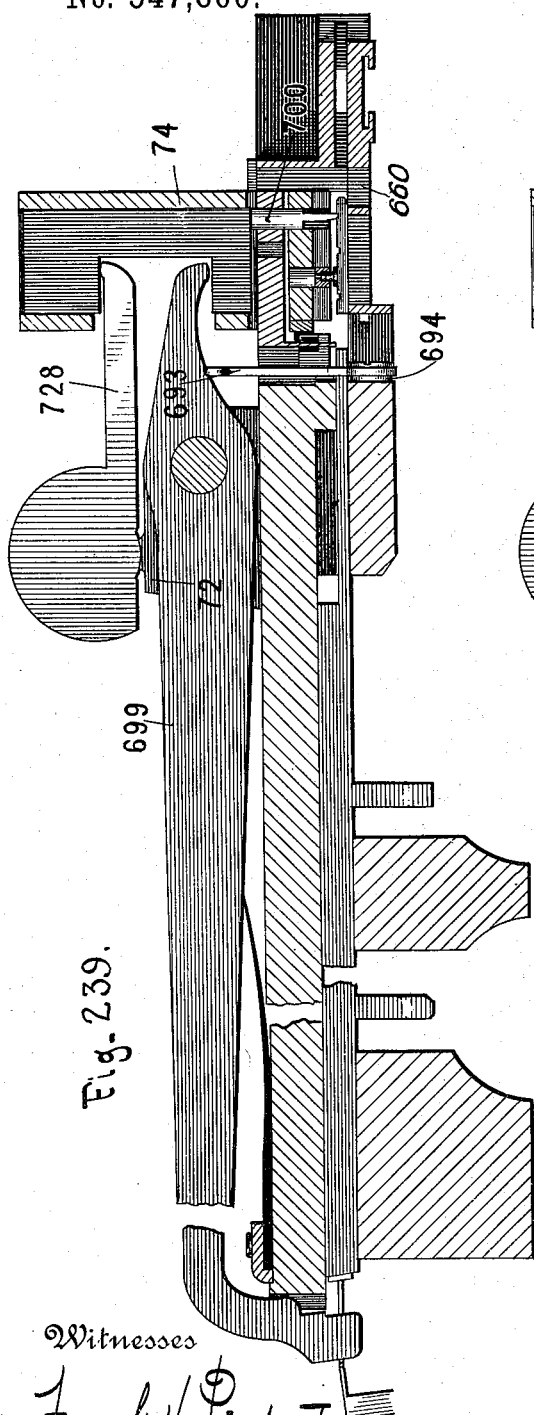
Figure 240:
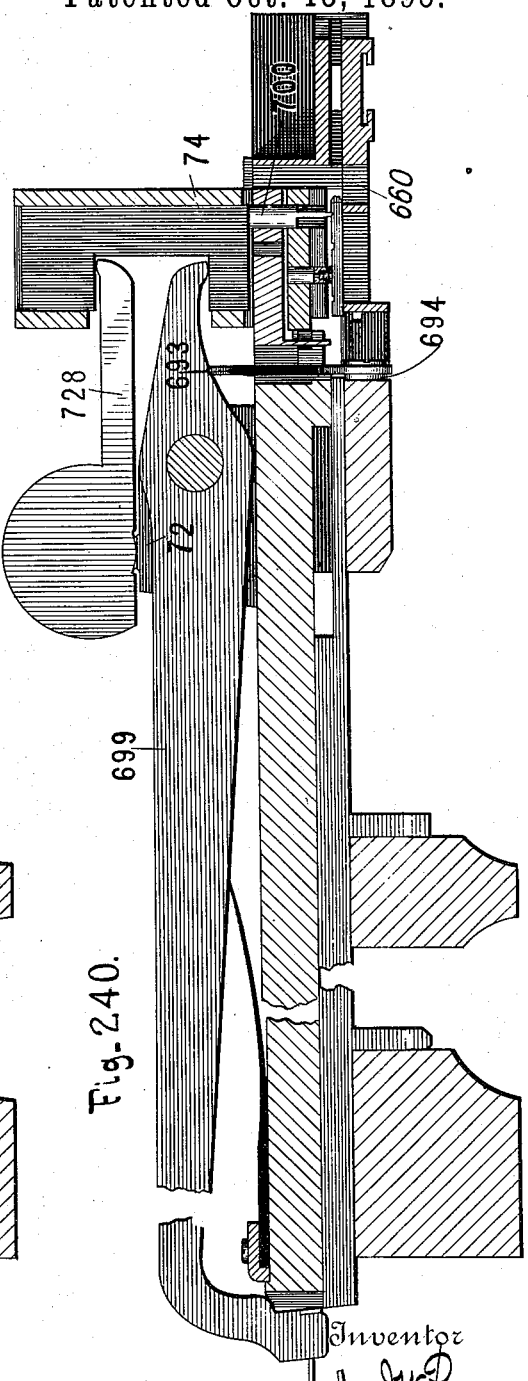
Figure 253:
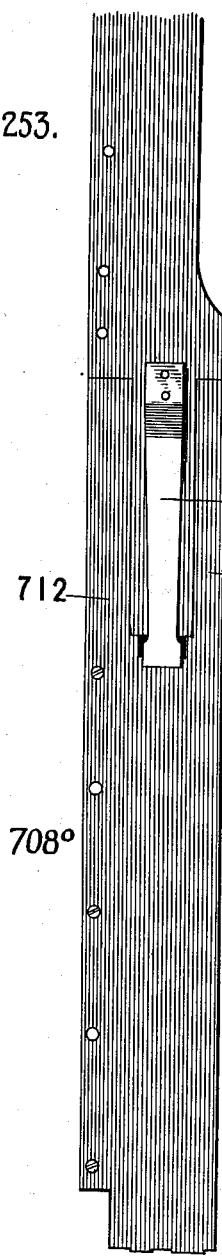
Figure 254:
Figure 255:
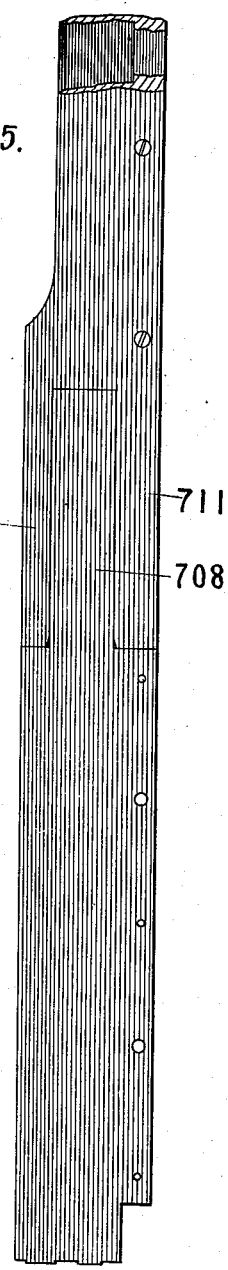
Figure 256:
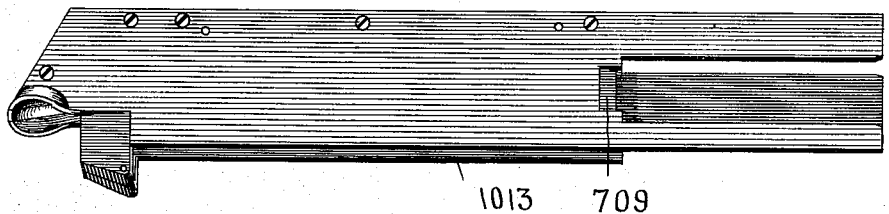
Figure 257:
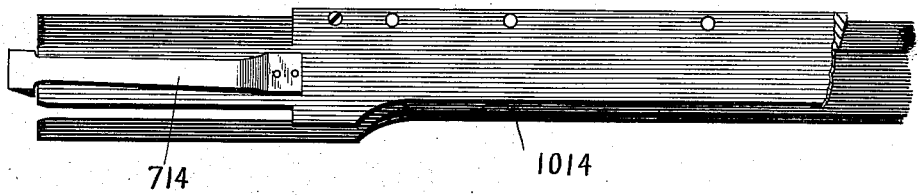
Figure 258:
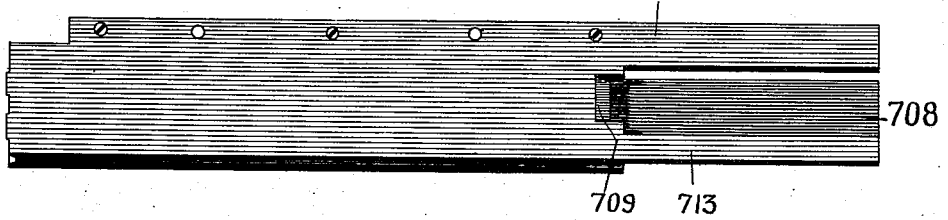
Figure 259:

In the drawings, Figure 1 represents a plan view of the main base-plate with the main supporting parts located thereon, and also certain parts which are located in the main uprights 11 and 12. This view is taken from the front side of the machine. Fig. 2 is a perspective view of the bearing-bracket 26; Fig. 3, a perspective view taken from the rear side of the machine of the supporting-arm 23, having the relieving-spring of the time-lock shaft; Fig. 4, a perspective view of the pi-channel support 27, the raceway extension 28, and a portion of the pi-channel; Fig. 5, a front view of the distributer-plate 36, which plate is supported between the main uprights 11 and 12. This plate is provided with a series of bearing-standards 760, hereinafter referred to, extending across the plate nearly the entire width of the same; but for the purpose of reducing the amount of drawing required they are represented as extending over a portion of the distance. Fig. 6 is a plan view of the distributer-plate 36 with some of the returning-springs 742 in place, and Fig. 7 a left-hand side view of the same; Fig. 8, a perspective view of the distributer-plate 36 with the cross-bar 735 for supporting the upper ends of the ward-plates in position, and also three selecting-levers and ward-plates and several returning-springs 742 in their proper relative positions, the view being taken from the top side of the plate; Fig. 9, a perspective view of the same taken from the bottom side of the plate; Fig. 10, a vertical cross-section of the base-plate and the distributer-galley plate 42; Fig. 11, a plan view, enlarged, of one-half of the distributer-galley plate, this view representing a portion of the left-hand end of the same; Fig. 12, a similar view of the portion of the galley-plate at the right-hand end of the same; Fig. 13, a perspective view of the justifying-stand 49; Fig. 14, a side view of the supporting block or plate 63 employed in connection with the comb, spring-raceway, and testing-plungers and levers, the testing-plungers being shown in position above the raceway 588; Fig. 15, a rear view of the supports 65 and 66 and the compound lever 622 623 of the ejecting mechanism of the testers; Fig. 16, a plan view of a portion of the parts near the right-hand end of the machine, the view being taken from the front side of the machine, near the right-hand end of the same; Fig. 17, a similar view of a portion of the parts near the center of the machine, this view being taken from the front side of the machine; Fig. 18, a plan view of a portion of the distributing mechanisms, this view being taken from the front side of the machine, near the right-hand end of the same; Fig. 19, a plan view of a portion of the distributing mechanisms, this view being taken from the front side of the machine at the left-hand end of the same; Fig. 20, a view of the main upright 11 and the parts located thereon, taken from the right-hand side of the same; Fig. 21, a view of the main upright 12 and the parts located thereon, taken from the left-hand side of the same; Fig. 22, a view of the parts shown in Fig. 20, enlarged; Fig. 23, a view of the cam 207, showing the conformation of the groove 208; Fig. 24, a side view of the cam 207 and certain connected parts; Fig. 25, a side view similar to 150 with the bolt 484, hereinafter referred to, in a different position; Fig. 26, a front view of the bolt; Fig. 27, an end view of the bolt; Fig. 28, a bottom view of the same; Fig. 29, a view similar to 150 with the bolt-recess 481; Fig. 30, an end view of the cam 209, having the bearing-surface 210; Fig. 31, a side view of the same; Fig. 32, a side view of the cam 218; Fig. 33, a perspective view of the ring 1,056, employed in connection with the cam 218; Fig. 34, a perspective view of the ring 1,063, employed in connection with the same cam; Fig. 35, a perspective view of the body portion 1051 of the cam 218; Fig. 36, a perspective view of the remaining portion 1,065 of the cam 218; Fig. 37, a diagram illustrating the joint action of the cams of the line-feeding, feed-controlling, cut-off, and locking-bolt mechanisms; Fig. 38, a side view of the catch-box; Fig. 39, an end view; Fig. 40, a transverse section, and Fig. 41 a longitudinal section, of the same; Fig. 42, a perspective view of the distributer-galley frame 17 in its proper position upon the bed or base plate 1; Fig. 43, a front view of the same; Fig. 44, a vertical sectional view of the same, taken from the left-hand side; Fig. 45, a top view of the distributer-galley frame 17; Fig. 46, a perspective view of the rack-plate 255; Fig. 47, a perspective view of the gate or wide plunger 336; Figs. 48 and 49, perspective views of the galley; Fig. 50, a sectional view of the pawl-plate, the ratchet-wheel, and gear-wheel upon the hollow shaft 131; Fig. 51, a partial view of the left-hand end of the hollow shaft; Fig. 52, a partial view of the right-hand end of the hollow shaft; Fig. 53, an end view of the pawl-plate and pawls; Fig. 54, an end view of the ratchet-wheel; Fig. 55, a front view, partially in section, of the clamping mechanism; Fig. 56, a perspective view of the annular block 287; Fig. 57, a perspective view of the collar 282; Fig. 58, a perspective view of the collar 280; Fig. 59, an end view of the sleeve 284; Fig. 60, a longitudinal view of the sleeve 284; Fig. 61, an end view of the screw-plug 292; Fig. 62, a side view of the same; Fig. 63, a sectional view of the hollow shaft 131; Fig. 64, a similar view with the parts shown in their unclamped position; Figs. 65 and 66, taken in connection with each other, a partial front view of the distributer-galley frame 17, with the mechanisms located thereon in their relative positions; Fig. 67, a right-hand side view of the mechanisms for clutching the hollow shaft, the parts being shown in the position occupied by them when the shaft is clutched; Fig. 68, a similar view with the parts in the position occupied by them when the shaft is unclutched; Fig. 69, a perspective view of the mechanism employed in connection with the movable pin 246 with the head 247, the parts being shown in the position occupied by them when the movable pin is in position to hold the galley in place; Fig. 70, a similar view with the parts in the position occupied by them when the movable pin is in position to permit the removal of the galley; Fig. 71, a detached view of the slotted plate 248; Fig. 72, a perspective view of the nut 308; Fig. 73, a perspective view of the collar 305; Fig. 74, a perspective view of the clutch 322 323; Fig. 75, a transverse sectional view of the V-shaped projection 326; Fig. 76, a side view of the distributer-galley frame 17, taken from the left-hand side, showing the mechanism for advancing the column; Fig. 77, a side view of the mechanism for advancing the column with the parts in the position occupied by them when the pawl-plate 276 is in its extreme backward position; Fig. 78, a similar view with the parts in the position occupied by them when the pawl-plate is in its extreme forward position; Fig. 79, a plan view of the mechanism for removing the upper line from the column, the gate being shown in its rearward position; Fig. 80, a similar view with the gate shown in its forward position; Fig. 81, a plan view of the mechanism for advancing the type-line and also the constant-pressure mechanism; Fig. 82, a partial sectional view of the supporting-bracket 56; Fig. 83, a detached view of the headed pin 399; Fig. 84, a detached view, partially in section, of the cap 401 containing the spring 402; Fig. 85, a top view of the pawl slide-block 376; Fig. 86, a front view of the same; Fig. 87, a bottom view of the same with the pawls in their engaging position; Fig. 88, a similar view with the pawls in their disengaged position; Fig. 89, a view of the plate 388, having the contact-studs 391 and 392; Fig. 90, an end view of the pawl slide-block without the plate 388; Fig. 91, a similar view with the plate 388; Fig. 92, an end view of the plate 388; Fig. 93, a side view, partially in section, of the mechanism for advancing the line and also the mechanism for moving the pawls out of engagement with the line-follower bar, the view being taken from the right; Fig. 94, a plan view of the feed-controlling mechanism; Fig. 95, a front view of the same; Fig. 96, a view, partially in section, of the mechanism for locking and unlocking the cams 197 and 199 and also the safety appliance employed in connection therewith. In this figure the section of the cams 197 and 199 is taken on the line O O, Fig. 99. Fig. 97 is a partial side view of the cams 197 and 199 and the locking-bolt mechanism employed in connection therewith; Fig. 98, a perspective view of the locking-bolt 427; Fig. 99, a side view of the feed-controlling lever 403 in connection with the parts employed therewith; Fig. 100, a side view of the cap 424; Fig. 101, a side view of the coiled spring 425; Fig. 102, a side view of the collar 422 and the leather disk 423 contained therein; Fig. 103, a perspective view of the supporting-plate 643 employed in connection with the trip mechanism of the testers; Fig. 104, a perspective view of the hook-bar 413 of the feed-controlling mechanism; Fig. 105, a plan view of the feed-advancing, the feed-controlling, and the cut-off mechanism. Fig. 106 is a plan view of the cut-off mechanism; Fig. 107, a side view of the cut-off mechanism; and Fig. 108, a front view, partially in section, of the same, the cut-off frame in Figs. 244 and 245 being shown in its normal or lowest position; Figs. 109 and 110, views similar to those shown in Figs. 107 and 108, with the exception that the cut-off frame is shown raised to its first upper position; Figs. 111 and 112, views similar to those shown in Figs. 107 and 108, with the exception that the cut-off frame is shown raised the full distance to its second and extreme upper position; Fig. 113, a perspective view of the feed-controlling hook 415; Fig. 114, a perspective view of the cut-off frame; Fig. 115, a perspective view of the cut-off frame with the feed-controlling hook in the proper position relative thereto; Fig. 116, a side view of the bonding-screw 472; Fig. 117, a side view of the sleeve 470; Fig. 118, a side view of the bonding-nut 465; Fig. 119, a side view of the cylindrical cover 462; Fig. 120, a rear view of the cap-block 468; Fig. 121, a side view of the cut-off frame and the rod attached thereto; Fig. 122, a side view of the coiled spring 471; Fig. 123, a side view of the binding-nut 467; Fig. 124, a side view of the adjusting-nut 466; Fig. 125, a side view of the coiled spring 464; Fig. 126, a side view of the sliding sleeve 461; Fig. 127, a bottom view of the base portion 451; Fig. 128, a top view of the same; Fig. 129, a side view of the cut-off frame and its rod with the parts located thereon; Fig. 130, an enlarged sectional front view of the cut-off frame; Figs. 131 to 139, inclusive, views illustrating the operation of the feed-advancing, the feed-controlling, and the cut-off mechanisms; Fig. 132, an enlarged view showing the specific construction of the upper portion of the raceway at the end next the cut-off; Fig. 140, a plan view of the mechanism for returning the line-follower bar located beneath the distributer-galley plate 42 with plate broken away to expose the mechanism. The line-follower bar in this view is in its extreme rearward position. Fig. 141 is a similar view with the line-follower bar in its extreme forward position; Fig. 142, a front view of this mechanism and other mechanisms employed in connection therewith, the wedge-bar 478 of the line-follower-bar-returning mechanism being shown in the same position as the wedge-bar 478 in Fig. 141; Fig. 143, a sectional view of the group of cams 211 with the mechanism for locking the same; Fig. 144, a partial view of the gear-wheel 158; Fig. 145, a view similar to the view in Fig. 278 with the exception that the wedge-piece 478 is shown in the same position as the wedge-piece 478 in Fig. 140; Fig. 146, an enlarged plan view of the wedge-piece 478 with the actuating parts employed in connection therewith, the position of the wedge-piece in this view corresponding with the position shown in Fig. 140; Fig. 147, a similar view to that shown in Fig. 146, with the exception that the wedge-piece is shown moved into the left-hand position, being the same as that shown in Fig. 141; Fig. 148, a similar view to that shown in Fig. 147, with the exception that the wedge-cam 209 has been moved into contact with the wedge-piece 478; Fig. 149, a similar view to that shown in Fig. 148 with the wedge-cam 209 shown in dotted lines moved far enough to cause the engagement of the locking-bolt 484 with the actuating gear-wheel 158; Fig. 150, a similar view showing the wedge-piece 478 moved into its right-hand position to cause the disengagement of the bolt 484 with the actuating gear-wheel 158; Fig. 151, a front view of the mechanism for advancing the type-line upon the raceway, and also the mechanism for disengaging the pawls of the pawl slide-block from the teeth of the line-follower bar; Fig. 152, a plan view of the time-lock spring 531; Fig. 153, an edge view of the same; Fig. 154, a bottom view of the lever 530; Fig. 155, a side view of the same; Fig. 156, a front view of the push-bar 528; Fig. 157, a front view of the push-pin 524. Figs. 158, 159, and 160 are plan views illustrating the operation of the mechanism for engaging the pawls with and disengaging them from the teeth of the line-follower bar. In Fig. 158 the upper end of the lever 492 is in its right-hand position, this position causing the engagement of the pawls with the line-follower bar. In Fig. 159 the end of the lever 492 is in its left-hand position, this position causing the disengagement of the pawls with the line-follower bar. In Fig. 160 the end of the lever occupies a central position between the contact-studs 391 and 392, this position permitting the reciprocating movement of the pawl slide-block without contact with the end of the lever and without the engagement of the pawls; Figs. 161 and 162, front views of the mechanism for moving the wedge-piece 478 into position to cause the disengagement of the locking-bolt 484 from the actuating gear-wheel 158 when the eccentric-shaft has nearly completed its revolution. Figs. 163 to 167 are views illustrating the operation of the column-feed stop mechanism. Fig. 163 represents the pawls and the plate or bar 388 in their normal operative positions, the bar 388 being shown in its right-hand position and the ends of the pawls projecting through the openings 390 390 into position to cause the opposite ends of the pawls to engage with the teeth of the line-follower bar. The pawl slide-block 376 is shown in its extreme left-hand position and the column-feed stop push-pin 524 is shown in its normal inoperative position. When the lever 492 is in this position, the plate 388 is carried by the pawl slide-block 376 in its reciprocating movement without being affected by the lever 492, the space between the pins 391 392 being sufficient to allow this movement. Fig. 164 represents the pawl slide-block 376 moved into a right-hand position by the line-feeding lever and the lever 492 moved to the left from its normal position by the action of the contact portion 523 upon the push-pin 524 and the intermediate mechanism. The bar 388, which normally moves with the pawl slide-block 376, is held from movement to the right by contact of the pin 391 with the lever 492 and the pawls by these combined movements are disengaged from the line-follower bar. Fig. 165 represents the pin 524 in the position occupied by it when it has been raised by the contact of the portion 523 with its lower end. By this action the mechanism is actuated to move the lever 492 into its left-hand position. The pawl-block 376 is also shown in its extreme left-hand position. In the operation of the machine the position of the parts shown in Fig. 165 precedes that shown in Fig. 164. Fig. 166 represents the pawl slide-block moved again into its left-hand position by the action of the line-feeding lever, but without affecting at all the relative position of the bar 388, the pawls consequently still remaining in their disengaged position. Fig. 167 represents the stop-pin 524 pushed downward into its normal position, the lever 492 returned to its right-hand position by the reaction of the spring 503, the bar 388 moved into its right-hand position by the contact of the stud 392 with the lever 492, and the pawls consequently in their engaging position. Fig. 168 represents a front view of the main and auxiliary portions of the short comb and the raceways employed in connection therewith. The relation of the cut-off mechanism to the conveying mechanism is also shown at the left-hand end of the comb; Fig. 169, a plan view of the corresponding portion of the machine shown in Fig. 168; Fig. 170, a plan view of the main portion 543 and the auxiliary portion 550 of the short comb with the blocks 541 and the standards 542 employed in connection with the main portion and the standards 552 employed in connection with the auxiliary portion; Fig. 171, a front view of the same; Fig. 172, a bottom view of the main portion 543 and the auxiliary portion 550; Fig. 173, detached views of the block 541 and the pivot-pin employed in connection therewith; Fig. 174, detached views of the quadrangular blocks 553 and the parts employed in connection therewith; Fig. 175, a side view of one of the lever-arms 540 with the connecting-standard 542 in section to show its bifurcated construction, by means of which connection is made with the comb-plate 543 below the support 63. In this view, also, the second tester 647 and the raceways are shown. Fig. 176 is a side view of the compound levers 543 544, also the lever-arm 556, employed on the auxiliary portion of the short comb; Fig. 177, a partial view, enlarged, of the adjusting mechanism of the lever 564 for imparting longitudinal movement to the long comb; Fig. 178, a front view of the mechanism for imparting the longitudinal and vertical movement to the long comb; Fig. 179, a partial plan view of the long comb and lower raceway employed in connection therewith; Fig. 180, a front view of the same in an inverted position; Fig. 181, a side view of the first registering mechanism, the parts in this view being shown in their normal position—that is, in the position of rest before the type is moved longitudinally upon the raceway; Fig. 182, a similar view with the parts in the position occupied by them when the type has been moved longitudinally upon the raceway; Fig. 183, a front view of the upper raceway 594 in an inverted position; Fig. 184, a bottom view of the same; Fig. 185, a plan view of the connecting-bar 582; Fig. 186, a rear view of the vertical lever portion 577; Fig. 187, a side view of the same; Fig. 188, a side view of the horizontal lever portion 576; Fig. 189, a side view of the connecting-bar 582; Fig. 190, a side view of the registering-plunger; Fig. 191, a top view of the same; Fig. 192, a bottom view of the horizontal lever portion 576; Fig. 193, a perspective view of one of the lower raceways 588; Fig. 194, a top view of the same with the type in position to be advanced by the registering-plunger; Fig. 195, a similar view with the type in its advanced position; Fig. 196, a rear view of the raceway-frame 588 in an inverted position; Fig. 197, a view of the raceway similar to Fig. 195 with a broken type in position thereon, the same having been acted on by the first registering-plunger and having been moved aside by the comb one step toward the tester. At this point the lower edge is caught upon an inclined portion of the rear wall of the raceway, and being held by this inclined portion it will be turned out of position at the next movement of the comb, and consequently will fall through the sides out of the machine. If the broken type, however, is not caught on the inclined portion, it will be carried by the comb forward upon the raceway to the first tester. Fig. 198 is a plan view of the testing mechanisms; Fig. 199, a right-hand side view of the same, the parts in this view being shown in their normal positions, excepting the first tester-plunger, which is resting on a perfect type; Fig. 200, a left-hand side view of the same with the first tester-plunger resting on an imperfect type and the type mechanism actuated to disengage the ejecting-plunger, but the plunger itself not yet carried forward to eject the imperfect type; Fig. 201, a partial side view of the testing mechanism with the second plunger resting on a perfect type; Fig. 202, a side view of the testing mechanisms with the ejecting-plunger carried forward to eject the imperfect type shown in Fig. 200; Fig. 203, a partial view of the testing mechanism with the second testing-plunger resting upon an imperfect type; Fig. 204, a perspective view of the support 63 and the vertical standards 606 rising therefrom and the parts supported thereby; Fig. 205, a left-hand side view of the second testing-plunger; Fig. 206, a rear view of the same; Fig. 207, a right-hand side view of the first testing-plunger; Fig. 208, a front view of the same; Fig. 209, a view of the pivot-pin 620 detached; Figs. 210, 211, and 212, detached views of the plate 619 for supporting the pivot-pin 620; Fig. 213, a side view of the compound lever 622 623; Fig. 214, a rear view of the same; Fig. 215, a side view of the lever 621; Fig. 216, an edge view of the same; Fig. 217, a right-hand side view of the second registering mechanism; Fig. 218, a plan view of the frame-piece 660, forming a portion of the lower raceways; Fig. 219, a sectional view showing the relative positions of the springs 671 672 and their blocks 673 674; Fig. 220, detached views of the latch-piece 668; Fig. 221, a rear view of the frame-piece 660 in an inverted position; Fig. 222, a front view of the frame-piece 660 in its proper position; Fig. 223, a detached view of the bracket-support 659; Fig. 224, a rear view, enlarged, of that part of the auxiliary portion of the short comb which is adapted to receive certain actuating parts of the wide-type selecting mechanism; Fig. 225, a similar view with the lever 684 and the vertically-moving bolt 687 in their proper relative positions; Fig. 226, a plan view of the same; Fig. 227, a plan view of the lever 684; Figs. 228 and 229, views of the actuating-lever 693; Fig. 230, detached views of the bolt 687; Fig. 231, detached views of the plate 691; Figs. 232 to 238, inclusive, except Figs. 235 and 237, front views illustrating the operation of the wide-type selecting mechanism. Figs. 235 and 237, respectively, are transverse vertical sectional views in detail of the parts 284 and 295 as they appear in different relative positions with respect to each other; Figs. 239 and 240, side views of the same; Fig. 241, a front view of the mechanism for actuating the regular pi-type driver and of the regular pi-raceway, the driver-bar being represented in its backward position; Fig. 242, a partial bottom view of the plate forming the upper side of the regular pi-raceway. Fig. 243 is a longitudinal sectional view in detail of a portion of the regular pi-raceway, showing the friction-studs for controlling the movement of the type; Fig. 244, a plan view of a part of the raceway-frame 660; Fig. 245, a similar view of that shown in Fig. 241 with the driver-bar shown in its forward position; Fig. 246, a front view of the regular pi-driver bar; Fig. 247, an end view of the same; Fig. 248, a top view of the same; Fig. 249, a side sectional view of the upper end of the long arm of the bell-crank lever 702, showing the maner of attaching the same to the square block which rests in the yoke 705; Fig. 250, an end view taken from the left-hand side of the parts shown in Fig. 252; Fig. 251, a vertical section through the lower supporting-block 96 of the transfer-channels, taken from the right-hand side; Fig. 252, a front view of the upper and lower supporting-blocks 96 and 97 with a space-channel represented in its proper position; Fig. 253, a partial view of the base and upper portions of one of the auxiliary transfer space-channels, taken from the left-hand side of the same; Fig. 254, a front view of the same; Fig 255, a similar view taken from the right-hand side of the same; Fig. 256, a view of one of the base portions located on the justifying-stand which is employed in connection with the upper portion of the auxiliary transfer space-channels, this view being taken from the left-hand side; Fig. 257, a view of the upper portion employed in connection with the base portion shown in Figs. 256 and also in connection with the lower portion shown in Fig. 258; Fig. 258, a view of one of the base portions held in the supporting-block 96; Fig. 259, a sectional view through the spring-tongue 714, Fig. 257, and adjacent parts; Fig. 260, a plan view taken from the rear of one half portion of the ward-lifting rock-shaft 122, the right-hand end portion being shown in this view and the other half portion being shown in Fig. 263; Fig. 261, a cross-section of one portion of the rock-shaft 122 on the line o o, Fig. 260; Fig. 262, a partial view of the mechanism for adjusting the position of the rock-shaft relatively to the actuating-lever 716; Fig. 263, a plan view taken from the front of one half portion of the ward-lifting rock-shaft 122, the left-hand portion being shown in this view. This figure and Fig. 260, taken together, give a complete plan view of the ward-lifting rock-shaft. Fig. 264 is a side view of the main upright 12 with the ward-lifting mechanism located thereon. Portions of the selecting mechanism are also shown in this view. Fig. 265 is a left-hand side view inverted of the actuating-lever 716; Fig. 266, a right-hand side view of the companion lever-arm 724; Fig. 267, views of the ward-plate 731; Fig. 268, views of the actuating-bolt 741; Fig. 269, a side view of the selecting-lever 738; Fig. 270, an enlarged bottom view of the upper raceway employed in connection with the auxiliary portion of the short comb; Fig. 271, a top view of the selecting-lever 738; Fig. 272, a rear view of the raceway shown in Fig. 434; Fig. 273, a bottom view of the same; Fig. 274, detached views of the various parts; Fig. 275, a rear view of the locking-bolt mechanism which is employed in connection with the lever 716 of the ward-lifting rock-shaft; Fig. 276, a left-hand side view of the same. Fig. 277 represents sectional detail views of the parts 716 and 759, Fig. 275, as they appear in their different relative positions; Fig. 278, a side view of one of the main selecting-levers 738 and the ward-plate employed in connection therewith, the lower end of the trying-stud 734 being shown in position above the type, but not in contact with it; Fig. 279, a similar view with the trying-stud resting upon the top of the type, but not registering with the same, so as to descend into the nick. In this position of the trying-stud the ejecting mechanism is not actuated, but the type by the next movement of the comb is conveyed along the raceway another step into position to be acted upon by the trying-stud on the next ward-plate. Fig. 280 is a similar view with the trying-stud registering with the nick of the type. In this position of the parts the actuating-bolt 741 of the selecting-lever 738 is in position opposite the ends of the fingers 748 and consequently by the action of them at the proper time the bolt 741 will be caused to strike the rear end of the ejecting-plunger 751 and move the same forward to bring the rear stud 752 within the range of action of the forwarding carrier-blade 755, shown in Fig. 282. By this action the plunger 751 will be carried forward to eject the type from the main raceway onto the ledge within the range of action of the lifting mechanism, by means of which latter it will be raised at the proper time into the proper character-channel of the type-case. Fig. 281 is a similar view with the parts in the position occupied by them when no type is presented for selection; Fig. 282, a vertical section showing the main distributing mechanisms; Fig. 283, a detached view of the mechanism for adjusting the lever, by means of which longitudinal movement is imparted to the lifter-plates; Fig. 284, a front view of the mechanism for imparting longitudinal and vertical movements to the lifter-plates; Fig. 285, a front view of the back plate 775 of the lifter; Fig. 286, a rear view of the central plate 778 of the lifter in an inverted position; Fig. 287, a similar view of the front plate 781 in an inverted position; Fig. 288, a rear view of the plate portion 787 inverted; Fig. 289, a rear view of the plate portion 783 inverted; Fig. 290, a top view of the ledge and lifter plates united; Fig. 291, a transverse vertical sectional view of the lifter-plates; Fig. 292, a rear view of the parts shown in Fig. 290 in an inverted position; Fig. 293, a front view of the ledge-bar 793; Fig. 294, a transverse sectional view of the same with a portion of the arm 803 attached to the ledge; Fig. 295, a detached view of the pin 794, having the square block 795; Fig. 296, a sectional view of a portion of the ledge-bar 793 and the adjustable connecting-rod 792; Fig. 297, a plan view of the lever 789 with the end of the connecting-rod 792 attached thereto; Fig. 298, an end view of the lever 789 with the connecting-rod 792 attached thereto; Fig. 299, a bottom view of the ledge-bar 793; Fig. 300, a top view of the ledge with the ledge-bar attached; Fig. 301, a front view of the same; Fig. 302, a top view of the ledge-plates 799 and 801; Fig. 303, a front view of the same; Fig. 304, a transverse sectional view of the ledge-plates; Figs. 305 to 313, inclusive, views illustrating the operation of the ledge and lifter. Fig. 314: This sheet is introduced to illustrate the nicking system. Fig. 315 is a front view illustrating the main feeding stop mechanism. Fig. 316 represents the parts in their normal positions, the bearing edge of the bar 807 of the rock-shaft 124 not being in contact with the weight-plate 808 of any character-channel. The bearing end of the latch-piece 818 consequently rests upon the shelf portion 812 and holds the rod 813 and the bolt 814 in their proper positions. The feeding-lever 366 then is free to move to advance the line. Fig. 317 represents a portion of the type-case with a full view of one of the weight-plates 808. Fig.

Figure 341:
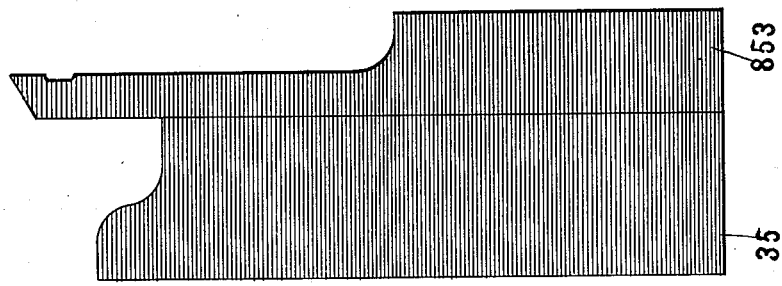
Figure 340:
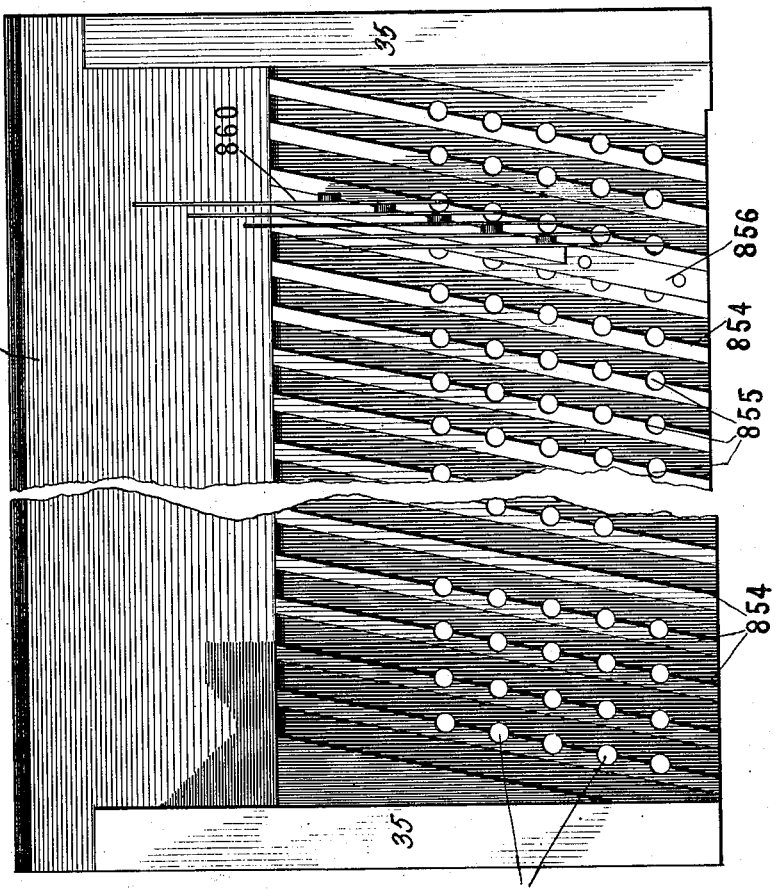
Figure 344:
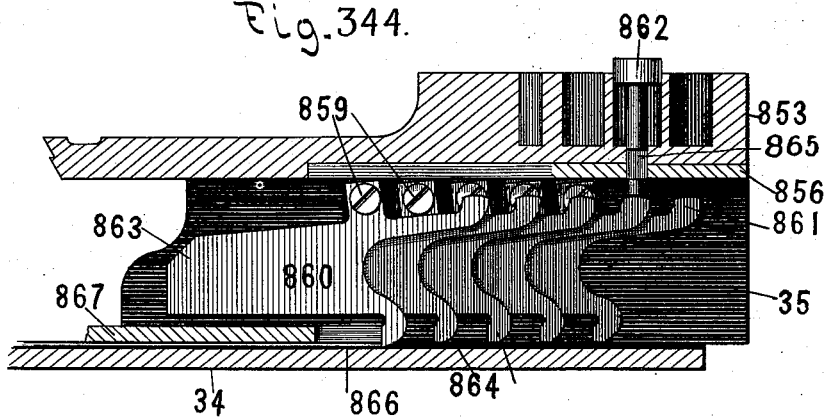
Figure 345:
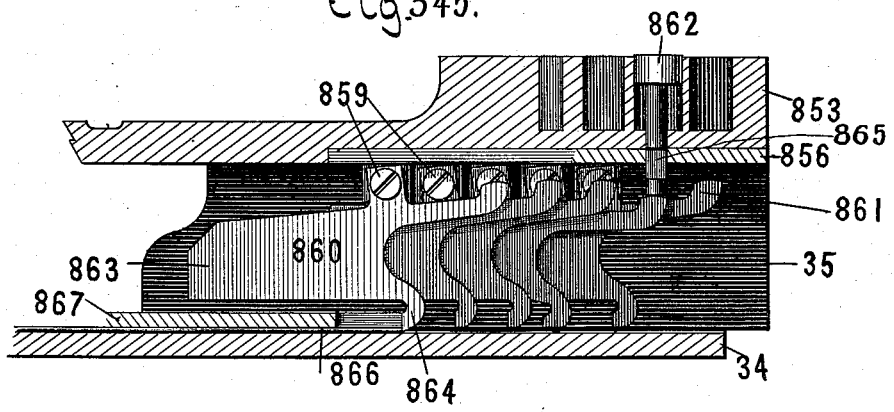
Figure 352:
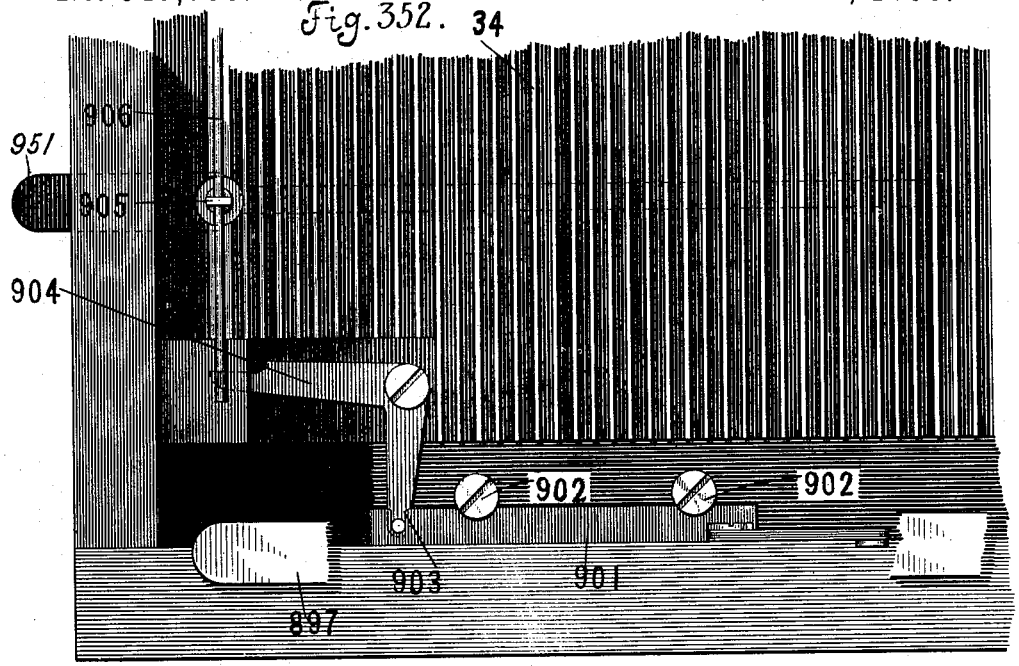
Figure 353:
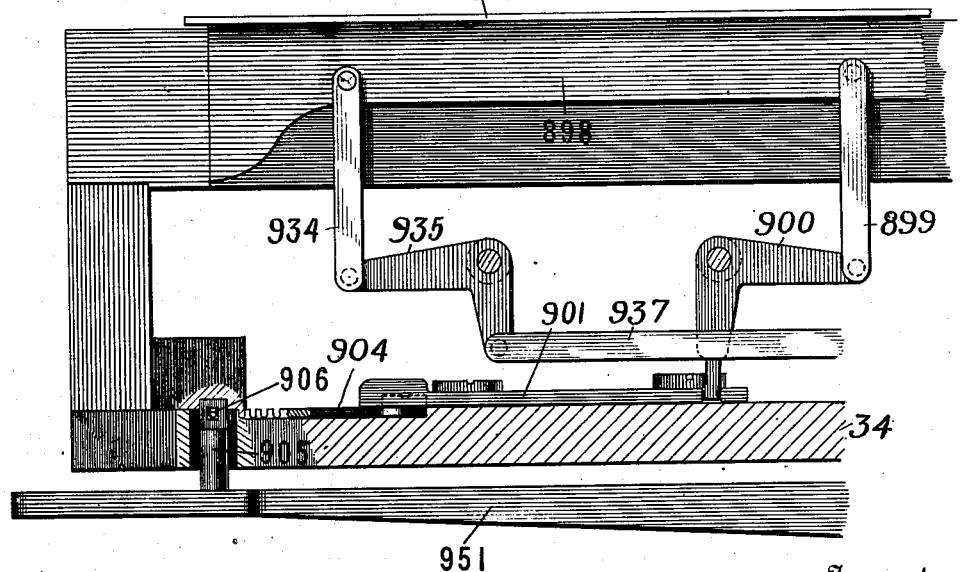
Figure 354:
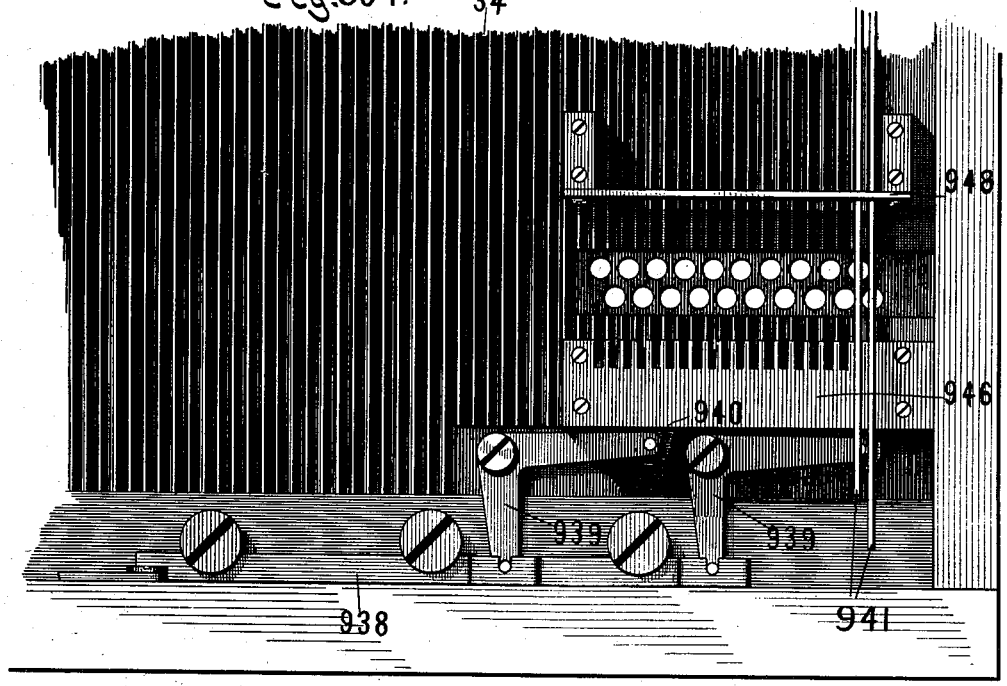
Figure 355:
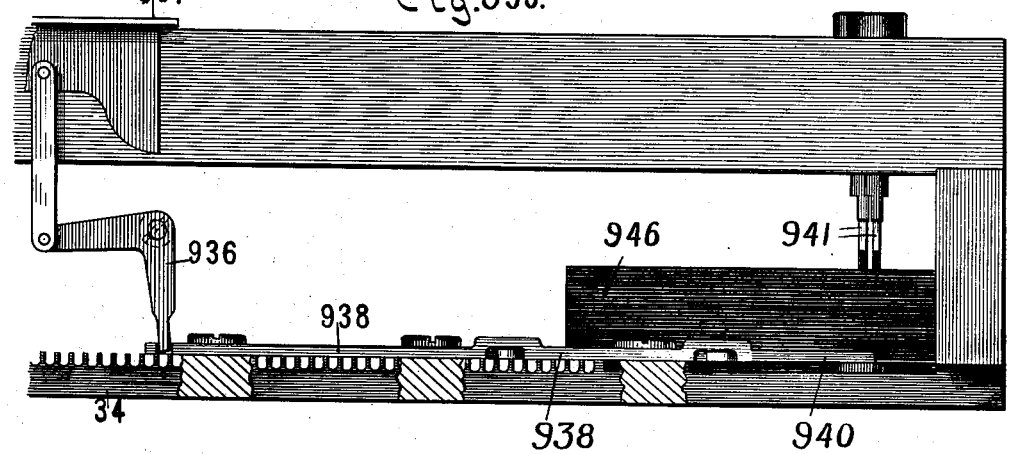
Figure 375:
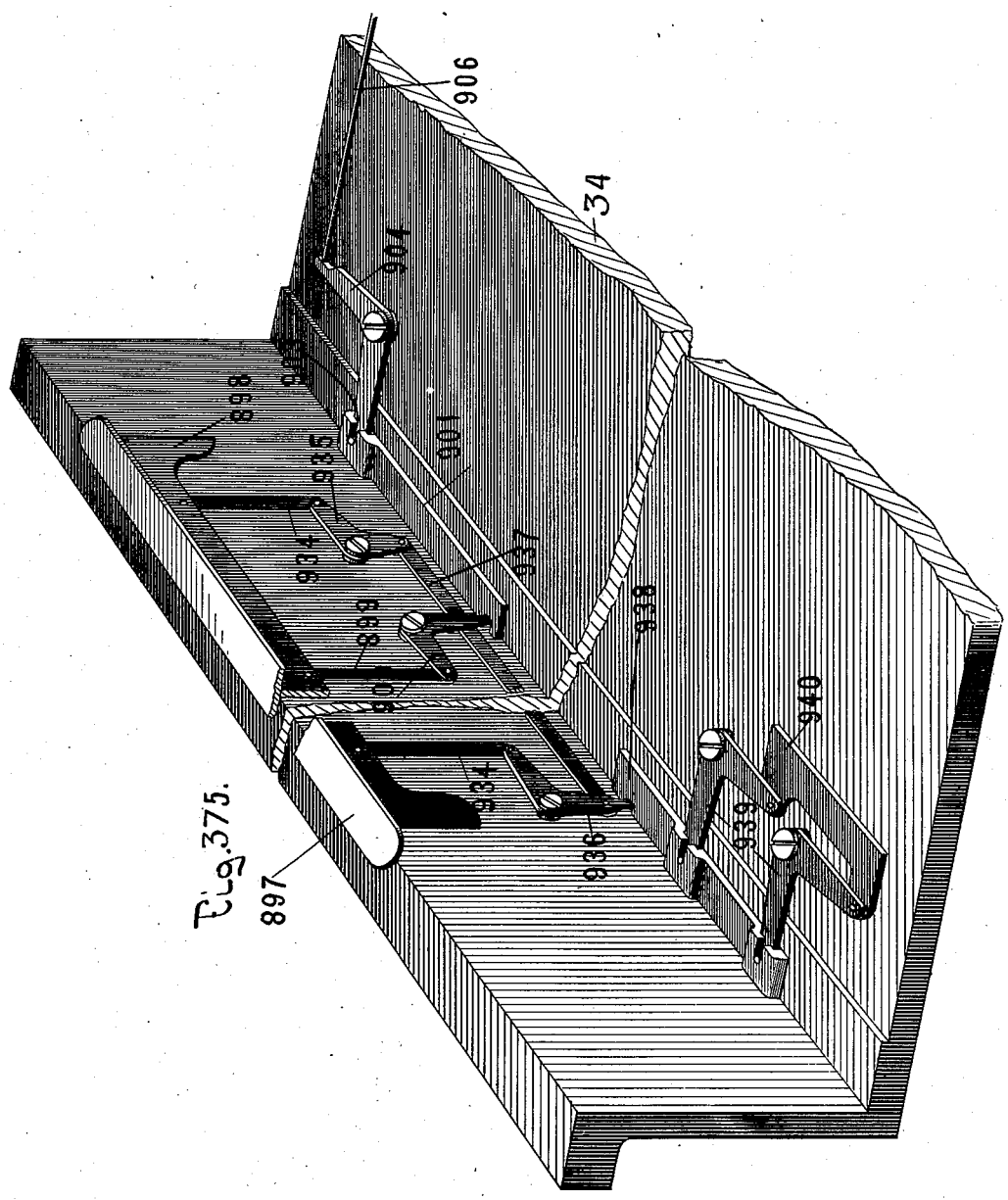
Figure 391:
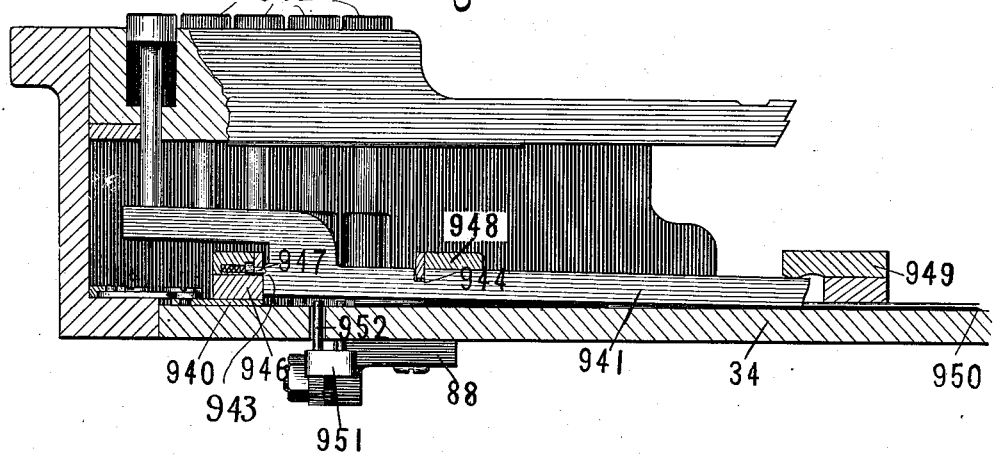

318: In this figure the inclined portion of the weight-plate 808 has engaged with the bearing-edge of the bar 807 and in consequence of this the rock-shaft 124 has been caused to move the latch-piece 818 out of its normal position upon the shelf portion 812, as shown. Fig. 319: In this figure the weight-plate 808 of one of the character-channels is being disengaged from the bar 807 and the latch-piece 818 consequently is in position to spring into place upon the shelf 812 when lifted the proper distance by the action of the pin 824 upon the lever 823 and the pin 825. The parts then will be in their normal position shown in Fig. 316. Fig. 320 is a front view of the type-case with the ledge and lifter plates employed in connection therewith shown in position below it; Fig. 321, a right-hand side view of the same; Fig. 322, a horizontal transverse section of the type-case, showing the vertical grooves 830 for holding the division-strips; Fig. 323, a side view of one of the division-strips with the clamping-bar holding the same at the upper end; Fig. 324, a left-hand side view, partly in section, of the type-setting mechanisms; Fig. 325, a detached view of the raceway-blocks 94 and 95; Fig. 326, a sectional view of the lower raceway-block 94; Fig. 327, various views of the stud 850 and its spring; Fig. 328, views of the stud 850; Fig. 329, a plan view of the raceway with two types in position thereon; Fig. 330, a plan view of the raceway, showing the series of holes 849; Fig. 331, a partial front view enlarged of the type-case with the ledge and lifter plates below it; Fig. 332, a partial right-hand side view, enlarged, of the type-case; Fig. 333, a partial plan view, enlarged, of the type-case and the division-strips 834 cut on the line ooo ooo, Fig. 332; Fig. 334, an enlarged view of the clamping-plate 836 for holding the upper ends of the division-strips; Fig. 335, a cross-section of a division-strip 834 on the line o o, Fig. 332; Fig. 336, a cross-section of the division-strip upon the line oo oo, Fig. 332; Fig. 337, a partial front view of the type-case with the ledge-plate in position below it; Fig. 338, a partial right-hand side view of one of the division-strips 834 with the holding-bar 838 in its proper place; Fig. 339, a bottom view of one of the division-strips; Fig. 340, a bottom view of the keyboard; Fig. 341, a left-hand side view of the same; Fig. 342, a top view of the keyboard and the cover-plate 867; Fig. 343, a right-hand side view of the same; Fig. 344, a left-hand sectional view of the keyboard with a key 862, the key-plates 860, and the actuating-rod 866 in their proper relative positions. In this view the key 862 is shown in its normal position. Fig. 345 is a similar view with the key in its depressed position; Fig. 346, a bottom view of one of the bars 856; Fig. 347, a side view of the same; Fig. 348, a side view of one of the key-plates 860; Fig. 349, a top view of the same; Fig. 350, a figure showing the manner of securing the key-shanks with the bar 856. In this view the key 862 is in its normal position. Fig. 351 is a similar view with the key 862 in its depressed position; Fig. 352, a partial plan view of the space-bar 897 and the parts immediately connected therewith which are employed in connection with the three-em space. In this view the left-hand end of the wire plate 34 is shown. Fig. 353 is a front view of the same; Fig. 354, a partial plan view of the grooved wire plate 34 with the space mechanism located thereon. In this view the right-hand end of the plate is shown. Fig. 355 is a partial front view of the parts shown in Fig. 354; Fig. 356, a front view of the ledge-bar 884, showing the projections between which the rear ends of the initial plungers are properly held and guided in their movements; Fig. 357, a right-hand end view of the same; Fig. 358, a side view of one of the actuating-levers 868; Fig. 359, a bottom view of the cover-plate 872; Fig. 360, a side view of one of the main plungers 873; Fig. 361, an enlarged view of the finger 876 of the plunger 873; Fig. 362, a side view of one of the intermediate plungers 877; Fig. 363, a side view of one of the initial plungers 781; Fig. 364, a top view of the same; Figs. 365 and 367, views of the adjustable links 889 of the inital-plunger forwarding and raising shafts; Figs. 366 and 368, views of the hub 891 with the lever-arm 890 on the initial-plunger forwarding and raising shafts; Fig. 369, a view of the initial-plunger forwarding rock-shaft 119; Fig. 370, a left-hand side view of the initial-plunger forwarding mechanism; Figs. 371 to 374, inclusive, views illustrating the operation of the initial-plunger forwarding and raising mechanisms, also the main-plunger forwarding and returning mechanisms; Fig. 375, a right-hand rear perspective view of the space-rail 897 and the parts immediately connected therewith; Fig. 376, a cross-section of the sliding bar 901; Fig. 377, a front view of the space-rail 897 and the parts immediately connected therewith; Figs. 378 and 379, views of the recess 903 formed in the sliding bar 901; Figs. 380 to 384, inclusive, views illustrating the operation of setting the three-em space; Fig. 385, a partial view of the lever 912, pivoted upon the stud 924; Fig. 386, a side view of the disk 928; Fig. 387, a partial view of the lever 912 with the coiled spring 932 in its proper position; Fig. 388, a front view, partially in section, of the lever 912 and the parts immediately connected therewith; Fig. 389, a front view, partially in section, of the mechanism for switching in the auxiliary space-channels. In this view the parts are shown in the position occupied by them when spaces are being set for the main space-channel. Fig. 390 is a similar view with the parts in the position occupied by them when one of the auxiliary space-channels is switched in; Fig. 391, a side view of the mechanism for switching in the auxiliary space-channels, the parts being shown in the position occupied by them when spaces are being set from the main space-channel; Fig.

Figure 410:
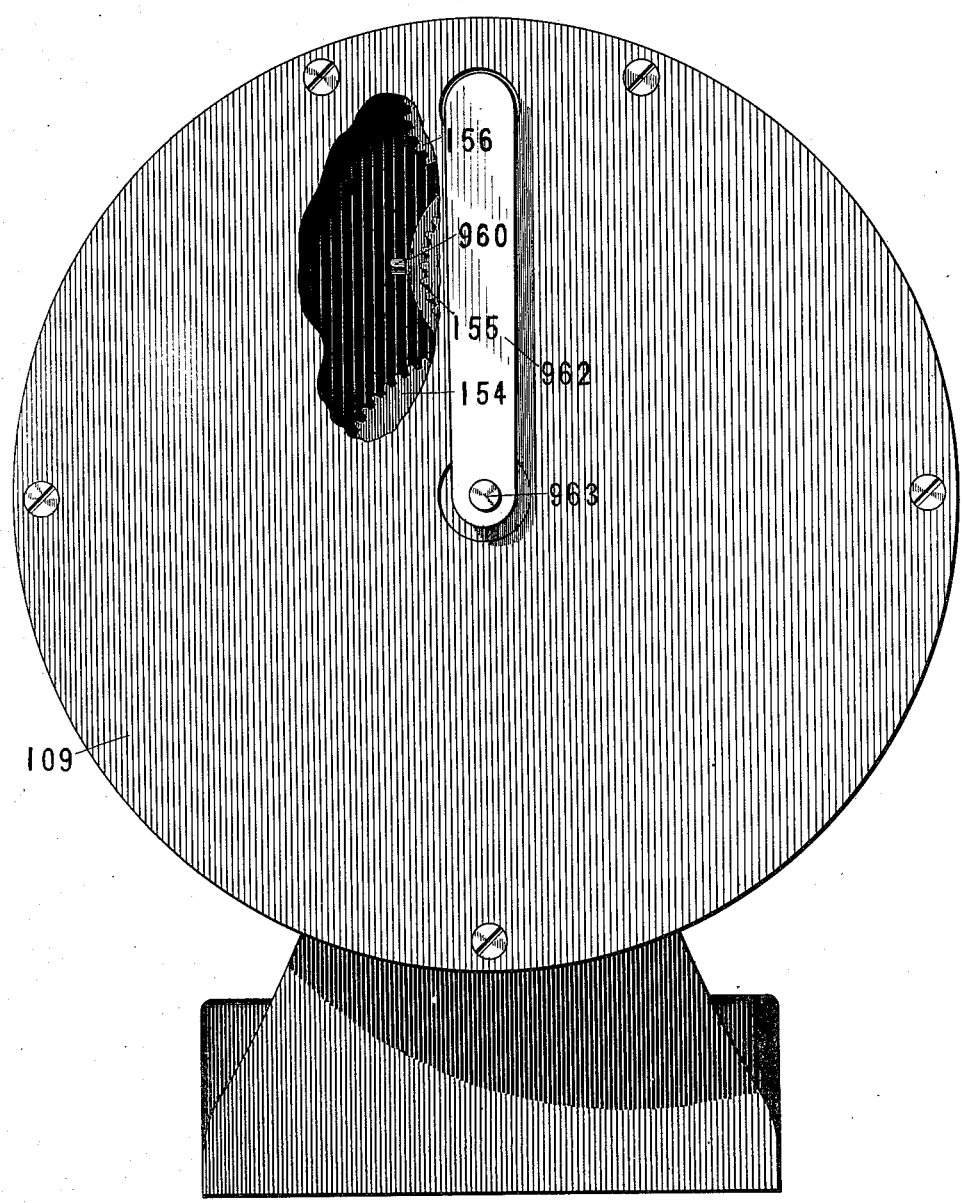
Figure 411:
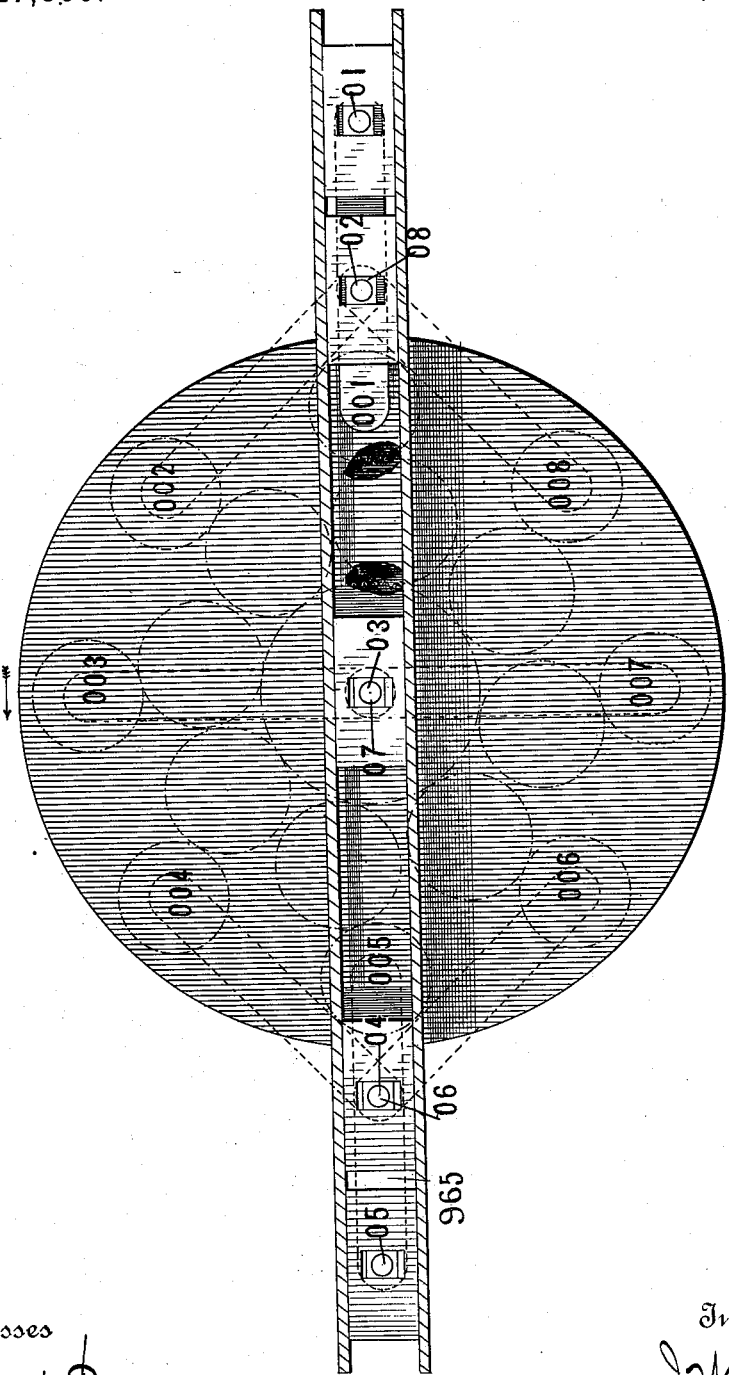
Figure 423:
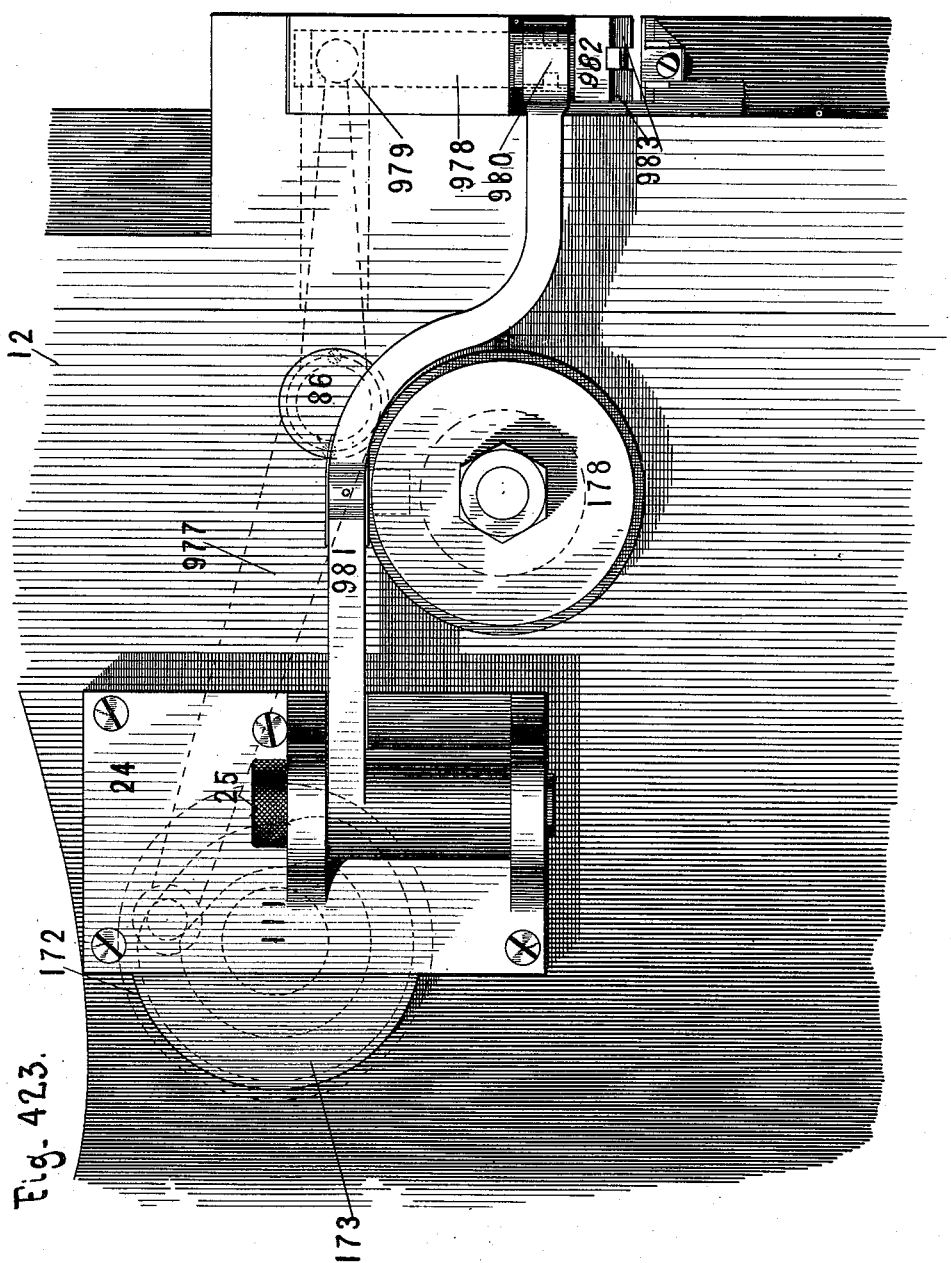
Figure 424:
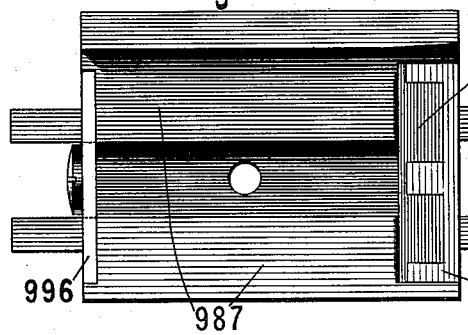
Figure 425:
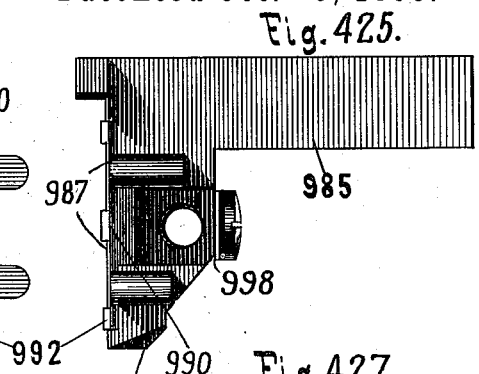
Figure 426:
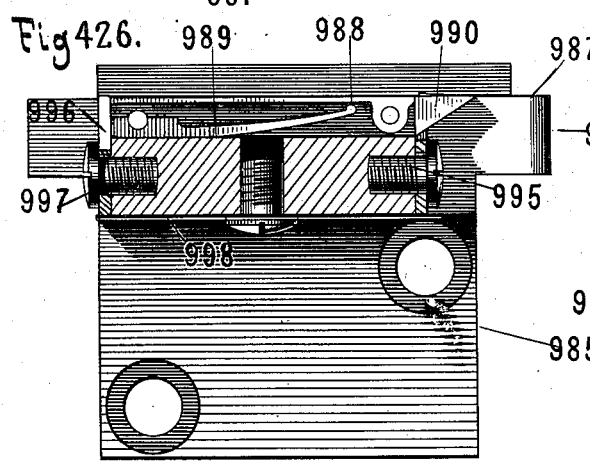
Figure 427:
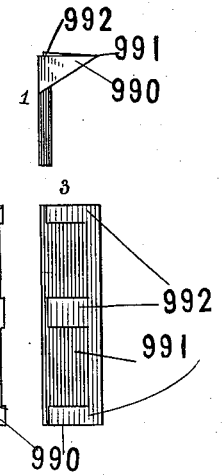
Figure 428:
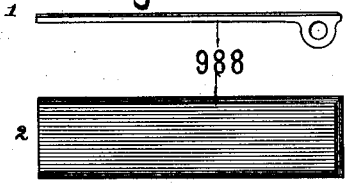
Figure 429:
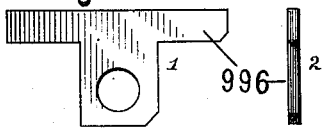
Figure 430:
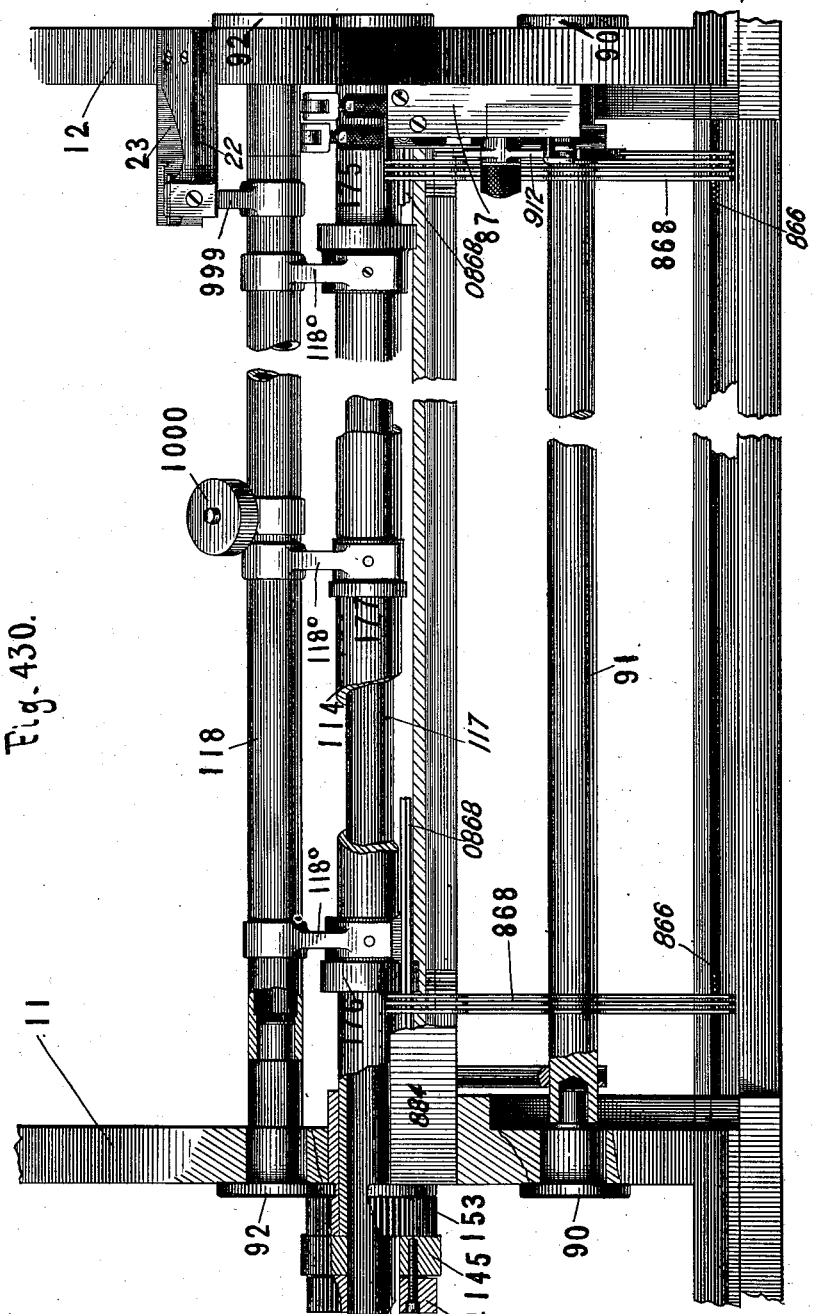
Figure 431:
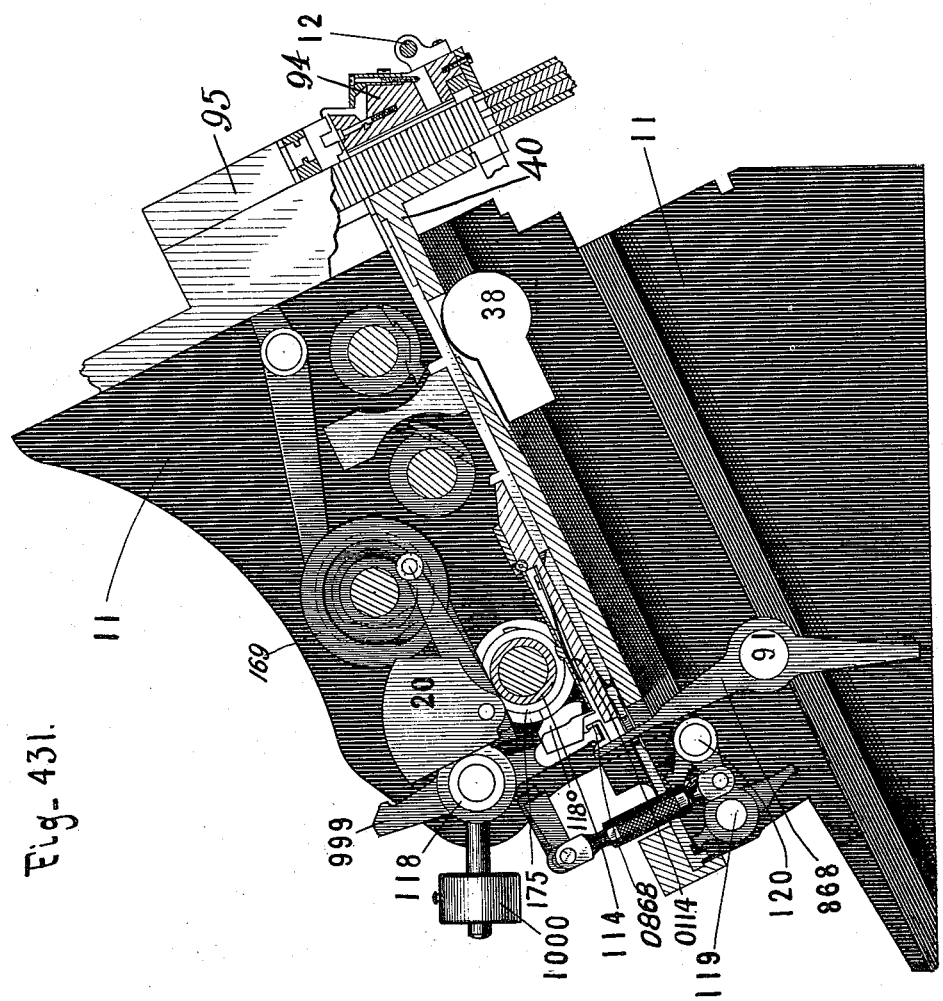
Figure 432:
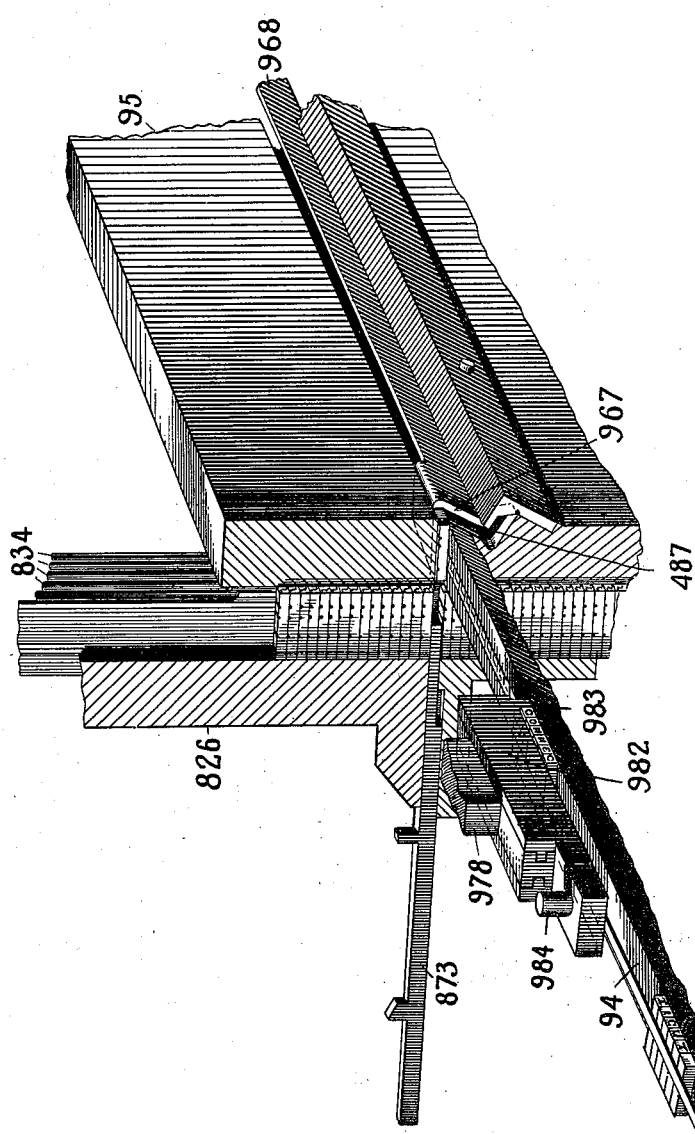
Figure 433:
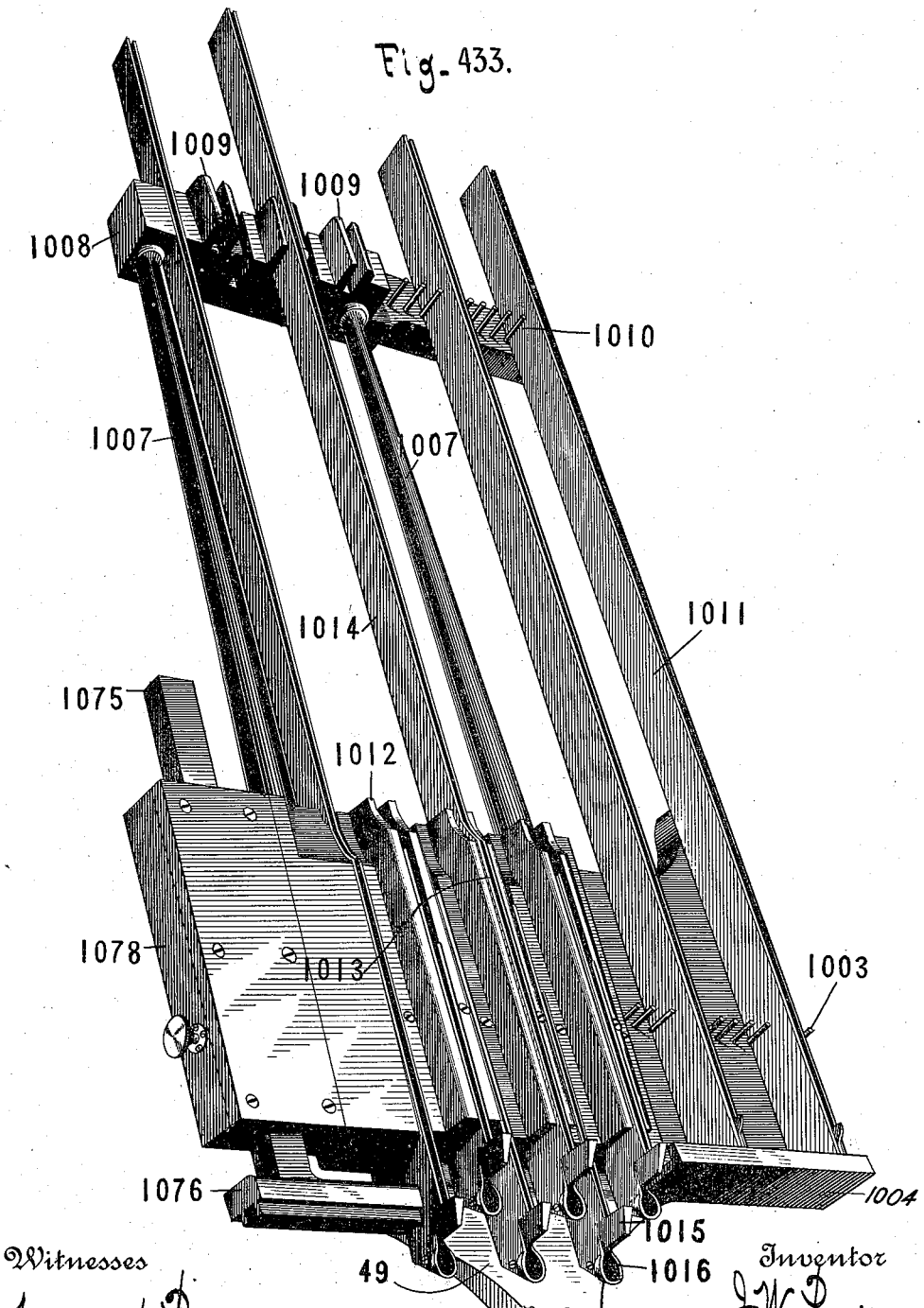
Figure 434:
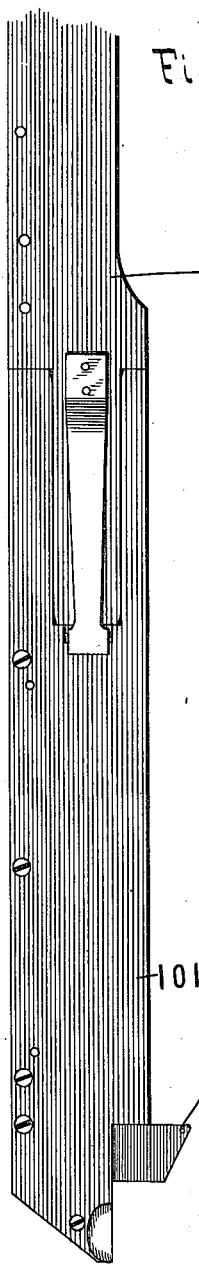
Figure 435:
Figure 436:
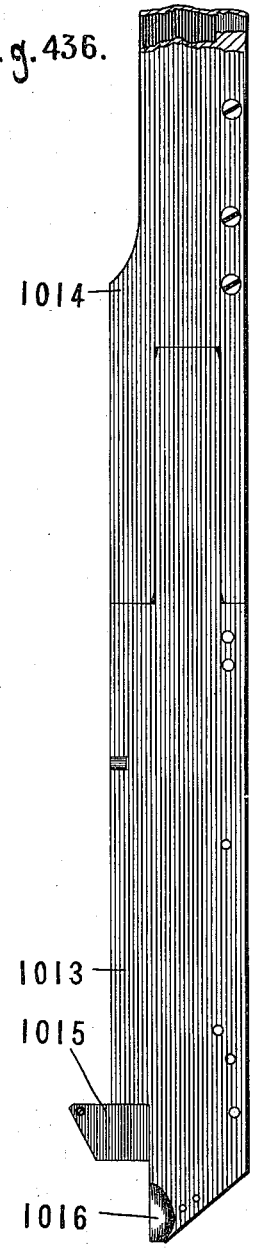
Figure 451:
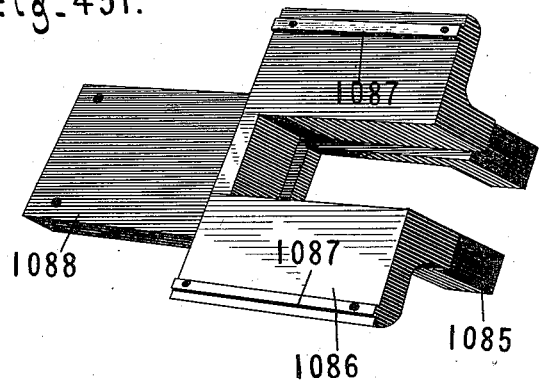
Figure 452:
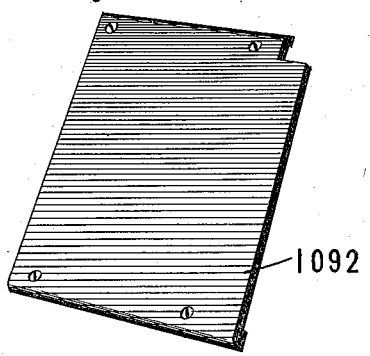
Figure 453:
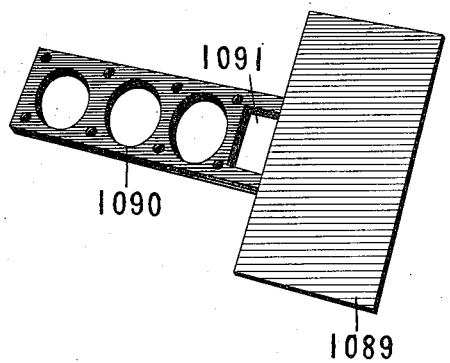
Figure 454:
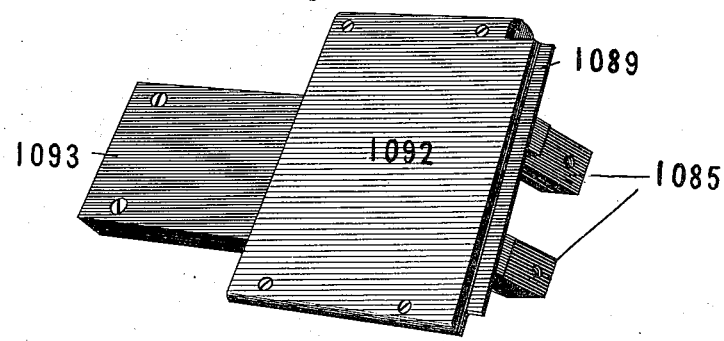
Figure 468:
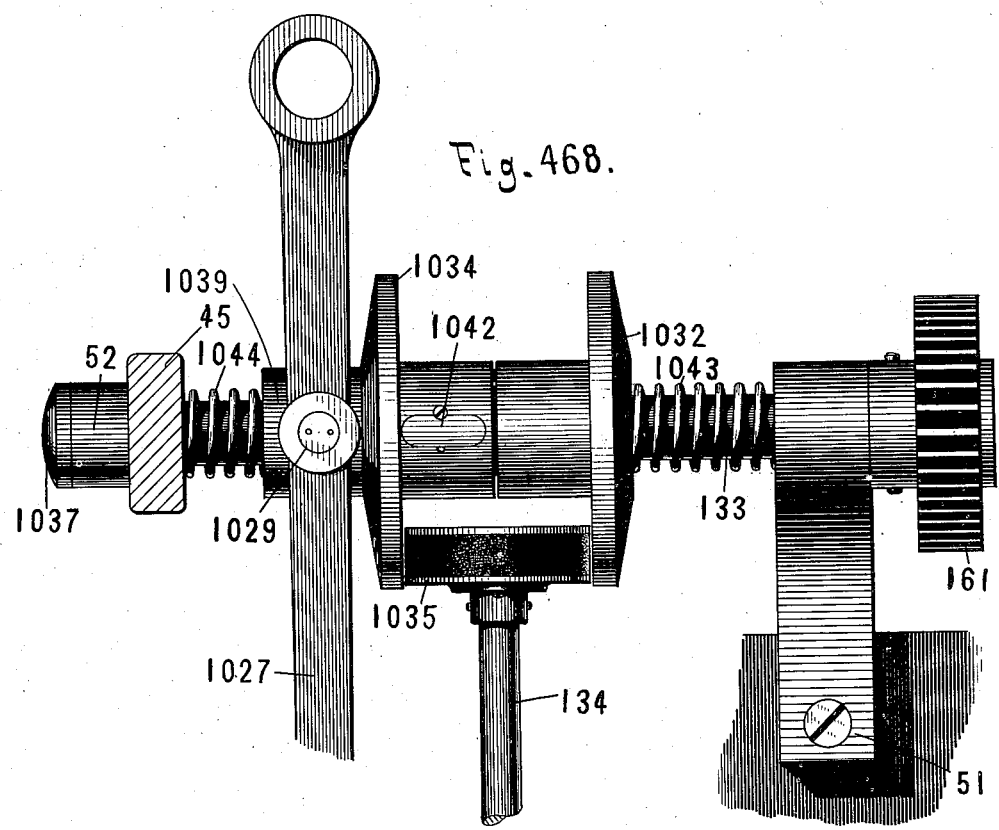
Figure 469:
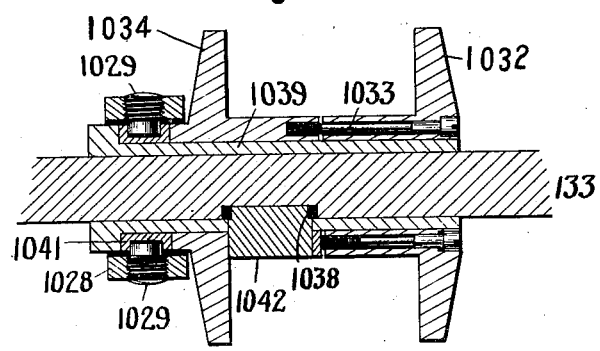
Figure 470:
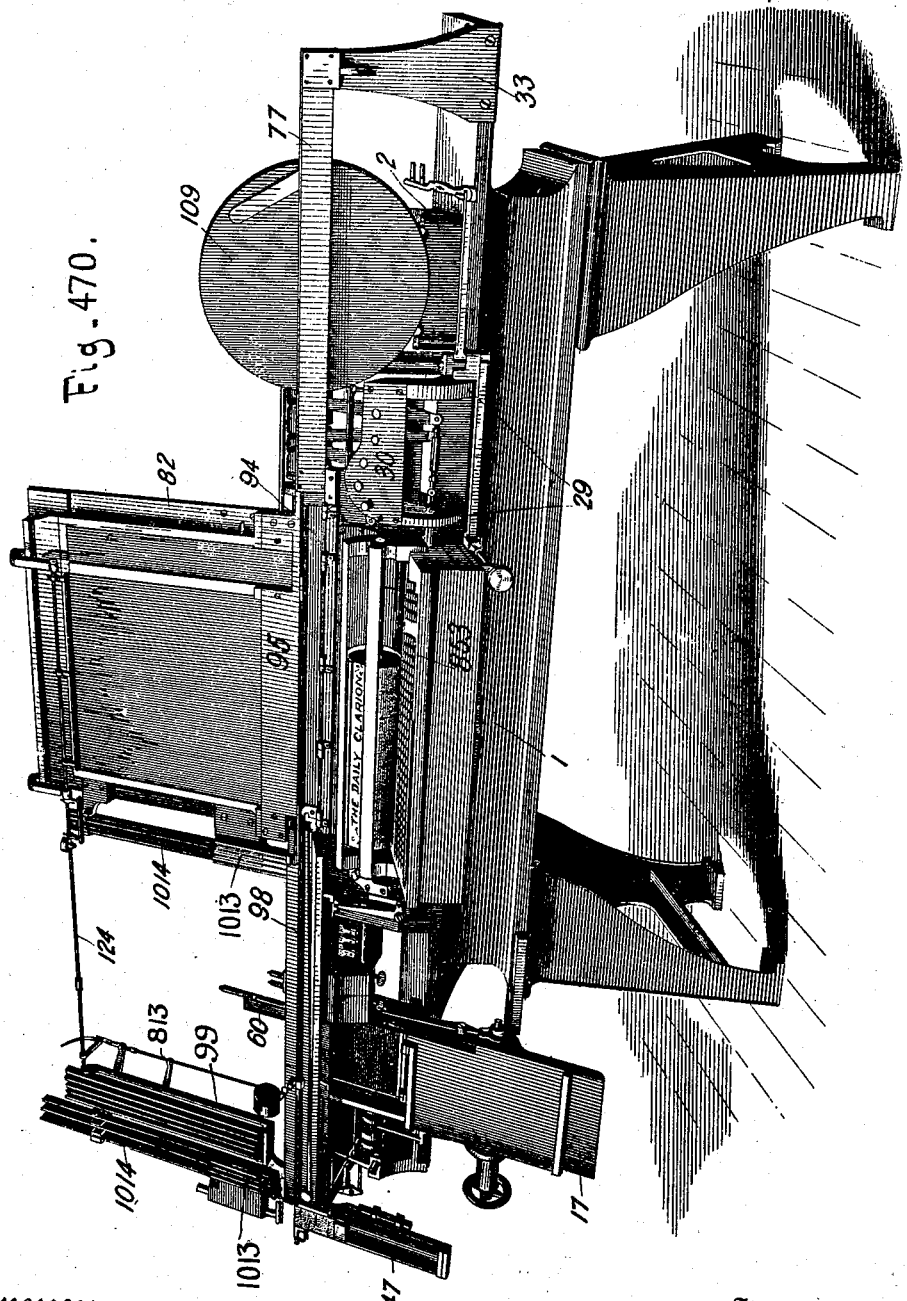
Figure 471:
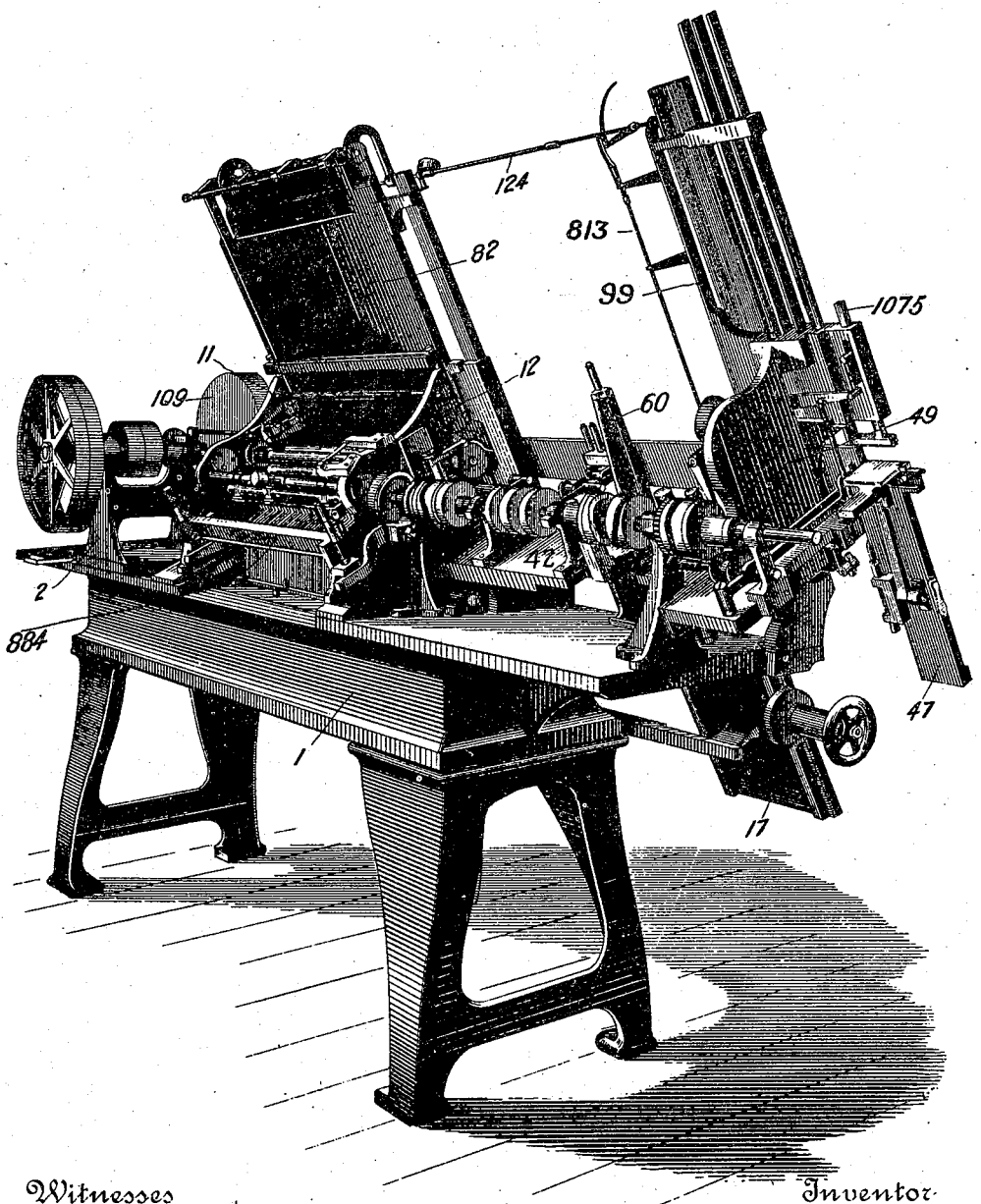

392, a similar view with the parts in the position occupied by them when one of the auxiliary space-channels has been switched in; Fig. 393, a plan view of the switch-lever 951; Fig. 394, a front view of the same; Fig. 395, a side view of one of the actuating-bars 941; Fig. 396, a top view of the same; Fig. 397, a side view of one of the actuating-bars 942; Fig. 398, a top view of the same; Figs. 399 and 400, views of keys with shanks; Fig. 401, a front view of the type-gate mechanism; Figs. 402 and 403, right-hand side views of the same; Fig. 404, a right-hand side view of the main shaft 108 and also a partial view in section of the actuating mechanism of the main type-driver; Fig. 405, a right-hand side view of the main type-driver nearing standard 33, the guide-bar 77, and the raceway-blocks 94 and 95 of the type-setter; Fig. 406, a rear view of one end of the driver-bar 965 and the sliding block 964, attached thereto; Fig. 407, a top view of the same; Fig. 408, a rear view of the guide-bar 77 of the main type-driver and the crank-arm employed in connection therewith; Fig. 409, a sectional view of the supporting-bracket 76 and the guide-bar 77; Fig. 410, a front view of the type-driver disk, partially broken away to show the gear-wheels of the actuating mechanism; Fig. 411, a view illustrating the operation of the actuating mechanism of the main type-driver; Fig. 412, a right-hand end view of the sliding plate 972; Fig. 413, (1 2,) a plan and front view of the same; Fig. 414, the body portion of the driver-head 970 in which moves the plate 972; Fig. 415, (1,) a left-hand end view of the body portion of the driver-head with the cover-plate 974 in place; Fig. 415, (2,) a plan view of the same; Fig. 416, a plan view of the driver-head 970 with the sliding plate and cover-plate in their proper positions. In this view the sliding plate 972 is shown in its advanced or forward position. Fig. 417, (1 2,) views of one of the stop-plates 976; Fig. 418, a view similar to Fig. 416, with the exception that the sliding plate is in its rearward position; Figs. 419 to 421, inclusive, views illustrating the operation of the driver-head; Fig. 422, a front view of the auxiliary type driver mechanism; Fig. 423, a left-hand side view of the same; Fig. 424, a plan view of the auxiliary type-driver raceway; Fig. 425, a right-hand end view of the same; Fig. 426, a front view of the same partially in section; Fig. 427, (1 2 3,) various views of the gate 990 employed in connection therewith; Fig. 428, (1 2,) views of the pivoted bearing-plate 988; Fig. 429, (1 2,) views of the gate 996 employed in connection therewith; Fig. 430, a view taken from the rear side of the machine of the hollow time-lock shaft 114, the time rock-shaft 118, and the rod 91 with the actuating-levers located thereon; Fig. 431, a left-hand side view of the type-setter mechanisms with the main upright 12 removed; Fig. 432, a perspective view illustrating the operation of setting the type; Fig. 433, a perspective view of certain parts on the justifying-stand employed for supporting the space-channels; Fig. 434, a partial side view of the base and upper portions of the space-channels on the justifying-stand, taken from the left-hand side of the same; Fig. 435, a front view of the same; Fig. 436, a similar view taken from the right-hand side of the same; Figs. 437 and 440, perspective views of the type-setter galley; Fig. 438, an enlarged view of the semi-circular recess 1046; Fig. 439, an enlarged view of the lever 1047; Fig 441, a perspective view of the type-setter raceway extension 98 with the finger-block 1017 in its proper position; Fig. 442, a side view of the finger-block 1017; Fig. 443, a cross-section of the raceway extension 98 and the shelf 1018, shown from the left-hand side; Fig. 444, a perspective view, taken from the front side of the machine, of the mechanism for moving the separated type-line against the fixed abutment of the galley and for depressing the justified line into the same. In this view the rule or gate for supporting the justified line is shown in the forward position and the bar for depressing the line in its upward position. Fig. 445 is a perspective view of the sliding bar 1083, having the abutment-figures 1084; Fig. 446, a view similar to Fig. 444 with the rule or gate in its backward position and the depressor-bar in its downward position; Fig. 447, a perspective view, taken from the rear side of the machine, of the mechanism for actuating the rule or gate and the actuating mechanism for drawing the separated type-line into the galley. In this view the rule or gate is shown in its forward position. Fig. 448 is a sectional view of the gate and adjacent parts; Fig. 449, an enlarged view of the rock-shaft 1098 and adjacent parts; Fig. 450, a view similar to Fig. 447 with the rule or gate in its backward position; Fig. 451, a perspective view of the frame-piece 1085 in which the rule or gate moves; Fig. 452, a perspective view of the cover-plate 1,092; Fig. 453, a perspective view of the rule or gate 1,098; Fig. 454, a perspective view of the frame-piece with the rule or gate in position; Figs. 455 and 456, views of the friction-disks 1,032 and 1,034; Fig. 457, (1 2,) views of the key-plate 1,042; Fig. 458, a perspective view of the lever 1,027; Fig. 459, a side view of the sleeve 1,039; Fig. 460, (1 2,) views of the collar 1,041; Fig. 461, a perspective view of the pinion 161; Fig. 462, a side view of the pinion-shaft 133; Fig. 463, a perspective view of the cylinder 1,068; Fig. 464, a perspective view of the collar 1,070; Fig. 465, a side view of one of the coiled springs 1,069 employed in connection with the cylinder 1,068; Fig. 466, a perspective view of the gear-wheel 160, having the sleeve 1,049; Fig. 467, a perspective view illustrating the operation of the mechanism for depressing the justified line into the galley; Fig. 468, a plan view of the friction mechanism for drawing the separated line of type into the galley; Fig. 469, a sectional view of the friction-disk 1,032 and 1,034;

Fig. 470, a perspective view of the entire machine, taken from the front side of the same; and Fig. 471, a perspective view of the entire machine, taken from the rear side of the same.

Like numerals of reference in the different figures indicate corresponding parts.

In order that the construction and operation of my improved machine may be the more readily comprehended, I shall endeavor, whenever practicable, to connect the description of the two, my general method being to preface the description of the mechanism with a statement of the end to be accomplished thereby. The description of the various mechanisms will be given in the order of their operation in the machine.

*The framework and main driving mechanism.*—Referring to the drawings, 1, Figs. 1, 470, and 471, represents the base-plate or main bed of the machine, which may be supported in any well-known way. Rigidly attached to said bed is a bearing-stand 2, Figs. 1, 16, 404, and 408, which is intended to serve as a support for the main driving-shaft 108 and one end of the auxiliary shaft 110, as shown in Fig. 87, which stand is provided with two vertical uprights, as shown in Fig. 561, having annular portions 3 3 for supporting the thimble-bearings. Two main uprights 11 and 12, Figs. 1, 16, 17, 18, 19, 20, 21, and 471, are rigidly attached to the base and serve as supports for the various shafts and other parts. A left-hand side view of the upright 11 as it appears in connection with said parts is shown in Fig. 324, while a similar view of a portion of the upright 12 is shown in Fig. 264. A tie-rod 13, Fig. 1, serves to connect the tops of said uprights, while a cross-beam 14, Figs. 1 and 282, rigidly secured at its ends to the front edges of the uprights, serves as a support for certain parts to be hereinafter described.

The distributer-galley frame 17, the bracket 29, the distributer-galley plate 42, and the stand 49, in connection with the parts above referred to, constitute the main framework of the machine. The galley-plate is supported in an inclined position relatively to the main base-plate by means of the galley-frame 17 and supporting-bracket 15, as shown in Fig. 10. Said plate is also clearly shown in Figs. 64 and 65. The inclination of the galley-plate conforms to that of the type-case 82, which is necessarily inclined in order to maintain the type in proper position in the type-channels, the object of so inclining the galley-plate being to simplify the work of manufacture, in that it enables the various parts to be adjusted at right angles thereto or parallel therewith and lessens the chances for error.

The main driving-shaft 108, Figs. 16 and 404, is supported in bearings 4 and 5 of the driving-shaft stand 2. An auxiliary driving-shaft 110 is arranged lengthwise of the machine and at right angles to the shaft 108 in suitable bearings, as shown, the two shafts being connected by means of beveled gears 135 and 136.

The various shafts which give movement to the distributing and setting mechanisms, respectively, are arranged lengthwise of the machine, as shown in Fig. 16. Those which impart movement to the setting mechanism are connected by means of gears to the auxiliary driving-shaft 110, while those which serve to actuate the distributing mechanism are connected by means of gears to a clutch-sleeve 138, loosely mounted upon the shaft 110, as shown. By means of a clutch-collar 137, Fig. 16, which is splined to but adapted to move longitudinally upon the shaft 110, the distributer-train may be connected to or disconnected from the setter-train.

One great advantage which is derived from arranging the driving-shafts in the manner described is that the various special mechanisms may be connected therewith by means of cams in such a manner that each one is independent of the action of the other, while directly subservient to the prime moving-power. By this means the multiplication of the lost motion is avoided and all the parts are caused to work in complete harmony.

*Mechanism for advancing the "dead-matter" column.*—My improved machine is so constructed that the distributing and setting portions act, broadly speaking, as an entirety, the one forming, in effect, an automatic feed for the other. I will therefore proceed to describe the distributer as being first in the order of operation.

The "dead matter," which preferably consists of two or more columns from which the usual rules have been removed, is placed in a galley 259, (better shown in Figs. 44, 48, 49, 65, and 194,) which galley is adapted to be supported and detachably secured within a distributer-galley frame 17, Figs. 1, 42, 43, 44, and 470, which depends, as shown, from the main frame, to which it is rigidly attached by means of a bracket 240, and is placed upon an incline adapted to conform to that of the distributer-galley plate 42 and that of the type-case. Said plate is provided at its lower end with an extended bearing-surface 235, adapted to support a rack-plate 255 in its upward and downward movement, and at its upper end with an extended bearing-surface 236, adapted to support the galley. The bearing-surface 236 is located in a plane in the rear of the bearing-surface 235, as shown in Fig. 44, in order to permit the upward movement of the rack-plate for the purpose of lifting the column of the type.

The galley 259 is supported between the side walls 239 239 of the frame, and is provided with an end plate 260, Figs. 48 and 49, which serves to support a bar or bars 261, upon which rests the bottom line of the dead-matter column, as shown in Figs. 44 and 65. The end plate is provided with notches 262, which are adapted to permit of the passage into the galley of base-blocks 258, Figs. 46, 65, and 66, extending rearwardly from the rack-plate, in order that the dead-matter column may be moved up step by step as the lines are removed from the top in the manner hereinafter explained, it being understood that the galley itself remains stationary, the column only being caused to move. The galley is provided with side plates 263 and 264 to furnish lateral support for the type. Notches 265 and 267, Figs. 48 and 49, are formed in the upper corners of the galley for the reception of corresponding pins 244, Fig. 43, in the distributer-galley frame, while a hole 266, Fig. 49, in said galley is adapted to receive a movable pin 246, Fig. 43. A long recess 268, Fig. 48, in the side of the galley is adapted to engage with a fixed pin 245, attached to the side plate of the distributer-galley frame 17, Fig. 43. In placing the galley in position for use it is inserted between the side plates 239 239 of the distributer-galley frame 17, Fig. 43, and pushed upwardly until the upper notches 265 and 267 engage with the pins 244 and the recess 268 engages with the pin 245. The movable pin 246 is then inserted into the hole 266, where it is retained in place by means of a suitable spring, thus holding the galley securely in position.

The rack-plate 255, Figs. 46, 65, and 66, is provided with depending flanges upon its outer edges, having racks 256 thereon, which are adapted to engage with gear-wheels 159 159, rigidly attached to a hollow shaft 131, mounted in bearings 238, located in a depressed portion 237, Fig. 44, of the galley-frame. Upon the inner faces of said flanges are grooves as shown, adjusted to receive guide-flanges which project laterally from the side plates 239, and thus hold the rack-plate securely in position, but leaving it free to slide up and down.

Upon a continuously-moving shaft 129, which is actuated by the power which drives the distributing mechanism and is more clearly shown in its general connection with the machine in Fig. 91, is a driving-pinion 157, which, with a portion of said shaft, is also shown in Figs. 43 and 65, in connection with a gear-wheel 158, loosely mounted upon the shaft 130 in the manner indicated in Fig. 43. Keyed to the shaft 130, so as to be moved longitudinally thereon, is a cam 207, Figs. 65, 76, 77, and 78. An automatic clutch mechanism, hereinafter described, is adapted to connect said cam with the gear-wheel 158, so as to cause the rotation of said shaft 130. The groove 208 of said cam is in engagement with a pin 327 upon the end of a lever 328, which is pivoted upon a stud 101, rigidly attached to the frame. Upon the opposite end of said lever is a pin 330, upon which is loosely mounted a square block 329, arranged to fit loosely within a square recess within a disk 276, also shown in Figs. 178 and 181. Upon the face of said disk are a series of pawls 277, adapted to be held by means of springs 278 into engagement with the teeth of a ratchet-wheel 274, which is loosely mounted upon the hollow shaft 131, but adapted to be held by frictional contact, so as to cause the movement thereof in the manner hereinafter stated. The disk 276 is loosely mounted upon a hub 275 of the ratchet-wheel 274 and is free to be revolved thereon. As the cam 207, Figs. 76, 77, and 78, is rotated, the lever 328 is caused to vibrate, thus oscillating the disk 276 and rotating the ratchet-wheel 274 a fixed distance with each forward movement thereof, which in turn, assuming the parts to be in frictional contact, as stated, rotates the shaft 131 and with it the gears 159, which, being in engagement with the rack-plate, advances the latter a given distance and with it the dead-matter column.

The reasons for connecting the ratchet-wheel 274 and other parts to the shaft 131 by means of frictional contact, as well as the manner of making said connection, will now be explained.

If the rack-plate 255 were advanced a fixed distance with each vibration of the lever 328, as it would be by an ordinary ratchet mechanism, there would, owing to the elasticity of the column caused by the presence of foreign matter between the type, and otherwise, be a variation in the position of the top line of type with relation to the part by which said line is to be acted upon, which variation might soon become sufficient to interfere seriously with the operation of the machine. It is of the utmost importance, therefore, to provide means whereby this contingency, as well as that resulting from lost motion, may be provided for, so that the position of the uppermost line of type, when the column is advanced, may be constant and bear a fixed relation to the gate, hereinafter referred to, by which it is to be removed from the column. To accomplish this important result I have devised means for producing an excess of movement of the ratchet-wheel 274, while at the same time I have so connected said wheel with the lifting mechanism by which the column is actuated as to permit the latter to yield when the top line of the column is brought into contact with the distributer-galley plate 42. This insures a sufficient advancement of the dead-matter column with each movement of the ratchet-wheel 274 to cause its upper line to be brought into position contact with the lower bearing-surface of the distributer-galley plate, while injury thereto is prevented by the proper yielding of the connecting parts, which will now be described in detail.

Both of the gear-wheels 159 are keyed to the shaft 131, as shown at 297, Figs. 63 and 64, and hence must rotate positively with the shaft. It follows, therefore, that any yielding from excess of movement must take place between said gears and the power by which they are driven. The left-hand gear-wheel abuts against a collar 272, (shown in said last-named figures and also in Figs. 50 and 55,) which is rigidly attached to the shaft and serves as a bearing-point to support said gear-wheel against lateral pressure. A collar 279 is also rigidly attached to the hub 275 of the ratchet-wheel 274. Secured to the shaft by means of a spline 296, Fig. 55, so as to permit of longitudinal movement thereon, is a collar 282. (Shown in detail in Fig. 57.) Between the collars 282 and 280 and the ratchet-wheel 274 and gear-wheel 159 are friction-disks, of leather or other suitable material, as shown, which when compressed are adapted to clamp the ratchet-wheel 274 and collar 280, and thus connect them with the shaft by means of frictional contact. This compression may be secured by the following-described means: Upon the left-hand end of the shaft 131 is placed a sleeve 284, which is provided with an inwardly-turned flange at its right-hand end, against which abuts a strong spring 291, which is inclosed within said sleeve. The other end of said spring abuts against an annular nut 287, having an interior screw-thread 288, Fig. 184, which engages a screw-thread 289 upon the end of the hollow shaft 131. Said nut is provided with keys 290, (better shown in Fig. 56,) which are loosely fitted in grooves 286 in the sleeve 284. The exterior of the collar 284 is knurled, as shown in Fig. 193, to enable it to be turned by hand. The sleeve 284 is employed to regulate the friction upon the ratchet-wheel 274. By turning said sleeve in one direction the nut 287 is turned with it, and hence forced farther upon the shaft 131, thus compressing the spring 291 and forcing the inner end of the sleeve 284 against the collar 282, thereby compressing the collar 279 and ratchet-wheel 274, which practically form one piece, into firm contact with the friction-disks against which they abut. It will thus be seen that by merely turning said sleeve the friction may be varied to any desired extent.

As before stated, the gears 159 are actuated by the movement of the ratchet-wheel 274, and as the movement of said wheel is in excess of that required to advance the column to the required extent it follows that when the top line of the column is in its upward movement brought against the distributer-galley plate the further rotation of the gears 159 is arrested and the ratchet-wheel 274 is caused to slip upon the friction-surfaces mentioned in order to complete its full movement. It is thus apparent that the friction necessary to regulate the upward movement of the rack-plate is governed, in the main, by the sleeve 284; but this does not take into account the backward movement of the pawls upon said ratchet-wheels nor provide for the release thereof when the column is fed out. Hence provision must be made for holding the rack-plate against retrograde movement during said backward movement of the pawls, which is accomplished in the following manner: A rod 299, Figs. 55, 63, and 64, is passed loosely through from end to end of the hollow shaft 131, one end of said rod having a bearing in a screw-plug 292 in the end of the sleeve 284, which plug is provided with a recess for the reception of a collar 301, which is rigidly attached to said rod. Said rod is provided near its left-hand end with a coarse screw-thread 300, adapted to engage with a corresponding screw-thread 295 (better shown in Fig. 51) on the interior surface of the hollow shaft 131. A hand-wheel 302 upon the end of said rod enables it to be rotated. Upon the extreme right-hand end of the rod is a quick thread 304, Figs. 63 and 64, upon which is placed a nut 308, having a corresponding thread. The nut is loosely secured by means of a key 310 to the hollow shaft 131, which enables said nut to be moved longitudinally, but prevents its rotation. The inner end of the nut is provided with a tapered portion 309, which fits into a tapered bearing-recess 307 in a collar 305, which is fitted loosely upon the shaft 131 next to the gear-wheel 159. By turning the hand-wheel in the proper direction the nut will be compressed against the collar 305, thus forming a friction-clutch by which said collar may be held rigid upon the shaft 131, which is its normal condition. Said collar is provided upon its periphery with a V-shaped groove 306, which is adapted to receive a hinged clutch, (shown in Figs. 66, 67, and 68,) which consists of two parts 322 and 323, hinged to each other at 324. One end of the part 323 is pivotally attached to the galley-frame by means of a stud 325, while the corresponding end of the part 322 is provided with a socket 321 for the reception of the rounded end 320 of the short arm of a lever 311, pivoted at 102 to the galley-frame. Perspective views of the collar 307, nut 308, and hinged clutch are shown in Figs. 72, 73, and 74, respectively, while Fig. 75 shows a cross-sectional view of the hinged clutch.

An adjustable plate 313, adapted to be adjusted by means of a screw 315 and secured by means of a binding-screw 316, is fitted in a recess 312 in the upper end of the lever 311. Said plate is caused to project, as shown at 314, so as to form a bearing-surface which is intended to engage with a surface cam 205 upon the right-hand end of the shaft 130. The projection is held in contact with the cam by means of a spring 318, one end of which is rigidly attached to the frame 319 and the other with an opening in a block 317 upon said lever. Thus the tendency of the spring is to so actuate the lever as to release the hinge-clutch, while the action of the cam serves to tighten it. It should be borne in mind that the cams 205 and 207 (see Fig. 65) are upon the same shaft, and the cam 205 is so timed with relation to the cam 207 that when the latter is causing the advance of the ratchet-wheel 274 the former is in position to release the hinged clutch, but upon the reversal of the lever 328, Fig. 77, the cam 205 is caused to act upon the lever 211, as shown in Fig. 67, thus compressing the hinged clutch and preventing a backward movement of the shaft 131, which otherwise would obviously result from the backward movement of the pawls 277. (Indicated in Fig. 77.) Thus it will be seen that by means of the reverse action, with respect to each other, of the levers 328 and 311 the rack-plate may be advanced step by step, while its weight is being constantly sustained by the alternate action of the friction mechanisms described. This action is continued until the column is fed out, when it becomes necessary to release the frictional mechanism and lower the rack-plate to permit the removal of the empty galley and the insertion of a new one. This is accomplished by turning the hand-wheel 302, Fig. 64, so that the screw-thread 300, acting in the hollow shaft, serves to push the collar 301 against the plug 292, thus compressing the spring 291 and separating the sleeve 284 from the collar 282. At the same time the action of the screw 304 pushes the tapered nut 308 out of contact with the collar 305, when, the frictional parts being released, the rack-plate is free to run down by its own gravity.

The screw-thread 304 is given a greater pitch than the thread 300, in order to cause the nut 308 to be moved out a proper distance to cause its release, while at the same time compensation may be made for the movement in the same direction of the screw-thread 300.

*The catch-box or safety-appliance mechanism.*—It is important to provide means for preventing injury to the machine should the column-raising mechanism for any cause be held against movement. For this purpose I provide a safety appliance which consists in so connecting the shaft by which the column-raising mechanism is actuated with the primary driving-shaft that the two may become disengaged in case of an obstruction.

By referring to Fig. 19 it will be seen that the shaft 129, by which the column-raising mechanism is actuated, is an extension of shaft 129, which latter is driven by a shaft 115, Fig. 41, in direct connection with the primary driving-shaft. It is the manner of connecting the shafts 115 and 128 which forms the safety appliance which is known as the "catch-box mechanism." Surrounding the meeting ends of the shafts 115 and 233, which forms an extension of the shaft 128, is a sleeve 220, the main purpose of which is at present immaterial, upon the circumference of which is formed a projection 222, Fig. 40, having side pieces 223, (also shown in Figs. 38 and 41,) to which is pivoted at 224 a catch-piece or pawl 225, which is held against the shaft 233 by means of a spring 227, attached to said sleeve. The end of the shaft 233 is cut away in volute form, as clearly shown in Fig. 40, leaving a shoulder 234 thereon adapted to be engaged by a detent or hook portion 226 upon the pawl 225. The bearing-face on the hook portion 226 of the catch-piece 225 is inclined at such an angle relatively to the pivot portion 224 that it is capable of disengagement from the tooth or shoulder 234 when undue strain is put upon the shaft 128.

The operation of said safety appliance is substantially as follows: During the normal operation of the machine the shaft 115 and the shaft 128 act together as one continuous shaft; but when from any cause the movement of the column-raising mechanism is arrested the spring 227 yields to permit the disengagement of the catch-piece from the shoulder of the shaft extension 233. In consequence of this action the shaft 115 is permitted to revolve without injury after the movement of the shaft 128 is arrested.

*Mechanism for removing the upper line from the column.*—Passing through and rigidly secured to the side plates 239 of the distributer-galley frame 17, Figs. 43 and 44, is a rod 100, to which are pivoted the lower ends of levers 331 through openings 332, in which is passed the eccentric portion of the shaft 130, which eccentric, when rotated, is adapted to act against the bearing-faces of said openings, and thus vibrate the levers. The upper portions of said levers are bent, as shown at 333, to avoid the shaft 129, and upon the upper ends thereof are formed rounded head portions 334, which are fitted loosely in corresponding recesses formed in blocks 335, which blocks are in turn loosely fitted in square openings 339, Fig. 47, formed in a gate or wide plunger 336, having the quadrangular body portion 337 and the diminished plate portion 338. Said gate is placed between the plate 242, Fig. 44, of the distributer-galley frame and the main distributer-plate 42, the former of which is provided with openings 243 (better shown in Fig. 45) for the passage of the lever-arms 331. It will be apparent by reference to Fig. 44 that the front or diminished portion 338 is adapted to bear against the feet of the upper line of type and when pushed forward, as hereinafter described, to advance the same upon a suitable raceway. A pin 340, Fig. 47, is attached to the gate 337 and adapted to engage with a slot 431, Fig. 45, in the galley-frame plate 242, which serves to limit the forward movement of the gate.

To avoid the lateral displacement of the upper line of type when lifted above the galley by the forwarding mechanism, I pivot a lever 344 upon the upper face of the plate 242 adjacent to the gate, as shown in Fig. 45, which lever is provided with a rounded bearing portion 345, adapted to engage with a recess 342, Fig. 47, in the side of the gate. Upon the opposite side of the lever is a right-angled projection 346, which is intended to be engaged by the inclined portion 343, Fig. 47, of the gate, the forward and backward movement of said gate causing the lever to be vibrated upon its pivot.

When, by the action of the mechanism for advancing the column, the upper line of type has been raised above the upper edge of the galley within the range of action of the gate, it is held at its right hand by the bearing-face on the projection 346, Fig. 79, which extends into the recess 271, Fig. 48, of the galley, while the left hand is held by the spring-stud 269, Figs. 48, 49, and 79. The parts described serve to properly hold and guide the line until it is moved far enough so as to bring its left-hand end into contact with the right-hand end of the follower-bar 473, Fig. 80, and its right-hand end into contact with the bearing-face of the left-hand side of the cut-off frame, which will be hereinafter described.

The operation of said mechanism is as follows: At the proper time in the movement of the machine the eccentric-shaft 130, Fig. 44, is caused to rotate, and the levers 331 connected therewith are consequently rocked on the rod 100 and caused, by means of the the heads 334 resting in the blocks 335, to actuate the gate 336 and move the same from the position shown in Fig. 80, and thus eject the upper line from the galley into the raceway, as shown in Figs. 44 and 80. By the forward movement of the gate the spring-stud 269 is depressed at the proper time, and the projection 346 is also moved out of the way, this latter result being accomplished by the contact of the inclined portion 343 of the wide gate, Fig. 47, with an inclined portion of the lever 344, as stated. The stud 269, Fig. 48, is returned to its normal position at the proper time by the action of a coiled spring upon the inner end of the stud. When the backward movement of the gate takes place, the front end of the lever is moved again into the proper position to hold the type-line, this result being accomplished by the projection 345 at the rear end of the lever passing out of the notch 342, as shown in Fig. 79.

In order to avoid undue pressure and friction upon the type when the upper line is pushed out by the gate, I cause the cam 207, Fig. 78, by which the column-moving ratchet-wheel 274 is actuated, to be so grooved as to permit a slight yielding action of the column at the time the gate is advanced. By the still further movement of the cam the pawls upon the ratchet-plate 276 are revolved in position to advance another line. The cam 207 then revolves in dead time, while the gate is being moved back to its normal position.

*Mechanism for advancing the type-line upon the raceway.*—When the type-line is removed from the column upon the raceway, it is advanced thereon laterally and fed step by step to a mechanism hereinafter described, known as the "cut-off," which mechanism is adapted to remove the type automatically, one by one, until the entire line is disposed of. It is not only essential to bring each type squarely up to and in positive contact with the cut-off mechanism, but inasmuch as the type vary in width it is likewise essential that the movemement by which each type is fed should correspond in degree to its width. In order to accomplish this result, I have embodied in the mechanism for advancing the line the same principle of excessive movement which is utilized and which has been described in connection with the column-advancing mechanism.

Beneath the front portion of the distributer-galley plate is located a raceway heretofore referred to, into which the upper line of the column is pushed by the gate, as shown in Figs. 80 and 105. Fitted in said raceway so as to slide lengthwise thereof is a line-follower 473. Said line-follower is adapted to be actuated by pawls hereinafter described, which pawls are in operative connection with a peculiarly-constructed two-part lever 366 370. (Shown in Figs. 81, 93, and 105.) Said lever is so constructed that while one part is adapted to be actuated positively the other is free to yield to a given resistance, and hence to accommodate itself with the utmost accuracy to the varying widths of type as the line is advanced to the cut-off. A pin upon the arm 370 is in operative connection with a groove 202 in a cam 201, mounted upon a continuously-rotating shaft 126. The other end of said arm is rigidly attached to a hollow vertical shaft 352, Fig. 93, which is provided with a central pivotal portion loosely inserted within a recess 347 in the distributer-galley plate 42. A flange 350 upon said shaft is also depressed in a suitable recess in said plate. The hollow shaft 352 is supported at the top by means of a bracket 53, rigidly attached to the plate 42. Surrounding the shaft is a sleeve 355, which is provided with a flange 356, forming a counterpart to the flange 350. A pin 363 is extended through the sleeve 353 and the hollow shaft to serve as a support for a block 360, which is inserted within the hollow shaft. Elongated slots, as shown, are provided in said shaft to permit a slight longitudinal movement thereof without being brought into contact with the pin. A strong spring 364 is inserted within the shaft, one end of which bears upon the block 360 and the other against a screw-cap 365 upon the top of the shaft, by which the tension of the spring may be regulated. The forward part 366 of the lever is provided with an annular portion 367, which is placed between the flanges 350 and 356. Friction-washers 351 and 357, of leather or other suitable material, are placed between said annular portion and said flanges 350 and 356, respectively, and form large flat friction-bearing surfaces therefor. It will thus be seen that when the spring 364 is placed under tension it presses downwardly upon the block 360 and hence upon the sleeve 355, while at the same time it causes an upward pressure upon the hollow shaft, thereby compressing the annular part 367 of the arm 366 between the friction-washers 351 and 357 with a pressure corresponding to the tension of the spring. As the arm 370 is keyed rigidly to the shaft and is actuated by the cam 201, it follows that its movement is positive and constant. The arm 366, however, receives its movement from the arm 370 through the oscillation of the shaft 352, and as its contact therewith is a frictional one it will move only when it meets a resistance sufficient to overcome said friction. Such a resistance is found in the abutment of the type against the obstruction formed therefor in the cut-off mechanism. As the movement of the arm 370 is sufficient to conform to the width of the widest type, this excessive movement is compensated for by the slipping of the arm 366 when a narrower type is fed to the cut-off.

The lever-arm 366 is provided with an opening in its outer end for the reception of a square block 395, Fig. 81, which forms a bearing for a stud 396, which is rigidly attached to a block 376, to which the pawls are attached, which serve to engage and actuate the line-follower bar when the lever is reciprocated. The slipping, as described, of the lever-arm 366 upon its frictional bearing upon being obstructed in its forward movement is compensated for in its return or backward movement by the abutment of the block 376, to which it is attached, against a suitable banking, as shown, which causes the lever-arm to slip upon its frictional bearing in an opposite direction. This serves to restore it to its normal position ready to again make a full forward movement for the purpose of advancing the widest type, if necessary, to the cut-off.

The block 376 referred to is also shown in Figs. 85 to 91, inclusive, and Fig. 93. Said block is provided upon its rear side with a rib or projection 377 and a similar depending projection 378, while a like projection 379 is formed on the inner face of a vertical projection of said block, as shown in Figs. 90 and 91. These projections fit into corresponding grooves in the front edge of the distributer-galley plate 42, as shown in Fig. 93.

A bar 388 is loosely inserted in the dovetailed groove 386, Figs. 90 and 91, one portion of which bar forms a flange which extends downwardly from the lower edge of the block 376, as shown in Figs. 86 and 91, and is provided with openings 390 therein, Figs. 86 to 89, inclusive, to permit of the passage of lever-arms 383, formed upon pawls 384, pivoted at 381 to the lower face of the block 376, said pawls being so located as to engage with the ratchet-teeth upon the line-follower bar 374, as shown in Fig. 158. A single pawl might be used; but I prefer to use a series and to arrange them with reference to the distance between the teeth, so that at least one pawl of the number will be sure to engage. The bar 388, the normal position of which with relation to the block 376 is shown in Figs. 86, 87, and 158, is adapted to slide longitudinally in the groove in which it is supported, so that its inner face may be brought into contact with the lever-arms 383 of the pawls, and thus disengage the latter from the ratchet-teeth of the line-follower. This movement is indicated in Figs. 88 and 159. The pawls are held normally in engagement with the ratchet-teeth by means of springs 394, Fig. 87.

The bar 388 is provided with contact-studs 391 and 392, which when the line is fed out are intended to engage with a lever 492, Figs. 93, 158 to 160, inclusive, 151, and 164, which lever is attached to a rock-shaft 488, adapted to be operated by a cam 214, Fig. 93, the groove 215 of which is in engagement with a pin upon a lever-arm 498, attached to said rock-shaft. The bar 388, when in its normal position, moves forward with the block 376; but at the proper time in the operation of the machine the lever 492 is moved to the left, when the contact-stud 391 is brought into engagement therewith and is held stationary thereby until the levers 383 are brought into contact with the depending flange of said bar and are caused to assume the position, respectively, as shown in Figs. 88 and 159, thus disengaging the pawls from the ratchet-teeth of the line-follower and leaving the latter free to be returned to its initial position by other mechanism. Upon the return of the block 376, the lever 492 being then in its right-hand position, as shown in Fig. 167, the contact-stud 392 is brought into engagement therewith, thus holding it stationary while the block 376 completes its rearward movement. At this time the levers 383 are again permitted to protrude through the openings 390, when the pawls again engage with the ratchet-teeth, ready to cause the forwarding of the line-follower. In the normal operation of the two-part lever to forward the line to the cut-off it is obvious that the pawls in the backward reciprocatory movement of the block 376 slip over the ratchet-teeth and in its forward movement actuate the line-follower one step, and it is only when the line-follower is to be returned to its normal position that they are disengaged therefrom.

The cam 214 is normally at rest and is only brought into action at the time the follower-bar 373 is returned to its normal position. The arm 492, therefore, is only actuated at that time to disengage the pawls. After the disengagement of the pawls a proper fall in the cam 214 causes the lever to make a partial return movement, so that the pawl-block can continue to reciprocate without bringing the studs 391 392 of the plate 388 into contact with the upper end of the lever 492, as shown in Fig. 160.

Figure 137:
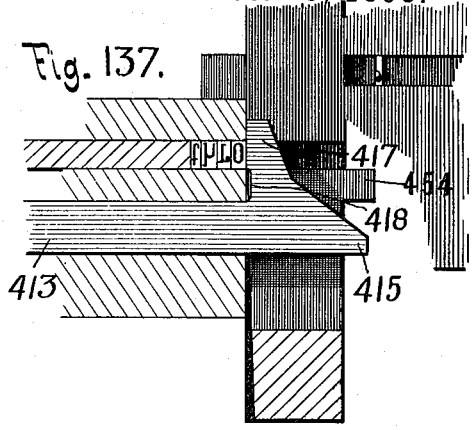

*Mechanism for controlling the advance of the type-line upon the raceway.*—In view of the constant variation in the width of the type, which is often very slight in degree, it is manifest that in order to enable any cut-off or separating mechanism to operate satisfactorily the type should be presented thereto with the utmost accuracy and no chance should be given to the type to become disarranged or misplaced in the slightest degree. To this end I have provided means whereby the type of the entire line may be clamped together while on the raceway, so that any slight variation in movement which might result from elasticity or the presence of foreign matter, such as oil or dust upon the type, may be avoided and the type of the whole line treated as an unit and moved as such. The line is advanced, as described, by the line-follower 473, which is positively actuated by the two-part lever 370 366. Working in conjunction with this lever is a secondary lever 403, Figs. 94, 95, 99, and 105, termed by me the "resistance-lever," whose province is to offer a frictional resistance to the foremost type of the line, in order that the type therein may be compressed and in effect clamped together as they are moved upon the raceway, so that no displacement thereof may be permitted. The lever 403 is pivotally mounted upon a vertical stud 54, the base 419 of which is rigidly attached to the plate 42. The annular bearing-surface of the lever, which is enlarged, is located between a rigid shoulder 420 and a loose collar 422, each of which is provided with a frictional packing, as shown, in contact with said annular part of said lever. A screw-cap 424, tapped upon the stud 54, is made to inclose a spring 425, so as to compress the same upon the collar 422 and thus produce a frictional resistance to the movement of the lever, the degree of which may be varied to any extent desired by turning said screw-cap. A pin 404, Fig. 99, is in operative proximity to the working face 200 of a cam 199, which is keyed to the shaft 126, so as to permit of longitudinal movement thereon. The object of the cam is to return the lever to its normal position after having been moved in an opposite direction by the forwarding of the type-line. The forward end of the lever is connected with a short vertical lever 406, Figs. 94, 95, 99, and 105, by means of a connecting-piece 410, having balls 411 upon the respective ends adapted to bear in corresponding sockets in the ends of the levers 403 and 406, respectively. The connecting-piece is provided with pins, as shown, which project through the levers to hold the piece in place, and is made adjustable longitudinally by means of a suitable intermediate screw connection. The lever 406 is pivoted at 407 to a block 59, attached to the plate 42, and a bearing-face 409, Fig. 95, is adapted to engage with a projection 414 of a hook-bar 413, arranged to slide in a suitable guide beneath and parallel with the raceway. Said bar is shown in detail in Figs. 104, 113, and 131. The extension 414 extends through a suitable slot in the face-plate, Figs. 95 and 104, so as to permit the bar 413 to be moved longitudinally. A vertical bearing-face 417 is extended above the raceway and adapted to press against one side of the end type, as shown in Fig. 137, so that as the type-line is pushed forward upon the raceway through the action of the two-part lever described the bar 413 is pushed with it; but owing to the friction upon the bearing-faces of the lever 403 the hook-bar offers a sufficient resistance to the movement of the line to compress the type therein and hold them thus clamped together between the bearing-face 417 and the end of the line-follower until they are acted upon by the cut-off. Upon the removal of the end type, as hereinafter explained, the lever 403 is returned to its normal position through the action of the cam 199, which movement also serves to restore the bar 413 to its normal position into contact with the next succeeding type. In the event, however, that the cut-off should fail to remove the end type and it should remain, for example, in the position shown in Fig. 139, it is obvious that the lever 403 could not be returned to its normal position without causing breakage. To avoid this danger, therefore, I have provided an automatic safety appliance, through the action of which the cam 199 may at such time be permitted to yield and thus to prevent injury to any of the parts.

Figure 134:
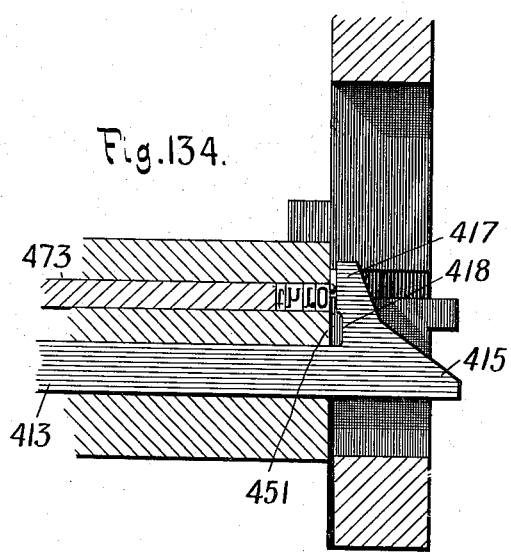

Integral with or rigidly attached to the cam 199 is a cam 197, one portion of which is flush with the periphery of the cam 199, as shown in Figs. 97 and 99, while the remainder is cut away, as shown. A stud 427 is inserted within a recess in a support 57, rigidly attached to the plate 42. A pin 428, passing through the stud and into a slot 426, serves to hold the stud in place, while it permits of a limited movement thereof. The end of the stud is adapted to bear upon the face 198 of the cam 197, against which it is pressed by the action of a spring 429, and the side thereof against the side of the cam 199 at all times, except when the cam 497 is in the position shown in Fig. 97, at which time it is obvious that it can offer no resistance to the lateral movement of the cam, being flush with the periphery thereof. Upon the shaft 126, adjacent to the cam 197, is rigidly secured a sleeve 430, upon the right-hand end of which is formed a screw-thread, which engages with a flange 433 of a sleeve 432, between which and the sleeve 430 is inserted a coiled spring 435, one end of which bears against the flange 433 and the other against an annular flange 434, formed upon the cam 197 and adapted to project loosely into the space between said sleeves. The cam 197 is in the position shown in Fig. 97 at the time when the lever 403 is moved by the cam 199 to restore the hook-bar 413 to its normal position, and hence the cam 199 is free to be moved to the right upon the shaft, except for the resistance of the spring 435. At all other times said cam is positively locked against longitudinal movement by the bolt 427. Should a type intervene at this time between the face of the plate 42 and the bearing-face 417 of the hook-bar, as shown in Fig. 134, it is obvious, as before suggested, that the hook-bar could not be returned without breakage. In such an event the lever 403 remains stationary, while the cam 199 is moved to the right against the pressure of the spring 435 and injury to the parts is avoided. Upon removing the obstructing type and starting the machine the parts automatically assume their respective normal positions and continue their work as if there had been no interruption.

In order to render the pressure upon the line constant during the shifting of the reciprocating two-part lever, I have provided as auxiliary to the mechanism above described a device which I term the "constant-pressure mechanism," which is intended to coact with the hook-bar and resistance-lever 403, so as to render the clamping action upon the type continuous during the time that the portion 370, Fig. 81, of the two-part lever is released from the action of the cam. Said constant-pressure mechanism consists of a pin 399, Figs. 81 and 82, having a head 400, which projects slightly through a bore in a bracket 56, adjacent to the lever-arm 370. A spring 402, inclosed within a screw-cap 401, exerts a pressure upon the pin, and when the parts are in their normal positions the outer end of the pin bears against the adjacent face of said lever-arm, exerting a constant pressure thereon, the degree of which may be varied, as desired, by means of the screw-cap. This pressure is transmitted through the lever to the type-line, which latter is thus held under moderate tension at a time when without it there might be such a relaxation as would permit a possible slight displacement of the type and thus interfere with the proper action of the machine.

*Mechanism for causing the return of the line-follower bar, initiating the advancement of the dead-matter column, and introducing a new line into the raceway.*—Having described the construction and operation of the mechanism for advancing the dead-matter column, removing a line therefrom and advancing and controlling the same upon the raceway, I will proceed to describe the novel means employed by me for returning the line-follower bar, initiating the action of the column-advancing mechanism, and for introducing a new line into the raceway.

It is obvious that the mechanisms about to be considered can only act intermittently, all but the line-follower bar being held dormant until the type of the entire previous line shall have been disposed of one by one. Hence I prefer to employ the line-follower bar as a prime controlling element to initiate the movement by which the column is advanced and the next succeeding line is removed therefrom.

It will be borne in mind from the previous description that the column is advanced and the line removed therefrom by the action of the eccentric-shaft 130, which shaft is normally at rest. It is essential, therefore, that means should be provided for bringing said shaft into action in harmony with the return of the line-follower bar, which is accomplished as follows: The cam 79, Figs. 19, 43, 65, 142, and 145, hereinbefore described in connection with the column-forwarding mechanism, is rigidly attached, as stated, to the shaft 130 and adapted to be clutched to the continuously-revolving loose gear-wheel 158, in order to actuate said shaft; but it is essential in order that it may be so clutched to establish a relation between said shaft and the other parts which coact therewith in order that the clutching action may be accomplished. For this purpose I provide means for locking the shaft in a given position upon the completion of each revolution, and I utilize the movement of the line-follower bar to first unlock it and then to initiate its movement. Keyed rigidly to said shaft, adjacent to the cam 207, Figs. 65, 142, and 145, is a cam-cylinder 216, upon which is formed a series of three cams, constituting a group 211, Fig. 143. Adjacent thereto is a bracket 18, Figs. 142 and 145, in a bore, in which is located a locking-bolt 505, the end of which bears against a spring 506, attached to the outside of the bracket. Said bolt is adapted to enter a corresponding hole in the cam 216, in which is loosely inserted a push-rod 507, which is held loosely in place by means of a set-screw arranged to engage with a recess therein, as shown, so as permit a limited longitudinal movement thereof. Said rod projects normally beyond the bearing-face 217 of the cam 216, as shown in Fig. 145, at which time the cam is locked in position by the bolt 505. Pivoted upon a stud 104 beneath the distributer-galley plate, Figs. 140 to 145, inclusive, is a bent lever 510, having a downwardly-projecting stud 512 upon its short arm in operative proximity to the working face 217 of the cam 216. In a curved slot 511 of said lever is adjustably secured a stud 516, to which is pivoted one end of a link 515. The other end of said link is in turn pivoted to a long lever 513, pivoted at the rear end thereof to a stud 103 upon the plate 42, while the front end is connected by means of a link 514 to the line-follower bar 473. The object of the curved slot 511 is to enable the movement of the line-follower to be adjusted to columns of different widths.

The operation of said device is as follows: When the line-follower is advanced to its full limit and the last type of the line is cut off, the bent lever 510 is caused, through the positive action of the line-follower and lever 513, to assume the position shown in Fig. 141, when the stud 512 is forced against the end of the push-rod 507, as clearly shown in Fig. 142, thereby forcing the bolt 505 against the action of the spring 506 and out of engagement with the cam 216, thus leaving the latter unlocked and free to be rotated. Simultaneously with the unlocking of the cam occurs the clutching of the shaft 130, as hereinafter described, which causes the cam 216 to revolve. By the first movement of said cam, through the groove 214 thereon and the intermediate mechanisms described, the pawls are disengaged from the line-follower bar. The bearing-face 217 of said cam, acting against the stud 512, reverses the position of the lever 510, as shown in Figs. 140 and 145, thereby positively returning the released line-follower bar to its normal position through the action of the lever 513 and releasing the push-rod 507, whereupon the bolt 505 is free to be pushed by the spring 506 into engagement with the cam 216 and again lock it upon the completion of its revolution. At the same time that the line-follower causes the unlocking of the cam 216 it also serves to initiate the action of the clutch, which causes the rotation of the shaft 130 in the following manner: Pivoted upon the under side of the distributer-galley plate 42 upon a stud 106, Figs. 140, 141, and 146, is a lever 475, the front end of which is in operative proximity to and adapted to be engaged by a projection 474 upon the line-follower bar 473 near its rear end, when the latter is advanced to its full limit, as indicated in Fig. 141. The end of the long arm of said lever is pivoted at 477 to a secondary lever, which in turn is pivoted at its rear end to a stud 105 upon the distributer-plate 42. Upon the under side of the front end of the lever 476 is formed a wedge-shaped projection 478, which is adapted to engage with a wedge-shaped cam-piece 209, Figs. 19, 30, 31, 65, 142, 145, and 146 to 150, inclusive, having bearing-surfaces 210, Figs. 31 and 146, upon a sleeve, which is keyed to the shaft 129 in such a manner as to revolve therewith, while it is free to be moved longitudinally thereon. The lateral movement of the cam-piece 478 is limited by rigid bankings, as shown in Figs. 140 and 141, so that if it is in one or the other of its extreme positions the cam-piece 209 will be engaged therewith as the shaft is rotated and cause said sleeve to slide upon the shaft in conformity to the position of said cam-piece 478. The sleeve upon which is formed said cam-piece is provided with a disk-collar 479, which is adjusted to engage with a circumferential groove 480, Figs. 113 and 65, in the cam 207, hereinbefore referred to, and when the cam is in its normal position with a transverse notch 485, formed in a sliding block 484, Figs. 23 to 28, inclusive, which is loosely fitted in a transverse dovetailed groove 481, Fig. 29, formed in a periphery of said cam. Notches upon the under side of said block (better shown in Fig. 28) are adapted to be engaged by a spring-actuated pin 482, Fig. 145, by which the block may be held in one of two extreme positions, into one or the other of which it may be moved by the positive action of the collar-disk 479 when the sleeve to which the latter is attached is actuated longitudinally.

Loosely mounted upon the shaft 130, adjacent to the cam 207, is a gear-wheel 158, Figs. 65, 142, 144, and 145, which is provided with lateral sector-shaped projections 487, Figs. 142 and 144, in operative proximity to the sliding block 484, the end 486 of which is adapted to engage with said projections. Said gear-wheel is driven by the continuously-revolving pinion 157, Fig. 65, but can only cause the rotation of the shaft when in engagement with the cam 207. This is accomplished as follows: When the type are all fed out and the line-follower is advanced to its full limit, as shown in Fig. 141, the contact of the projection 474 with the end of the lever 475 will have caused the free end of the lever 476 to be moved to its extreme left-hand position against the banking, as indicated in dotted lines in said last-named figure. As the cam 207 when at rest is always locked in position to cause the disk-collar 479 to be in engagement with the sliding block 484, the rotation of the cam-piece 209 causes the block 484 to be moved longitudinally into engagement with one of the projections 478 of the gear-wheel 158, which clamps said wheel to the cam 207 and causes the rotation of the latter, the cam 216 having been an instant before unlocked, as shown in Fig. 142, to permit such rotation. This movement causes the disk 479 to engage with the groove 480, which prevents any longitudnial movement of the sleeve until the cam shall have completed its revolution, when the disk-collar is again in engagement with the block 484, ready to reverse the position of the latter and release the gear-wheel 158, in the manner hereinafter explained.

The rotation of the cam 207 serves to actuate the lever 328, Figs. 65, 77, and 78, thus moving the ratchet mechanism to advance the column and feed a new line, while at the same time the rotation of the eccentric-shaft 130 causes the removal of the line to the raceway and the return of the gate by which it is actuated, in the manner hereinbefore described.

The shifting of the cam-piece 209 to its normal position, which causes the unclutching of the cam 207 after the completion of a single revolution, is accomplished as follows: In the cam 216, Figs. 140, 145, 161, and 162, is formed a cam-groove 213, which is engaged by a pin 519, attached to a slide 518, having a bearing in the bracket 18, Fig. 145. The slide is connected by means of an adjustable rod 517 to a lever 520, pivoted at 44 to a bracket 43, attached to the plate 42. Attached to the other end of said lever is a rod 521, the right-hand end of which is supported in a bearing 522, Fig. 141, adjacent to the lever-arm 475. The groove 213 in the cam 216 is so timed that during the last quarter of the revolution of said cam and in harmony with the various operations above described for forwarding the column and advancing the new line into the raceway, the slide 518 is moved thereby to the left and the rod 521 consequently pushed to the right against the lever 475, which causes the movement of the latter, together with that of the lever 476, to their respective normal positions. The wedge-piece 478 upon the lever 476 is therefore moved to the right, as shown in dotted lines in Fig. 140 and in full lines in Fig. 161. In this position of the wedge-piece 478 its left-hand bearing-face is caused to engage with the right-hand bearing-face on the cam 209, as shown in Fig. 150, and by contact with it to move the cam and sleeve attached thereto to the left, which causes the collar 479 of the sleeve to disengage the bolt 484 from the block 487 on the face of the gear-wheel 158, as shown in Fig. 145. The bolt being thus disengaged, the movement of the cam 207 and the eccentric-shaft attached thereto ceases and remains locked in its normal position until the new line is fed out, when the operations described are repeated until the galley is empty. Just before the clutching-bolt 484 of the cam 207 is disengaged the cam-groove 215 on the cam 216, through the intermediate mechanism described, is caused to move the lever 492 into position to effect the engagement of the feeding-pawls with the teeth of the line-follower bar. The eccentric-shaft is then locked in the manner specified.

*Mechanism for stopping the feed when the last line of the column is introduced into the raceway.*—When the column-feeding rack-plate 255 is advanced to its full upward limit after the removal of the last line of the column and the feeding to the cut-off of the last type of the line, a flange or contact portion 523, Figs. 65 and 163 to 167, inclusive, is caused to engage with a stud or pin 524, which is held in a suitable opening in the plate 42. Arranged in suitable guides on the top of said plate, as shown in Fig. 81, is a push-bar 528, (shown in detail in Fig. 156,) which is provided with a beveled face upon its right-hand end adapted to enter a notch 525 in the stud 524 when said stud is in its normal position, as shown in Fig. 163. The opposite end of said push-bar is arranged to bear against a pin 529, Fig. 154, upon a lever-arm 530, which is pivoted to the plate 42 at right angles to the push-bar and arranged to project beyond the face of said plate into the path of movement of the lever 492, as shown in Fig. 81. Said lever-arm is extended beneath a spring 531, Figs. 209, 152, and 95, which is provided with a head portion 532, having an inclined face and a catch-shoulder 533. The head portion rests normally upon said lever-arm, as shown in Fig. 163. A block 393, Figs. 81, 85, and 163, is adapted to engage with the inclined face of the spring 531 and lift the same with each backward movement of the block 376, thus releasing the lever-arm and leaving it free to be moved to the right except for the obstruction of the push-bar 528.

The operation of said device is as follows: When the stud 524 is pushed up by the rack-plate 255, the inclined face upon the notch 525, faces the push-bar 528 to the left, which pushes the lever 530 until it is engaged by the shoulder of the spring-catch 531. When the lever 495, Fig. 151, is forced to the right by the positive action of the cam-groove 215, the spring 503 permits the lever 492, then in contact with the lever 530, to yield, and hence the pawls are prevented from engaging the teeth of the follower-bar. This condition continues as long as the stud 424 remains raised; but as soon as it is depressed by the hand of the operator and the lever 530 is released by the automatic action of the block 393 upon the spring 531, the spring 503, as the rock-shaft 488 is oscillated to the right, forces the lever 530 into its normal position, and through it the push-bar 528. The lever 492 then moves the pawl-slide 388 into position to permit the re-engagement of the pawls with the line-follower bar. It will thus be seen that by merely pushing up the stud 424, whether through the action of the rack-plate or by hand, serves to lock the lever 492 in its left-hand position, which prevents the engagement of the pawls with the line-follower bar and stops the feed.

*The mechanism for cutting off or separating the individual type from the line.*—As has been described, the type is compressed against the hook 417 while being advanced upon the raceway, and while thus compressed, to prevent the possibility of displacement, it is introduced into the cut-off in the following manner: The bar 415, with the hook 417 thereon, is projected loosely into suitable notches formed in a rectangular frame 449, known as the "cut-off frame," the axis of which is in a vertical plane at right angles to that of the axis of the bar 415, as clearly shown in Figs. 111, 115, and 131 to 139, inclusive. The bottom portion 452 is separable from but rigidly attached to the upper part, as indicated, and is provided with a central prong 453, which projects upwardly through the slot 416 of the hook-bar 413, the slot being sufficiently long to permit of a limited movement of said bar. Said bottom portion, as it appears when detached, is shown in detail in Figs. 127 and 128. Depending parts 450 and 450 project downwardly from the upper part of the frame, leaving sufficient space for a type to pass beneath them, as shown in Fig. 129. The cut-off frame 449 is arranged to slide loosely in suitable guides formed in the plate 42 and provided with an upwardly-extending stem 456, intended for use in actuating said cut-off, which stem is reduced in size, as shown at 457 and 460, respectively, Fig. 121. The upper end of the stem is supported in a bearing formed in a shoulder 468, Figs. 106, 107, and 108, which is rigidly attached to a standard 60, secured in turn to the plate 42. A sleeve 461, Figs. 109, 110, and 126, is secured to the part 457, Fig. 121, so as to have a longitudinal movement thereon, but is prevented from revolving by means of a spline 458, as shown in said last-named figure. A secondary sleeve 462, Figs. 108 and 119, is adjustably secured upon the stem 457 by means of the screw-thread 459 and fastened in any desired position by means of the lock-nut 465, within which sleeve is placed a coiled spring 464, the upper end of which bears against the upper annular bearing-face of the sleeve and the lower end upon the upper end of the sleeve 461. A secondary spiral spring 471, inclosed within a sleeve 469, surrounds the upper portion of the stem, the lower end of said spring being arranged to rest against the shoulder 468 and the upper end against the bottom of a sleeve 470, which is tapped upon the stem and fastened in the desired position by means of a large headed screw which enters the upper end of the stem. Lock-nuts 466 467 are placed upon the screw-thread 459 of the stem for the purpose of limiting the upward movement thereof. The cut-off frame is actuated through the sleeve 461, the lower end of which bears against the shoulder formed by the enlarged part 456 and the upper end against the spring 464. It will thus be apparent that said frame is capable of an elastic movement in its upward direction occasioned by the yielding of the spring 464, while the positive downward movement is opposed by the action of the lighter spring 471. The sleeve 461 is provided with laterally-projecting pins 447, upon which is loosely placed square blocks 446, which are in loose engagement with corresponding openings in the forward end of a lever 442, which is pivoted at 438 to a bracket 62. Said lever is made in two parts, both of which are independently pivoted upon the same pivot-pin 438. The front portion is provided with a rear extension 443, which is placed between two lips 440, formed upon the part 436, through which are projected set-screws 441, adapted to engage with the part 443 for purposes of accurate adjustment. A binding-screw serves to secure the levers firmly in place when once adjusted. A pin 437 upon the rear end of the arm 436 is arranged to engage with a groove 196, formed in a cam 195 upon the continuously-revolving shaft 126.

Figure 133:
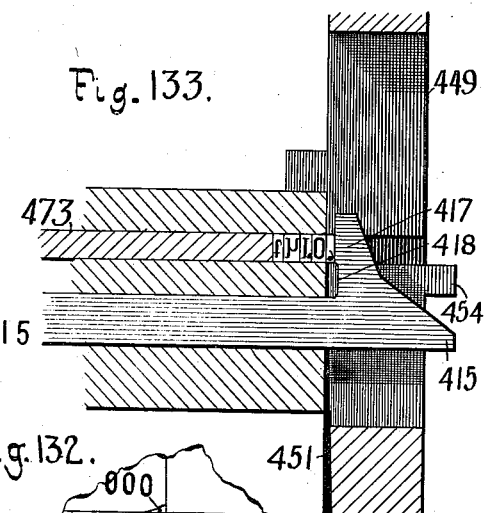
Figure 135:
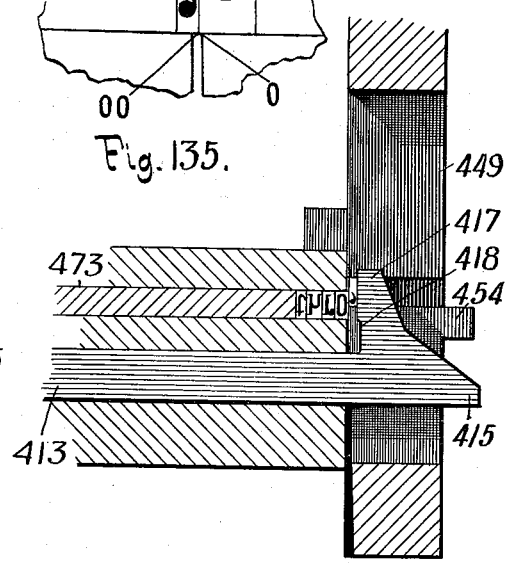
Figure 136:
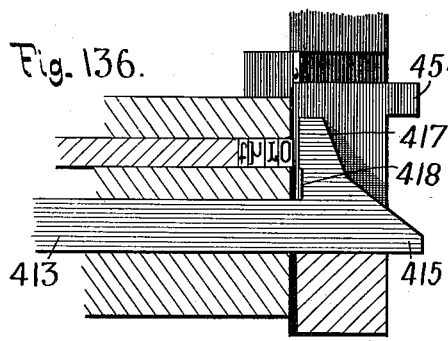
Figure 138:
Figure 139:
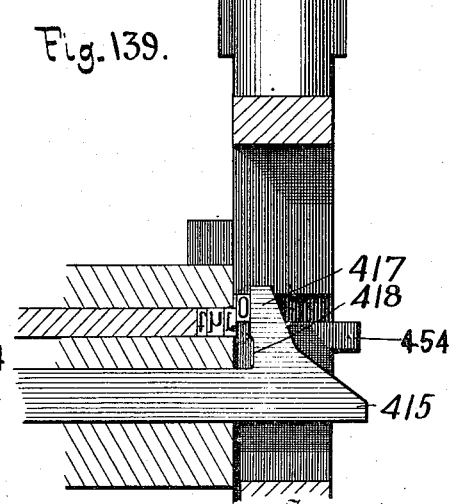

The operation of my improved cut-off is as follows: In advancing the line of type to the cut-off by means of a line-follower bar 473, the rear portion 370, Fig. 105, of the compound feeding-lever is given an excessive forward movement in two distinct impulses, the first of which is limited by the movement of the feed-controlling hook, while the second is limited and determined by the width of the end type, which is advanced by this movement into the cut-off frame. The normal position of the parts before the first action takes place, the extent of which is intended to conform to the width of the thinnest type in the line in order to introduce it into the cut-off, is shown in Fig. 131. Assuming the parts to be in the respective positions shown in said figure, the line-feeding and feed-controlling mechanisms are actuated to cause the advance of the line a sufficient distance to introduce the thin type on the front end of the type-line into the raceway-space of the cut-off frame, as shown in Fig. 133. The type having been thus advanced until it is entirely within the cut-off frame and past the end of the upper wall of the raceway, so that the latter no further offers resistance thereto, it is free to be lifted by the cut-off frame, the upward movement of which is also effected by two distinct impulses through the action of the cam 195 and the two-part lever connected therewith. The first impulse causes the type to be separated from the line and to be lifted a given distance, as shown in Fig. 134. In order to prevent a conflict in this first action between the upper edge of the lower portion of the cut-off frame and the edge of the type which is next to the end, I cause the lower portion of the cut-off frame next to the type-line to be slightly cut away, as shown at 451, Figs. 114, 115, 130, and 134. This feature enables the cut-off to work continuously without any danger of injury to the type. When the first type is partially separated, as shown in Fig. 134, the second impulse is given to the line-feeding and line-controlling mechanisms; but as the second type of the line bears against the solid wall of the cut-off frame the friction-surfaces of the line-feeding mechanism are caused to slip and the position of the parts remain practically unchanged, as shown in Fig. 135. By the second impulse of the cut off lever the cut-off frame with the thin type is lifted to its full limit, as shown in Fig. 136, in a plane with the main distributer-raceway, as shown in Fig. 137. Assuming that a thicker type is introduced to the cut-off, the line-feeding and line-controlling mechanisms operate in a similar manner. By the first impulse the wider type is moved a distance corresponding to the width of a thin type, as shown in Fig. 138. Simultaneous with this action occurs the first action of the cam 195 upon the lever which actuates the cut-off frame. As the upper wall of the raceway prevents the wider type from being lifted, the spring 464 yields, as shown in said last-named figure, under the action of the lever, thus permitting the sleeve 461 to rise while the cut-off remains stationary. A further movement being made, which causes the entered type to be moved far enough to be disengaged from the upper wall of the raceway, the spring 464 is permitted to react, when the type is instantly carried up the first distance, as shown in Fig. 139. Afterward, at the proper time, it is lifted the full distance by the second impulse of the actuating-lever in the same manner employed to lift the thinner type to the level of the upper raceway. Should the end type prove to be one of the widest of the font, it will not be fully entered until the advancing action is nearly completed, when it will be carried up by two distinct movements in the manner described.

As the various mechanisms for feeding the dead-matter column, advancing and controlling the type-line, and for separating the individual type from the line are required to work in harmony with each other, I have indicated in diagram in Fig. 37 the relative timing of the cams 197, 201, 199, and 195. The cam 199 is employed, as stated, in connection with the hook mechanism. By means of the rise marked "return" on the diagram the lever and hook are caused to be returned to their respective normal positions, at which time the hook is at the extreme limit of its rearward movement, as shown in Fig. 131, with its inner face bearing against the outer face of the new type. Said cam, after causing this return movement, continues to revolve in "dead time" until that portion of the bearing-face marked "first release" is brought opposite the pin of the lever. This permits the pin, lever, and controlling-hook to be moved independently of the cam a sufficient distance to enable the first type at the front end of the line to be entered into the cut-off frame a distance equal to the width of the widest of what may be termed the "thinner" types of the font. The controlling-hook, however, has, as described, no action of its own, but, on the contrary, is held against movement by the friction-bearing surfaces upon the stud 54 of the lever. Immediately after the action just described the cam 201, employed in connection with the mechanism for advancing the line, is caused, by means of its first rise, to actuate the feeding-lever and thereby advance the type-line through the line-follower bar, as above described. This action causes the movement of the hook, the intermediate-lever 406, Fig. 95, and the lever 403 the full distance permitted by the first release on the controlling-cam against the resistance of the friction-bearing surfaces on the stud 54 of the lever 403. A fall upon the cam 201 (indicated in said diagram as the first release) permits a slight retrograde movement of the feeding-lever, by means of which the type-line is somewhat released from pressure, in order that the end type may be separated from the line without the requirement of much force. In order to permit a slight initiatory movement of the thin end type, the end of the upper wall of the raceway is beveled, as shown at O O O in the enlarged view, Fig. 132.

It will thus be seen that by reason of the excessive movements given to the feed-advancing lever the friction-bearing surfaces upon that and the feed-controlling lever coupled with the releasing action of the feed-controlling cam and the double impulses caused by the feed-advancing and cut-off cams, respectively, that the type may not only be positively controlled in their respective movements and prevented from becoming displaced, but that type of varying widths from the thinnest to the widest may be separated from the line with the utmost rapidity and without danger of conflict of the parts therewith or of injury thereto.

When the separated type is lifted by the cut-off to the upper plane it is brought within the range of action of certain conveying mechanisms, which will now be described.

*The short comb or conveyer for presenting the type to the special testing mechanisms.*—Having described the manner in which the type is conveyed to the cut-off, separated from the line and lifted to the upper raceway, I will now describe the means by which it is transferred to that raceway and the comb mechanism known as the "short comb" for conveying the same thereon to the special testing mechanisms, which are adapted to remove all defective type as well as those not provided for in the type-case. The mechanism for further conveying the type along the raceway for delivery to the type-case known as the "long-comb" mechanism, which coacts with the other, but differs therefrom in construction, will be described after completing the description of the testing mechanism. The lower portion of the cut-off frame is provided with extensions 454, Figs. 127 to 137, inclusive, which, when the cut-off frame is in its raised position, are upon a level with and form a part of the upper raceway 563. These extensions are intended to support the type momentarily while it is being transferred from the type or raceway opening in the cut-off to the raceway proper. Immediately above and parallel with said raceway, as clearly shown in Fig. 168, is located the short-comb type-conveying device 543, which is also shown in detail in Figs. 170 to 172, inclusive. The reason for employing separate combs in different parts of the raceway is to enable one to operate preferably above the raceway for the purpose of presenting the type to the special testing mechanisms and the other to operate from beneath in order to enable the type to be lifted from the raceway into the type-case. Moreover, inasmuch as the special testing-wards are farther apart than the type-channels, the one comb requires a longer movement than the other.

The short comb is provided with an auxiliary portion 550, which, to all intents and purposes, is one with the main part 543. To the main part is attached blocks 542 and to the auxiliary part similar blocks 552, which are capable of both vertical and horizontal movement in the frame-plate. Connected with said blocks, as shown, or in any well-known way, are lever-arms 540 and 556, respectively, all of which are rigidly attached to a rock-shaft 132, pivoted in suitable bearings, as shown in Fig. 169, upon the frame-plate 42. A two-part lever-arm is also attached to said rock-shaft in the following manner: An arm 536 is rigidly attached to said shaft, which arm is provided with laterally-projecting flanges 538, also shown in Fig 176, which overlap and partially inclose a secondary arm 534, which is loosely attached to the shaft 532, and the rear end of which is provided with a pin adapted to engage with a groove in the cam 188 upon the shaft 126.

By means of set-screws 538 539, the arms 534 and 536 may be adjusted, as desired, with reference to each other, which, as is obvious, serves to adjust the movement of the arms 540 and 556. The two-part arm, the rock-shaft, and the arms 540 556 form in effect a single lever, by means of which, through the rotation of the cam 188, serves to impart a reciprocatory motion to the comb. Rigidly attached at one end to the stud or block 542 is a link 547, the right-hand end of which is loosely secured to a pin 549 upon the block 551. Connected at its forward end with a square block upon said pin is a two-part lever 545, which is pivoted upon a stationary pin 71. The rear part 544 of said lever is provided with depending flanges, which overlap the rearwardly-extended part of the forward member 545, as clearly shown in Fig. 176, the relations of the two being adjusted by means of set-screws 546, substantially as in the lever last described. A pin upon the rear end of the arm 544 is adapted to engage with a groove in a cam 186, which is likewise mounted upon the continuously-rotating shaft 126. By means of the lever last described a horizontal movement is imparted to the comb, and as the last-named lever and rock-shaft work in harmony with each other a four-motion movement is thus given to said comb, by means of which the type, acted upon by the teeth of the comb, which are equidistant from each other, are intermittently conveyed along the raceway, so as to be subjected to the respective tests required. The raceway at the left-hand end of the main portion of the short comb overlaps the projections 454, Fig. 128, of the cut-off frame, so that when the latter is raised to its highest position a continuous raceway, as before described, is formed, upon which the type is conveyed from the cut-off frame by the action of the comb. The left-hand end of the short comb is bifurcated, as shown in Fig. 170, in such a manner as to adapt it to enter the upper openings of the cut-off frame, as shown in Fig. 168, and engage the type while the latter are upon said frame.

*The first registering mechanism.*—After separating the individual type from the line and before distributing it into the type-case, I provide means for removing therefrom extraneous matter, or that matter not provided for in the type-case. This is accomplished by means of special selecting mechanism hereinafter described, and in order that the type may be accurately presented to that mechanism I first provide means for registering the same upon the raceway. There are two registering mechanisms which are adapted to act upon the type before it leaves the short comb-conveyer, which mechanisms will be described in the order of their operation. The first one is as follows: Adjusted in suitable guides upon the frame-plate 42, as shown in Figs. 181 and 182, is a reciprocating plunger, preferably formed as shown in said figures and also in Figs. 190 and 191, the forward end 585 of which is in the plane of the raceway, so as to engage with the foot of the type thereon in the manner represented. The lower end of one arm 577 of a bell-crank lever is loosely connected with said plunger by means of a link 582 in the usual way. Said lever-arm is loosely pivoted upon a short rock-shaft 578, supported in bearings in a bracket 64. The other arm 576 of said bell-crank lever is also secured to said rock-shaft, which arm is provided with an extended portion 579, adjustably secured by means of set-screws between flanges 586. A pin upon the rear end of the arm 576 is in engagement with a groove 194 of a cam 193 upon the shaft 126. The rotation of the cam causes the plunger to be regularly reciprocated in harmony with the reciprocatory movement of the type-conveying comb. As each individual type is advanced by the comb to a given position upon the raceway immediately in front of the registering-plunger 585, the latter, through the action of the lever and cam described, is given a forward movement against the foot of the type, as shown in Fig. 182, which serves to push the latter into the exact position longitudinally to enable it to be properly acted upon by the testing mechanisms.

In order to avoid a displacement of the type upon the raceway, as well as to comply with the requirements of the testing mechanisms which are intended first to test the strength of the type, it is necessary to construct said raceway in a peculiar manner, which will first be described.

The raceway 588, Figs. 193 to 197, inclusive, consists of an open framework having side pieces 590, which are integral with or attached to blocks 589, which are secured in turn to the frame-plate 42. The side pieces form the lower portion of the raceway and their upper edges serve as bearing-surfaces for the ends of the type. Should the type be broken in testing, they are free to fall through the openings in the raceway. Special pieces 591 of hardened steel are inserted in the raceway to prevent wear from the longitudinal movement of the type under the action of the registering mechanism. The upper raceway 594 (shown in its proper position in Figs. 168 and 175 and in detail in Figs. 183 and 184) consists of a thin bar placed above and parallel with the lower raceway and located in the central longitudinal slot extending from end to end of the comb. Said bar is rigidly attached to the bracket-plate 63, Fig. 204, while the comb is supported, as described, in a manner to permit proper longitudinal and vertical movement. Secured in vertical holes drilled in the upper raceway-bar are a series of headed posts 595 and spiral springs 596, which bear upon the inner ends of the posts, which are permitted to have a slight vertical movement. The lower faces of the post-heads are slightly beveled, as shown, to enable the type to be pushed laterally beneath them without obstruction. By means of this construction the upper raceway, usually termed the "spring-post raceway," furnishes an elastic bearing-surface, beneath which the type are forwarded and by means of which all lateral displacement or excess of movement resulting from inertia or otherwise may be avoided.

*The testing mechanisms.*—The testing mechanisms are intended to test the strength of the type by applying strains thereto, so as to act in opposite directions thereon with reference to the edges, and said mechanisms differ in construction only in minor details, the general construction of the two being the same. Broadly speaking, they may be said to consist of two plungers under spring tension and means for reciprocating the same in harmony with the action of the comb, so that the type may, with each movement of the comb, be passed beneath the plungers in such a way that if too weak to withstand the spring-pressure of the plungers, respectively, the type will be bent or broken, thus permitting an excessive movement of the plunger, to the pressure of which it yields, and thereby initiating the action of a type-lever, which permits an ejecting-plunger to be brought into action to eject the type.

Sustained in suitable bearings in brackets 606, Figs. 14 and 198 to 204, inclusive, are testing-plungers 612 and 647, respectively, which are located above the raceway and are adapted to be reciprocated in the manner hereinafter set forth. Side and edge views of said plungers are shown in detail in Figs. 365 to 368, inclusive. The special construction of said plungers will be explained in connection with the description of their operation. Pivoted at 620, Figs. 198 and 199, upon a shoulder formed upon the bracket 606 are levers 621 621, (shown in detail in Figs. 215 and 216,) the forward ends of which are in engagement, as shown, with the testing-plungers 612 and 647, respectively. The rear ends of said levers are in operative proximity, respectively, to the short arms of tripping-levers 636, Fig. 200, each of which is provided with a set-screw 640 for purposes of adjustment and a binding-screw 641; but in the normal operation of the plungers the movement of the levers 621 is not sufficient to cause them to be brought into contact with the tripping-levers, the province of which is to initiate the action, as hereinafter described, of ejecting plungers, one of which, 628, is shown in Fig. 202. Rigidly attached to a sleeve which is mounted upon a shaft 600, sustained in suitable supports, is a lever 601, the rear arm 603 of which is provided with a pin adapted to engage with the groove 191 of a cam 190 upon the shaft 126. The short arm 604 of said lever is located between the levers 621, and is provided with a plate upon the end which overlaps said levers. Set-screws 605 in said plate permit of a proper adjustment. A two-part or compound bell-crank lever, (shown in detail in Figs. 213 and 214,) having the arms 622 623, respectively, is pivoted upon an upright 65, and a pin upon the short arm is in engagement with a groove 92 in the cam 190, so that with each revolution of said cam the arm 623 is caused to be reciprocated. Upon the lower end of the arm 623 are detents or arms 627, which are adapted to engage with notches in gravity-latches 630 upon opposite sides thereof, one of which is better shown in Fig. 200, each of which latches is pivotally attached by means of a pin to an ejecting-plunger 628. Upon the top of each latch is formed a hook-catch 633, which is adapted to engage normally with a like hook upon the lower end of the corresponding tripping-lever 636. When so engaged, the rear end of the latch 630 is lifted sufficiently to prevent the detent 627 from pushing the same forward as the former is actuated; but when the rear end of either of the levers 621 is raised high enough to actuate the tripping-lever with which it is adapted to engage, the catch is released, and the detent 627 in its forward movement engages with the shoulder of the notch in the latch and causes one of the plungers 628 to be pushed forward enough to eject a type from the raceway, when the plunger is withdrawn to its normal position. Adjustable set-screws 644, Figs. 103 and 200, limit the forward movement of the tripping-levers. In withdrawing said plunger the latch, by reason of the incline 631 in the notch, is lifted far enough to cause the catch 633 to be again engaged by the hook upon the type-lever, thereby preventing the plunger from being again pushed forward until the trip-lever is released.

Across the raceway, opposite the first testing-plunger, is located a bridge 392, Fig. 193, which is flush with the top of the raceway, and as the type is advanced by the comb to the first testing-plunger the body of the type rests upon said bridge, as shown in Fig. 199. The front edge of the raceway is beveled or rounded, as shown, so that the forward end of the type projects over it without support. The first testing-plunger is provided with two rigid legs 615 616, one being long enough to engage with the forward end of the type and the other being short. A plate 646, Figs. 199 and 200, is interposed between the short leg and the foot of the type, so as to prevent said foot from being tilted upwardly when pressure is brought to bear upon the front end of the type. The legs 649 650 of the second plunger are pivotally attached to the body of the plunger, as shown in Figs. 205 206, so as to permit of a limited movement of said legs toward each other. The bridge 593, Figs. 195 and 201, is adapted to be moved vertically in suitable guides and is normally held with its upper edge flush with the upper edges of the raceway by means of a spiral spring 652 surrounding a pin attached to said bridge, the lower end of said spring resting upon a solid support beneath, as shown in Fig. 201. The legs of the second testing-plunger are in lines which fall between the sides of the raceway, so that a pressure thereon tends to exert a strain upon the middle of the type. A box 645 is provided to receive the type when thrown out by the ejecting-plunger. Inclosed within sleeves 609, adjustably secured to plugs tapped into the upper part of the head 608, Figs. 199 and 204, are spiral springs 618, which bear at the top against a screw-plug 610 and at the bottom against a loose disk, as shown. Rods 617, attached to the upper ends of the plungers, are arranged to bear against the disks and thereby to depress the testing-plungers through action of the springs 618.

The operation of said testing devices is as follows: With each revolution of the continuously rotating shaft 126 the lever 601 is vibrated, which causes a downward pressure of the rear ends of the levers 621, thereby causing the forward ends of said levers to be lifted. Simultaneous with this action a type is advanced by a comb to a position beneath the first testing-plunger, which descends and engages it in the manner shown in Fig. 199. Should there be a defect in the upper edge of the type, so as to render it too weak to resist the pressure of the spring 618, it will yield in the manner shown in Fig. 200; but it is obvious that if the rear leg 616 were to rest upon the foot of the type it would require a sufficient force to crush the type to cause the plunger to descend, in view of the fact that the foot of the type is caused to rest solidly upon the raceway. The object of this construction is to cause the strain to be placed upon the type in the line of the manufacturer's nick. In order to overcome this difficulty, I employ the plate 646, which is adapted to engage the foot of the type and hold it from upward movement while the forward end descends. The contact of the short leg with the top of the plate 646 limits the downward movement of the testing-plunger. Should the type yield under pressure, the rear end of the lever 621 is caused to rise sufficiently to engage the short arm of the trip-lever 636 and release the latch 630, which, in turn, is brought into engagement with the detent upon the lower end of the lever 623 in its forward movement, as shown in Fig. 200, when, by the advancement of said lever, the ejecting-plunger 628 is pushed forward and the defective type ejected into the box 645, as shown in Fig. 202. The return of the detent 627, acting upon the incline 631, Fig. 200, of the latch serves to restore the latter to its normal inoperative position.

Should the type when submitted to the action of the first testing-plunger fail to yield, the latch 630 will fail to be released and the plunger 628 will remain stationary. By the next movement of the comb the type will be forwarded to a position beneath the second testing-plunger 647. If weak upon the opposite edge from that previously tested, it will yield in the manner indicated in Fig. 203, when it will either be pushed forward by the ejecting-plunger in the receiving-box 645, or, if broken, may fall through the open raceway into said box. The pivoting of the legs 649 650 of the second plunger enables them to adapt themselves to the bending of the type in the middle.

*The second registering mechanism.*—After testing the strength of the type in the manner described, those which are not rejected are again registered in order that the special nicks therein, by which they are selected, may conform to the position of the selecting wards, so as to be properly acted upon thereby.

The second registering mechanism is the same in principle as that hereinbefore described, but is actuated by a different shaft.

Located in a guideway beneath the plate 42 is a plunger 657, Fig. 217, the forward end of which is in operative proximity to the raceway. A pin 656 upon one arm of a bell-crank lever 655 is passed loosely through a sliding block, which is placed between and in engagement with depending projections 658 upon said plunger. Said lever is pivoted to a stationary stud 107, and a pin 654 upon the forward arm is in engagement with a groove 204 in a cam 203, which is attached to the left-hand end of the sleeve 220 of what has been heretofore described as the "catch-box." (Shown in Fig. 19.) At the proper time, in the operation of the machine and in harmony with the action of the comb, the plunger 657, through the action of said cam and bell-crank lever, is thrown forward against the foot of the type presented to its action by the comb. By this means the type are brought successively into the exact longitudinal position required for presentation to the selecting mechanisms; but in order to prevent displacement of the type after registration I provide a peculiarly-constructed raceway and certain automatic devices, which are adapted to coact with the registering mechanism.

*The raceway employed in connection with the second registering device, and the wide type, round nick, and regular pi-selecting mechanisms.*—Attached to the galley-plate 42, by means of a bracket-support 659, is a raceway-frame 660, which frame and support are shown in Figs. 218 to 223, inclusive. The frame-piece 660 forms a portion of the lower raceway and is secured to the distributer-galley plate 42 in such a way as to make connection at the left-hand end of the frame-piece with the right-hand end of an extension of the raceway-frame 588, employed in connection with the first registering mechanism and the testing mechanisms, Fig. 168.

The special raceway under consideration consist of an open framework similar to that last referred to and is provided with side pieces 661 and 662, which are rigidly united by means of bridge-bars 663, 664, 665, and 666, respectively, as clearly shown in Fig. 218. The first bridge-bar 663 is intended to support successively each type as the same is brought into position by the comb to be acted upon by the second registering-plunger, the second bridge-bar 664 to support the type while being acted on by the wide-type or round-nick selecting mechanism and the third bridge-bar 665 to support the type while being acted upon by the regular pi-selecting mechanism. With each of said selecting mechanisms there are automatic ejecting-plungers, which serve to eject the type selected into a special raceway, as hereinafter described. It will be observed that the openings in the raceway vary in width, the object of which is to enable short or broken type to fall through the raceway, thus leaving thereon for distribution to the type-case only type of standard length and such as are capable of passing the testing and selecting mechanisms referred to.

When the type is pushed forward by the second registering-plunger, it is important to provide automatic means for preventing a retrograde movement either laterally or longitudinally, so that certainty of action on the part of the selecting mechanism may be insured. This result is accomplished as follows: Located in the lower raceway is a spring-catch 667, Figs. 218 and 221, which is adapted to rise behind the type when the spring is passed thereby and thus prevent a retrograde movement in a lateral direction. Pivoted at the point 669 is a spring-actuated latch 668, (shown in detail in Fig. 220,) which is provided with an inclined surface 670, which is adapted to be engaged by the type in their lateral movement upon the raceway and to be moved thereby against the action of the spring until the type is moved longitudinally by the registering-plunger. As soon as the latter action occurs, the catch-piece snaps behind the type and thus prevents a longitudinal retrograde movement thereof. By the means described the type which pass on toward the type-case are located on the raceway in such a position as to register with the trying-studs of their proper selecting mechanisms.

As I do not regard it as desirable to provide channels in the type-case for type which exceed a given width, and as I prefer to utilize the round or manufacturer's nick for the purpose of guiding the type upon the raceway, it is essential that means should be provided for selecting and ejecting wide type and such characters as may not be provided with a round nick. Before describing the selecting mechanisms used in connection with this special raceway I will describe certain features of the upper raceway used in connection with the auxiliary portion of the short comb.

Located in a central longitudinal groove in the under side of the auxiliary portion of the short comb is the upper raceway referred to, which consists of a bar, as shown in Figs. 270, 272, and 273, which is provided upon one side with a recess adapted to receive a series of spring-plates consisting of a plate portion O, Fig. 273½, having its ends formed upon diagonal lines, and a spring portion O O, which is secured to the bar in such a manner as to furnish a yielding support for the plate portion. This device is bolted to a proper portion of the machine in order to form an upper raceway-surface, and inasmuch as the plates bear with a yielding pressure upon the type any excess of movement from inertia resulting from the rapid action of the machine is rendered impossible.

*Mechanism for selecting wide type and other characters not provided for in the type-case.*—Instead of employing a special selecting mechanism for each kind of type I have provided that which in conjunction with a single selecting-lever is adapted to select and reject from the raceway all wide type, all type not provided with a round nick, turned type, and reversed type, or such as may be turned end for end. In Figs. 239 and 240 is shown a lever 699, which is pivoted to the framework near its forward end, as shown. A spring beneath the rear end of said lever tends to depress its forward end, which is arranged to bear upon a shoulder formed upon the main body or plunger of a trying-stud 700, said body portion being fitted within a supporting-frame 74. The trying-stud is intended and adjusted to register with the usual round nick, the ward being lifted in harmony with each movement of the comb by means of an arm 728, connected with a rock-shaft, so as to permit the type to be forwarded to a proper position beneath the trying-stud. In connection with the rear end of the lever 699 is a movable pin, which, when the trying-stud rests upon the top of the type, is adapted to be brought into alignment with a vibratory finger and thus to initiate the movement of an ejecting-plunger, which is thereby brought into engagement with continuously-acting carrier-blades, which serve to force the plunger forward and eject the type. Should the stud, however, enter the nick, the pin upon the rear end of the lever will be thrown out of alignment with the vibratory finger, and hence will fail to initiate the action of the ejecting-plunger, and the type will be left upon the raceway in position to be advanced another step by the comb.

Inasmuch as the lever 699, the trying-stud, and the automatic mechanism at the rear end of the lever for initiating the action of the ejecting-plunger is like that employed in connection with the selecting mechanism for selecting the type for distribution in the type-case, a more detailed description of those features will be deferred until a description is given of such selecting mechanism, and attention will now be given to the special features in connection with the selection and rejection of the wide type. This mechanism is connected directly and arranged to coact with the short comb. Pivoted upon the framework at 694, Figs. 232 to 240, beneath the forward end of the selecting-lever 699 is a lever-arm 693, which is adapted to have a limited movement in a plane at right angles to that of the selecting-lever. The normal position of the lever 693 is that shown in Fig. 232, in which position it is adapted to engage the forward end of the selecting-lever and so limit its downward movement that the pin upon the rear end of said lever is in alignment with the vibrating finger before referred to, thus serving to initiate the action of the ejecting-plunger and cause the ejection of the type presented at that time upon the raceway; but it is my purpose to have such ejecting mechanism act upon wide type when the lever 693 is thus interposed beneath the selecting-lever, and in order to accomplish this result I provide automatic means whereby when a narrow type is presented the lever 693 will be removed from beneath the selecting-lever and thus leave the latter free to act upon the type through its selecting-ward, as hereinafter specified. Fitted in a shallow recess 680, Figs. 224 to 226, inclusive, in the side of the comb 550, is a lever 684. (Shown in detail in Fig. 227.) Said lever is pivoted upon a pin 682 attached to the comb, and a pin 685 upon the lever is adapted to engage with a vertically-elongated slot 683, Fig. 224, which serves to limit the movement of said lever. Loosely fitted in a recess 681, formed in the comb, is a bolt 687, Figs. 225, 226, and 230, which is connected with the lever 684 by means of a pin 686, which engages with a bore in said bolt. The movement upon its pivot of the lever 684, therefore, serves to raise and lower the bolt 687. The lever 684 is held in a normal position, as shown in Figs. 225, 226, and 236, by means of a spring 689, and adapted to bear upon the end thereof. The bolt 687 is located far enough away from the adjacent tooth of the comb, as shown in Figs. 225, 234, and 236, to enable any type that is narrow enough to enter the widest channel of the type-case, to be freely received between the two, as the comb is caused to descend; but at the same time said bolt is near enough to engage with a wide type under like conditions and thus tilt the end of the lever 684, as shown in Fig. 238. It is obvious, therefore, that when a narrow type is presented the lever 684 will remain in its normal position, in which it is adapted to actuate the lever 393, in the following manner: Formed upon the front face of the lever 693, as shown in Figs. 228, 229, and 234 to 238, inclusive, is a projection 695, having a bearing-face 696 so located as to be engaged by a shoulder 690 upon the lever 684, as shown in Fig. 235, during the forward movement of the comb, provided said lever is in its normal position, as shown in Fig. 236 in which case the lever 693 is pushed to the right of the continued movement of said comb until its upper end is released from the lever 699, leaving the latter free to descend to its full limit. A recess 697 is, however, formed in the projection 695, which recess is adapted to receive the shoulder 690 when the left-hand end of the lever is raised, as shown in Fig. 238. The lifting of said lever, which is held in its normal position by means by the spring 689, as stated, is caused by the descent of the comb at the time when a wide type is presented, in which case the bolt 687 is caused to be brought into contact with the top of the type, as shown in Fig. 238, and said bolt being connected with said lever by the pin 686, the end of the lever is lifted against the action of the spring 689, thus enabling the shoulder or bearing-face 690 to enter the recess 697, in which case the lever 693 is not actuated, but remains in position beneath the lever 699, as shown in Fig. 238. When the lever 693 is in the position last mentioned, the lever 699 is so limited in its descent as to cause the pin in its rear end to register with the vibratory fingers hereinbefore mentioned, which actuates an initial plunger and thereby causes the ejection of the wide type.

Secured in the upper raceway opposite to the point where the wide type are ejected is a spring-actuated stud 667, Figs. 242 and 243, which is adapted to bear with a spring-pressure upon the upper edge of the type, while a block 673 upon the end of a spring 671, Figs. 219 and 236, is projected through said upper raceway and caused to bear upon the type with a resilient pressure as the latter is pushed forward by the ejecting-plunger. The bearing-face of the block is slightly beveled, as shown, to prevent injury to the type. The friction caused by these two blocks serves to prevent an excess of movement of the type longitudinally and enables such type as may be ejected from the main raceway to be deposited upon a contiguous raceway 660, known as the "regular pi raceway," Figs. 219, 390, and 409, where it is free to be disposed of in the manner hereinafter set forth.

As before stated, the same selecting-lever and ejecting-plunger which are employed in connection with the wide type are also employed in connection with the round-nick mechanism. When, therefore, a wide type having a round nick is presented for trial, it follows that it would not be ejected through the action of the trying-stud, and hence the special mechanism above described is requisite in order to cause its ejection. The two mechanisms, however, work in harmony with each other, and when a wide type having no round nick is presented for trial the trying-stud 700 of the round-nick mechanism and the actuating-lever 693 of the wide-type mechanism both act to hold the selecting-lever 699 in the proper position to cause the ejection of the type. The lever 693 is therefore brought into action in all cases in which a wide type is involved, whether it is provided with a round nick or not.

The operation of the mechanism intended especially for the selection of narrow type is as follows: The normal position of the part is shown in Fig. 232, the comb being in its upward position ready to descend and take a narrow type. The left-hand end of the lever 684, with the bolt 687, is in position over the pin 692, but not in contact therewith. Upon the downward movement of the comb, as shown in Fig. 233, the lever 684, with the bolt 687, is held against downward movement with the comb by contact with the pin 692, upon which it is caused to rest, the relative positions of the comb and bolt being as shown in Fig. 233. After the descent of the comb and when a forward movement thereof is made, as indicated in Fig. 234, and the bearing-surface of the lever 684 is carried by the movement of the comb off from the pin 692, as shown in Fig. 236, the lever and bolt are returned to their respective normal positions in the comb-plate by the action of the spring 689 before the full movement of the comb is made. In the downward position of the bolt 687 the bearing-shoulder 690 of the lever 684 is caused to strike the bearing-surface 696, Fig. 228, upon the projection 695 of the lever 693, as shown in Fig. 235. As a result of this contact of parts the upper end of the lever 693 is swung out of position beneath the front end of the selecting-lever 699 in time to permit the latter to move into the position shown in Figs. 236 and 240, and thus to initiate the action of the ejecting-plunger, as described in connection with the wide-type mechanism. When the type is ejected, the return movement of the comb causes the shoulder 690$^c$, Fig. 227, to be brought into contact with the projection 695, as indicated in dotted lines in Fig. 232, and to thus return the lever 693 to its normal position.

It is obvious that if a type having a round nick is turned over or turned end for end, so that the nick could not be presented to the trying-stud, it would be rejected in the same manner as if it were possessed of no round nick.

*The regular pi-selecting mechanism.*—In addition to the wide type there are certain characters—such as the star, double dagger, dollar-mark, &c.—seldom required to be used, for which I prefer to make no provision in the type-case. These characters constitute what I term "regular pi," and are provided with a special nick, which is adapted to register with the trying-stud of the regular pi-selecting ward, which is located next to that for selecting the wide type, the selecting-lever corresponding to the lever 699, being pivoted in the right-hand space of the bearing-support 72, Figs. 12 and 239, and the mechanism is in every way similar thereto except that there is no mechanism corresponding to the lever 693 and that by which it is actuated. Each type which is left on the main raceway after having been subjected to the action of the round-nick and wide-type mechanisms is conveyed to the bridge-bar 665, and then is subjected in the third place to the action of the regular pi-selecting mechanisms. If the type thus presented for selection is provided with the special nick peculiar to the regular pi characters, the selecting-lever is so actuated that the pin in its rear end is in alignment with the vibratory fingers, which cause it to actuate the initial plunger in the manner hereinbefore generally and hereinafter more particularly described. The regular pi-plunger being actuated, the character upon which it acts is thrust out beneath a spring-post 678, Figs. 242 and 243, thence beneath a spring-actuated block 674, Figs. 219 and 242, actuated by the spring 672, also shown in Fig. 218, upon the regular pi-raceway 660, Fig. 244. A division-strip 676, Fig. 242, is interposed between the respective pathways of the wide and regular pi-type in the longitudinal movement thereof. If the type presented for action is not provided with a special nick to designate it as one of the regular pi characters, it is not selected, but is passed on toward the type-case.

*The driver mechanism of the regular pi-raceway.*—The regular pi-raceway 660, Fig. 244, which has been before referred to and into which the wide and regular pi characters are caused to be ejected in the manner hereinbefore described, is located in front of the raceway, and the type are intended to be conveyed laterally thereon toward the left to the end of the raceway, which is comparatively short, as shown, from whence they may drop into any suitable receptacle. A driver-bar 706, Figs. 244 to 248, inclusive, having a base portion 707, with projections adapted to fit in corresponding recesses in the sides of the raceway, is adapted to slide in said raceway. The head of said driver-bar is T-shaped, as shown, and its bearing-face is adapted, when the lever is actuated, to strike the type in the manner indicated in Figs. 241 and 244 and move them laterally toward the left along the raceway. Depending from the base of the driver-frame is a yoke 705, into which is loosely inserted a square block 704, the middle portion of which is rounded to connect loosely with the upper end of an arm 703, Fig. 249, forming part of a bell-crank lever 702, which is pivoted, as shown, to a stationary bracket secured to the frame. The short arm of said lever is connected by means of a link 701, Figs. 241 and 245, to the auxiliary plate portion 787 of a lifter hereinafter described, to which is imparted a vertical reciprocatory movement in harmony with that of the conveying and type-ejecting mechanism.

The operation of this mechanism is substantially as follows: The normal position of the parts, with the driver-bar in its rearward position, is shown in Fig. 241. At the proper time in the operation of the machine the lifter is given a vertical movement in an upward direction. By means of the connecting-bar the end of the short arm of the lever 702 is raised and the upper end of the long arm is caused to move in a forward direction, as shown in Fig. 245, with the driver-bar and to thereby advance any type that may have been ejected into the raceway. It is obvious that by this means the rejected type may be collected into any desired receptacle.

*The transfer space-channels.*—The setting-galley, hereinafter described, is located at the left-hand end of the machine in operative proximity to the main setting-raceway leading from the type-case. Hence it is necessary, in order to utilize the spaces, to provide proper means whereby they may be transferred to that point. This I accomplish by means of what I term the "transfer space-channels," which are located upon the left hand of and next to the space-case, and upper sections of which are adapted to be removed and located in supports in a suitable position to enable the spaces to be transferred therefrom directly into the line of composition.

The transfer-channels 708°, Figs. 250 to 255, inclusive, are supported in suitable grooves, as shown, formed in a framework attached to the space-case 82 by means of arms or brackets 96 97, Fig. 252.

Each transfer-channel is open at its lower end, as shown in Fig. 419, by means of which opening the channel is adapted to receive the character designed for it, which character is introduced into the opening from below by means of auxiliary lifting mechanisms hereinafter described. These transfer-channels are employed for holding the five-em space, the four-em space, the em-quad, and the hyphen, which spaces are selected in their order by means of selecting mechanism like that hereinbefore referred to and hereinafter described in connection with the selection of the characters distributed into the main type-case. The location of the selecting-levers is indicated in Fig. 12, in which a bearing-block 73 is shown, having a series of four openings in which the selecting-levers are pivoted. The first opening at the left-hand end of said bearing-block is designed to hold the selecting-lever, and a corresponding opening in the support 75 to hold the ward-plate for selecting the five-em space; the second opening in each, the lever and ward, respectively, for the four-em space; the third opening in each, the lever and ward for the em-quad; and the fourth opening in each, the lever and ward for the hyphen. The type are forwarded upon the raceway into proximity to those space-channels outside of the main type-case for transfer to what I term the "justifying-stand," by a portion of the main comb, hereinafter described, which is extended in the left-hand direction for this purpose, and the type are selected and lifted into their proper channels by extended portions of the main lifting and selecting mechanisms. For purposes of transfer each of the channels described is divided into two parts—a base portion, which is rigidly secured in one of the grooves of the lower block 96, and a movable upper portion. A tongue 708, Figs. 255 and 258, is caused to project upwardly between tongues 710 and 711 of the upper portion. Upon the opposite side this arrangement is reversed, a downwardly-projecting tongue upon the upper portion being inserted between upwardly-extended tongues 712 and 713 upon the base. A spring 714, Figs. 253, 254, 257, and 259, is extended downwardly from the main part of the upper portion, which spring is provided at its lower end with a beveled detent adapted to engage with the inclined portion 709 when the parts are in their normal positions.

The spring-catch referred to is designed for the sole purpose of preventing the spaces from falling out during the transfer of the channels. In the normal position of the parts when the channels are being filled by the lifting mechanism the catch portion of the spring 417 is held back out of the way by contact with the inclined face 709, as shown in Fig. 259. When the upper part of the transfer-channel is removed, the catch portion springs into place beneath the lower type of the upper section of the channel, and thus prevents them from falling out. The filled channel may then be transferred to a proper base portion 1013, (shown in Fig. 256,) which base portion when in proper position is located upon the justifying-stand 49, Fig. 433. An inclined face (not shown) upon the base portion 1013 causes the spring to be held out of engagement with the type, so that they may descend to the bottom of the channel for use as required.

*The long comb.*—Before describing the mechanisms by which the type are selected and lifted into the respective type-channels I will first describe the long comb or main distributing-conveyer by means of which the type are conveyed intermittently along the main distributing-raceway into suitable positions, respectively, to be acted upon by the mechanism by which it is to be transferred into the type-case.

The main distributing-raceway 563, Figs. 179, 180, and 282, consists of a series of plates of proper width, thickness, and length, which are united together at the base by means of bolts in such a manner as to leave intervening spaces between the upper portions thereof, which spaces are adapted to receive the comb-plates 558 in such a manner as to enable the latter to be freely moved. Said raceway is located beneath and in the rear somewhat more than the length of a type of the type-case 82, as clearly shown in Fig. 282. The object of so placing it is that the type may be forced forward longitudinally by means of suitable plungers upon a lifter by means of which it is transferred to the type-case channels in the manner hereinafter described.

The long comb 557, Figs. 178 to 180, inclusive, and Fig. 282, consists of a series of similar plates 558, united together by means of bolts 559, so as to leave an intervening space between adjacent plates and to form a single rigid structure, as shown in Figs. 179 and 180. Said plates are provided with teeth equidistant from each other upon the upper edges. The comb is shown in its proper position in Fig. 178, a plan view of the comb and raceway being shown in Fig. 179, while Fig. 180 represents a front view of the comb and raceway in an inverted position. Solid-plate portions 560 560 are rigidly attached to the comb at each end, in which are formed longitudinal slots 561 561 and in the right-hand end a vertical slot 562.

The following means are provided for reciprocating the comb longitudinally: Loosely inserted in the slot 562, Fig. 178, is a block 570, through which is projected a pin 568, secured, in the manner hereinafter stated, to a lever 464, the lower end of which is pivotally attached to the frame, as shown. A pin in the upper end of said lever is adapted to engage a groove 165 in a cam mounted upon the shaft 125, which cam forms one of a group 162, (shown in Fig. 16,) located at the front and near the right-hand end of the machine.

In order to lengthen or shorten the longitudinal movement of the comb, the pin 568 and bearing-block 570 may be raised and lowered in the following manner: The pin 568 is formed upon or attached to a plate 567, Fig. 177, the edges of which are dovetailed or inclined to fit corresponding bearing-surfaces upon the inner face of a shoulder or flange 565, formed upon one side of the lever 564, and a plate 566, attached to the opposite side by means of screws, as shown. Extending upwardly from the pivotal portion of the lever 564 is a screw 569, by means of which the block 567 may be raised or lowered and accurately adjusted. The slot 562, in which the block 570 is fitted, is elongated vertically to permit of a vertical movement of the comb. The vertical movement of the comb is accomplished in the following manner: Bell-crank levers are pivoted to the framework at 31 31, Fig. 178. Pins upon the short arms of said levers are adapted to engage with the blocks loosely fitted in the slots 561 561, Fig. 180, which are sufficiently elongated to permit of a longitudinal movement of the comb. The long arms 574 574 of said levers are connected by means of a link 573, to the right-hand end of which is loosely secured a link 572, one end of which is pivotally attached to the short arm of a lever 571, which is pivoted to the frame, as shown. A pin upon the upper end of said lever is arranged to engage with a groove 164 in a cam, as indicated, upon the shaft 125. By the action of the cam-groove 165 the lever 564 is reciprocated, which imparts a corresponding movement to the comb through the block 570, the vertical position of which, as stated, determines the length of the stroke. This movement is imparted to the comb first in one direction to advance the type along the raceway 563, and then in an opposite direction to return the comb to its normal position ready for a new forward movement. A slight backward movement is imparted to the comb after its forward movement in order to separate the comb-teeth from contact with the type before the descending movement is made. As a result of the vibration of the lever 571 movement is given to the bell-crank levers 574 574 through the bar 573, which in turn serves to impart a vertical movement to the comb. By the operation of the combined mechanisms a five-motion action is imparted to the comb for the purpose of advancing the type belonging to the type-case along the raceway. This action is substantially as follows: The comb being in its normal upward position is given a longitudinal movement in a forward direction to advance the type. It is then given a slight longitudinal movement in a backward direction to remove the teeth of the comb from contact with the type, then a vertical movement in a downward direction, and then a full movement in a backward direction, and finally a vertical movement in an upward direction to its first or normal position. In order to hold the type in proper position upon the raceway and to prevent displacement, I cause a series of studs to be loosely extended through the distributer-plate 36, which studs are provided upon their lower ends with square bearing-faces 764°, as shown in Fig. 9, which bearing-faces are adapted to rest upon the upper faces of the type to hold them properly in position, as stated. The upper ends of said studs are in contact with the free ends of springs 764, Fig. 6, which are secured to the plate in any well-known way.

*Mechanisms for selecting the characters.*— Located between the two main uprights or brackets 11 and 12, Fig. 1, is the main distributer-plate 36. (Shown in detail in Figs. 5 to 9, inclusive, and also shown in the inclined position which it occupies in the machine in Figs. 264 and 282.) This plate serves as the main support for the selecting and ejecting mechanisms. Directly over the main raceway and above the distributing-plate 36, Figs. 8 and 278 to 282, inclusive, is located a series of ward-plates 731, corresponding in number and position to the channels in the type-case. Each ward-plate is provided with pins 737, projecting loosely through openings in a horizontal plate 735, which is supported above and parallel with the distributer-plate by means of rigid end supports 736 736, Fig. 8. One of said ward-plates is shown in detail in Fig. 267. Each of said ward-plates is provided with one or more trying-studs 734, extended downwardly through the distributer-plate 36 and having their lower ends formed to fit in nicks in the upper edges of the type as it rests upon the raceway. The position of the stud or studs upon each ward-plate is arranged to correspond with that of the nick or nicks upon the upper edge of the particular type which it is designed to select. A rock-shaft having journals 122 122 at its ends, as shown in Figs. 260 and 263, which are supported in suitable bearings in the uprights 11 and 12, is arranged in the rear of and parallel with the ward-plates 731. The body of said rock-shaft is flattened, so as to form a main-plate portion 717, extending from the rear, and a forward blade or extension 718, as clearly shown in Figs. 260 and 263. Upon the journal 122 of said rock-shaft, near its left-hand end, is loosely secured an arm 716, which is extended rearwardly therefrom. Said arm is bent laterally, as shown, and is provided with a pin 715, which is fitted to engage with a groove 183, Fig. 264, in a cam 182 upon the shaft 117, also shown in Fig. 16. A similar arm 724, Fig. 260, is rigidly attached to the right-hand end of the rockshaft. By placing the sheet of drawings upon which Fig. 260 is shown with the signatures at the right hand and that upon which Fig. 263 is shown with the signatures at the left hand the reader may obtain a full plan view of the rock-shaft in question, which is known as the "ward-lifting" rock-shaft. Near the rear end of each of the arms 716 and 724 is formed a depression 725, which is adapted to receive the lower end of a coiled spring, one of which 726 is shown in Fig. 264. Said spring is inclosed within a sleeve 727, as shown, the lower end of which is screwed into the arm of a lug 26, which is arranged to project over the arm 716. The rear ends of the arms 716 and 724 are therefore depressed by the action of the springs, the tension of which may be adjusted by means of screw-caps, but may be raised against the pressure of said springs by the action of the cam 182, the revolution of which is adapted to impart a slight vibratory movement to said arms and thus to actuate the ward-lifting rock-shaft. The forward portion 718 of said ward-lifting rock-shaft is caused to project into recesses formed in the back of the ward-plates and to engage with shoulders 732, Figs. 264 and 267, in the manner shown in said former figure. Thus it will be seen that with each revolution of the cam 182 the ward-plates are caused to be positively lifted by the action of the rock-shaft. In order that said rock-shaft may be prevented from sagging in the middle and may be enabled to lift each of the ward-plates with like uniformity, it is rounded throughout its length in a line concentric with its axis, as shown at 730, Figs. 261 and 264, which rounded portion is supported upon a bearing-surface 729, formed upon the distributer-plate.

In order that the ward-lifting rock-shaft may be accurately adjusted with reference to the ward-plates and the actuating-arm 716, I provide an adjusting device which is constructed in the following manner: Rigidly attached to the part 717, Figs. 262 and 263, is a plate 721, upon the outer end of which is formed the box portion 720, which is adapted to inclose the arm 716, as shown. A plate 723, also shown in Fig. 265, is removably attached to said box portion to enable the arm to be inserted therein. Set-screws 722, extending through the plates 720 and engaging with the top and bottom faces of said arm, as shown, permit of accurate adjustment. A flange or flat portion 728, Fig. 263, corresponding to the part 718, is secured to the left-hand end of said rock-shaft and fitted to engage in the manner described with the ward-plates of the space-selecting mechanism of the auxiliary transfer space-channels before referred to, and is adapted to lift the wards in the same manner that the other selecting-wards are lifted. Arranged to coact with the ward-plates are a series of selecting-levers 738, Figs. 278 and 279, which are pivoted in bearings 761, formed in the spaces 760, Figs. 5 and 6, upon the raised portion of the distributing-plate 36. The forward end of each of said levers is provided with a finger portion which projects into the recess of the ward-plate corresponding therewith, and is arranged to bear upon a shoulder 733, Figs. 267 and 278. The rear portion or long arm of each of the selecting-levers 738 is extended past the rear of the distributer-plate 36 and bent, as shown in Figs. 278 and 282, to extend slightly below said plate, and is guided in notches 762, Fig. 6, formed in said distributing-plate. Said depending portion is provided with a cap or lug 740, Figs. 269 and 271, having an opening therein adapted to receive a bolt 741, Figs. 268 and 278, which is free to move longitudinally therein, but is retained in place by means of suitable heads or stops, as shown. A series of springs 742, Figs. 6 and 278 to 282, inclusive, are attached to the distributer-plate 36 and arranged beneath the selecting-levers, so as to lift the rear ends thereof, respectively, and thus by the action of the forward or short arms of said levers to depress the ward-plates 731 when permitted so to do by the action of the ward-lifting rock-shaft. Beneath the distributing-plate 36 is arranged in suitable guides in the manner better known in Fig. 9 a series of ejecting-plungers 751, also shown in Figs. 278 to 282, which are in line with and adapted to be initially actuated by the initial plungers or bolts 741 in the manner hereinafter stated. Supported in suitable bearings in the uprights 11 and 12, Figs. 21, 264, and 282, is a rock-shaft 123, provided with a plate or blade 747, formed thereon or rigidly attached thereto, to the outer end of which is adjustably secured a series of fingers 748, adapted to engage with the bolts or initial plungers 741 and to actuate the latter when the selecting-levers are in the proper position to permit such action. Upon a sleeve 749, Fig. 19, located upon an extension of the left-hand end of the shaft 123, which is passed through the upright 12, is an auxiliary plate or blade 750, having fingers similar to those described above, which are employed in like manner in connection with the selecting mechanism for the auxiliary space-channels. Rigidly attached to the rock-shaft 123, Fig. 264, is an arm 746, the end of which is connected by means of an adjustable link 745 with one end of a lever-arm 744, which is in turn pivoted to the upright 12, as shown. A pin 743 (indicated in dotted lines) upon the opposite end of said lever is adapted to engage with a groove 181, formed in a cam 180, mounted upon the distributed forwarding carrier-shaft 116, also shown in Figs. 18 and 282.

Each of the ejecting-plungers 751, above referred to, is provided with an ejecting-finger 754, Fig. 278, and depending studs or projections 752 753, as shown, the former of which is adapted to engage with a blade 755, Fig. 282, secured, as shown, to a sleeve upon the shaft 116, while the latter is adapted to be engaged by a like blade 756 upon a sleeve secured to the shaft 115. The shafts mentioned are adapted to revolve continuously, and the blades are so arranged with respect thereto that the plunger when initially moved is forwarded by the one to eject the type and then returned by the other to its normal position.

In order that the ejecting-plungers may be prevented from excessive movement by inertia, I have devised the following described controlling mechanism: Arranged in bores formed in a rib 767, Figs. 9 and 278, which bores are in alignment with the ejecting-plungers, respectively, are a series of pins 757, the upper ends of which bear by frictional contact against the edges of the plungers. A series of springs 758, secured to said rib, serve to press the pins against said plungers, thus producing a frictional action upon the plungers, which causes them to remain in the desired positions in which they may be moved by the parts by which they are actuated.

The operation of said selecting and ejecting mechanisms, respectively, is as follows: Through the action of the cam 182 and lever 716, Fig. 264, the ward-lifting rock-shaft is actuated to lift the wards regularly and continuously in harmony with the intermittent movement of the type upon the raceway, the lifting of said wards being so timed as to permit the type to be moved beneath them with each forward movement of the comb. As soon, however, as the ward-plates are released by the shaft-rock and are free to descend, the springs 742 cause the rear ends of the selecting-levers to be raised, thus causing the forward ends of said levers to depress the ward-plates, which forces the trying-studs 734 into contact with the type beneath them upon the raceway. Should a type be so nicked that its nick registers with the trying-stud, as shown in Fig. 280, then the rear end of the selecting-lever is sufficiently raised to cause the bolt or initial plunger 741 to be brought into exact horizontal alignment with the vibratory finger 748, which in its forward movement strikes the bolt 741 and forces it against the plunger 751, so as to move the latter far enough to bring the projection 752 into the path of movement of the forwarding carrier-blade 755, Fig. 282, it being understood that the rock-shaft 123 is through the action of the cam 180, Fig. 264, lever 744, and the connecting parts shown rocked in harmony with the movements of the forwarding and returning carrier-shafts. It follows, therefore, that if the proper type-nick is presented to the ward the type is selected and ejected in the manner described to the lifting mechanism. Should, however, the type presented beneath a given ward have the nick or nicks therein so placed as not to register with the trying-studs of a given ward, then the trying-stud will rest upon the top of the type, as shown in Fig. 278, in which case the rear end of the selecting-lever will be sufficiently depressed to cause the bolt 741 to be in an inoperative position below the finger 748, and hence the bolt will not be actuated, the plunger 751 will remain in its normal position, and the type will not be ejected, but will be advanced by the comb step by step upon the raceway until it rests beneath a ward adapted to register with the nick therein, when it will be selected in the manner described and pushed forward upon the lifter. Should no type be presented beneath a given ward, the action of the spring 742 will at the proper time cause the ward-plate 741 to be forced down to its full limit and raise the rear end of the selecting-lever to such a height, as shown in Fig. 281, that the finger 748, when vibrated, will pass beneath the bolt 741 and no action of the ejecting-plunger will be produced.

It will be observed that in the construction shown the rock-shaft 122 acts to lift the ward-plates against the combined resistance of the springs 742, which pressure is in turn balanced by that of the springs 726 726, Fig. 264, which exert a downward pressure upon the rear end of the levers 716 and 724. The construction of the cam 182 is such that twice in its revolution it moves in dead-time without being in contact with the pin of the lever 716. This construction permits the lever to be locked by means of a locking-bolt mechanism, whereby excessive and unnecessary wear of the cam and pin may be prevented. This occurs during the periods of rest when the ward-plates are either in the upward or downward position.

*The locking-bolt mechanism.*—Upon the left-hand side of the arm 716, Figs. 263, 264, 265, 275, and 277, is formed a rib or projection 716°, which is adapted to be engaged by a corresponding rib or projection, as shown, upon a bolt 759, arranged to slide horizontally in a suitable bearing formed in a bracket 16, Figs. 275 and 276, which supports the right-hand end of the shaft 126. Mounted upon said shaft is a cam 184, the groove 185 of which is adapted to engage with a pin upon said sliding bolt 159 and to act in harmony with the cam 182 upon the left-hand end of the ward-lifting cam-shaft 117.

The operation is substantially as follows: The cam 182 is provided with two cut-away spaces at opposite points, and when one cut-away space is passing the pin in dead-time the rear end of the lever 716 is held by the rib of the locking-bolt 759 in its upward position, as shown in illustration 1, Fig. 277, the wards being at this time in their downward position. The locking-bolt is then withdrawn, as shown in illustration 2, Fig. 277, and the cam causes the lever to be moved downwardly. The bolt is then moved into contact to lock the lever in its downward position, as shown in illustration 3. While in this position the cut-away space of the cam is free to pass the pin in dead-time. The bolt is then withdrawn again to permit the upward movement of the rear end of the lever, as shown in illustration 4. While the cut-away spaces are passing the pin there is no contact between the cam and the pin and both are thus relieved from excessive wear.

*The nicking system.*—I have described the manner in which the type are selected, but have referred only in a general way to the special nicks therein by means of which that selection is accomplished. Before proceeding to the description of the lifting mechanism by which the type are passed into the type-channels after having been selected and ejected from the main distributing-raceway, I will describe the nicking system.

For the purpose of selecting the various characters belonging to the type-case each individual type is provided with two special nicks upon its upper edge or with one nick made of double width. These nicks are located at specific points in each type, differing in position from those of any other character. The trying-studs of the wards, hereinbefore described, correspond, respectively, in position, as before stated, to the location of the nicks in the type which they are intended to select.

The system of nicking is substantially as follows: A certain portion of the length of the type from face to foot is divided into twenty-three spaces, each space equaling the width of a single nick, and these spaces are numbered from 1 to 23. In determining the location of the special nicks upon the characters the letters may be taken in any desired order. In practice the spaces used for the nicks preferably range from No. 6 to No. 21, the remaining spaces at the extreme ends of the type not being used in this system. In the diagram Fig. 314, however, the limit is shown as ranging from No. 1 to No. 23. Starting, then, with the sixth space from the foot of the type, this space forms the point for locating what may be termed for convenience the "base" nick of a number of characters. The other nick, which for convenience may be termed the "auxiliary" nick, is located in the next adjacent space, the two nicks forming in this instance one nick of double width. In the next combination the next vacant space is taken for the auxiliary nick, and so on. For example, as shown in the diagram Fig. 314, the lower-case "v" has the base-nick 6 and the auxiliary nick 7, and so on. When the base-nick 6 has been used with other nicks up to the limit, then the space 7 must be taken for the base-nick in a similar manner, and then space 8, and so on up to the limit, as shown.

For certain of the characters a single nick and single trying-stud may be employed, if desired. The special nicks used are preferably square in form, as shown in illustration at the bottom of the diagram Fig. 314.

If desired, reversible quads may be employed. In this case the nicks are so located that the proper trying-studs will enter when either end of the quad is toward the front, as shown.

In connection with the special nicks employed the round nick of the type-founder is also used, a round-nick-selecting mechanism being located at the proper point in the machine for the purpose of ejecting any characters not provided with a round nick, or any character provided with a round nick which may be turned end for end or so disarranged as not to present the round nick to the trying-stud in the manner hereinbefore described.

*The mechanism for lifting the selected characters into the type-case.*—The main feature of the lifting mechanism consists of a frame composed of three plates 775, 778, and 781, known as the "back," "central," and "front" plates, respectively, as shown in detail in Figs. 290, 291, and 292. Said plates are arranged parallel with each other with spaces between and are rigidly attached at one end by means of bolts or rivets, as represented, to an auxiliary plate 783 and at the other to auxiliary plates 787. Each of said plates 775, 778, and 781 is provided with teeth, some of which are shown upon their upper edges, which teeth are in alignment with each other across said plates. The lifting-frame, consisting of said plates so joined, is arranged in front of and parallel with the distributing-raceway in the same plane with and beneath the channels of the type-case 82, as shown in Figs. 282 and 320. Pivoted to a stationary stud 31, Fig. 284, upon the framework and to a like stud upon a bracket 85, which is also secured to the framework, are bell-crank levers 771 and 773, respectively. A square block, secured loosely to a pin upon the short arm of the lever 771, is adapted to engage with an elongated rectangular opening 785, Fig. 289, in the plate 783, which plate is also shown in its proper position in Fig. 284. The short arm of the lever 773 is attached in like manner to the plate 787, the elongated opening 788 therein for the reception of said plate being shown in Fig. 288. The openings 785 and 788 are elongated horizontally to permit of a longitudinal movement of the frame independently of the action of said bell-crank levers. The long arms of said bell-crank levers 771 and 773 are connected by means of a bar 772, to the right-hand end of which is attached a link 769, which connects said bar to the short arm of a lever 768, Fig. 284, which is pivotally attached, as shown, to the frame. A pin upon the upper end of said lever is adapted to engage with a groove 163 in a cam mounted upon the shaft 125, also shown in Fig. 16. A lever 774, having its lower end pivotally attached to the framework, is connected by means of a pin upon its upper end with a groove 166 in a cam, also mounted upon said shaft 125. A square block 774°, loosely mounted upon a pin near the lower end of said lever, as shown in Fig. 284, is loosely inserted in a vertically-elongated slot 784, Fig. 289, formed in the plate 783. The elongation of said slot, as stated, permits of a vertical movement of the frame independently of the action of the lever 774, which serves to produce a longitudinal movement of the frame.

The lever 774 is provided with a means of adjustment (shown in Fig. 283) similar to that described in connection with the corresponding lever for imparting longitudinal movement to the long comb. Thus it will be seen that through the action of the two levers both a vertical and horizontal reciprocatory movement may be imparted to the lifter.

The lifter-plates 775, 778, and 781 are separated from each other in the manner shown and described for the purpose of loosely inserting between them similar plates 799 and 801, Fig. 290, known as the "ledge-plates," which are provided with teeth like the lifter-plates and are rigidly attached to each other, so as to be actuated as one. Openings 780 780, Fig. 286, in the central plate are provided for the reception of the parts by which the plates 799 and 801 are attached to each other. Projections 804 804, Fig. 292, which is an inverted side view of the lifter-frame with the ledge-plates inserted therein, are formed upon the rear ledge-plate and are adapted to extend through openings 776 776, formed in the rear plate 775, in order that they may be secured in suitable guides formed in the division-plate 93, Fig. 282, which separates the distributing-raceway from the lifter-frame. These projections also serve to separate the rear ledge-plate from the division-plate, in order to permit the free movement of the back lifter-plate.

Rigidly attached to and depending from the ledge-plates are arms or projections 803, Figs. 282, 292, 294, and 301, which extend through cut-away portions or recesses 777 777 and 779 779, Figs. 285 and 286, formed in the rear and central lifter-plates, respectively. The openings 776, 780, and 782, the latter of which are intended to receive the heads of the screws which secure the ledge to the division-plate, are each sufficiently large to permit the lifter-frame to be moved to its full limit independently of the action of the ledge. The screws by which the ledge is secured to the division-plate are so inserted as to permit of a proper movement of the ledge.

The lower ends of the depending arms 803 are provided with inclined slots 796, Figs. 292, 294, and 301, into which are loosely inserted square blocks 795. Through said blocks are projected pins 794, which connect said blocks with a sliding bar 793, Figs. 284, 292, 293, 294, 296, and 299. Said bar is arranged in suitable guides in the framework, as indicated in Fig. 284, to permit of a longitudinal movement. A wrist-pin 793°, which is rigidly attached to the bar 793, is connected by means of an adjustable link or pitman 792 to the end of a bent lever 789, Figs. 18 and 21, which is pivotally attached to the frame, and the rear end of which is in operative connection with a groove in a cam 174, mounted upon the distributer-returning carrier-shaft 115. The rotation of the cam serves to impart through said lever and pitman a reciprocatory movement to the bar 793, which, through the blocks 795 and inclined slots 796, imparts a vertical reciprocatory movement to the ledge.

The general operation of the ledge and lifter mechanisms is illustrated in the views shown in Figs. 305 to 313, inclusive, in which 834 834 indicate the division-strips of the character-channels, 797 the ledge, and 781 the lifter. The types "A" are shown in the various relative positions according to the movement of the respective parts by which they are actuated.

Figure 305:
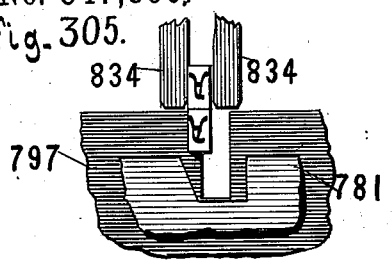
Figure 306:
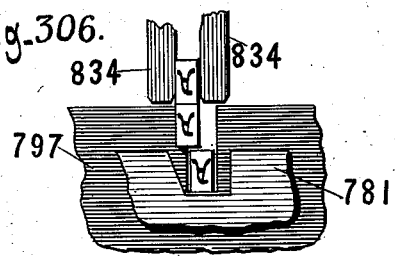
Figure 307:
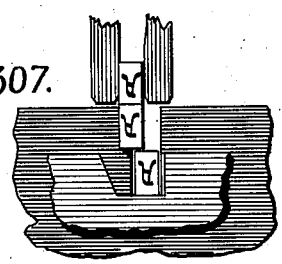
Figure 308:
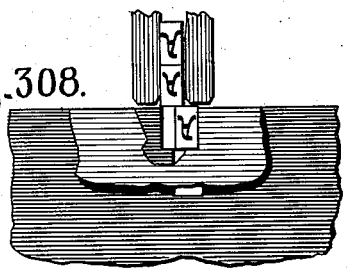
Figure 309:
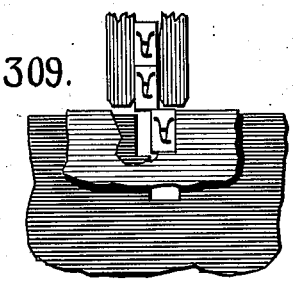
Figure 310:
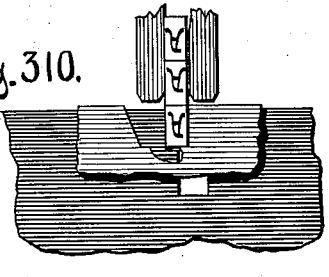
Figure 311:
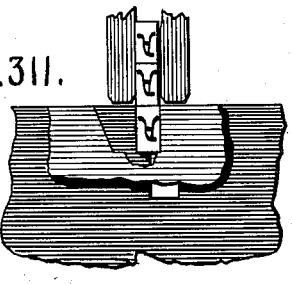
Figure 312:
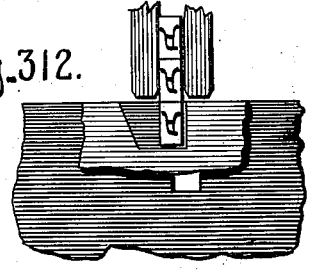
Figure 313:
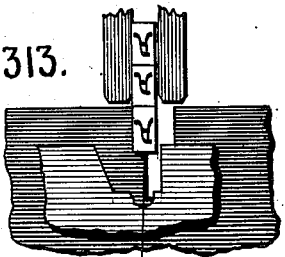

It should be borne in mind that the ledge-piece is adapted to move only to a limited extent and that in a vertical plane. The lifter, on the other hand, has imparted thereto a six-motion movement, as follows: first, to the left; second, upwardly; third, to the left again; fourth, to the right; fifth, downwardly, and, sixth, to the right to the point of beginning. The normal position of the parts prior to the reception of a type from the main raceway is shown in Fig. 305, while in Fig. 464 a type is shown as having been inserted while the parts are still in the same respective positions. This action having been performed, the lifter, which is not in contact with the type, is given a movement to the left, as shown in Fig. 307, the length of which movement is sufficient to provide for the wider type of the font. The lifter, carrying the type with it, is raised in a vertical plane, as shown in Fig. 308, a distance corresponding to the height of the type. The column of type, which at this time rests upon the entered type, is also lifted off from the shoulder of the ledge by which it is normally supported and is carried up with the entered type. The entered type, as well as those resting thereon, is at this time supported by the lifter. The ledge-piece from which the type has been lifted is now caused to move downwardly to such a position that the upper face of its bearing-shoulder is below the lower edge of the entered and lifted type, as shown in Fig. 309. The lifter upon which the entered type now rests is moved to the left a sufficient distance to cause the type to be brought into position over the supporting-shoulder of the ledge, as shown in Fig. 310, when the latter is raised to engage and support the type, as shown in Fig. 311. The lifter is then moved to the right, as shown in Fig. 312, then downwardly, as shown in Fig. 313, and lastly to the right, as represented in Fig. 305, when the parts are again in position to receive a new type.

The action of the parts may be briefly restated, as follows: The ledge is first lowered to receive the entered type, and when the latter is moved into position over it by the lifter the ledge is raised to receive and support the type. The lifter is first moved to the left to bring it into position to lift the type, then vertically to elevate the type, then to the left to bring the type over the supporting-shoulder of the ledge, then to the right to provide a proper space between the lifter and the type, thence downwardly, and finally to the right, when it is again in position to take a new type.

Should it occur in the operation of the machine that a character after passing the auxiliary selecting mechanisms should also pass the main selecting mechanisms, it will be discharged from the machine through the extension 28 of the main raceway into the pi-channel. (Shown in Fig. 4.)

*The feed-stop mechanism.*—The type distributing and setting mechanisms are intended and arranged to constitute one single machine which shall be harmonious in its action; but as the one is automatically operated, while the other is subject primarily to the will and movements of an operator, it is obvious that the work done by the two in a given time may not be the same. I prefer, therefore, to so time the movements of the machine that the distributing mechanisms may introduce the characters into the type-case more rapidly than they can be removed therefrom by the operator, and to provide automatic means for arresting such distribution when a channel becomes filled, and holding the mechanisms in abeyance until one or more characters are removed from the type-case. The following-described mechanism is employed by me for this purpose: The type-case 82, Figs. 315, 316, 470, and 471, consists of a series of channels of uniform height, separated from each other by proper division-strips. The type are inserted therein from the bottom in the manner described until the channels are full, or nearly so, as indicated in Fig. 315. Resting upon the top of the type in each of the respective channels are weight-plates 808, Figs. 316 and 317, which are intended to prevent the sticking of the type in the channels as well as to actuate the stop-feed mechanism in the manner hereinafter stated. Each of said weight-plates is provided with a beveled bearing-face 810, which when the channel is filled and the weight thereby lifted is adapted to engage a bar 807, which is connected by means of arms 806, Fig. 316, to a rock-shaft 124, extending from the right-hand bearing 83 across the front of the type-case near the top and across the machine to the upper end of the support 99 on the justifying-stand 49, as shown in Figs. 315, 470, and 471. An auxiliary bar 809, Fig. 315, is attached to the rock-shaft 124 in the same manner as the bar 807 and is extended across the space-channels, as shown. Attached to the supporting-standard 99, Figs. 316 and 471, is a bracket 811, through a ledge 812 in which is projected a rod 813, having a locking-bolt 814 upon its lower end, which is in operative proximity to the compound feed-lever 366 370 and guided vertically by means of a guide-plate 55, Figs. 316, 93, and 105. A coiled spring 817 is interposed between the ledge 812 and a collar upon the rod 813, which spring serves to depress the rod and the bolt 814 thereon when free to act. A curved portion 816 is formed upon the upper end of the rod 813, to which is pivotally attached a catch-piece 818, against which a spring 820 is arranged to bear so as to cause said catch-piece when properly lifted to engage with the ledge 812, and thereby hold the bolt 814 out of engagement with the lever 366. Rigidly attached to the rock-shaft 124 is an arm 821, having a rounded portion thereon, as shown, which is adapted to engage with an extension 819 upon the catch-piece 818. A weight 822 is adapted to so act upon the rock-shaft as to hold the bar 807 in position to be engaged by the beveled portion 810 of the weight-plates as the latter are lifted by the type. A lever 823, pivoted upon the stationary support 56, the location of which support is shown in Fig. 105, is so arranged that its forward end is adapted to engage a collar 825 upon the rod 813, while the rear end is in operative proximity to a pin 824 upon the continuously-revolving cam 201, which serves with each revolution to depress the rear end of the lever, thus lifting the forward end thereof and with it the rod 813.

The action of the mechanisms described is as follows: When by the action of the lifting mechanism of the distributer any character-channel is caused to be filled with type, the inclined portion 810 at the upper end of the weight-plate 808 is caused to strike the bar 807, extending across the type-case, and by contact with it to rock the shaft 124, which causes the arm 821 to strike the bearing-face 819 of the latch-piece 818, the normal positions of which parts, respectively, are shown in Fig. 316, and thus to move the bearing end of the latch-piece off from the ledge 812, thereby permitting the locking-bolt to engage with the feeding-lever and prevent the movement of the latter. If, however, the feed-stopping lever 823 is held against movement by the pin 824, as shown in Fig. 318, the locking action is prevented from taking place until the lever is released by the revolution of the cam 201. Once, however, in every revolution of the cam 201 the rear end of the lever 823 is depressed through the action of the pin 824, which causes the front end to lift the rod 813, so as to permit the latch-piece 818 to return to its normal position upon the ledge 812 in case the spring 820 is free to act. By this means the feeding-lever 366 is unlocked; but if the latch-piece is still held out of engagement by the arm 821 the rod and locking-bolt are caused to again descend into the locking position before the forward movement of the line-feeding lever occurs.

The locking-bolt, it will be understood, is lifted to unlock and released again to lock once during each revolution of the main shaft, and the lifting action to unlock occurs while the feeding-lever is being moved backward. It follows, therefore, that the feeding-lever cannot be advanced to feed the line to the cut-off while the bar 807 is held out of its normal position by the weight-plate of any character-channel.

The operative views by which the above-described action is intended to be illustrated are as follows: In Fig. 316 the parts shown are represented in their several normal positions, at which time, it will be observed, the bearing edge of the bar 807 of the rock-shaft 124 is not represented as being in contact with the weight-plate of any character-channel. The bearing end of the latch-piece 818 consequently is shown as resting upon the shelf portion 812, thus holding the rod 813 and locking-bolt 814 in their raised positions against the action of the spring 817 and leaving the feeding-lever free to advance the line.

In Fig. 318 the inclined portion 810 of a weight-plate is shown in contact with the bearing edge of the bar 807, and as a consequence the latch-piece is shown out of its normal position upon the ledge 812, thus releasing, so far as its individual action is concerned, the rod and locking-bolt, which latter are represented as still being held in their raised positions by the action of the pin 824 upon the lever 823, the opposite end of which is in engagement with the pin 825.

In Fig. 319 the weight-plate 808 of one of the character-channels is represented as about to be disengaged from the bar 807, thus enabling the latch-piece to spring into position upon the ledge when raised sufficiently through the action of the lever 823, upon the occurrence of which the parts will again be in their respective normal positions.

An important advantage results from the employment of the beveled bearing-surface 810 upon the weight-plates. Should foreign matter be interposed between the type, thus raising the uppermost type of a given number higher than it otherwise would be, it will act upon the feed-stop mechanism in the same way as if a greater number of clean type were in the channel. It is thus manifest that the described action must take place when the weight-plate reaches a given height regardless of the condition of the type.

From the foregoing it is apparent that the supply and demand of type, so far as relates to the action of the distributing and setting mechanisms, are equalized through the automatic action of the machine.

*The type-case.*—Having completed the description of the various mechanisms for distributing the type, I will now describe the type-setting mechanisms, which are designed to act in harmony therewith, commencing with the type-case, which forms a common reservoir, into which the type are automatically distributed, as described, and from which they are drawn by the setting mechanisms at the will of the operator. The type-case 82 is inclined in the manner indicated in Fig. 324, and the frame portion thereof is composed mainly of three distinct parts. The main portion 826, Figs. 320 and 324, consists of a plate, which is rigidly attached to the front bearing-faces of the main uprights 11 and 12 and is provided with a foot-piece 829 at the bottom and rear thereof, Figs. 324 and 332, which rests upon the auxiliary type-setter plate 40, the depending portion of which, as shown, rests upon the distributer-plate 36. The plates 40 and 36 together form a continuation of the type-case frame, which extends to the bottom of the distributer-plate. A series of grooves 830 are formed in the plates 826, 40, and 36 for the reception of division-strips 834, which are inserted therein in the manner shown in Figs. 331 and 332. The grooves are equally distant from each other; but the division-strips vary in width, and the spaces between them, the width of which is correspondingly varied, form the respective character-channels. Each of said division-strips is provided with a projection 835, Fig. 334, at the top, which extends beneath a removable retaining-bar 836, also shown in Fig. 320, by which all of said division-strips are held in place at the top. A similar bar 838, Fig. 338, at the bottom is recessed to receive projections 837 upon the division-strips to secure the lower ends thereof. The ledge 797, Figs. 332 and 337, forms the bottom of the respective type-channels, and the division-strips are cut away, as shown at 845, Figs. 338 and 339, to receive said ledge. Each of the division-strips is grooved or cut away, as shown in Fig. 333, in order to lessen the bearing-surface of the type and decrease the friction. This is especially important in the use of greasy or sticky type. The upper portions of the division-strips are beveled in front, as shown at 842, Fig. 335, in order to permit the insertion of pinchers between them for insertion or removal of type. An additional bearing-surface 843, Fig. 336, is provided in order that the type ejected from the case into the setter-raceway may be properly guided in their movement.

The type-case is preferably divided into two unequal parts by means of the partition-strip 846, Fig. 320, the larger part of which is adapted to hold all the ordinary characters of the case and the smaller part an additional supply of three-em spaces. The auxiliary space-channels, it will be observed in Fig. 320, do not extend the entire length of the type-case from top to bottom, but terminate on the line of the setter-raceway, which is indicated by the line of openings 826⁰. The channels are adapted to be automatically filled each with its own type, which are placed therein edge upon edge with the manufacturers' nick uppermost and the face of the type toward the front of the machine. When sufficiently filled, the weight-plates 808 hereinbefore mentioned are placed in the respective channels on top of the type to insure the proper descent of the unsupported type when one has been withdrawn. The type-setter plate 40 is provided with a series of parallel grooves upon its upper face for the reception of the setter-plungers 873, Figs. 371 to 374, inclusive, which grooves terminate in the character-channels. A certain type in each channel, counting from the bottom, always registers accurately with the corresponding groove in the type-setter-plate portion 40, so that when a plunger is moved out of any one of the grooves, as shown in Fig. 374, it will strike the foot of the type and eject it in the manner shown.

*The setter-raceway.*—The raceway into which the type are ejected from the case consists of two bars 94 95, Figs. 324, 325, 326, 329, 330, 400, 401, and 470, placed parallel to each other with an opening between, the height of which corresponds to the depth or gage of the type. Said raceway is in a plane parallel to that of the distributer-raceway and is placed in front of the type-case, as shown, in alignment with the setter-plungers 873. In the bar 94, which forms the lower portion of the raceway, are a series of bores 849, Fig. 330, into which is inserted a series of pins 850. (Shown in detail in Fig. 328.) The pins are notched, as shown, at 851, and a bar 852, Fig. 326, is inserted in a groove in the part 94 for the purpose of securing the pins in place. The notches are of sufficient length to permit of a slight vertical movement of the pins. Spiral springs 3, Fig. 327, inserted in the bores 849, serve to exert an upward pressure upon said pins. The pins are located directly opposite to the respective plungers 873, and each pin is provided with a rectangular head, which projects upwardly slightly above the surface of the raceway. Each of said heads is beveled upon the right hand and toward the rear, as shown in Fig. 420, in order not to obstruct the type when forced out longitudinally by the plungers or when moved laterally upon the raceway by the type-driver. The position of the type above the pins when forced upon the raceway by the plungers is shown in Fig. 329, while Fig. 420 is intended to illustrate the action of the pins upon the type when moved laterally upon the raceway by the type-driver. As the type are brought into contact with the pins in either of the ways described, a frictional action is produced which serves to overcome the inertia of the type and to prevent displacement thereof upon the raceway. Each individual stud in the raceway being exactly in line with the corresponding plunger-opening in the type-case, it is obvious that the type when ejected will be delivered exactly upon the corresponding stud in the raceway. As the end of the type in its movement first strikes the inclined bearing-surface of the stud, it causes a slight compression of the spring and passes to its place upon the main bearing-surface of the stud. It is apparent that the device described serves to positively hold the type in the precise position in which they are moved by the ejecting-plungers until they are again moved by the type-driver.

*The keyboard and key mechanisms.*—Supported by means of a plate 34, Fig. 324, which forms a part of the framework and projects outwardly in front of the machine, is the keyboard 853, which consists of a plate of suitable size and material, which plate is provided with a series of perforations 855, Fig. 340, into which is inserted a series of keys 862, Figs. 324, 342, 344, and 345. The lower ends of the pins, which form a part of the keys, are arranged, respectively, to engage with the arms 861 of a series of levers 860, which are pivoted at 859, as shown in Figs. 345 and 345, beneath the keyboard, to bars 856, also shown in Figs. 346, 347, 350, and 351, which are placed diagonally, as shown, and are detachably secured to the keyboard-plate 853. Said bars when they are in position are adapted to engage with notches 865, formed in the key-pins, whereby the latter may be retained in place and their vertical movement limited, as indicated in Figs. 350 and 351. Each of the bars 856 is placed obliquely to the front of the keyboard and is provided with a depending flange 857, (better shown in Figs. 346 and 347,) which is notched, as shown at 858, to form bearing-faces at right angles to the front of the key-board for the key-plates or levers 860. Said key levers are provided with counterpoise extensions 863, Figs. 344, 345, 348, and 349, the gravity of which acts to cause the arms 861 to return to their normal positions when the pressure is released from the keys 862. Each of the key plates or levers is provided with a depending projection 864, adapted to bear against the end of an actuating-rod 866, as shown in Figs. 324, 344, and 345, a series of which rods, corresponding to the number of keys, are arranged to lie in parallel grooves formed in the plate 34 and are covered with a plate 867. The rods 866 project rearwardly and are adapted to engage, respectively, with the lower ends of a series of levers 868, Figs. 324, 358, and 430, which are pivotally mounted upon a shaft 91, secured by means of plugs 91 91 between the uprights 11 and 12. The upper ends 869 of the levers 868 are diminished, as shown, in order to engage with a recess 870, Figs. 363, 364, 370, and 371, of an initial plunger 871, the operation of which will be hereinafter explained.

Supported between the main uprights 11 and 12 upon bearing-ledges 39, Fig. 324, or in any well-known way, is a plate 38, known as the "type-setter" plate, which is in alignment with one flange or portion of the plate 40, heretofore referred to in the description of the type-case, of which it forms a part, as shown in Fig. 332. A series of parallel grooves are formed in the upper face of the plate 38 in alignment with notches 886, Fig. 370 formed in the rear of said plate for the reception and guidance of the levers 868, which grooves are also continued in the upper face of the plate 40 in alignment, respectively, with the channels of the type-case. Said grooves are each adapted to receive a main plunger 873, an intermediate plunger 877, and an initial plunger 871, as shown in Fig. 371, and to guide them in their movements, as hereinafter stated. A covering-plate 883, Fig. 324, in connection with the overhanging plate 829, Fig. 332, serves to secure the respective plungers in place. The forward end of the initial plunger, which is supported in the groove of the plate 38, is somewhat enlarged and rounded, as indicated at 871, Figs. 363, 364, and 370, in order to enable the rear end to receive the proper vertical movement. The rear ends of the respective initial plungers are normally supported by means of a bar 884, Figs. 356, 357, 370, and 471. Notches formed in a depending flange in the front side of said bar, as shown in Fig. 356, serve to separate and properly guide said plungers. A bearing-shoulder 880, Fig. 370, upon the rear end of said initial plunger is adapted to rest loosely upon a ledge 885, formed upon the bar 884, thus normally supporting the same.

A blade 887 is formed upon a shaft 119, which blade is adapted to engage with notches 882, formed in the respective initial plungers, said engagement taking place only when said plungers are pushed forward far enough to enable the ends to slip off from the shoulders 885. Projections 881 upon said plungers are intended to engage with the blade 887 when the plunger is pushed forward, which prevents any displacement and insures the engagement of the blade 887 with the notch 882. An arm 890 upon the shaft 119 is connected by means of an adjustable link 889 to the rear end of a lever 888, which is pivotally attached at 21 to a bracket 20, which is secured in turn to the upright 12. A pin upon the forward end of said lever is in engagement with a groove 171 in a cam 169, mounted upon the shaft extension 111, next to the upright 12. The rotation of the cam serves, through the connections described, to oscillate the rockshaft 119, which causes the blade 887 to forward or return the initial plunger in the manner hereinafter explained.

Each of the main forwarding-plungers 873, Fig. 371, is provided with a projection 874, which when said plunger is thrust forward by the action of the initial plunger is adapted to be engaged by a carrier-blade 892, mounted upon a continuously-rotating shaft 113, while a like projection 875 is adapted to be engaged by a similar carrier-blade 896 upon the returning-carrier shaft 112. The manner in which said respective shafts are driven is indicated in Fig. 22, the gear 150 upon the forwarding-carrier shaft 113 serving to drive the gear 151 upon the returning-carrier shaft 112, while it is in turn driven by the gear 149 upon the shaft 110. It will thus be seen that the shafts 112 and 113 are caused to rotate in unison and in opposite directions. The main plunger when in its normal position, as shown in Fig. 371, lies with its rear stud 874 just out of the range of action of the forwarding-carrier blade 892, but when in the forward position, resulting from the full movement of the initial plunger 871 and the consequent movement of the intermediate plunger 877, just within the path of movement of the forwarding-carrier blade 892, as shown in Fig. 373, so that at the proper time it is carried forward to eject the type, where it is left by said carrier in the position shown in Fig. 374. Immediately upon the completion of this action the blade 896, moving in an opposite direction, engages the stud 875 and returns the carrier 873 to its normal position; but it is obvious that the initial plunger should also be returned to its normal position in time to enable it to be forwarded, if desired, in time to utilize the next rotation of the forwarding-carrier shaft. This result is accomplished as follows: Mounted in suitable bearings upon the uprights 11 and 12 is a rock-shaft 120, Figs. 371 to 374, inclusive, which shaft is placed forward of and parallel with the shaft 119. A blade 895 is attached to said shaft and extended beneath the initial plungers 871. An arm 894 upon said shaft is connected by means of a link corresponding to the link 839 with a lever 893, which is pivoted upon the pin 21. A pin upon the forward end of said lever is in engagement with a groove upon the right-hand side of the cam 169, the rotation of which causes the shaft 129 to oscillate, thereby causing the blade 895 to lift the rear end of such initial plungers as may be in an abnormal position with each upward movement of the blade.

The operation of the keys and coacting type-ejecting mechanisms above described is as follows: When the parts are in their respective normal positions, as shown in Figs. 324, 370, and 371, the bearing-shoulder of the initial plunger rests upon the supporting-ledge 885, and the blade 887 on the shaft 119 is held in a position slightly in advance of the recess 882, and the diminished portion 869 also of the lever 886 is removed a short distance from the bearing-face of the recess 870. Upon depressing a key the key-plate 860, Fig. 324, is tilted and the projecting end 864 thereof is caused to move backward against the rod 866. The resultant movement of this rod causes the lower arm of the lever 868, against which it bears, to be actuated in a rearward direction and its upper arm to be moved forward, and as the diminished portion thereof is extended into the front recess of the initial plunger, in which provision is made, as indicated, for lost motion, it moves a short distance without causing the disengagement of the rear end of the plunger from the bearing-shoulder of the ledge-bar; but a continuation of the movement causes a disengagement of the plunger from the ledge, which permits it to fall within the range of action of the forwarding-blade 887, as shown in Fig. 372. The provision for lost motion referred to is designed to prevent the initial plunger from becoming disengaged from its supporting-ledge in the event of the accidental and partial depression of a key. At the proper time in the operation of the machine by the action of the groove 171 in the cam 169 the lever 888 is oscillated, and through the link 889 and arm 890 the movement of the lever is communicated to the initial-plunger forwarding-shaft 119, and its blade 887, being in engagement, as stated, with the recess 882 of the initial plunger, advances the latter into contact with the intermediate plunger 887. By the forward movement of the intermediate plunger the rear stud 874 of the main plunger 873 is brought within the range of action of the blade 892 of the forwarding-carrier shaft 113, as shown in Fig. 373. The initial plunger, after having completed this movement, is held by the rock-shaft blade in its forward position against the intermediate plunger long enough to prevent any return movement on the part of the main plunger before it is engaged by the forwarding-carrier blade 892.

As before stated, the main plunger when in its normal position lies with its rear stud 874 just out of the range of action of the forwarding-carrier blade; but when in the forward position, resulting from the full movement of the initial plunger and the consequent movement of the intermediate plunger, it is brought into the path of movement of said carrier-blade and at the proper time is advanced thereby, as shown in Fig. 373, to eject the type, when the blade revolves away from the stud 874, thus leaving the plunger in the advanced position shown in Fig. 374.

At the proper time in the action of the machine, previous to the return of the main plunger, through the action of the cam-groove upon the right-hand side of the cam 169, the lever 893 is oscillated, and its movement is communicated through the connecting parts, as described, to the rock-shaft 120, the blade 895 of which is caused to raise the rear end of the initial plunger, so that the latter can be returned to its normal position upon the supporting-ledge by the return movement of the blade 887, which immediately follows. This action is indicated in Fig. 374. The blade 887 is then returned to its normal position, as shown in Fig. 371. The action described is immediately followed by that of the returning-carrier blade 896, as shown in Fig. 374, which engages the stud 875, and thus returns the main plunger to its normal position. The rock-shafts 119 and 120 are oscillated constantly and in harmony with the movements of the other parts with which they coact. An important advantage of this construction is that it insures a definite and positive movement to the initial plunger instead of depending upon the uncertain movements of the operator, who has only to depress the keys sufficiently to push the initial plunger off from the ledge by which it is supported at the rear, when the forwarding thereof is completed automatically.

*The mechanism for setting the three-em space.*—Having fully set forth the means by which the type is ejected from the type-case into the raceway, I will, before specifying the manner in which it is forwarded thereon, describe certain special mechanisms in connection with the spaces, which may be properly considered at this time.

Figure 380:
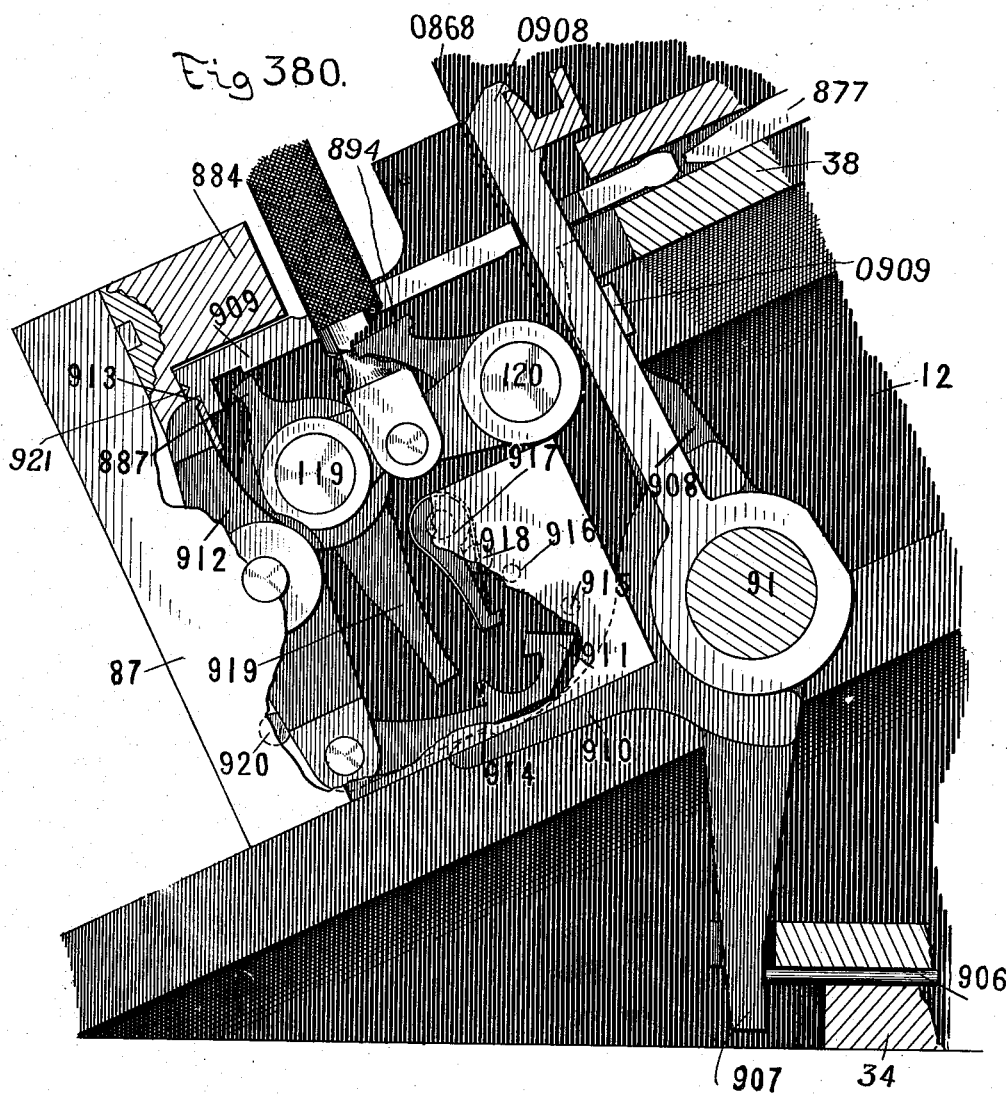
Figure 381:
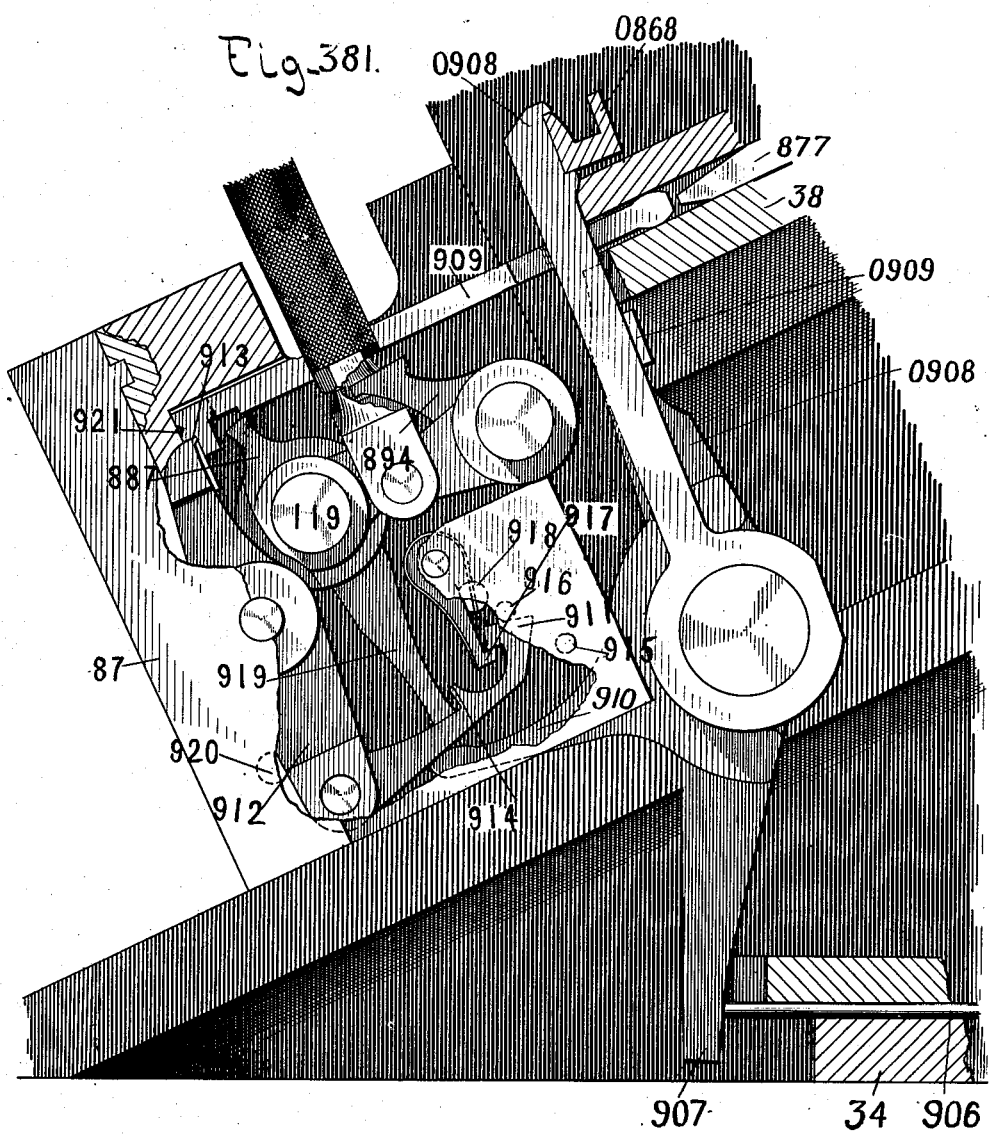

The space preferably employed to separate the words is the usual three-em space, which in the natural order of the operation of the machine would be placed at the right hand of the type-case in order to prevent transposition, it being borne in mind that the spaces are set after the words, but inasmuch as large numbers of these spaces are required to be used, and if the channel therefor were placed at the right of the type-case it would necessitate the moving of them in distribution the entire width of the type-case, I prefer to place the space-channels for this particular space at the left of the type-case and to provide special means for preventing the space from being set before the word instead of after it. I am enabled to accomplish this result by delaying the action of the initial plunger, so that the main plunger for ejecting the three-em space may be forwarded by the second instead of the first revolution of the forwarding-carrier after the depression by the operator of the space-rail. In Figs. 352, 353, 355, and 375 is shown the space-rail 897, which consists, preferably, of a flat metallic bar arranged upon the keyboard in front of the bank of keys, and which is provided with a depending flange 898, which is loosely connected by means of links 934 934 (better shown in Figs. 375 and 377) to elbow-levers 935 936, which are pivotally attached to the keyboard-frame. The depending arms of said levers are connected by means of a link 937. The result of this construction is to enable the space-bar to remain parallel to the frame during its movement, regardless of the point at which the pressure is applied thereto by the operator. A central elbow-lever 900, Figs. 353, 375, and 377, similar to the others, is also pivoted to the frame, and its horizontal arm is connected to the space-rail by means of a link 899. The other arm is in engagement with a notch in a sliding bar 901, also shown in Fig. 352, secured and guided in the frame by means of screws 902 902, Figs. 376 and 377. A notch 903, Figs. 375 and 379, in the left-hand end of said bar is adapted to engage one arm of an elbow-lever 904, pivotally attached to the plate 34. The other arm of said lever rests normally against the end of an actuating-rod 906, Figs. 352, 375, and 380 to 384, inclusive, which bears against the lower end of a lever 907, as shown in said last-named figures. Said lever, like the levers 868 heretofore described, is pivoted to the shaft 91 and is similar to said levers, except that the upper arm 908 thereof is shorter and does not engage with the initial plunger 909. The only object of said upwardly-extended arm is to enable the lever at the proper time to be returned to its normal position by means of an arm 0908, connected with the time-lock returning-bar 0868, hereinafter described, the object of which is to return all of the levers 868, as well as the lever 907, to their respective normal positions. A lug 0909, attached to the bar 0908, is adapted to engage the arm 908 and to return the same to its normal position when the time-lock returning-bar is actuated. The lever 907 is provided with an arm 910, which is extended rearwardly therefrom and is adapted to lift a latch 911 when the lower end of the lever 907 is pushed back as a result of a depression of the space-rail. The latch 911 is pivotally attached to the lower end of a lever 912, and is provided with a hook upon its forward end, which is adapted, when said latch is raised, to engage with a corresponding spring-actuated hook 917, as shown in Fig. 381. A shoulder 914 is also formed upon said latch, which, when raised, is in the path of movement of an arm 919, which is extended downwardly from the rock-shaft 119, hereinbefore described. The lever 912 is pivoted near its middle to a block 87, Figs. 381, 388, and 430, which is secured in a position against the upright 12. Said lever is shown in detail in Figs. 542 to 545, inclusive. A spring 932, Figs. 387 and 388, is connected with said lever, preferably in the manner shown, so as to cause the upper end of the lever to pass forward beneath the projection at the rear end of the initial plunger 909, as shown in Fig. 380. A pointed projection 913 is formed upon the upper end of said lever, which is adapted, under certain conditions hereinafter stated, to be received in a notch 921, formed in the end of said initial plunger. The blade 887, when in engagement with the notch in the initial-plunger, is adapted to forward and the arm 894 to raise the initial plunger in the manner hereinbefore described. A stud 920 is provided to limit the backward movement of the lower end of the lever 912, a like stud 918 to limit the forward movement of the hook 917, while a stud 916 serves to limit the upward movement of the latch 911 and to deflect the same downwardly when pushed forward. A similar stud 915 is provided to hold the latch 911 in the position shown in Fig. 382 when the same is thrown forward by the arm 919.

Figure 382:
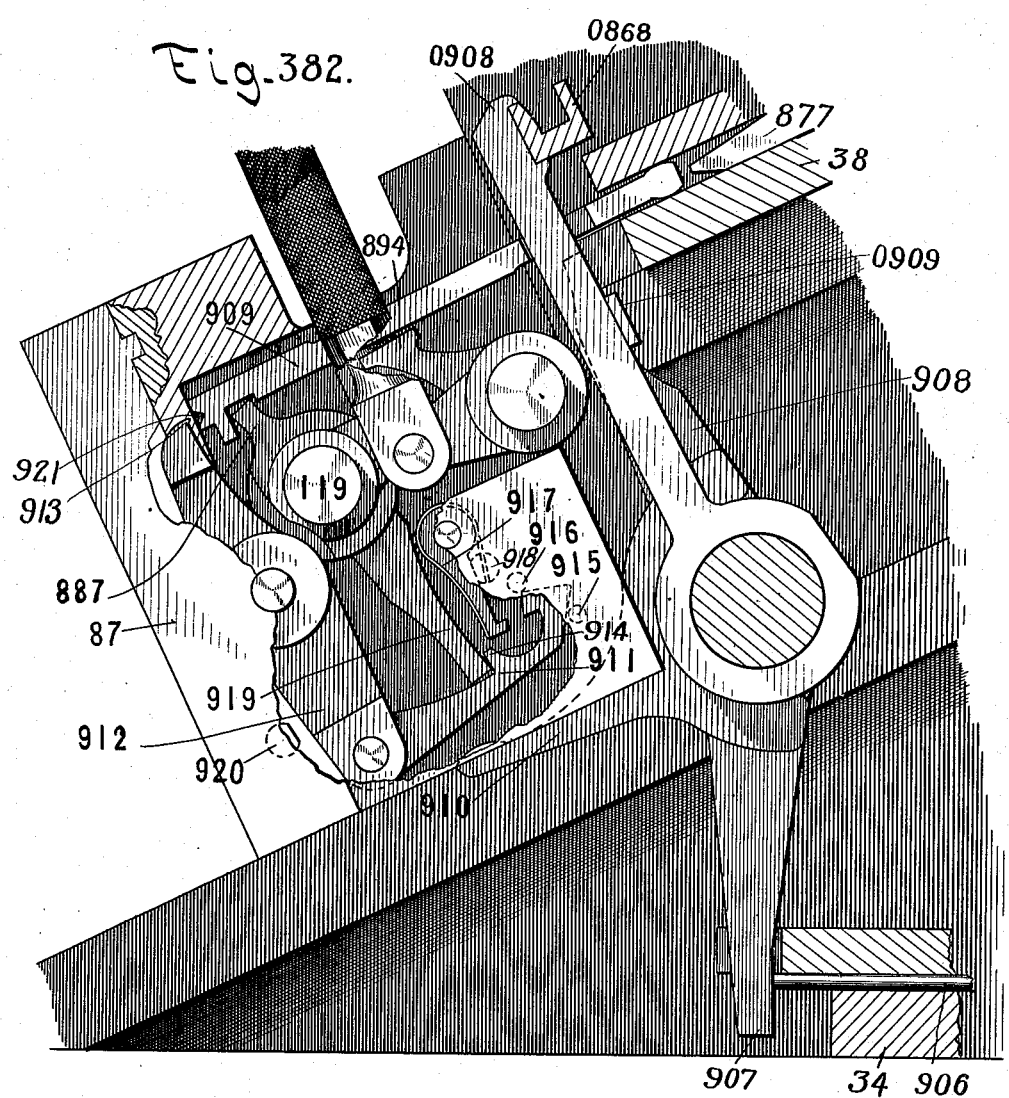

The operation of said mechanism is as follows: Assuming the parts to be in their respective normal positions, as shown in Fig. 380, upon the depression of the space-rail the actuating-rod 906 is caused to press back the lower arm 907, and consequently to swing forward the upper arm and upward the arm 910. The lever-latch 911 is lifted by the latter and caused to engage with the hook 917, as shown in Fig. 381. The forward movement of the blade 887 then occurs, and if any character-keys have been depressed simultaneously with the space-rail the initial plungers, which have been brought within the range of action of the blade 887 by the depression of the keys, are carried forward to cause the ejection of the corresponding type from the type-case into the raceway; but it is obvious that a space cannot be simultaneously ejected, for the reason that the initial plunger 909 has not been released by the action described, and hence cannot be forwarded. As the blade 887 is rocked in a forward direction, as stated, the arm 919 is moved in a backward direction a sufficient distance to cause its lower end to be brought into contact with the lower end of the spring-lever 912, which renders it certain that the upper end of the latter is in proper position to support the rear end of the initial plunger. As the blade 887 rocks in a rearward direction in its return movement, the arm 919 is advanced into contact with the projection 914 on the latch 911, as shown in Fig. 382, to draw forward the lower end of the spring-lever 912, thus releasing its upper end from contact with the rear of the initial plunger and permitting the latter to fall within the range of action of the blade 887, as before described in relation to the ejection of the characters. By the forward movement of the latch 911 its front end is disengaged from the hook 917, which latter is prevented from following the latch at the time by the stop-pin 918, as shown in Fig. 382. As the latch 911 is disengaged from the hook it is moved downwardly below the horizontal line of the hook by the contact of its inclined bearing-surface with the bearing-pin 916, the horizontal arm 910 being moved out of the way at this time by the action of the arm 0908, as described. This provision for slightly lowering the latch prevents the possibility of the accidental engagement of the latch with the hook 917 when the former is caused to make its return movement. When the latch 911 is disengaged from the hook 917, its lower inclined surface is brought into contact with the pin 915, and the latch is thus held in engagement with the arm 919 until the completion of the parts of their forward movement, where they are held until the blade 887 is caused to make another forward movement. The initial plunger, having in the meantime been released from the projection 913 and having fallen into engagement with the blade 887, is thrust forward thereby, thus causing the ejection by the main plunger of a space from the type-case into the raceway. The types before referred to as having been ejected into the raceway during the previous revolution of the forwarding carrier having been removed by the type-driver will, it is obvious, precede this space in the order of composition; but the space having been set from the first character-channel will, of course, precede the type which are ejected into the raceway at this time. When the blade 887 is moved forward to cause the ejection of a space, as described, the arm 919 is moved back, and the spring-lever 912, which until this time has been held in its forward position by the engagement of the latch 911 with the arm 919, is permitted to return to its banking by the action of the spring by which it is actuated. The latch 911 then falls to its normal position. When the blade 887 is moved forward with the initial plunger, the projection 913 upon the upper arm of the spring-lever 912 advances with it, but being actuated by a spring its movement is at a much more rapid rate than that of the initial plunger 909, and hence would come in contact with said plunger were it not for the clearance-space 921, as shown in Fig. 383, which is made to prevent it. Upon the completion of the forward movement of the initial plunger it is raised by the movement of the arm 894, as shown in Fig. 384, in time to permit the plunger to be moved back upon the supporting projection 913 of the lever 912 by the return movement of the blade 887.

*The supplementary space-channels and the mechanism for switching them into operative connection with the space-rail.*—Inasmuch as the spaces may sometimes be exhausted from the three-em-space channel described, I prefer to place a series of supplemental space-channels upon the right-hand side of the case and provide means for connecting the space-rail at such times as may be desired with the mechanism for ejecting the spaces therefrom and at the same time for disconnecting it from the regular mechanism described for ejecting the three-em space. These supplemental channels may be filled with pinchers and are intended to serve as an extra reservoir from which to draw when desired.

Connected with the vertical arm of the belt-crank lever 936, as shown in Figs. 355 and 375, is a bar 938, similar to the bar 901, which is connected, as shown, to corresponding arms of bell-crank levers 939, Fig. 375, which are pivotally attached to the frame 34. The opposite arms of said levers are pivotally attached to a plate 940, which is in operative proximity to the ends of a series of actuating-bars 941 942, Figs. 354, 355, 389, 390, 391, and 392, when the bars are lowered, as hereinafter stated and as shown in said last-named figure. Said actuating-bars, which are shown in detail in Figs. 395 to 397, inclusive, are arranged to rest in the grooves formed in the plate 34 and are supported against lateral movement by means of notches formed in a block 946, Figs. 354, 355, 391, and 392. Notches 943, Figs. 391, 392, 395, and 397, are adapted to be engaged by spring-actuated pins 947, which serve, when desired, to hold said bars in an elevated position, as shown in Fig. 391. Notches 944 are adapted to be engaged by a bar 948, Figs. 354, 391, and 392, so as to hold and lock the same in position when raised, as shown in Fig. 391. The ends of the bars are adapted to project over the block 846 and are connected with the keys 862 upon the keyboard. The rear ends of the bars 941 project loosely beneath a cross-bar 949, Figs. 391 and 392, which holds them in place while permitting them to be moved longitudinally. Actuating-rods 950, like those before described, have their forward ends in operative proximity to the bars 941 and are adapted to actuate levers for moving initial plungers, in the manner hereinafter described.

Pivotally attached to a bracket 88, Figs. 389 to 394, inclusive, secured to the bottom of the plate 34, is a transverse lever 591, which projects laterally to the left of the keyboard-frame, as shown in Fig. 389. A pin 905 is formed upon said lever near the left-hand end, which pin projects upwardly through the plate 34 and is provided with an opening, as shown, through which is loosely projected the actuating-rod 906, hereinbefore described in connection with the three-em-space mechanism. When the lever 951 is in its normal position, as shown in Fig. 389, the rod 906 is also in its normal position in which it may be actuated by the lever 904, as shown in Figs. 352 and 353; but when the lever 951 is in its abnormal position, as shown in Fig. 390, the rod 906 is lifted by the pin 905 out of engagement with the lever 904 and hence the movement of the space-rail can have no effect thereon. Upon the right-hand end of the lever 951 are a series of pins 952, which correspond in number to the actuating-bars 941 and project upwardly through openings in the plate 34 in operative proximity thereto. The depression of the left-hand end of the lever to its normal position serves to lift the actuating-bars 941, as shown in Figs. 389 and 391, above the path of movement of the plate 940.

Figure 392:
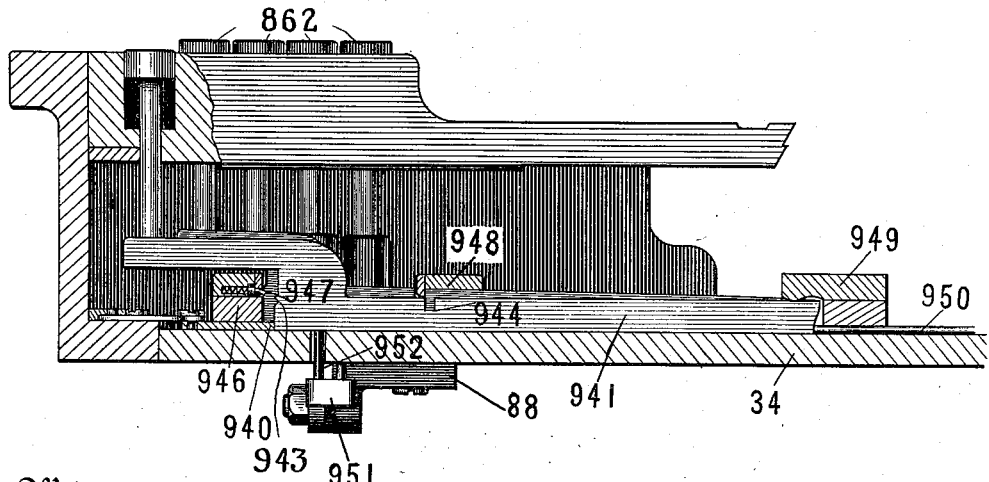

Upon referring to Fig. 375 it will be obvious that whenever the space-rail is depressed both the bars 901 and 938 will be actuated longitudinally, and hence both the lever 904 and plate 940 will be moved. If the lever 951 is in its normal position, the rod 906 will be lowered into contact with the lever 904, which will cause the ejection of a three-em space. At the same time the plate 940 will be moved; but as the levers 941 are raised out of contact therewith no action will result therefrom. Upon the depression of one of the keys 862, however, as shown in Figs. 390 and 392, the lever 551 is tilted, so as to throw the rod 906 into an inoperative position with reference to the lever 904, while at the same time the actuating-bar 941 is lowered into a position, as shown in Fig. 392, to be engaged and pushed back by the plate 940 when the space-rail is depressed. When the actuating-bars are depressed, they are released from contact with the retaining-bar 948.

It is obvious from the foregoing description that two or more of the supplemental space-keys may be depressed at the same time, if desired, and that upon moving the space-bar they will all be actuated by the plate 940, which will cause a corresponding number of spaces to be thrown out, all of which will be forwarded upon the raceway by a single movement of the type-driver, as hereinafter stated. The important advantage of this construction is that it not only provides an ample reserve from which spaces may be withdrawn in case the three-em-space channel becomes exhausted, but it also enables a line at the end of a paragraph to be filled out as a result of one or two movements on the part of the operator, when without it an indefinite number might be required.

*The type-gate.*—In order to prevent a possible retrograde movement of the type when ejected from the type-case onto the raceway, I provide a movable gate which is adapted to be automatically interposed behind the type when the latter are thrust forward, so as to prevent their return.

The type-gate 956⁰, Figs. 401, 402, and 403, consists of a flat plate, as shown, arranged to move in a suitable guideway immediately behind the setter-raceway, and is extended across that portion of the type-case which is below the character and space channels. A rock-shaft 121 is secured in suitable bearings in front of the lower portion of the type-case and is provided with a series of arms 955, which are extended into corresponding slots 955⁰, formed in the lower portion of said gate, as more clearly shown in Fig. 401, in which a portion of the plate 94 and rock-shaft is broken away to show said slot. Connected with the arm 955 at the right-hand end of the rock-shaft is a link 954, which is connected in turn with the forward end of a lever 953, pivotally mounted, as shown, upon a stationary bearing, and the rear end of which is provided with a pin adapted to engage with a groove formed in a cam 167 upon the returning-carrier shaft 112. The forward ends of the main type-ejecting plungers are tapered slightly, as shown at 957 and 958, respectively, Fig. 361. The former is provided for the purpose of enabling the plunger to enter between the type without engaging with the one next above that which is intended to be ejected from the type-case, and the latter is provided for the purpose of enabling the type-gate to rise behind the ejected type before the withdrawal of the plunger for the purpose of insuring the prevention of any backward movement.

The operation of said device is as follows: When the selected type are ejected into the raceway, the type-gate, through the action of the cam 167 and the connecting mechanisms described, is caused to rise behind the type, the first part of the upward movement being made before the withdrawal of the plungers and the last part of the continued movement after the withdrawal of the plungers. When the type-gate attains the full limit of its upward movement, it remains in its raised position until the ejected type are swept by the type-driver, in the manner hereinafter described, to the delivery end of the machine, when it is caused, through the action of the cam, to return to its normal position in time to again permit the ejection of type. Thus it will be seen that the entry and maintenance of the type in the raceway is positively insured.

*The main type-driver.*—The main type-driver is adapted to reciprocate in the raceway composed of the parts 94 95, Figs. 401 and 432, in front of the type-case, and consists of a base portion 967, adapted to fit loosely in the recess 847, Figs. 324, 325, 326, and 402, before referred to. Said base portion is provided with a vertical rib 968, Figs. 414, 416, 418, and 432, extending upwardly therefrom, which is united to the body-plate 969 of the type-driver head 970, as shown. The body-plate 969 is provided with a recess 971, into which is loosely inserted a movable plate 972, having a laterally-extended depending arm 973, also shown in Figs. 412 and 413. The plate 972 is adapted to be moved longitudinally in the recess 971, which movement is positively limited by shoulders which engage the arm 973, and which constitute the walls of the recess through which it is extended. The recess 971 is somewhat longer than the plate 972, and the whole is covered with a cap-plate 974, into which is formed a series of air-vents or perforations 975 for the purpose of cushioning the plate or head proper, which is brought into contact with the type when the head is reciprocated.

Rigidly attached to the framework opposite to the respective sides of the type-case are stops 976 976, illustrations 1 and 2, Fig. 417, also shown in Figs. 418 and 420, the ends of which are bent upwardly so as to engage the arm 973 when the latter reaches its limit of movement in either direction. At the right hand, Fig. 420, the plate 972 is shown in its normal position, the dotted lines indicating its relative position with respect to the vents 975. As the head is advanced into contact with the type the plate is pushed back, as shown in the middle portion of the view, and by the time the stroke is completed the arm 973 is brought into contact with the stop 976, which prevents its further advancement and enables the type to be deposited at a fixed point, where they may be taken by the auxiliary driver in the manner hereinafter set forth. Were it not for the positive stop at the forward end of the main raceway, there might be a slight variation in the point at which the type would be left by the driver, as the resistance of the type against the air-cushion might vary in proportion to the number of the type advanced by each stroke. The purpose of the stop 976 at the right hand is to cause the driver-plate 972 to be drawn out, as indicated in dotted lines upon the return of the driver-head, so as to suck the air into the recess through the openings 975 and thus leave the parts in position to utilize the air-cushion during the next forward stroke of the driver. The part 967, which is connected with the driver-head, is in turn connected with a driver-bar 965, Figs. 406, 407, 408, and 411, the right-hand end of which is attached to a block 964, arranged to slide in a groove in a horizontal guide-bar 77, Figs. 405, 406, and 470, which is attached to the framework at the left-hand end and to the bracket 33 at the right-hand end, as shown. A block 966, Fig. 406, is capable of a vertical movement in the block 964, and the opening therein is intended to receive a crank-pin 963 upon the end of a crank-arm 962, Figs. 405, 410, and 411, which is connected with and operated by means of a "sun-and-planet" gear system in the manner hereinafter set forth.

Rigidly attached to the main driving-shaft 108, Figs. 404 and 410, is a disk 109, within which is placed, in the manner shown, a journal-stud 78, upon which is mounted a gear-wheel 155 in engagement with a stationary gear 154. The latter is secured to the thimble in which the main shaft 108 is mounted. The gear 155 is also in engagement with an outer gear 156, which is rigidly attached to a shaft 127, having bearings in the disk 109, and also in a cover-plate 961, which is rigidly attached to said disk. A continuous revolution is imparted to the disk 109 while the machine is in operation. By means of the pinion 154, secured to the fixed sleeve 4, the intermediate pinion 155, and the pinion 156 an independent rotary motion is imparted to the crank-shaft 127. The result of the combined rotary movements of the disk 109 and the shaft 127 in the disk is shown in Fig. 411, in which the pinion and disk are indicated as being in certain positions occupied by them while making one complete revolution, the different positions being numbered from one to nine. Starting at the beginning of the forward movement when the crank-pin 0 is in its extreme position at the right-hand end of the type-driver guide, as indicated at 01, and the crank-pinion 00 is in the same horizontal line, indicated, also, at 001, the pinion 00 is carried by the revolution of the disk into the position marked 002 and the crank-pin 0 into the corresponding position marked 02. By the next partial revolution the crank-pin 00 is moved to the position 003 and the crank-pin 0 to the corresponding position 03. By the next partial revolution the crank-pin 00 is moved into position 004 and the crank-pin 0 into the corresponding position 04. By the next partial revolution the crank-pinion 00 is moved into the position 005 and caused to complete a half-revolution and the crank-pin 0 is moved into the corresponding position 05, which is the extreme limit of its forward movement. By the continued revolution of the disk the crank-pinion 00 is moved successively into the positions marked 006 007 008 001 and the crank-pin 0 into the corresponding positions 06 07 08 01, thereby completing an entire revolution.

From the foregoing it is not only obvious that the crank-pin 963 is caused to move in a straight line, but that the extent of its movement is four times the length of the crank-arm. By this means a reciprocating movement is obtained sufficient in extent to sweep the type-driver past the entire case while the parts employed occupy a comparatively small space.

*The auxiliary type driver.*—The auxiliary driver which is intended to sweep the type forward on the raceway from the delivery-point at which it is left by the main driver consists of a block 932, Figs. 422, 423, and 432, connected by means of suitable guiding-ribs arranged horizontally with a secondary block 978, arranged in vertical guides in the stationary part 95, forming the upper portion of the raceway, the block 982 being free to move horizontally, while the block 978 is free to be moved vertically. Said horizontal block is provided with a series of teeth 983, adapted to engage the type, as shown in Fig. 422, and to advance the same upon the raceway. The vertical block 978 is connected in the usual way with the forward end of a lever 977, Figs. 324 and 423, which is pivoted at 86, as shown, while the rear end is connected by means of a pin to a groove in the cam 172 upon the shaft 111. By this means a vertical movement is imparted to the block 978 and through it to the auxiliary driver-block 982. The left-hand end of said block 982 is connected by means of a pin 984 to a lever 981, the rear end of which is pivoted at 25 to a bracket 24 upon the upright 12. A pin upon said lever is in engagement with a groove 179 in a cam 178, adapted to rotate continuously, thereby imparting through the lever 981 a horizontal movement to the auxiliary driver 982. As a result of the combined action of the two cams 172 and 178 a four-motion movement is imparted to the auxiliary driver as follows: By the action of the cam 172 the block is given an upward movement while in its extreme left-hand or forward position. It is then moved to the right by the action of the cam 178 into position to permit the delivery by the main type-driver of the gathered type within the range of its action. Through the cam 172 it then receives a downward movement to bring the teeth 983 upon the raceway in the rear of the gathered type, as shown in Fig. 422. A horizontal movement is then imparted to said driver, through the action of the cam 178, to advance the type upon the raceway into the line of composition. When this movement is completed, the block is again raised to its first position through the action of the cam 172. The cam 178 is so timed as to impart to the auxiliary driver a rapid backward and a slow forward movement, so as to prevent a disarrangement of the type as they are advanced upon the raceway.

*The auxiliary type-driver raceway.*—In order to prevent a possible retrograde movement of the type with the backward movement of the auxiliary driver, I provide, in connection with that portion of the raceway over which the auxiliary driver travels, special devices for engaging the type and preventing its return. Rigidly secured within a suitable recess in the part 94, Fig. 422, over which the auxiliary driver is actuated, is a block 985, also shown in Figs. 424 to 426, inclusive, the upper face of which forms a part of the upper raceway. Upon the right hand of said block is a gate 990, loosely secured thereto by means of a screw 995. Said gate is also shown in detail in Fig. 427. The opening 994 therein, through which the screw 995 is passed, is sufficiently large to permit a slight vertical movement of the gate, which is held in its normal position by means of a spring 998, arranged to bear upon the bottom thereof. The upper portion of said gate is provided with inclined faces 992, the base of each of which is flush with the raceway, while the forward or left-hand portion projects, as shown. Located immediately forward of the gate 990 is a pivoted bearing-plate 988, Figs. 426 and 428, which is adapted to press upwardly against the type by means of a spring 989. A second gate 996, Figs. 424 and 426, is secured to the left-hand end by means of a screw 997 in the same manner as the gate 990, the spring 998, which is centrally supported, serving to actuate both of said gates.

The operation of said devices is as follows: When the type in their movement upon the raceway by the main type-driver are caused to pass the proper point, the first gate 990, which yields in a downward direction against the resistance of the spring 998 to permit their passage, shuts in behind them and prevents retrograde movement. During the continued movement of the type by the auxiliary type-driver they are held under spring-pressure by the action of the spring 989 upon the bearing-plate 988. By means of the inclined face upon the upper edge of the second gate 996 the type are permitted to move past it. After the passage of each type the gate rises under the action of the spring 998, thus preventing any retrograde movement on the part of the type.

*The time lock.*—It is essential to the perfect working of the machine that some means should be employed whereby the forward movement of the ejecting-plungers may be caused to harmonize with the movements of the parts with which they are intended to coact. For this purpose I provide what I term a "time-lock," which is adapted to prevent the forward movement of the plungers except at such times as it is desirable for them to be actuated. To the time-lock generally I make no claim in this application.

Loosely mounted upon the shaft 117, Figs. 16, 22, 324, and 430, is a hollow shaft 114, which I term the "time-lock shaft." A gear-wheel 153 thereon (better shown in Fig. 22) is driven by an intermediate gear 152, which in turn is driven by a gear 149 upon the auxiliary driving-shaft 110. Said time-lock shaft is provided with cams 175, 176, and 177, Figs. 430 and 431, which are adapted to engage with arms 118⁰ upon a rock-shaft 118, mounted in suitable bearings between the uprights 11 and 12, and which shaft is provided with a counterbalance-weight 1,000 upon a rearwardly-extended arm, as shown, the tendency of which is to maintain the lower ends of the downwardly-extended arms 118⁰ in proper contact with the surface of the cams. An arm 999 is rigidly attached to and extended upwardly from the rock-shaft 118 and provided with a beveled end, as shown, which is in operative connection with a relieving-spring 1,001, Fig. 324, attached to the arm 23, Fig. 3, upon the upright 12. The lower ends of the downwardly-extended arms 118⁰ are in engagement with corresponding recesses in the returning-bar 0868, which by the action of the cams 175, 176, and 177 and spring 0114, Fig. 431, locks the returning-bar and through it and the intermediate parts the selecting-keys; but at the proper time in the operation of the machine the returning-bar is released to permit the forwarding of the plungers, and when this is accomplished the action of the cams mentioned causes the return of the actuating-levers 868, the actuating-rods 866, and the selecting-keys to their normal positions, as shown in Figs. 324 and 431.

When in the operation of the time-lock mechanism the cams are revolved into their unlocking position to permit the depression of a key, the pressure upon such key by the finger of the operator must be sufficient to overcome the inertia and friction of the returning-bar and its attachments; but when the key is started the relieving-spring 1,001 commences to act on the inclined face of the arm 199, and by moving it back instantly overcomes the resistance and insures a complete and easy movement of the key; but it should be borne in mind that when the parts are in their respective normal positions the spring rests upon the end of the arm in close proximity to but not upon the inclined face, and consequently does not in any wise tend to actuate said arm.

In operating the machine the main shaft 108 is given a rapid continuous revolution from any proper source of power, and by means of the continued revolution the moving parts connected are caused to operate in the manner hereinbefore described. One or more keys may be depressed by the operator with each revolution of the forwarding-carrier shaft, the number depressed being determined by the relation existing between the type to be set and the position of the keys upon the keyboard, as well as the skill of the operator. The keys can be depressed only at that period in the revolution of the time-lock shaft when the latter has caused the release of the returning-bar, at which period type may be set with absolute certainty and without danger to the machine or type. Owing to the rapidity of the revolution of the time-lock shaft, the keys may be depressed almost at any instant, and while being so depressed the normal resistance incident to the action is instantly overcome by the time-lock-relieving spring, so that no resistance after starting the key is offered to its complete depression.

The selecting-keys, which are moved at any one impulse, and the corresponding initial, intermediate, and main plungers are caused to be returned to their respective normal positions during that impulse or revolution, so that the same keys may be used successively, if desired. If, in the rapid manipulation of the keys, one should become accidentally moved and partially depressed, the corresponding initial plunger would, as hereinbefore stated, receive no movement, owing to the provision for lost motion in the long recess therein, and hence not being disengaged from its supporting-ledge no type would be set.

As stated, the movement of the type-driver is in harmony with that of the other parts of the machine, and when the type have been ejected into the raceway the type-gate is caused to rise behind them and the type-driver is moved forward to gather and deliver the type to the auxiliary driver when it moves backward out of the way to permit the ejection of the other type. The type having been moved within the range of action of the auxiliary driver are advanced upon the raceway toward the place of justification, as hereinafter described.

*The justifying mechanisms.*—The type-setter-raceway extension 98, Figs. 441, 443, 444, and 470, is continued from the point at which the auxiliary type-driver is located along the front of the machine to the setter-galley 47, in which the type is finally placed, as hereinafter described.

Loosely secured in a suitable guide beneath the raceway extension 98, as shown in Figs. 441, 443, and 444, is a sliding block 1,017, termed by me the "finger-block," to the bottom of which is secured a plate 1,021, having a cylindrical block 1,022, Fig. 441, connected therewith, as shown. A finger 1,019 is secured in a groove in said block and the rear end is adapted to be extended into the raceway. A spring 1,020, Fig. 442, is arranged to press upon said finger and to hold the same by frictional contact in any position in which it may be placed by the operator. By withdrawing the finger and moving the block in which it is held to the right the finger may be inserted into the line of composition and the line pushed forward to the left by sliding said block, as indicated in Figs. 444 and 446, into operative proximity to the justifying-stand. This movement may be accomplished either by hand or otherwise, but preferably in the manner hereinafter stated.

Located beneath the raceway extension 98 are two pulleys 1,024, one of which is shown in Fig. 444 as being near the setter-galley, while the other (not shown) is near the auxiliary driver. A cord 1,023 is trained over said pulleys, one end of which is attached to the left and the other to the right hand side of the block 1,017, so that by the revolution of said pulleys the block would be caused to slide back or forth, according to the direction of movement of said cord. The forward pulley 1,024 is attached to the front end of a shaft 134, Figs. 447, 467, and 468, upon the rear end of which is secured a friction-disk 1,035, adapted to engage with friction-disks 1,032 and 1,034 upon the shaft 133, which is connected by a pinion 161, Fig. 467, with a gear 160 upon the continuously-revolving shaft 126, which causes the shaft 133 to be rotated continuously. Upon the shaft 133 is mounted a sleeve 1,039, Figs. 611 and 621, upon which, in turn, are mounted the disks 1,032 1,034. The hub of the disk 1,032 is provided with pins 1,033, Fig. 455, which are adapted to enter corresponding holes in the end of the hub 1,034, as shown in Fig. 456. Through the hub of the disk 1,034 is formed an elongated opening 1,036 corresponding to openings 1,040 and 1,038, respectively, in the sleeve 1,039 and shaft 133. A key 1,042 is inserted in said openings, as shown in Figs. 468 and 469. As the opening 1,038 in the shaft is somewhat longer than the others, it permits of a slight longitudinal movement of the sleeve 1,039 thereon, but causes both the sleeve and the disk 1,034 to revolve with the shaft. As the disk 1,032 is connected by means of the pins 1,033 with the hub of the disk 1,034 the latter is also caused to rotate therewith. A spring 1,043, Fig. 468, upon the shaft 133 is interposed between the disk 1,032 and the bracket 51, in which one end of said shaft has its bearing, while a secondary spring 1,044 is interposed upon said shaft between the opposite end of said sleeve and a bracket 45. The tendency of said springs is to press the disks toward each other, and as they are of equal strength one counteracts the pressure of the other. The pins are so adjusted as to normally hold the faces of the disks slightly farther apart than the diameter of the disk 1,035, which they do not touch normally, as indicated in Fig. 468. Upon the sleeve 1,039 is placed a collar 1,041, Figs. 460 and 469, which is between the hub of the disk 1,034 and the shoulder upon the end of the sleeve 1,039. A lever 1,027, Figs. 447, 458, 468, and 469, having a part 1,028, is adapted to surround said collar and to be connected therewith by means of set-screws 1,029. The rear end of said lever is pivoted upon a stud 1,026, Figs. 447 and 458, while the forward end is in position to be readily grasped by the operator. The lateral movement of the lever lessens the pressure of the spring upon the side toward which it is moved and thereby permits the other spring to press the adjacent disk against the disk 1,035 and thus to cause the rotation of the shaft 134. For example, should the lever 1,027 be moved to the right, it will overcome the counter-pressure of the spring 1,043 and cause the disk 1,034 to be pressed against the disk 1,035, which by frictional contact causes the same to rotate in a given direction; but should the lever be moved to the left it will compress the spring 1,044, thereby permitting the spring 1,043 to press the disk 1,032 against the disk 1,035 and cause the rotation of the latter in an opposite direction. Thus it is manifest that by merely pressing the lever 1,027 to the right or left the shaft 134 may be caused to rotate and the finger-block 1,017, through the action of the pulleys 1,024 and cord 1,023, to be moved forward or back, as desired. It should be borne in mind that when the finger-block is moved back the finger 1,019 is first withdrawn to prevent its contact with the type upon the raceway.

Above the raceway and at the right hand of the setter-galley is located what I term the "justifying-stand," which consists of a suitable support 49, Figs. 13, 467, and 471, adapted to sustain the base portion of the space-channels 1,013, which are connected with the removable or transfer space-channels 1,014 in the manner hereinbefore described in connection with the selection of the spaces. The front part of the bottom of said base portion of the space-channels is removed to expose the lowermost type therein in order that the same may be readily grasped by the thumb and finger of the operator, while the space next above is kept in place by the guard-cap 1,015, as shown in Figs. 433 to 436, inclusive. A bell-shaped mouth 1,016 is also provided, by means of which any space improperly taken may be returned to the channel into position beneath the lowermost type. The spaces being inserted by means of the cord 1,023 and the actuating mechanism, the finger-block is at the proper time moved upon the raceway in one direction into position to take the type and the finger is entered into the line at the proper point by the hand of the operator, when the finger-block is moved in the other direction to advance the type toward and into the galley.

*The type-setter galley and mechanism for depressing the type therein.*—Rigidly attached to the distributer-galley plate at the left-hand end of the machine is the type-setter-galley plate 47, Figs. 446, 450, 470, and 471, in which the setter-galley 1,045 is inserted. Said galley is shown in detail in Figs. 437 and 440, and is provided upon the left-hand side with a semicircular recess 1,046, Figs. 437 and 438, which is adapted to be engaged by a rib upon the face of a lever 1,047, Figs. 439, 447, and 450, pivoted upon the left-hand side of the type-setter-galley plate for locking the galley in position. A supporting-block 1,048 is located and adapted to move vertically in the galley. Any suitable friction device may be provided for holding the block in a given position to support the column of type as the justified lines are successively added and the column and supporting-block are caused to be depressed step by step in the galley, as indicated in Fig. 446. In the same plane with the type-setter-raceway extension 98, Fig. 444, is a movable gate 1,089, the operation of which will be hereinafter described. The normal position of said gate is shown in the figure last named, in which position it serves, as shown, as a further continuation of the raceway and as a temporary support for the type-line which is to be inserted in the galley and which is advanced from the raceway extension upon said gate. Secured to a shoulder upon the left-hand side of the galley-plate is a movable abutment 1,080, which is adjusted longitudinally by means of a screw 1,081, Figs. 447 and 450. The inner face of said abutment is intended to be in alignment with the inner face of the galley and is intended to serve as a stop for the type-line, as shown in Fig. 444. Secured in a suitable guide upon the right-hand side of the galley-plate is a sliding plate 1,083, Figs. 444 and 445, having fingers 1,084, adapted to project upwardly through openings at the end of the raceway extension and to serve as a movable abutment for the right-hand end of the type-line when in position over the gate, so as to prevent any displacement of the type and to sustain it while being depressed into the galley. The bar 1,083 is operated by means of a finger-plate 1,082. When the line is in position upon the gate between the abutments mentioned, the gate is automatically withdrawn from beneath it, and the line is depressed into the galley by means of a depressor-bar 1,076, Fig. 444, in the manner hereinafter specified. The depressor-bar is provided with a vertical shank 1,075, Figs. 444, 446, 467, and 471, arranged in a guideway in a block or extension forming a part of the support 49. The shank of the depressor-bar is connected by means of an adjustable link, as shown in Fig. 467, to an arm 1,074, which is in turn rigidly attached to a shaft 1,071, supported in bearings 50 50 upon the support 49. A rigid arm 1,072 upon said shaft is provided with a pin 1,073, adapted to engage with the working face 219 of a peculiarly-formed cam 218, which will now be described. The cam 218 is loosely mounted upon a sleeve 1,049, Fig. 466, mounted upon the shaft 126, so as to revolve therewith. Upon one end of said sleeve is the gear 160, having a friction-disk 1,050 upon its inner face. A disk 1,067 is keyed to said sleeve, so as to be moved longitudinally thereon while rotating therewith. The sleeve, with the gear and disk mentioned, is shown in Fig. 32 with the cam 218 interposed between them. Mounted upon the sleeve 1,049 is a loose sleeve 1,068, Figs. 32 and 463, having a series of openings therein, in which are placed springs 1,069, which bear against the hub of the disk 1,067. A collar 1,070, Figs. 32 and 464, is screwed upon the end of the sleeve 1,049 and secured by means of a set-screw. By adjusting said collar the tension of the springs and the consequent pressure against the disk 1,067 may be varied. This enables the cam 218, which is loose upon the sleeve, as stated, to be clamped or pressed between the disk 1,067 and the friction-disk 1,050 with sufficient force to cause the cam to be rotated with the shaft 126, unless positively prevented, as hereinafter stated, when it slips upon the friction-surfaces. The cam 218 is composed of separate parts, as shown in Figs. 33 to 36, inclusive. The main parts 1,051 and 1,065, Figs. 35 and 36, are rigidly connected with each other by means of bolts 1,055, which are passed through openings formed in a hub 1,054 upon the former. Loosely fitted upon a shoulder in the part 1,051, is a ring 1,056, Fig. 33, having the extension 1,057 adapted to fit beneath a recess 1,053, an abutment 1,058, adapted to enter said recess in the manner hereinafter stated, and a plate 1,059, adapted to cover said recess and to be received within a shallow recess 1,052. A secondary ring 1,063, Figs. 32 and 34, is secured within the part 1,065, and the rings 1,063 and 1,056 are connected to each other by means of a spiral spring 1,062, the bent end 1,061 of which is adapted to enter an opening 1,060 in the ring 1,056, while the opposite end is connected in like manner with the ring 1,063. A set-screw 1,064 enables the ring 1,063 to be so set as to cause the abutment 1,058 to be normally withdrawn from the recess 1,053, which, being inclosed on all sides, forms an air-cushion to prevent a shock in case of the stoppage of the revolution of the cam. Upon the shaft 1,071, Fig. 467, is an arm 1,077, which is provided with a weight (not shown) which is adapted to raise the depressor-bar. When in this position, the pin 1,073 upon the arm 1,072 is adapted to engage the abutment 1,066, and thus prevent the revolution of the cam 218. The air-cushion described is intended to prevent any shock when this occurs.

When it is desirable to depress the line into the galley, the bar 1,076, Fig. 444, is depressed sufficiently to cause the pin 1,073, Fig. 467, to be moved to the right into the line of the cam-groove 219, also shown in Fig. 32, by which movement the cam, which has been positively held against movement by the interposition of said pin, is released and caused to revolve with the continuously-revolving friction-disks between which it is located. The rotation of the cam causes the pin 1,073 to continue to rock the shaft 1,071 in the same direction in which the movement thereof is initiated by the hand of the operator and against the resistance of the weight upon the arm 1,077, thereby lowering the horizontal arm 1,074 and causing the depression of the depressor-bar 1,076, which forces the justified line down into the galley, as shown in Fig. 446. Upon the complete revolution of the cam the pin 1,073 is returned to its normal position against the edge 1,066 of the bearing-plate 1,059, which yields, as stated, and by virtue of the air-cushion prevents undue shock. The cam is thus held until it is again necessary to repeat the operation.

As has been stated, it is necessary to withdraw the gate 1,089 previous to the depression of the line in the galley. This is accomplished in the following manner: In the rear of and attached to the galley-plate at its upper end is a block 1,085, Figs. 448, 450, 451, and 454, which is provided with a recess 1,086, Fig. 451, to receive the bearing-faces 1,087 to guide the gate 1,089, Fig. 453, which is provided with a shank 1,090. Cover-plates 1,092 and 1,093, Figs. 452 and 454, are provided to protect said gate and shank. Within the shank is an opening 1,091, with which is connected the upper end of an arm 1,100, Figs. 447, 448, and 449, rigidly attached to a rock-shaft 1,098, supported in bearings in the rear of the setter-galley. A secondary arm 1,099 (better shown in Fig. 449) is attached to said rock-shaft, and is provided with a pin adapted to engage with a cam-groove 1,096, formed in a bar 1,095, Figs. 402, 446, 447, and 449, which is loosely secured in guides 1,097, 1,097 attached to the galley-plate. The bar 1,095 is connected by means of a rod 1,094 to the arm 1,074, as more clearly shown in Fig. 447. As the arm 1,074 is raised through the action of the weight upon the arm 1,077, Fig. 467, the shaft 1,098 is rocked through the action of the cam-slot 1,096 and causes the arm 1,100, and with it the gate 1,089, to be advanced into the position shown in Fig. 447. The depression of the arm 1,074 reverses this action and causes the withdrawal of the gate in time to prevent interference with the depressor-bar which acts in harmony therewith.

There is no natural division between the setting and distributing mechanisms at the type-case, for when the setting and distributing mechanisms in their normal operation are thus running together they form practically one machine, and the types pass in nearly steady streams from the lower ends of the type-channels, where they are introduced, to the points where they are ejected from the type-case into the position to be moved into the line of composition. The supply of type in the channels above this point is only drawn upon when the supply from below is temporarily insufficient. The types also are only advanced in the channels above the ejecting-point when the supply at the lower ends exceeds the amount being ejected from the type-case. The distributing mechanisms thus are practically automatic feeding mechanisms for the type-setter.

In consideration of the machine as a whole the setter mechanism, as before stated, may be regarded as constituting the main portion of the machine and the justifying and distributing mechanisms as auxiliary thereto, the combined mechanisms acting in harmony for the accomplishment of a single definite primary result—that is, the formation of a column of type in the galley.

The relative capacities of the two divisions of the machine—that is, the distributing portion and the type-setting portions—are not equal, the distributing portion being capable of cutting off or separating only one type from the end of the type-line during one impulse of the machine or during the revolution of the main shaft, while the setting portion is capable, when properly operated, of setting a number of types during the same period of time. To prevent, therefore, the emptying of the type-case by the setting out of the characters from it faster than they are distributed into it, the impulses of the machine, by the speed of the movement given to it, are caused to follow each other more rapidly than they can be used by the operator. From this it follows that in the normal operation of the parts a single type will be cut off from the end of the type-line at each impulse of the machine; but a group of type will not be taken by the operator at each impulse, a sufficient number of impulses escaping this action to cause the aggregate of the number of the type distributed to exceed the aggregate of the number of the type set.

Some of the special advantages resulting from the novel constructions employed in this machine are as follows:

In the advancement of the dead-matter column in the galley the upper line of the column is brought certainly and accurately into position for introduction into the raceway without undue strain. This result is accomplished by the employment of positive means having an excess of movement for advancing the column and intermediate friction-bearings to take up the excess of movement.

In the advancement of the type-line toward the cut-off the proper position of the end type of the line in the cut-off frame is certainly and accurately secured by means of a movable stop at the front end of the line, which stop at the proper time is rigidly held against forward movement, and by means of a positive forwarding mechanism having an excess of movement in connection with friction-bearings for taking up the excess of movement.

In the advancement of the type-line by pressure upon the rear end of the same the front type of the line is properly held in position as it enters the cut-off frame by the frictional resistance of the movable stop pressing upon the front of the same.

By the employment of the testing mechanisms it is made impossible for any weak or broken type to be introduced into the type-case.

The movements of the ward-lifting rock-shaft are accomplished with precision and without undue strain by the employment of curved bearing-supports throughout nearly its entire length in connection with balancing-springs upon the lever-arms at each end. By giving a slight downward and return movement to the ledge the necessity of causing the lifter to lift the whole body of type in the type-case from the ledge at each revolution is avoided.

By causing the movement of the line-feeding lever to be arrested when any one of the character-channels is filled it is made possible to stop and start the action of distribution without shock to the machine and without interfering with the operation of any other part.

By the employment in the setting portion of the machine of the initial plungers in connection with the ledge for supporting and the mechanism for imparting forward movement to the same the liability to give a partial movement to the ejecting-plungers is avoided.

By the employment in the justifying portion of the machine of power-actuated mechanisms to advance the line of type toward the galley the operator is materially assisted in his work and the operations are more quickly and accurately performed.

By the employment of the time-lock-relieving spring in connection with the setting mechanisms the effort of the operator in setting the keys is materially assisted and the complete movement of the keys is made certain.

The specific construction of the details of this machine in which the novel features are embodied may be variously changed without altering the essential principles which are claimed as new.

The terms "horizontal," "vertical," "upward," "downward," "front," "rear," and other similar terms are used for convenience of description, and it is not intended by their use to limit the arrangement of the parts to the relative positions indicated.

Having thus fully described my invention, what I claim as new, and desire to secure by Letters Patent, is—

1. The combination in a type setting and distributing machine of a column raising mechanism in operative connection with a two part shaft connected with the main driving power, and a yielding connection interposed between the two parts of said shaft, said connection being adapted to act positively under normal conditions but to yield to undue or abnormal strain, substantially as described.

2. The combination with a column advancing mechanism and a source of power, of a catch box, substantially as described, interposed between one of the shafts connected with the main power, and one of the shafts connected with the column raising mechanism, the construction being such, that when the movement of the latter is arrested from any cause, the parts of the catch box will yield, and permit the disconnection of the shaft of the column raising mechanism, from the shaft connected with the main power, without the injury of any part.

3. The combination of the independent main power shaft 115, and the independent auxiliary column raising shaft 128, with an interposed catch box, uniting the shafts, which catch box has upon one part a hook portion, and upon the other part a tooth portion adapted to engage with each other in such manner as to separate under abnormal strain and to reconnect and continue its action under normal conditions, substantially as described.

4. The combination of the sleeve 220, on the distributer carrier returning shaft 115, which sleeve has the catch piece 225 pivoted thereon, and provided with a hook portion 226, with the portion 233 of the pinion shaft extension 128, which extension has a tooth 234, adapted to engage with the hook portion 226, and with the spring 227, adapted to hold the hook portion and tooth in proper engagement, as described.

5. The rack-plate 255 having the teeth 256 adapted to engage with the gear wheels 159—159 upon the hollow shaft 131, and the base blocks 258—258 in combination with the movable bar 261 in the galley, for the purpose of advancing the dead matter column in the galley.

6. In a column raising mechanism, the pawl plate, pawls and ratchet wheel, with actuating parts for giving an excess of movement to the same, in combination with the shaft 131, and gear wheels 159—159, having a limited movement, the construction being such that the ratchet wheel slips upon the frictional bearing surfaces, by means of which the ratchet wheel is secured to the shaft.

7. In a column raising mechanism, a ratchet wheel 274, on the hollow shaft 131, having the hub 275, and the pawl plate 276, turning freely on the hub, in combination with the gear wheel 159, keyed to the shaft 131, the collar 272 rigidly secured to the shaft 131, the collar 282 keyed to the shaft in such a manner as to slide longitudinally thereon, the friction bearing surfaces on the gear wheel 159 and the collar 282, and the nut 287, on the shaft 131 for forcing the collar 282 toward the gear wheel 159, to cause the clamping of the ratchet wheel 274, between the friction bearing surfaces, without interfering with the rotary movement of the pawl plate.

8. In the column raising mechanism, a ratchet wheel having a hub turning freely upon a shaft, a pawl plate turning freely upon the hub, in combination with the clamps substantially as described, having frictional bearing surfaces for clamping the ratchet wheel to the shaft, without interfering with the movement of the pawl plate upon the hub.

9. In a column raising mechanism, the ratchet wheel on the shaft 131, the nut 287, and friction clamp for clamping the ratchet wheel to the shaft, in combination with the spiral spring 291, interposed between the nut and the clamp as described.

10. In a column raising mechanism, the hollow shaft 131, having located on it the ratchet wheel 274 and the friction spring clamp for clamping the ratchet wheel to the hollow shaft 131, in combination with the rod 299 screwed into the hollow shaft 131, the collar 301 on the rod 299, and the sleeve 284 engaging at one end with the spring 291, and the other end with the collar 301, in such manner that when the rod 299 is turned in the proper direction, the spring 291 is compressed, and the ratchet wheel 274, released from the clamping action, as described.

11. In a column raising clutch mechanism, the cam 205, the lever 311, the hinged clutch 322, 323, in combination with the collar 305, secured to the shaft 131 in any proper manner, and having a V shaped groove to engage with the hinged clutch, for the purpose of clutching the shaft against movement at the proper time.

12. In a column raising mechanism, a forwarder substantially as described, for advancing the dead-matter column,—in combination with a clutch, substantially as described, for holding the column in position, while the forwarder makes its return movement, and adapted to unclutch and allow the forwarder to advance the column.

13. The nut 308, keyed to the shaft 131, the rod 299 held in the hollow shaft 131, having the screw threads engaging with the nut 308, and the hand wheel 302, in combination with the collar 305, and the clutch connected therewith for the purpose of clamping the shaft 131 to the collar 305, and releasing the same therefrom at the proper time.

14. In a column raising mechanism, the combination of the following elements:—the hollow shaft 131, the hand wheel 302 on the rod 299, the rod 299 in the hollow shaft 131, having screw threads engaging with the hollow shaft 131, and the coarser screw threads engaging with the nut 308, the collar 305 and the friction clutch connected therewith, the collar 301, connected with the sleeve 284, and the friction clamp for the ratchet wheel connected therewith.

15. In a column raising mechanism the cam 207, the lever 328, the pawl plate 276, and the ratchet wheel 274, in combination with the friction clamp for clamping the ratchet wheel to the shaft 131, as described.

16. In a line advancing mechanism, the gate 336, in combination with the levers 331, pivoted on the rod 100, and the eccentric shaft 130, as described.

17. In a mechanism for holding the type line, in its movement from the galley to the race-way, the gate 336, in combination with the spring stud 269, and the lever 344, as described.

18. The combination of the following elements:—a forwarder, substantially as described, for advancing the dead-matter column, a clutch, substantially as described, for clutching and unclutching the shaft of the forwarding parts, and a gate, substantially as described, for moving the upper line of the column, and introducing the same into the race-way.

19. The combination with a column raising mechanism of a forwarder, means for imparting an excessive movement thereto, and an interposed friction device adapted to yield to the excessive movement of the forwarder when the column is advanced to its full limit, substantially as described.

20. The combination with a column raising mechanism of a forwarder, means for imparting an excessive movement thereto, an interposed friction device adapted to yield to the excessive movement of the forwarder when the column is advanced to its full limit, a gate for removing the topmost line, means for actuating said gate, and means for causing a slight yielding of the column during the forward movement of the gate, substantially as described.

21. The combination with a gate for removing the line from the galley to the race-way, of a pivoted lever having one end in operative proximity to the end type as the line is removed upon the race-way and the other with a bearing face upon the gate and means for supporting the opposite end of the type line whereby lateral movement of the type may be prevented during the transfer thereof from the column to the race-way, substantially as described.

22. The combination of a column advancing mechanism, a shaft normally at rest in operative connection with said column advancing mechanism and adapted to advance the latter one step with each rotation thereof, a clutch for connecting the same with a continuously moving source of power, means for removing the topmost line of the column into a suitable race-way, a cut-off for separating the individual type from the line, a line follower for advancing the line to the cut off, and mechanism for connecting said line follower with said clutch whereby the line follower may serve to initiate the action of the column advancing mechanism, substantially as described.

23. The combination of a column forwarding mechanism, means for locking said mechanism with each forward movement of the dead matter column, a line forcer for removing the line from the column, a line follower, means for actuating the same, a cut-off for separating the individual type from the line, means for returning said line follower to its normal position when the last type of the line is removed by the cut-off, and means in operative connection with said line follower for unlocking said column forwarding mechanism, substantially as described.

24. The combination of a column forwarding mechanism, means for locking said mechanism with each forward movement of the dead-matter column, a line forcer for removing the line from the column, a line follower, means for actuating the same, a cut-off for separating the individual type from the line, means for returning said line follower to its normal position when the last type of the line is removed from the cut-off, means in operative connection with said line follower for unlocking said column forwarding mechanism, and means in operative connection with said line follower for initiating the forward movement of said column advancing mechanism, substantially as described.

25. The compound line feeding lever consisting of two parts 366, 370, joined at a common pivotal point by means of frictional contact, and means for imparting a reciprocating movement of definite length to one of said parts whereby the other may be permitted to be arrested in its movement at any point short of the full normal limit thereof, substantially as described.

26. The shaft 352, having the flange 350 with friction bearing face 351 rigidly secured to the shaft, in combination with the sleeve 355, having the friction bearing surface 357, the nut cap 365, the spring 364 interposed between the nut and the sleeve, and the lever 366, held on the shaft between the bearing faces 351, 357, as described.

27. In a compound line feeding lever having friction bearings, the combination of the following elements:—the hollow shaft 352 having the elongated opening 354; the block 360, the sleeve 355, the pin 363 passing through the sleeve, the pin and the block; the cap 365, and the spring 364 between the block and the cap, the construction being such that the wear of the friction surfaces is taken up by the reaction of the spring 364.

28. In a line feeding mechanism, a line follower bar 473, substantially as described, and a pawl slide block 376, having pawls adapted to engage with the line follower bar, in combination with a sliding plate 388, which is adapted by contact with the inclined surfaces of the pawls, to disengage the same from the line follower bar.

29. The combination of a two part line feeding lever having friction bearings adapted to slip the one upon the other, means for imparting a positive and constant movement to one of said arms, greater in extent than the width of the widest type to be forwarded, and a line follower in operative connection with the secondary arm of said lever, substantially as described.

30. The combination of a two part line feeding lever having independent arms connected at its pivotal point by frictional bearing surfaces, means for imparting a positive and excessive movement to one of said arms, a line follower in operative connection with the other of said arms, means for retarding by frictional action the foremost type in the line and a reciprocating cut-off having an opening therein adapted to receive the foremost type in the line while subject to said retarding action, substantially as described.

31. The combination of a two part line feeding lever having friction bearings adapted to slip the one upon the other, means for imparting a positive movement to one of said arms greater in extent than the width of the widest type to be forwarded, a line follower in operative connection with the secondary arm of said lever and a yielding stop in front of the type line adapted to offer a frictional resistance to the advance of the line by the forwarder.

32. The combination of a two part line feeding lever having friction bearings adapted to slip the one upon the other, means for imparting a positive movement to one of said arms greater in extent than the width of the widest type to be forwarded, a line follower in operative connection with the secondary arm of said lever, a yielding stop in front of the type line and a lock adapted to arrest the movement of the yielding stop at the proper time whereby the position of the front type of the line may be accurately determined, substantially as described.

33. The combination of the following elements: a compound line feeding lever having friction bearings, means for imparting an excessive movement thereto, a line follower bar in operative connection therewith, a feed controlling hook arranged to bear against the front end of the type line and to be moved thereby, and a cam in operative connection with said hook adapted to arrest the movement thereof and to hold, release and return the same to its normal position at the proper time, substantially as described.

34. In combination with a forwarder exerting a pressure on the rear end of the type line, a feed controlling mechanism, controlling the front end of the line, consisting of the following elements:—the cam 199, having the surfaces for arresting, releasing and returning the lever 403, as described, the lever 403, with friction bearing surfaces, as described, and the feed controlling hook bar, 413.

35. In combination with a forwarder arranged to act upon the rear end of a line, a two part friction joined feeding lever, means for actuating the same, a feed controlling hook bearing against the front end of the line, and the lever 403 connected therewith having frictional bearing surfaces adapted to offer frictional resistance to the movement of the feed controlling hook, substantially as described.

36. In a feed controlling lever the combination of the following elements:—the lever 403 having enlarged bearing surfaces, the stud 54 having a friction bearing surface, the collar 422, having a friction bearing surface, the screw cap 424, the spiral spring 425, interposed between the cap 424, and the collar 422, as described.

37. A line feeding mechanism consisting of the following elements:—the cam 201, with the bearing surfaces as described; the lever 366, 370, having friction bearings as described; the pawl slide block 376, with the pawls, and the line follower bar 473 engaging therewith, in combination with a feed controlling mechanism, consisting of the following elements;—the cam 199 having surfaces adapted to arrest the movement of the lever 403, and to return the same to its normal position; the lever 403, with the friction bearing surfaces, as described, and the feed controlling hook connected with the same; the line follower bar, and feed controlling hook being caused by means of the cams to cooperate in their movements, as described.

38. In combination with the cam 199, the cam 197, the spring 435, and the locking bolt substantially as described, adapted to lock the cam 199 against longitudinal movement upon the shaft, during the time that the cam 199 acts as a stop for the lever 403, and to unlock the same, during the time that the cam 199 is returning the lever 403, to its normal position.

39. The cam 199 in combination with the spring 435, which spring is adapted to hold the cam 199 in its longitudinal position on the shaft 126 with a spring pressure, and to yield when the feed controlling hook is obstructed in its return movement.

40. A cut off frame, having a race-way space adapted to receive and hold the type, openings adapted to permit the projection of the feed controlling hook into the frame, and openings adapted to permit the projection of the forwarding comb into the frame, in combination with a feed controlling hook, and a forwarding comb, as described.

41. A cut off frame and rod and lever connected with the rod for the purpose of actuating the same, in combination with a spring forming a yielding connection between the rod, and the lever in one direction, as described.

42. A reciprocating cut off frame having a rod portion 457, and a portion 456 forming a shoulder for a sliding sleeve 461 fitted upon the rod portion 457, a nut 463 fitted upon the rod, and a spring 464, interposed between the nut and the sliding sleeve, as described.

43. The combination of a two part feeding lever having friction bearings adapted to slip the one upon the other, means for imparting a positive excessive movement to one of said arms, a line follower in operative connection with the secondary arm of said lever, a yielding stop in front of the type-line adapted to offer a frictional resistance to the advance of the line by the forwarder, and a cut-off adapted to separate the end type from the line, substantially as described.

44. The combination of a two part line feeding lever having friction bearings adapted to slip upon each other, means for imparting a positive excessive movement to one of said arms, a line follower in operative connection with the secondary arm of said lever, a yielding stop in front of the line, a lock adapted to arrest the movement of the yielding stop at the desired point, and a cut-off adapted to separate the end type from the line, substantially as described.

45. The combination of the following elements:—a compound feeding lever having friction bearings, means for imparting an excessive movement thereto, a line follower bar in operative connection therewith, a feed controlling hook arranged to bear against the front end of the type line and to be moved thereby, a cam in operative connection with said hook adapted to arrest the movement thereof and to hold, release and return the same to its normal position, and a cut off for separating the end type from the line, substantially as described.

46. A forwarder adapted to exert a pressure upon the rear end of the type line in two distinct impulses, for the purpose of advancing the same along the race-way, in combination with a yielding stop in front of the type line, and a lock adapted to arrest the movement of the yielding stop at the proper points and at such times as to harmonize with the impulses of the forwarder.

47. A forwarder adapted to exert a pressure upon the rear end of the type line in two distinct impulses, for the purpose of advancing the same along the race-way, in combination with a cut-off actuated in two distinct impulses, for the purpose of separating the end type from the line, and for moving the same within the range of action of the conveying mechanisms, the impulses of the cut-off being given during the time when the forwarder is at rest.

48. A cut-off for separating the end type from the line, a forwarder for advancing the type along the race-way, and the lever 366—370, employed to actuate the forwarder, in combination with the cam 201, having a bearing surface of such conformation, as to cause, first, a pressure upon the rear end of the line, for the purpose of advancing the same, and then a release of the pressure, to permit the cut-off to act without undue strain.

49. In combination with the compound line feeding lever, having friction bearings, an abutment block substantially as described, adapted to return by the rearward movement of the lever, the front end to its normal position, as described.

50. In a column raising clutching mechanism, the combination of the following elements:—the lever 475, receiving movement from the forwarder of the type line, the lever 476, provided with the wedge piece 478, the wedge shaped cam piece 209, upon the sliding sleeve, the collar 479, the bolt 484, and the revolving gear wheel 158, as described.

51. In a column raising clutching mechanism, the wedge piece 478, receiving movement from the line forwarder by means of the levers, substantially as described, in combination with the sliding sleeve, having the cam piece 209, the collar 479, the bolt 484 and the revolving gear wheel 158.

52. In a column raising mechanism, the combination of the following elements for the purpose of locking and unlocking the cam shaft; the stud 512, receiving movement from the line forwarder, by suitable connections, as described, the push rod 507, the locking bolt 505, and the spring 506, as described.

53. In a mechanism for disengaging the pawls from the teeth of the line follower bar, the combination of the following elements:—a sliding plate adapted to actuate the pawls as described, a lever engaging with the plate, and a cam adapted to actuate the lever as described.

54. In a mechanism for disengaging the pawls from the teeth of the line follower bar, the combination of the following elements:— the sliding plate 388 upon the pawl slide block 376, adapted to actuate the pawls as described, the lever 492, attached to the rock-shaft 488, and engaging with the sliding plate as described, the lever 498, attached to the rock-shaft 488, and the cam 214, engaging with the pin of the lever 498, as described.

55. In a mechanism for disengaging the pawls from the teeth of the line follower bar, the combination of the following elements:— the lever 492, the rock-shaft 488, and the cam 214, the lever 492 being rigidly held in one direction on the rock-shaft 488, as described, and by means of a spring in the other direction as described, in such a manner as to be capable of receiving movement from the cam 214, for the purpose of disengaging the pawls of the line feeding mechanism, and also of receiving movement from the column raising mechanism for the same purpose, while the rock-shaft 488 is rigidly held by the cam 214.

56. In a mechanism for disengaging the pawls from the teeth of the line follower bar, the plate 388 in combination with the pin 524, adapted to receive movement from the column raising mechanism, as described, the lever 492, and the intermediate connecting parts, as described.

57. In a mechanism for registering the type upon the race-way, the cam 193, the right angled lever, and the registering plunger as described.

58. In combination with a comb above the race-way, for conveying the type along the same, a race-way located beneath the comb, and provided with openings, adapted to permit pieces of broken type, or other foreign matter to fall through the same, from the race-way as described.

59. The race-way frame 588, having the block portion 589—589, and the side plates 590—590, the construction being such, that short or broken type may be discharged between the side plates, out of the machine.

60. The race-way frame 588, having the side plates 590—590 with hard end pieces of steel 591—591 located at proper points, as, and for the purpose described.

61. In combination with a tester the race-way frame 588, having the bridge piece 593, provided with a pin 652, and coiled spring 653, the bridge piece being adapted to yield under the strain, as described.

62. In the distributing portion of the machine, a tester adapted to exert a pressure upon the type for the purpose of testing the strength of the same, and also adapted, when permitted by a weak and broken type, to receive an additional movement, to release an ejector, in combination with an ejector adapted when released and properly actuated, to eject the type from the race-way, substantially as described.

63. In a testing mechanism, a plunger actuated by a spring, and adapted to exert a pressure upon the type, in combination with a lever and cam, adapted to remove the plunger from contact with the type, at the proper time.

64. In a testing and ejecting mechanism, the plunger 612, 613, the spring 618, the lever 621, the lever 603, 604, the cam groove 191, in combination with the lever 636, the cam groove 192, the lever 622, 623, and the plunger 628, 630, as described.

65. The combination of the following elements, a cut-off substantially as described, for separating the individual types from the line, a conveyer and a tester substantially as described, for testing the strength of the separated types.

66. The combination of the following elements, a cut off substantially as described for separating the individual types from the line, a conveyer, substantially as described, for advancing the separated types along the race-way, a register, substantially as described, for adjusting the separated types longitudinally in their proper registering positions upon the raceway, and a tester, substantially as described, for testing the strength of the separated types.

67. The combination of the following elements:—a conveyer, substantially as described, for advancing the types along the race-way and presenting them successively to the action of the tester, and a tester, substantially as described, for testing the strength of the types presented thereto by the conveyer.

68. A race-way, adapted to support the type in such manner that one extreme is left without support, in combination with a tester, adapted to exert a pressure upon the unsupported end of the type, and a stop adapted to hold the other end of the type as described.

69. The combination with a testing plunger for testing the strength of the type, of means for exerting a pressure upon the type, an ejecting plunger, and means in operative connection with said testing plunger for initiating the action of said ejecting plunger when the testing plunger is caused to move beyond a given point by the yielding of the type submitted thereto for trial, substantially as described.

70. The combination of the following elements:—a testing plunger as described, adapted to exert a pressure upon the type, a spring adapted to actuate the plunger, a movable hook and intermediate connecting parts, by means of which the hook is actuated by the plunger; and a movable piece adapted to be supported by a hook, and also adapted to engage at the proper time with the type ejecting actuating mechanism, the construction being such that when the plunger by the action of the spring is moved beyond a certain position, the hook by this action is disengaged from the movable piece, and the latter consequently is permitted to move into position to cause the engagement of the mechanism for ejecting the type.

71. A raceway adapted to support the type at its extreme ends, in combination with a tester adapted to exert a pressure upon the type, between the points of support, as described.

72. In a type testing mechanism the combination of a spring actuated plunger for exerting a pressure upon the type, means for presenting the type thereto and removing it therefrom, means of raising said plunger to permit of the presentation and removal of the type and means for adjusting the pressure upon said plunger, substantially as described.

73. The combination with a type tester adapted to exert a pressure upon one portion of a type, of a raceway formed to support only that portion of the type body not acted upon by the tester, substantially as described.

74. The combination with a type tester, of a raceway arranged to support the type at the ends and provided with a yielding middle portion, substantially as described.

75. A race-way adapted to support the type at its extreme ends in combination with a tester having pivoted legs adapted to exert a pressure upon the type between the points of support, substantially as described.

76. A testing plunger having two legs, 649, 650, pivoted to the plate 651, which plate is itself pivoted to the plunger, as described.

77. A conveyer and supporting raceway in combination with type testers, one of which is adapted to exert a breaking strain upon the type in one direction, and the other to exert a breaking strain in the opposite direction, substantially as described.

78. The combination of the following elements:—the lever 621, pivoted as described, engaging with the lever 604, the compound ejecting plunger 628, 630, the trip lever 636, adapted to support the pivoted end 630 of the ejecting plunger, and the lever 622, 623, adapted to give movement to the ejecting plunger, as described.

79. In a wide type selecting mechanism, the combination of the following elements, a reciprocating trying bolt, adapted from its position in relation to the type presented to it, to be held against movement by a wide type, and to be permitted to make its full movement by a narrow type, an ejecting plunger, a selecting lever, and intermediate actuating parts, as described.

80. In a wide type selecting mechanism, the combination of a conveyer having a vertical and horizontal movement for forwarding the type, a reciprocating trying bolt in operative connection and adapted in its normal action to descend with said conveyer, said bolt being so placed with reference to the teeth of the conveyer, as to be engaged by a wide type, a selecting lever, an ejecting plunger, means for actuating the latter and means interposed between said trying bolt and selecting lever for holding the latter in position to cause the movement of the ejecting plunger, substantially as described.

81. The combination of the following elements:—a cut off substantially as described, adapted to separate the wide and narrow type from the end of the line, a conveyer, substantially as described, adapted to advance the wide and narrow type along the raceway, and a wide type selector and ejector, for selecting and ejecting the wide type from the raceway, the same being located at a point between the cut off, and the type case, as described.

82. In a type selecting mechanism, a ward plate, provided with a trying stud, adapted in shape and position to enter the round nick, as described, in combination with a selecting lever adapted as described, to cause the ejection from the raceway of any type in which the round nick is not presented to the action of the trying stud.

83. A ward plate provided with a trying stud, adapted in shape and position to enter the round nick of the type, as and for the purpose described, in combination with a conveyer adapted to present the type to the action of the trying stud, as described.

84. The pin 692, upon the galley plate 42, the vertically moving bolt 687 upon the comb, having the bearing shoulder 690, in combination with the lever 693, having the bearing face 696, the recess 697, and the selecting lever 699, as described.

85. The auxiliary transfer space channel having an upper portion provided with a spring catch 714, for supporting the type when this upper portion is removed, and having a base portion provided with an inclined face 709, adapted to withdraw the spring catch when the upper portion is placed in position on the base portion as described.

86. The selecting lever 738, having the bolt 741, in combination with the ejecting plunger 751, and the reciprocating finger 748, substantially as described, for actuating the bolt 741.

87. A selecting lever, having a movable bolt 741, adapted, when held in line with the reciprocating finger 748, to receive movement from the same, and communicate the movement to an ejecting plunger, as described, and an ejecting plunger, in combination with a carrier, adapted to impart a complete movement to the ejecting plunger, as described.

88. In combination with a ward lifting lever, a locking bolt substantially as described, adapted to lock the lever in its upward and downward positions, as described.

89. In combination with the lever 716, and the cam 182 for actuating the same, the locking bolt and the cam 184 for actuating the bolt, the construction being such that the locking bolt acts to lock the lever twice in each revolution of the cam, as, and for the purpose described.

90. In combination with the ward plates actuated as described to try the type by spring pressure, the ward lifting rock-shaft, the levers attached thereto, and the springs bearing upon the levers, for the purpose of balancing the spring pressure upon the wards, as described.

91. The ledge, cam, lever and intermediate parts, for giving vertical movement to the ledge, as, and for the purpose described, in combination with the lifter, the cams, levers and intermediate parts for giving vertical and horizontal movement to the lifter, as, and for the purpose described.

92. The combination of the following elements:—a series of weight plates resting upon the columns of type, and provided with inclined bearing surfaces, as described, a rock shaft having a bar 807 attached thereto, a bolt, adapted when in its engaged position to arrest the line feeding lever, a latch adapted to hold the bolt in its disengaged position, and a lever on the rock shaft adapted to move the latch, and release the bolt, as, and for the purpose described.

93. In combination with the rock-shaft, a series of weight plates, adapted by the upward movement of the type to actuate the rock shaft, and a latch substantially as described, adapted when actuated by the rock shaft to release the locking bolt to stop the feed, substantially as described.

94. In combination with the line feeding lever for advancing the type line, a locking bolt adapted to arrest the movement of the line feeding lever, and a latch substantially as described, actuated by any one of the weight plates, and the intermediate connecting parts, as described, for releasing the locking bolt.

95. The combination of the following elements:—a lifter for placing the types in the type channels, a plunger for ejecting the types from the channels, a bolt for locking the type feeding mechanism, a latch for holding the bolt in its disengaged position, and intermediate parts adapted to impart the movements of the types in the channels, resulting from the action of the lifter, to the latch, for the purpose of disengaging the same.

96. In combination with the locking bolt, substantially as described, the cam having the pin 824, and the intermediate lever 823, adapted to move the locking bolt into its unlocked position, once in each revolution of the machine.

97. In combination with the weight plate 808, the bar 807 on the arm 806 of the rock-shaft 124, the latch substantially as described for releasing the locking bolt, and permitting it to descend into its locking position.

98. The spring latch 818, a shelf or ledge for normally engaging the same, a spring for holding the same in engagement with said shelf, means in operative proximity to the weight plates for disengaging said latch from the shelf, spring actuated rod 813, and locking bolt 814, substantially as described.

99. The locking bolt 814, the rod 813, the spring 817, the bar portion 815, the latch 818, the spring 820, the shelf 812, in combination with the arm 821 on the rock-shaft 124, and the bar 807 actuated by the weight plate 808, as described.

100. A character channel having at the upper portion of its length an enlarged space for the introduction of pinchers, which space is formed by the beveled edges of adjacent strips, as described.

101. A type channel having special bearing surfaces in alignment with the ejecting type setter plungers and arranged to guide the type in their ejection from the channels, substantially as described.

102. In a type setter mechanism, the combination with a main ejecting plunger of an initial plunger and a detached intermediate plunger interposed between and in alignment with said initial and main plungers respectively, substantially as described.

103. In a mechanism for ejecting the type from the type-case into the race-way, an initial plunger, a ledge for holding the same in its disengaged position and a power actuated forwarder adapted to give movement to the initial plunger in combination with a detached intermediate plunger, the main ejecting plunger and the actuating lever 868 in operative connection with a key, substantially as described.

104. In a mechanism for ejecting the type from the type case, the lever 868, the initial plunger 871, and the ledge piece 884 in combination with the forwarding and returning rock-shaft 119 the initial plunger raising shaft 120, means for oscillating the same respectively, blade 887 and arm 895, substantially as described.

105. In a mechanism for ejecting three em spaces from the space case into the raceway, the combination of the following elements:— the rock-shaft 119 and the blade 887 attached thereto, the lever 912 for supporting the initial plunger 909 during the first forward movement of the blade 887, the arm 919, on the rock-shaft 119, and the connecting parts adapted to withdraw the lever 912 from beneath the initial plunger, when the blade 887 makes its return movement, these parts being combined for the purpose of detaining the initial plunger during the first forward movement of the blade 887, and releasing the same in time for the second forward movement of the blade 887, as described.

106. In combination with the initial plunger 909, a spring lever 912, having a projection 913, adapted to furnish a movable support for the rear end of the initial plunger, the spring lever being actuated at the proper time to release the rear end of the plunger as described.

107. In combination with the spring lever 912, having the projection 913 adapted to support the rear end of the initial plunger, the arm 919 on the shaft 119, and the lever latch 911 having the projection 914, the construction being such that by the forward movement of the arm 919 and the lever latch 911, the spring lever is disengaged from the rear end of the initial plunger, to permit it to fall within the range of action of the blade 887, as described.

108. The lever 912, adapted to support the initial plunger, the latch 911 attached to the lever 912, and the spring catch 917, in combination with the lever arm 910 actuated by the key mechanism, as described.

109. The space rail adapted to actuate the rod 906, in combination with the rod 906, and the lever 951, the lever being adapted at the proper time to move the rod 906 out of its engaging position, as described.

110. In a space setting mechanism the combination of the following elements:—a space rail 897, intermediate parts for communicating movement to the actuating rod 906, the lever 951, and the stud 905, on the lever as described.

111. The space rail and intermediate parts adapted to actuate the bar 941, in combination with the bar 941, the actuating rod 950, and the lever 951, adapted at the proper time to move the bar 941 out of the range of action, as described.

112. The space rail 897 and intermediate parts, adapted to give parallel movement to the sliding plate 940, and the plate 940 in combination with the series of bars 941, 942, the series of actuating rods 950, 950, and the keys, each one of which is adapted to move its corresponding bar into engaging position with the sliding plate 940.

113. The bars 941 in combination with the keys for moving the same into engaging position, and the lever 951 for moving the keys out of engaging position, as described.

114. A space key, and key bar 941, in combination with the pin 952, on the lever 951, having the stud 905, adapted to hold the actuating rod 906, the construction being such, that by the depressing of the auxiliary space key, the switch lever is actuated to lift the rod 906, out of its engaging position.

115. The switch lever 951, having the stud 905 and pin 952, adapted when the left hand end of the lever is depressed, to raise the engaged key bar 941 out of its engaging position with the sliding plate 940, and also at the same time move the actuating rod 906 into its engaging position.

116. A plunger adapted to eject a type from the type case into the race-way, and an actuating carrier adapted to hold the plunger for an instant in its extreme forward position, in combination with a type gate as described, which type gate is caused at the proper time to rise partially behind the type, before the plunger is withdrawn, as described.

117. The combination with a type case of a race-way, means for moving the type from the case upon said raceway, a type gate normally in position to permit the passage of the type from the case to the raceway and means for automatically actuating said gate when the type is advanced whereby it may form a stop to prevent the backward movement of the type, substantially as set forth.

118. In a type driver mechanism the fixed gear wheel 154, the shaft 108, the disk 109 attached to the shaft, the intermediate gear wheel 155, the pinion 156, and the crank 962, as described, in combination with the guide bar 77, and the sliding block 964, the crank pin being secured to the block in such a manner as to permit a slight lateral movement, as described.

119. A type driver head provided with a movable slide, adapted to make contact with the type, and a recess adapted to form an air cushion for the slide, the construction being such, that a yielding resistance is offered to the blow of the type against the slide, as described.

120. A type driver head, provided with a movable slide, adapted to make contact with the type, and a recess adapted to form an air cushion for the slide, in combination with the stop plates 976, 976, adapted to insure the complete movement of the slide in the driver head, as described.

121. In an auxiliary type driver mechanism the lever 977, the vertical portion 978, the portion 980, in combination with the longitudinal block 982, and the lever 981 as described, the construction being such that a vertical and longitudinal movement are imparted to the auxiliary type driver.

122. An auxiliary type driver having the vertically moving block 980, and the longitudinally moving block 982, in combination with the levers and cams for imparting vertical and longitudinal movement, as described.

123. The combination with the character keys and type ejecting mechanism of a type setting machine, of a rock-shaft in operative connection with said keys, an arm having a beveled bearing face and a relieving spring arranged to bear upon said beveled surface as a result of a slight depression of the key to aid in completing the initial movement of said ejecting mechanism, substantially as set forth.

124. In a type setting mechanism the character keys, the intermediate parts for communicating movement to the arm 999, the arm 999 having the beveled bearing face, in combination with the relieving spring 1,001, as, and for the purpose described.

125. A space channel having a guard plate, adapted to prevent the second space from the bottom, and adjoining spaces above, from being removed in front, as described, and having an open space exposing the front end of the space on the bottom and sides of the same, in such manner as to permit the lowermost space to be grasped by the thumb and finger of the operator, and a bell mouth, adapted to permit the introduction of a space into the lower end of the channel, as described.

126. In a space channel a fixed base portion, adapted to expose the front end of the lowermost type, and provided with a guard plate, and bell mouth as described, in combination with a removable upper portion, as described.

127. In combination with the raceway extension 98, the finger block 1,017 secured to the front edge of the same, in such manner as to be capable of a free movement in a longitudinal direction, and the finger 1,019, and the spring plate 1,020, as described.

128. The finger block 1,017, the endless cord 1,023, the pulleys over which the cord 1,023 is held, in combination with the actuating mechanism consisting of the shaft 134, the friction disk 1,035, on the shaft 134, and the friction disks 1,032 and 1,034, on the shaft 133, as described.

129. The type setter galley 1,045, having the circular recess 1,046, in combination with the lever 1,047, having a circular rib, adapted to enter the recess, for the purpose of securing the galley in position, as described.

130. In a mechanism for depressing the line into the galley, the cam 218, on the shaft 126, adapted as described, by means of friction bearings, to revolve with the shaft, and provided, in connection with its groove, with an abutment as described, in combination with the lever 1,072, and the pin 1,073 adapted in connection with the abutment to arrest the movement of the cam, and also to receive movement, first from the operator, and then from the cam, as described.

131. In a mechanism for depressing a line into the galley, the cam 218, in combination with the friction bearing surfaces, and the springs 1,069, for maintaining an elastic pressure on the same, as described.

132. In a mechanism for depressing the line into the galley, the lever 1,072, having the pin 1,073, adapted to arrest the movement of the cam 218, in combination with the cam 218, having a recess 1,053, and an abutment block 1,058, as described, the construction being such that an air cushion is formed to arrest the movement of the cam, without due shock, as described.

133. The lever 1,072, the pin 1,073, the cam 218 having the recess 1,053, the abutment block 1,058, in combination with the spring 1,062, and the intermediate connecting parts, the spring being adapted to offer a yielding resistance when the movement of the cam is arrested, and also to return the abutment block 1,058 to its normal position, as described.

134. In a mechanism for depressing the line into the galley, the shaft 1,071, having a vertical arm 1,072, a pin 1,073 located thereon, and a horizontal arm 1,074 connected with the standard 1,075 of the depressor bar 1,076, in combination with the cam 218, for actuating the same.

135. In a galley mechanism the base block 1,079, the abutment portion 1,080, having the adjusting screw 1,081, in combination with the handle plate 1,082, and the sliding bar 1,083, having the stud 1,084, as described.

136. The lever 1,074 of the line depressor, in combination with the rod 1,094, the block 1,098 having the cam slot 1,096, and the rockshaft 1,098 with the lever 1,100 attached thereto, for the purpose of actuating the gate 1,089, as described.

137. In combination with the distributing portion of the machine, adapted to cut off from the end of the type line one type at each impulse of the machine, the setting portion adapted to permit the taking of the type in groups, for the character channels as described, and a feed stop mechanism adapted to arrest the line feeding lever, when any one of the character channels is full, substantially as described.

138. In a column raising clutching mechanism, the wedge piece 478 receiving movement from the line forwarder, in combination with the sliding sleeve having the cam piece 209, and with the bolt 484, the sliding sleeve being adapted to move the bolt 484, for the purpose of clutching the column raising mechanism, as described.

139. In combination with a tester the raceway frame 588, having the bridge piece 593, adapted to yield under strain.

140. The combination of a suitable support for the type, with a tester substantially as described, adapted to exert a pressure upon each type, as it is successively presented to its action, for the purpose of detecting the presence of weak or broken type.

141. A lifter adapted to advance the type into the channels of the type case, in combination with a ledge which is capable of having imparted to it a movement from its normal position, for the purpose of permitting the type to be placed in position by the lifter, and a return movement to its normal position, for the purpose of receiving the type from the lifter, as described.

142. A combined machine having a main portion for setting the type, an auxiliary portion for distributing the type to the setting portion, and a further auxiliary portion for testing the type, and rejecting the imperfect type, before the final operation of distribution is performed, as described.

143. A combined machine, having a main portion for setting the type, an auxiliary portion for distributing the type to the setter, an auxiliary cut off portion for separating the individual types from each other preparatory to the distribution of the same, and a further auxiliary portion for testing the type, and rejecting the imperfect type before the final operation of distribution is performed.

144. In a feed stopping mechanism, a locking bolt, a latch adapted to hold the locking bolt in its disengaged position, a weight plate and intermediate connecting parts, the construction being such that the movement of the type in the channel disengages the latch, and permits the locking bolt to move into engagement with the feeding mechanism, and arrest the movement of the same, as and for the purpose described.

145. The compound line feeding lever 366—370, having the friction bearings adapted to slip the one upon the other, in such a manner as to permit the actuated end of the lever to have a constant reciprocating movement of definite length, and to permit the other end, when its movement is arrested, to have a limited movement of variable length; in combination with the line follower bar and the intermediate connecting parts, as described.

146. A ledge, adapted to have a vertical motion for the purpose described, in combination with a lifter adapted to have a vertical and horizontal motion for the purpose described.

This specification signed and witnessed this 17th day of August, 1887.

JAMES WILLIAM PAIGE.

Witnesses:
D. L. ABERDEIN,
H. W. BEADLE.